(12) United States Patent
   Van Winkle

(10) Patent No.: US 11,255,498 B2
(45) Date of Patent: Feb. 22, 2022

(54) LED LIGHT FIXTURE WITH NIGHTLIGHT

(71) Applicant: ETi Solid State Lighting Inc., Wheeling, IL (US)

(72) Inventor: Gary Van Winkle, Chagrin Falls, OH (US)

(73) Assignee: ETi Solid State Lighting Inc., Wheeling, IL (US)

(*) Notice: Subject to any disclaimer, the term of this patent is extended or adjusted under 35 U.S.C. 154(b) by 0 days.

(21) Appl. No.: 16/915,291

(22) Filed: Jun. 29, 2020

(65) Prior Publication Data

US 2021/0054979 A1 Feb. 25, 2021

Related U.S. Application Data

(63) Continuation of application No. 16/710,777, filed on Dec. 11, 2019.

(60) Provisional application No. 62/778,626, filed on Dec. 12, 2018, provisional application No. 62/835,648, filed on Apr. 18, 2019.

(51) Int. Cl.
   *F21S 8/00* (2006.01)
   *F21V 5/04* (2006.01)
   *F21Y 103/10* (2016.01)
   *F21Y 115/10* (2016.01)

(52) U.S. Cl.
   CPC ............... *F21S 8/033* (2013.01); *F21V 5/04* (2013.01); *F21Y 2103/10* (2016.08); *F21Y 2115/10* (2016.08)

(58) Field of Classification Search
   CPC ........ F21S 8/033; F21V 5/04; F21Y 2103/10; F21Y 2115/10
   See application file for complete search history.

(56) References Cited

U.S. PATENT DOCUMENTS

| 5,548,494 A | 8/1996 | Blackman |
| 6,280,053 B1 | 8/2001 | Chien |
| 6,322,228 B1 | 11/2001 | Feldman |
| 6,642,659 B1 | 11/2003 | Hsieh |
| 6,909,239 B2 | 6/2005 | Gauna |

(Continued)

FOREIGN PATENT DOCUMENTS

| CA | 2885837 A1 | 1/2016 |
| CA | 3007238 A1 | 1/2016 |

(Continued)

OTHER PUBLICATIONS

ETI Dimmable 10.4 Watt Color Selectable (2700K/3000K/3500K/4000K/5000K) 4" LED Recessed Downlight Retrofit with Nightlight Trim Retrieved from Internet at www.bulbs.com.
MLD Series—Recessed Down Light Signtex Lighting Inc., Retrieved from Internet at www.signtexinc.com.

(Continued)

*Primary Examiner* — Fatima N Farokhrooz
(74) *Attorney, Agent, or Firm* — Walter Haverfield LLP; D. Peter Hochberg

(57) ABSTRACT

A main light and a secondary LED light for generation lumination of particular light characteristics in a particular direction. This includes an LED lighting fixture having a main light in a ceiling/wall lamp and a nightlight transmitting nightlight illumination along a ceiling. Downlights are disclosed having a main illumination source a secondary lumination source as a nightlight or some other illumination.

29 Claims, 102 Drawing Sheets

(56) References Cited

U.S. PATENT DOCUMENTS

| | | | |
|---|---|---|---|
| 8,500,313 B2 | 8/2013 | DeVries et al. | |
| 9,500,352 B2 | 11/2016 | Van Winkle | |
| 9,541,270 B2 | 1/2017 | Van Winkle | |
| 10,091,855 B2 | 10/2018 | Van Winkle | |
| 10,462,871 B2 | 10/2019 | Van Winkle | |
| 10,492,262 B2 | 11/2019 | Van Winkle | |
| 2001/0048599 A1* | 12/2001 | Hess | F21S 8/06 362/290 |
| 2002/0136002 A1 | 9/2002 | Hoernig | |
| 2004/0257814 A1 | 12/2004 | Eusterbrock | |
| 2010/0277105 A1* | 11/2010 | Oyama | H05B 47/11 315/312 |
| 2011/0175545 A1* | 7/2011 | Harris | F21K 9/00 315/294 |
| 2012/0113635 A1* | 5/2012 | Sim | H05B 45/34 362/235 |
| 2013/0003369 A1* | 1/2013 | Hiraoka | F21V 17/002 362/231 |
| 2017/0030552 A1* | 2/2017 | Monteiro | F21V 7/0008 |
| 2020/0073046 A1* | 3/2020 | Kim | G02B 6/0091 |

FOREIGN PATENT DOCUMENTS

| | | | |
|---|---|---|---|
| CA | 2998173 A1 | 7/2018 | |
| CA | 3048045 A1 | 7/2018 | |
| CN | 1457622 A | 11/2003 | |
| CN | 106151934 A | 11/2016 | |
| CN | 205877991 U | 1/2017 | |
| CN | 107726164 A | 2/2018 | |
| KR | 1694715 * | 1/2017 | F21V 17/10 |
| WO | 1999044397 A1 | 9/1999 | |
| WO | 2011098063 A1 | 8/2011 | |

OTHER PUBLICATIONS

Elipse12 volt LED Dome Lights (10-30vdc)—Ceiling Hugger 462 lumens, satin nickel with soft touch dimmer and blue LED night light Retrieved from Internet at www.salvinco.com.

EMLED Series—ELDD Mule Lighting, Inc., Retrieved from Internet at www.mulelighting.com.

LED Recessed Can Emergency Light with Security/Night Light—Drywall Retrieved from Internet at www.emergencylight.net.

* cited by examiner

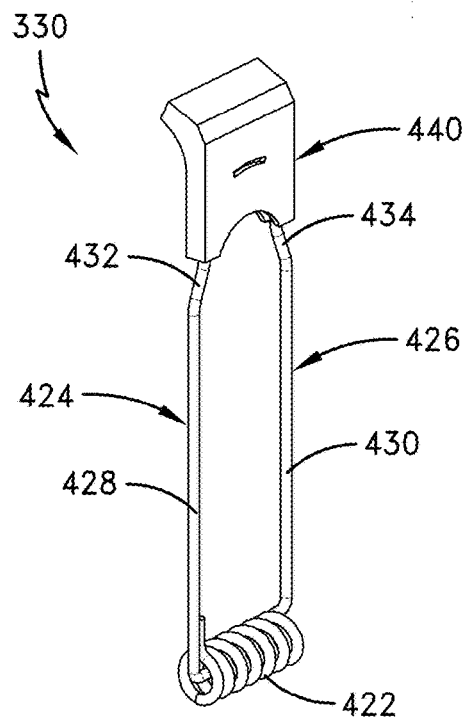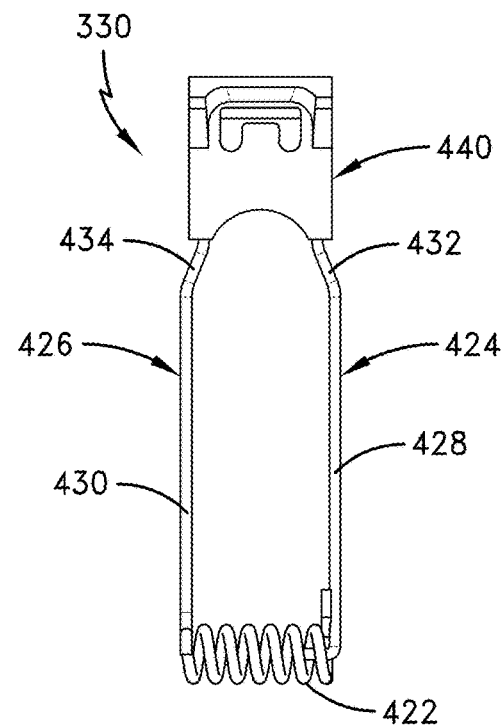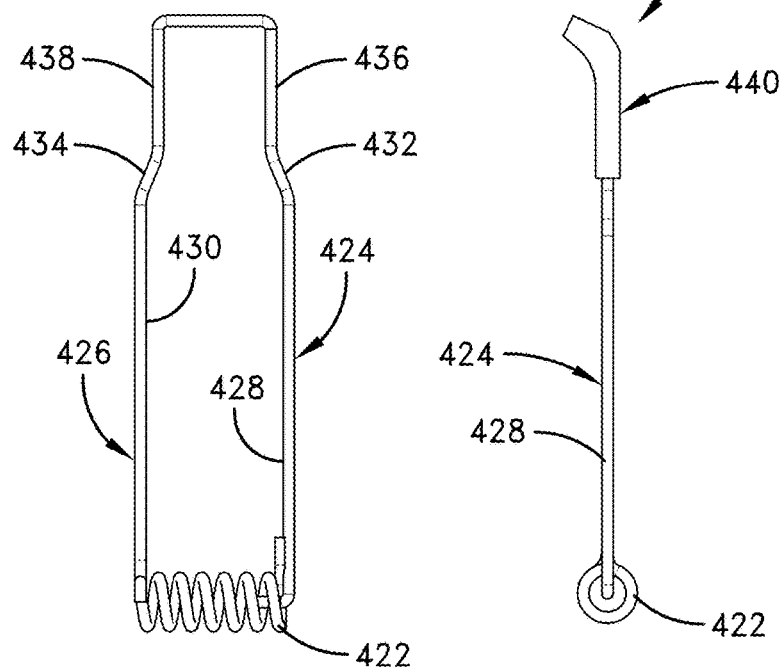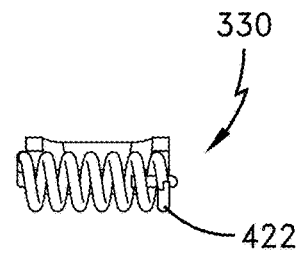
FIG.26A  FIG.26B  FIG.26C  FIG.26D  FIG.26E

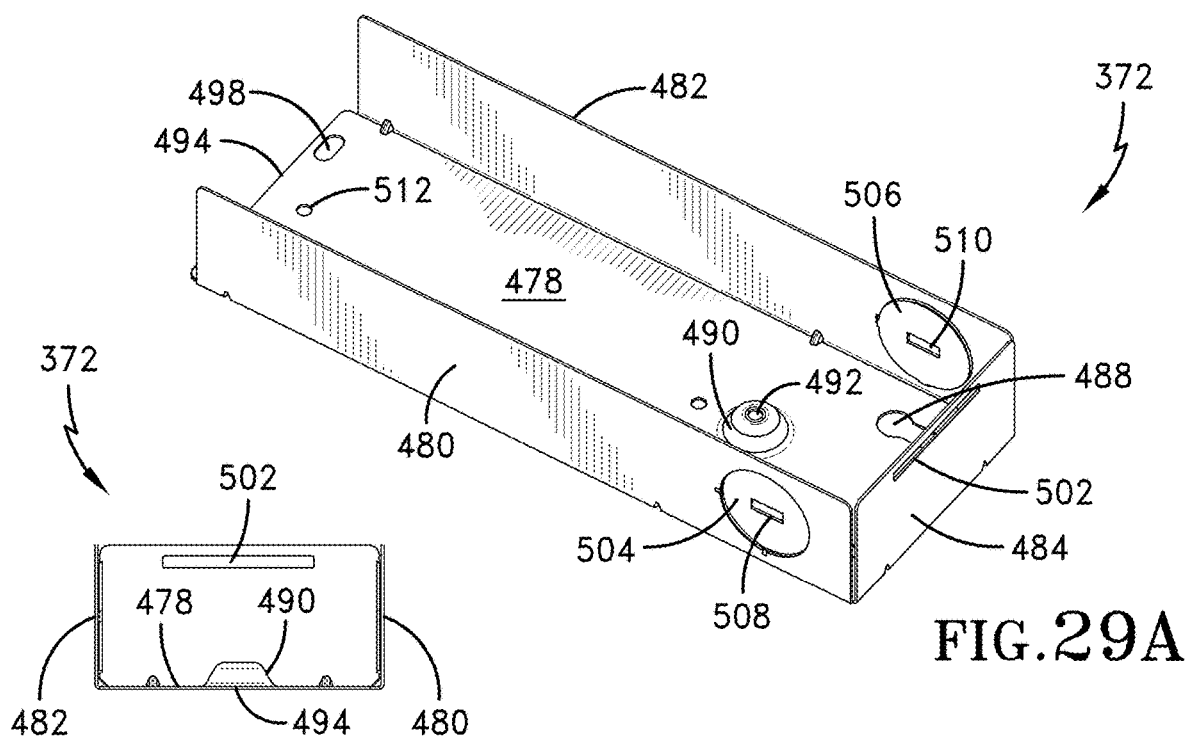
FIG.29A
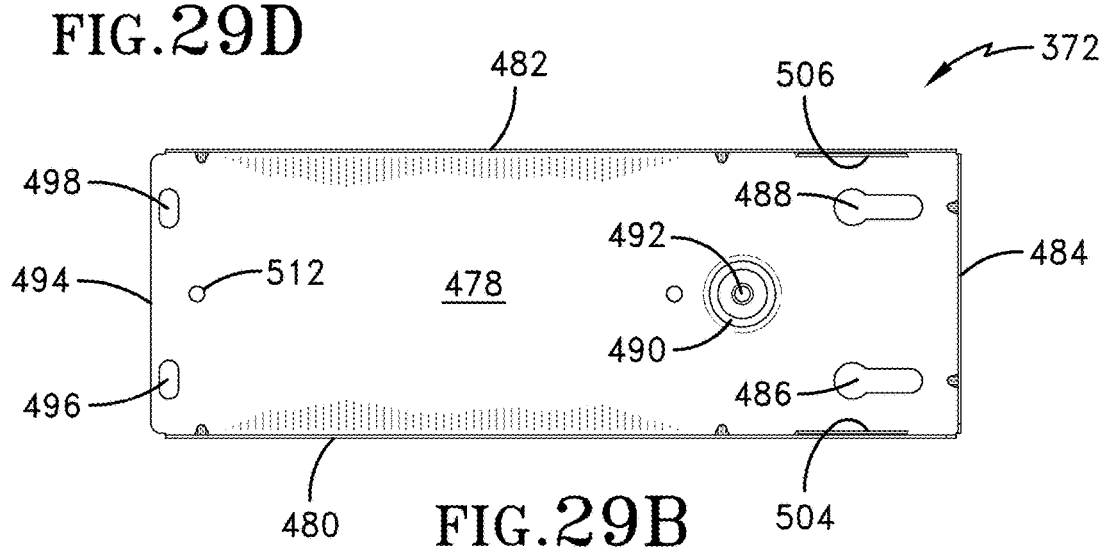
FIG.29D
FIG.29B
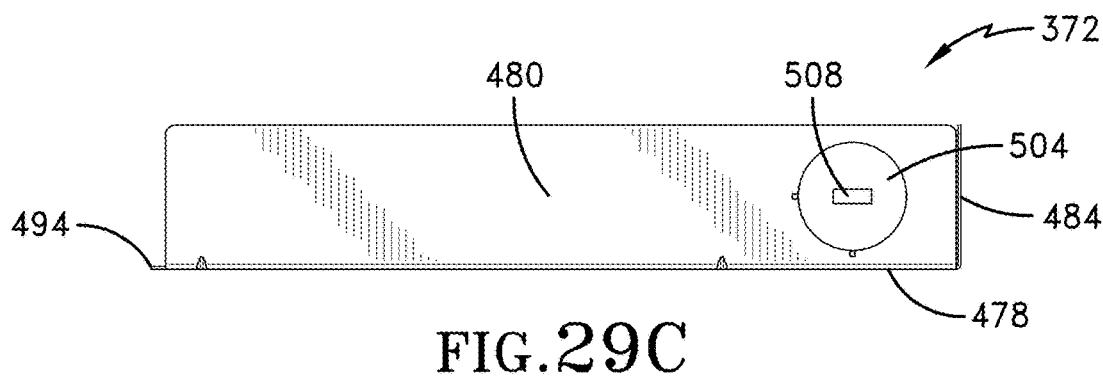
FIG.29C

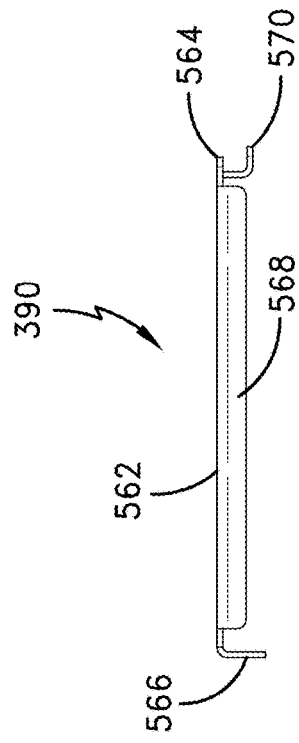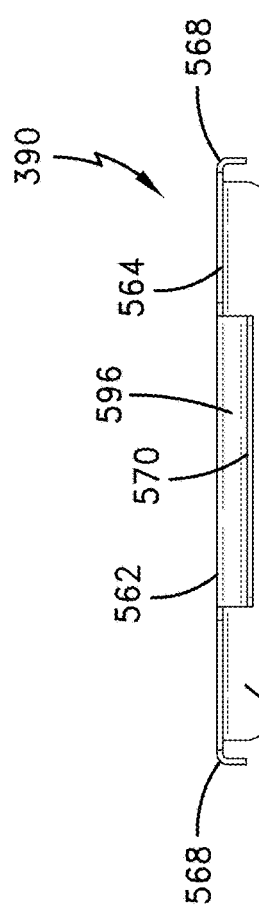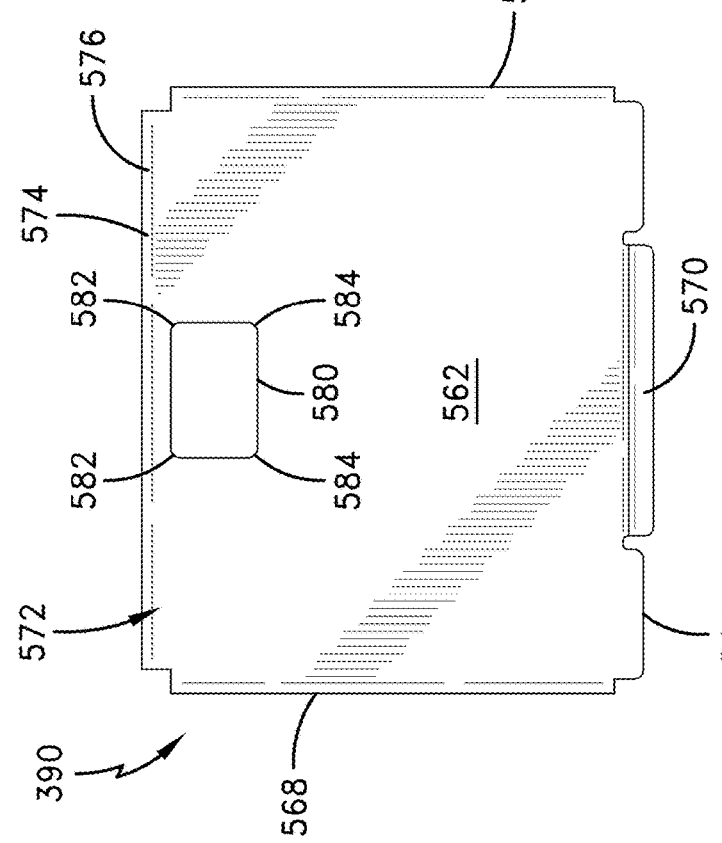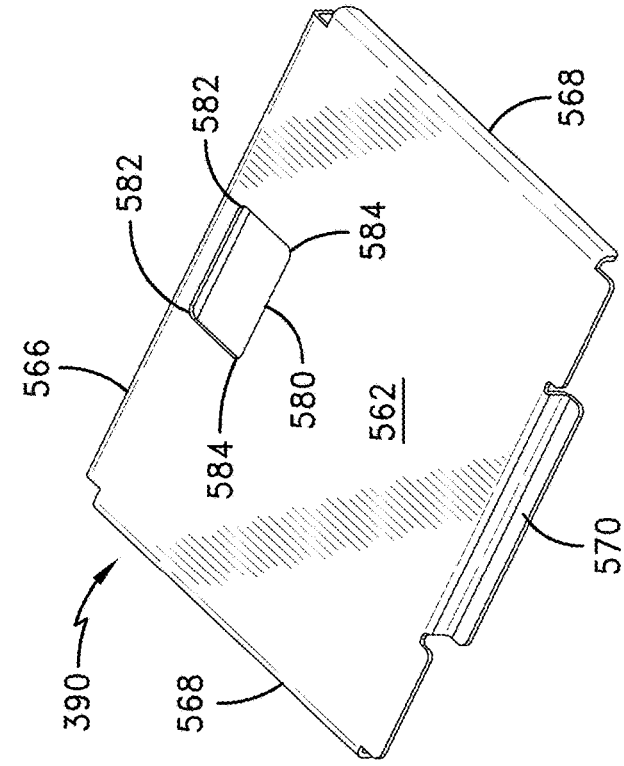

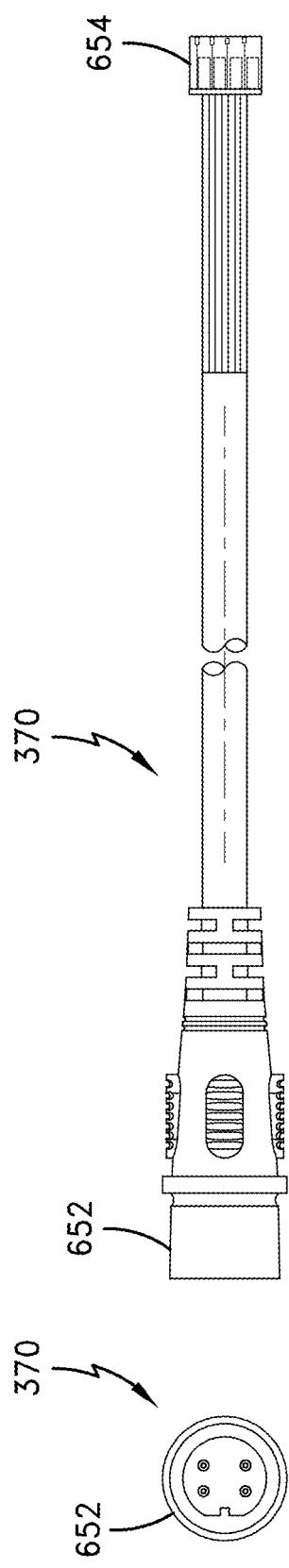
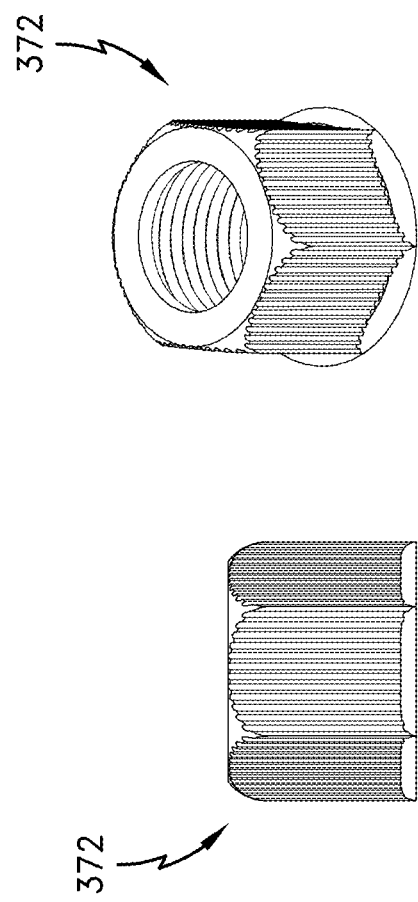
FIG.35A
FIG.35B
FIG.36A
FIG.36B

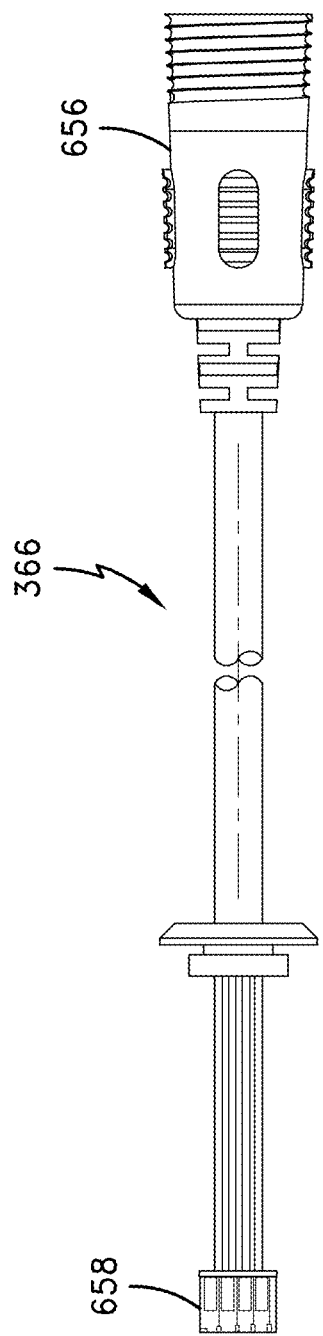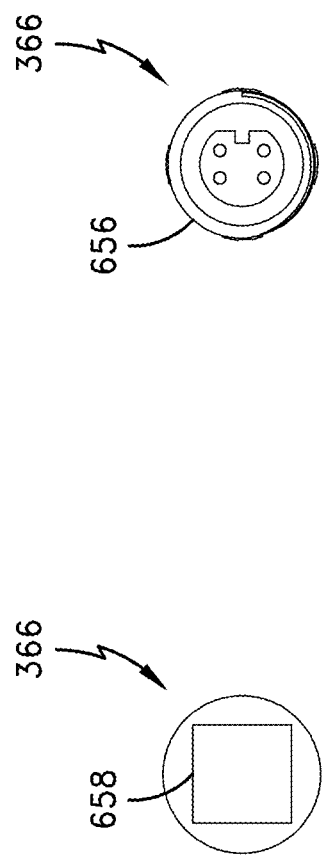
FIG.37A
FIG.37B
FIG.37C

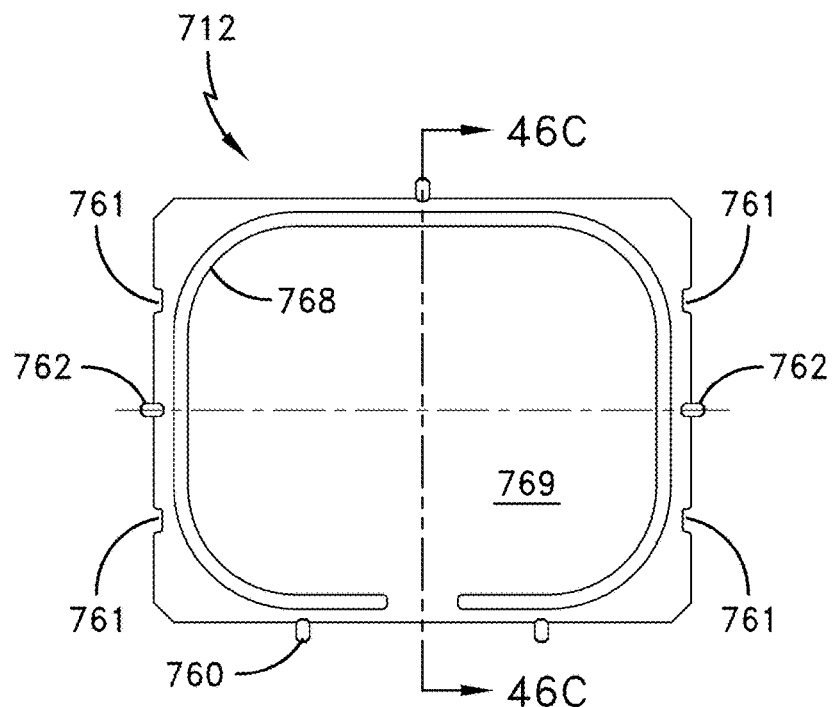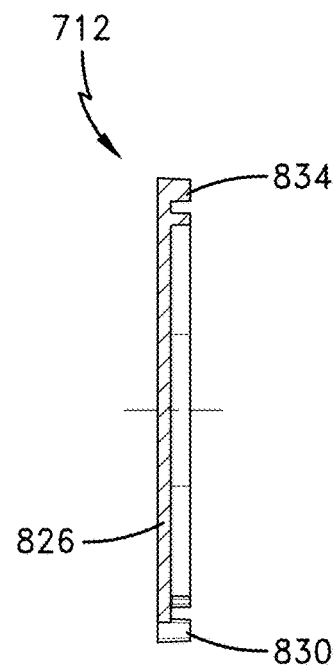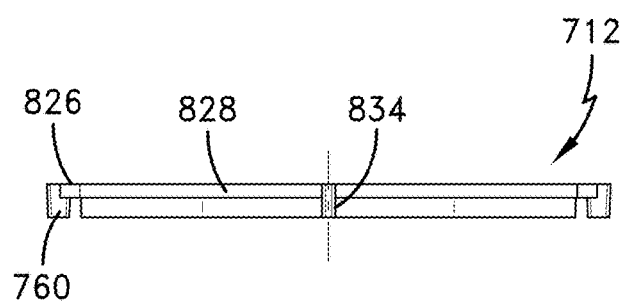
FIG.46A
FIG.46C
FIG.46B

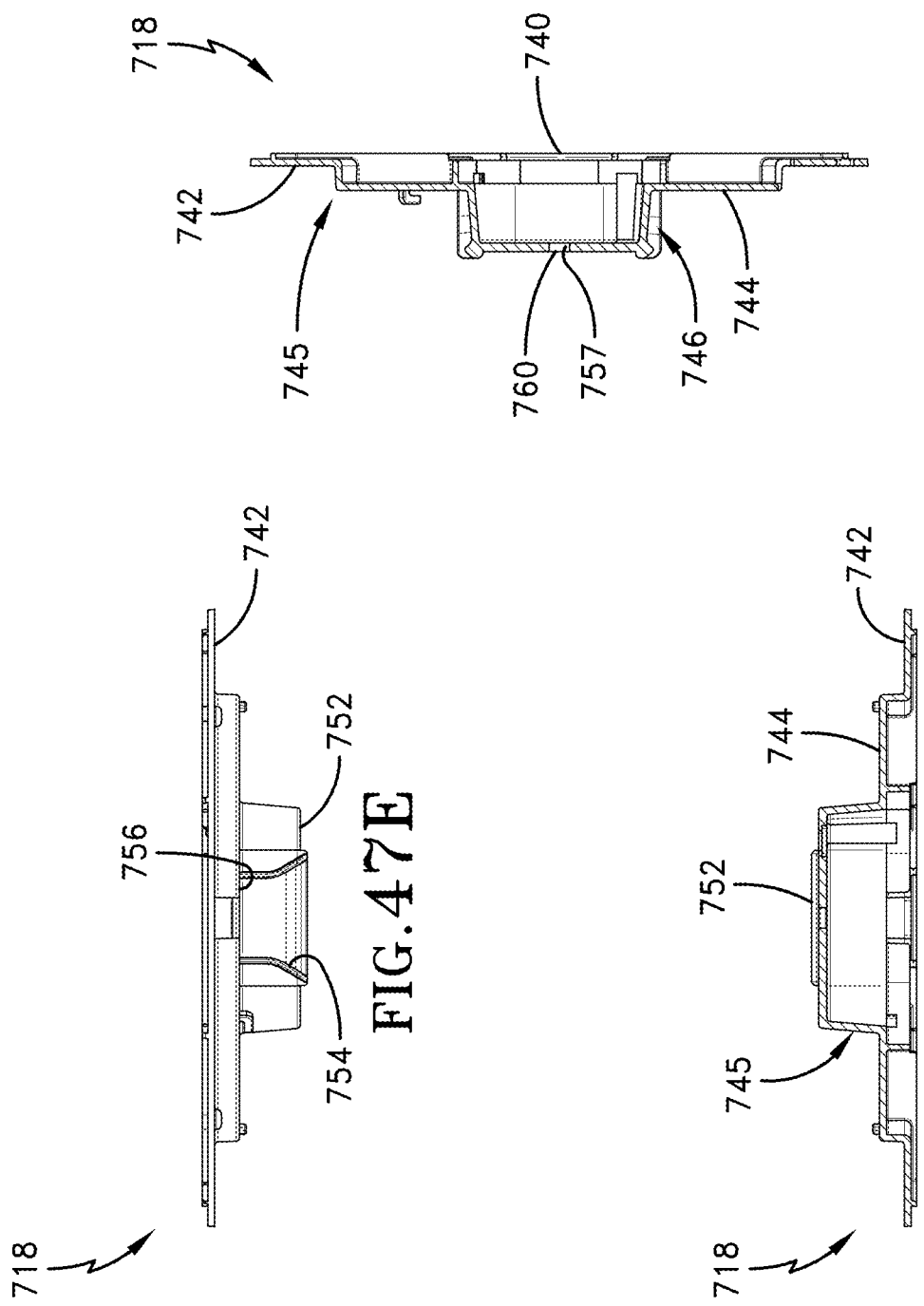

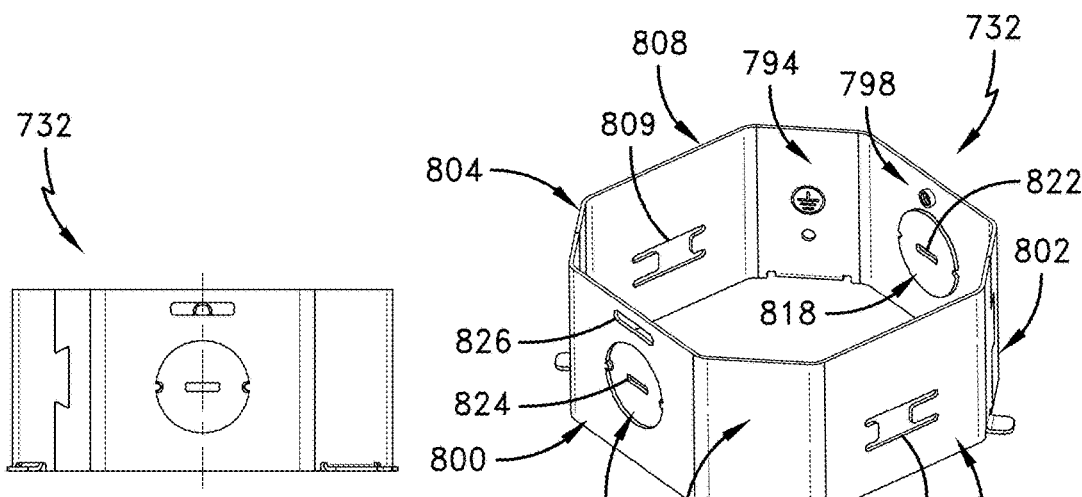
FIG.50B
FIG.50A
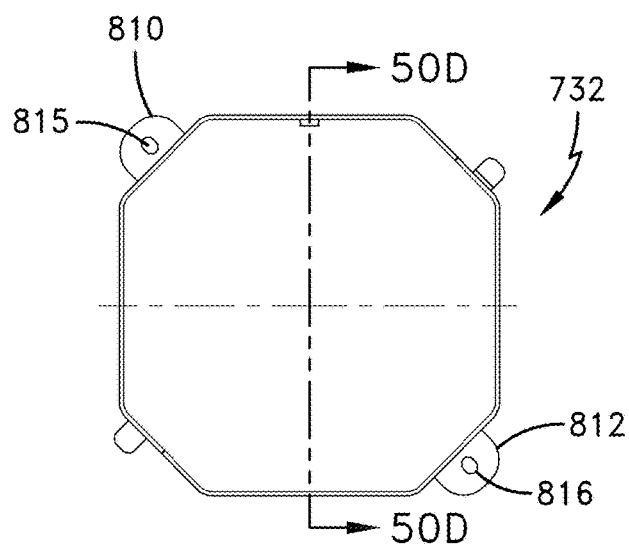
FIG.50C
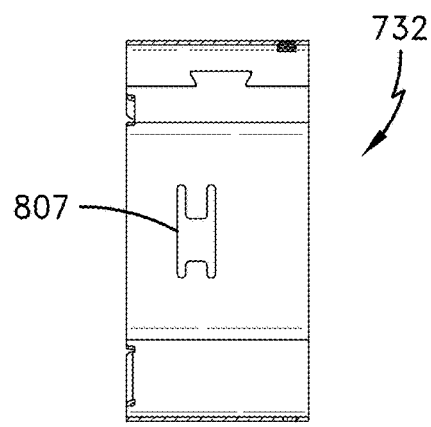
FIG.50D
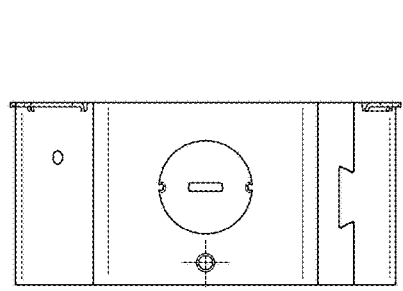
FIG.50E

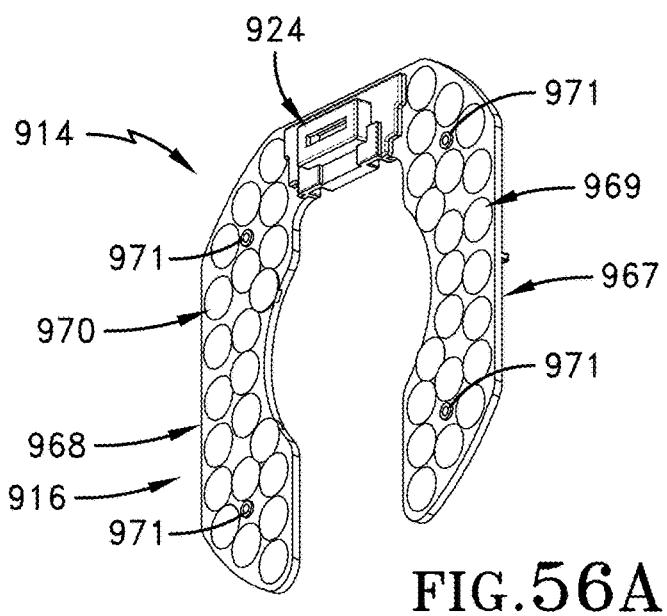
FIG.56A
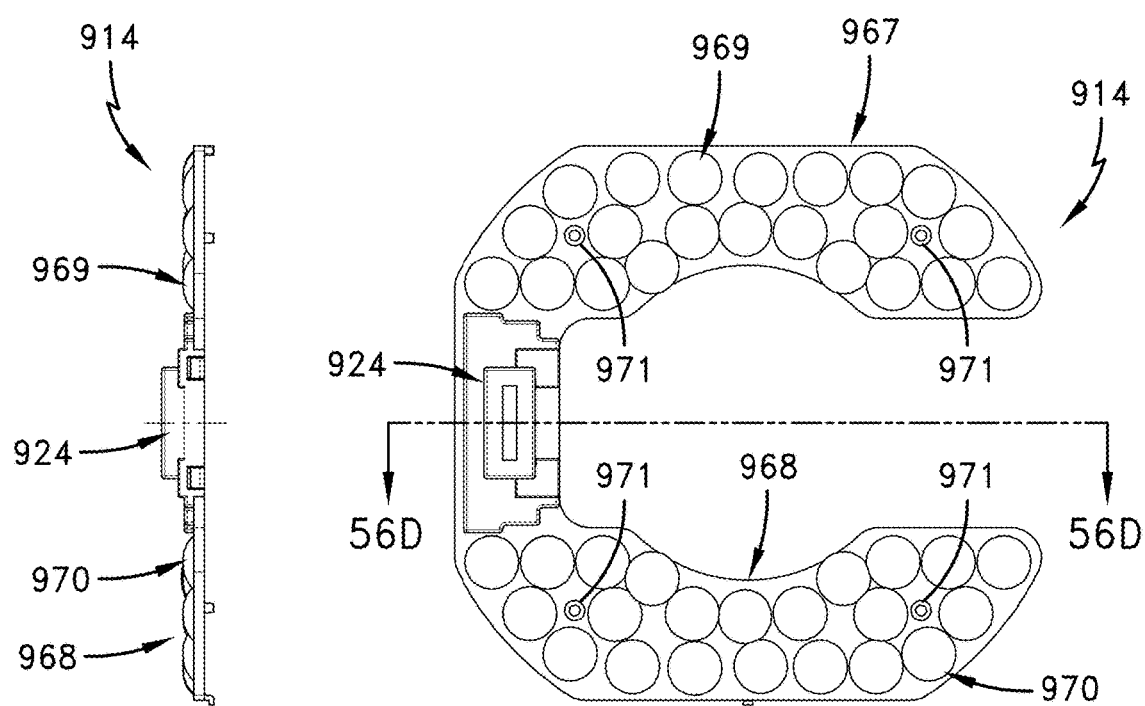
FIG.56C  FIG.56B
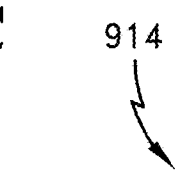
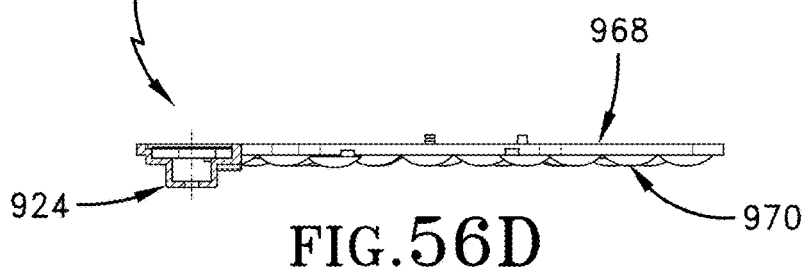
FIG.56D

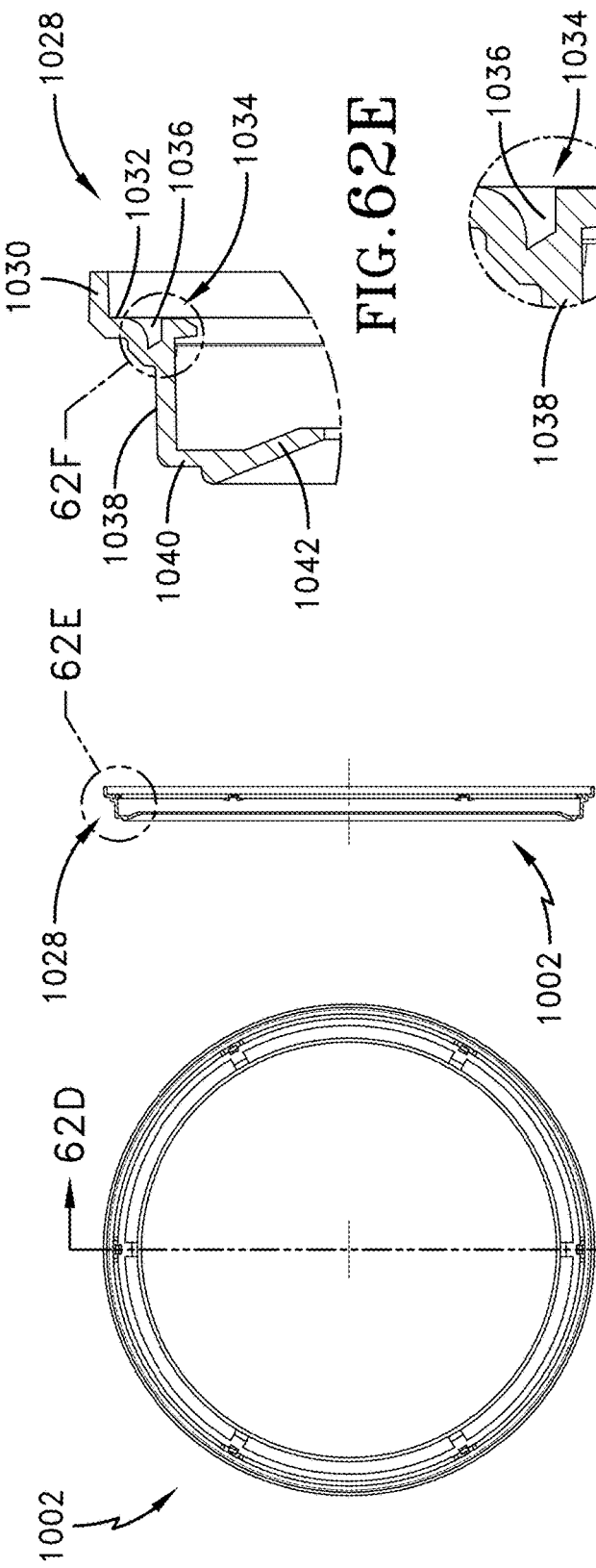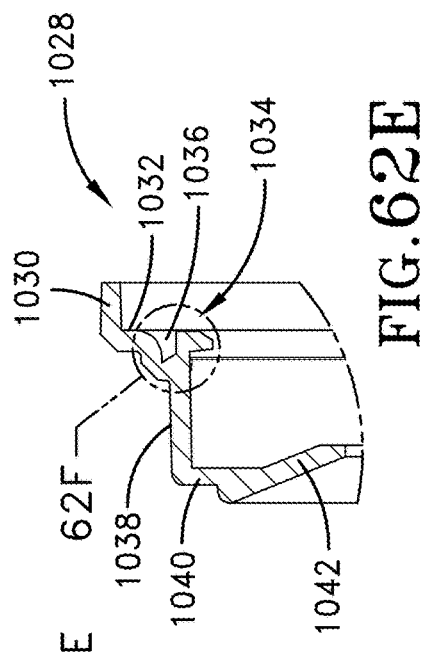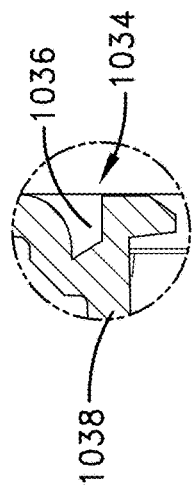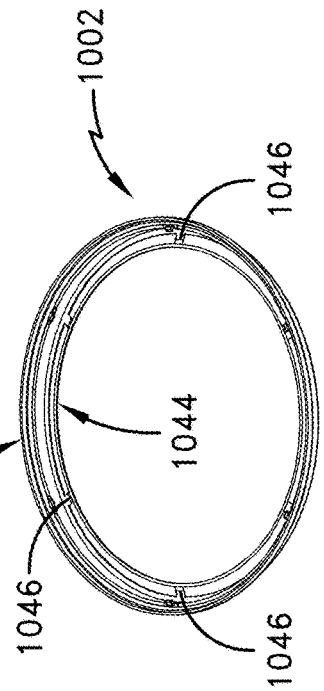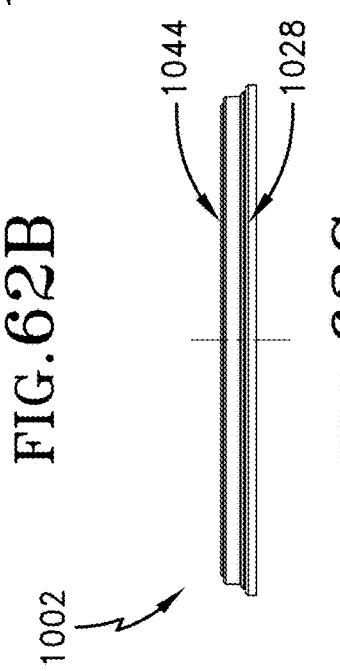

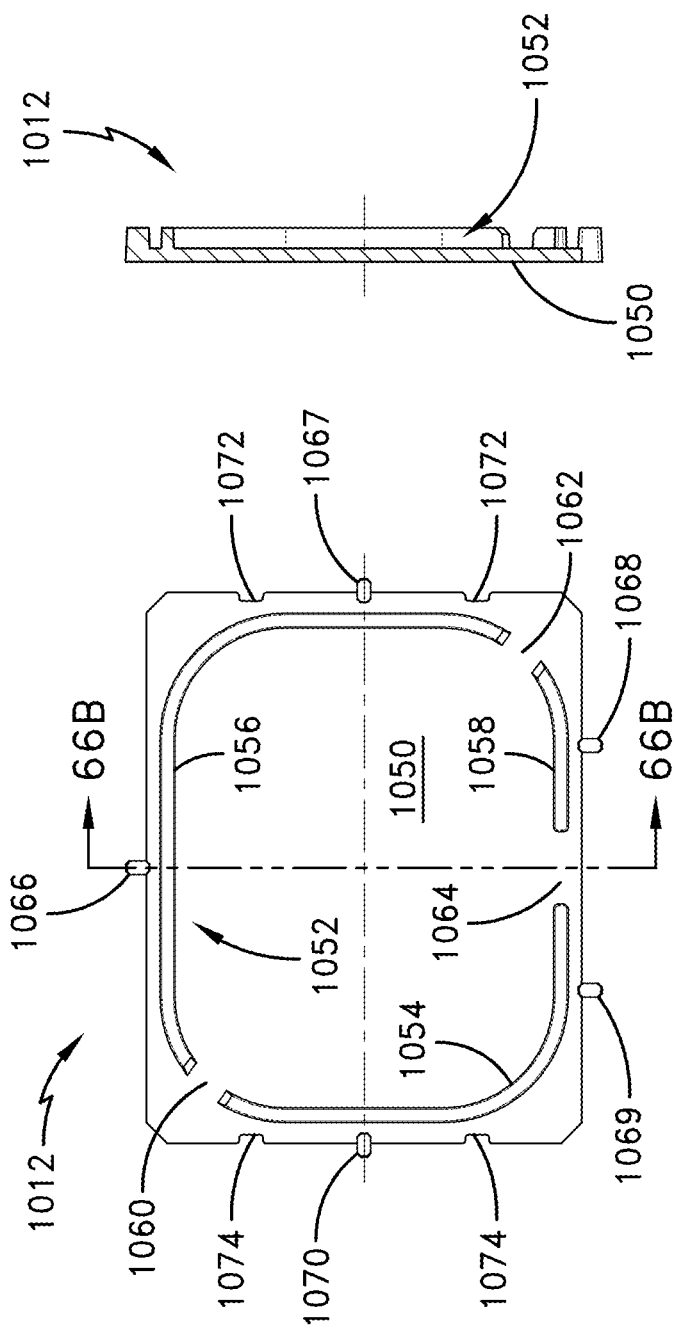
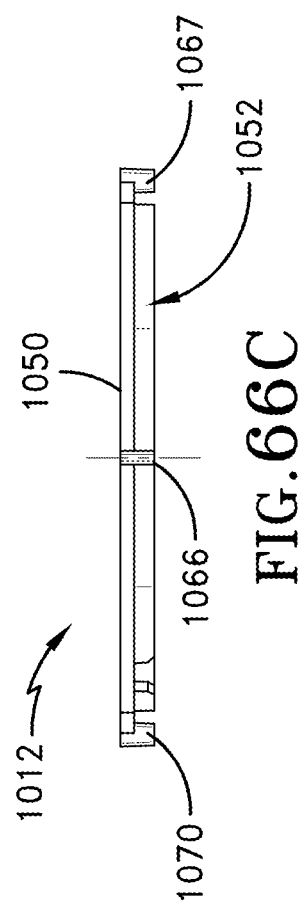
FIG.66A  FIG.66B  FIG.66C

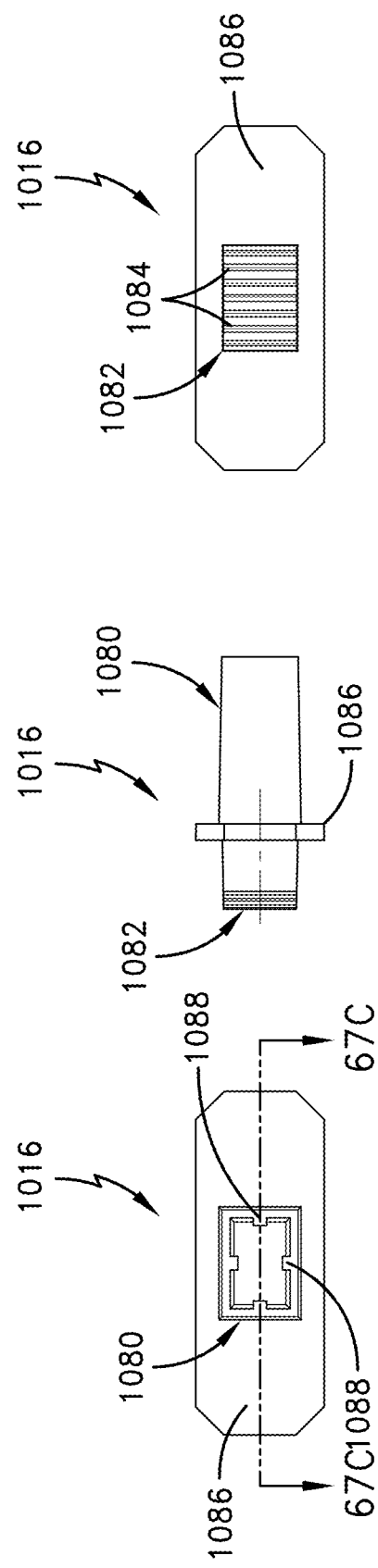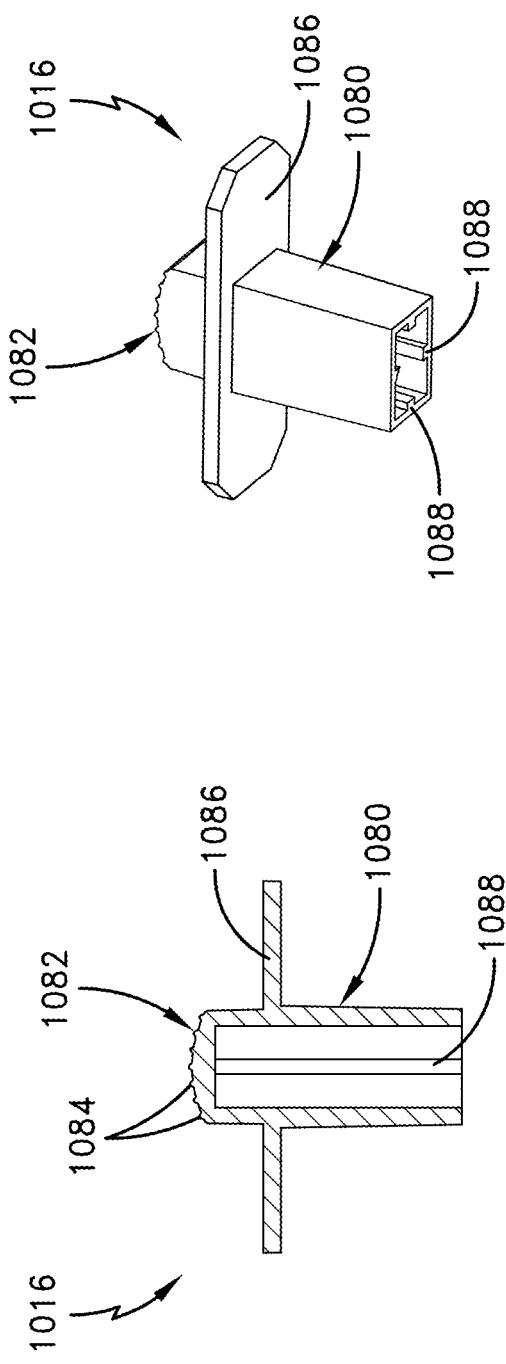

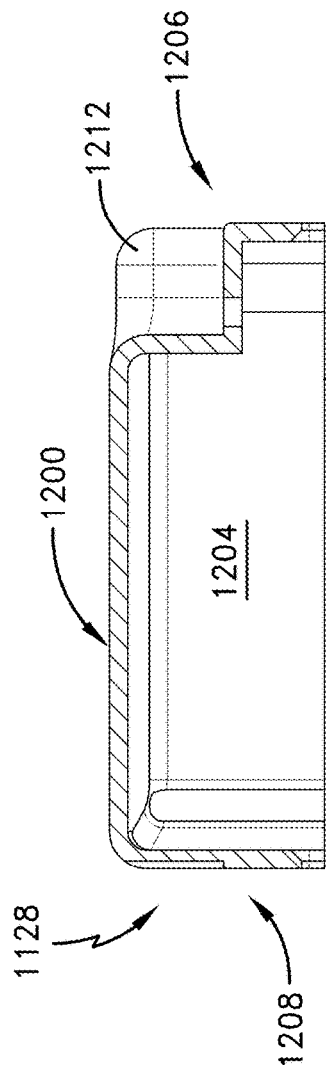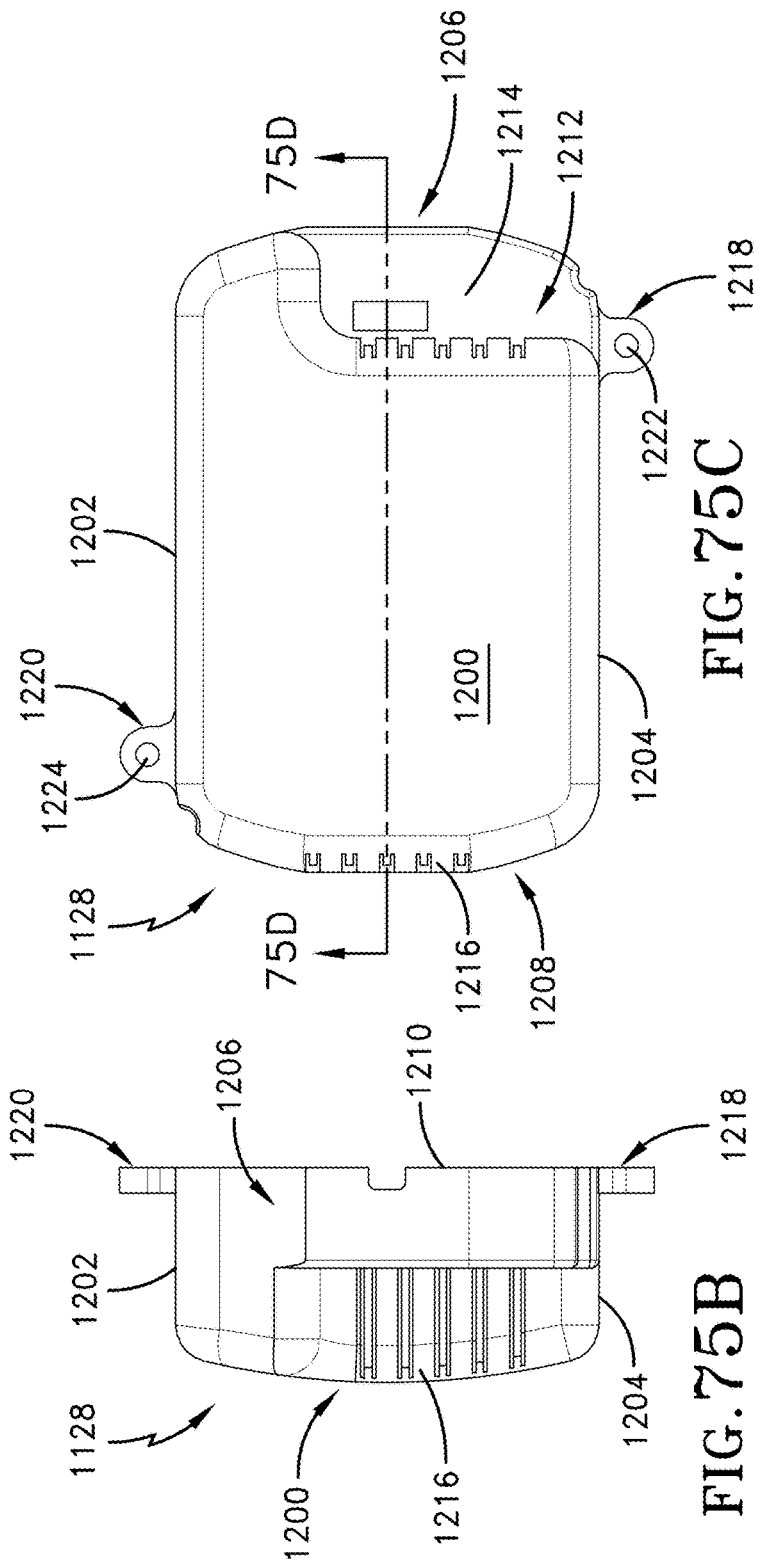

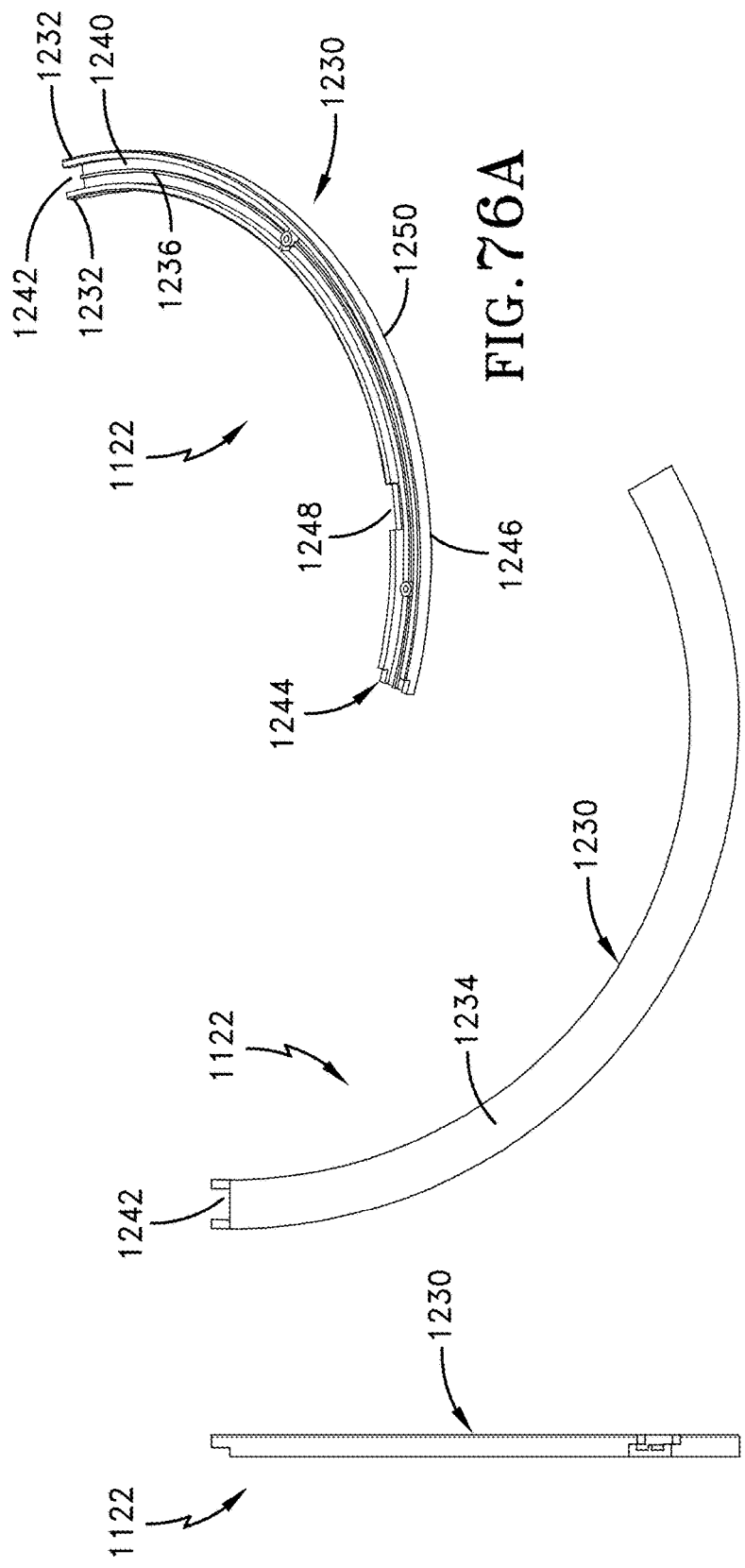
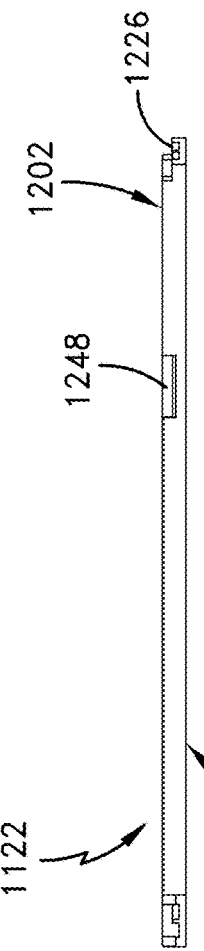

LED LIGHT FIXTURE WITH NIGHTLIGHT

CROSS-REFERENCE TO RELATED APPLICATION

This application is a continuation of U.S. patent application Ser. No. 16/710,777 filed Dec. 11, 2019, which claims priority of U.S. Provisional Application Nos. 62/778,626 filed Dec. 12, 2018 and 62/835,648 filed Apr. 18, 2019, all of which are incorporated herein by reference in their entireties.

BACKGROUND OF THE INVENTION

Field of the Invention

This invention relates to light fixtures, more particularly to light fixtures having both normal or main light illumination and light emitting diode ("LED") nightlight or accent light illumination, to LED downlights with main light illumination and LED nightlight illumination, to an LED ceiling/wall light fixture with a main light and with a nightlight, and related LED lighting arrangements.

This invention relates to light fixtures, and particularly to LED ceiling light fixtures with various types of illumination, to LED ceiling light fixtures with more than one type of lighting including but not restricted to nightlights, to LED ceiling lights with controllable correlated color temperature ("CCT") and with an LED nightlight, and to LED lights with a nightlight, and where the LED light has variable CCT.

This invention further relates to LED light fixtures, and particularly to LED ceiling/wall light fixtures with various types of illumination, to LED ceiling/wall light fixtures with more than one type of lighting which can include nightlights, to LED nightlights, to LED ceiling/wall lights with controllable CCT and with an LED nightlight, to LED ceiling/wall lights with an LED nightlight feature and a dimmer feature, LED light fixtures having a nightlight, accent light, and to related LED light fixtures.

Description of the Prior Art

Various electrically operable lighting devices are known which are either nightlights or light sources including a main lighting source. However, none are believed to have heretofore been known where the nightlight (or other additional light source) directs illumination in particular directions which are predominantly separate from the direction of the illumination of the main light. This in particular applies to LED lighting fixtures. Thus, no light sources are known to exist, particularly with respect to LED light sources, where the main light source can be directed in many directions whereas the nightlight (or other additional light source) is directed to a specific area such as along a ceiling as an adjacent surface to receive illumination.

LED light fixtures such as LED ceiling light fixtures in general are well known in the art. For example, LED downlights generally include a housing mountable in a holder referred to as a canister or can, mounted in a ceiling or elsewhere. LED components located in the housing include a driver with electronic circuitry for providing electrical power to a group of LEDs and a diffuser for transmitting diffused LED illumination from the LED in downlight. The LED downlight typically emits luminosity with a fixed value of CCT, which luminosity can be varied in its intensity by a dimmer switching circuit that is installed in the room or other facility for controlling the electricity in the electrical interface in which the LED downlight is mounted. Commonly assigned U.S. Pat. No. 10,091,855 discloses an LED light fixture with a manually variable CCT. There are LED nightlights for emitting LED illumination of low intensity which are used to provide a lower end of illumination at night time. Such nightlights are typically mounted in electrical receptacles located near a floor or on a wall. Nightlights were not heretofore known to be an additional component of LED lights of any sort, including ceiling or wall lights or of any other type of lights at all.

Also not heretofore known are any ceiling lights such as flushmount lights having nightlights as an additional source of illumination. LED ceiling lights are also well known. See for example commonly assigned U.S. Pat. Nos. 9,500,352 and 9,541,270, each entitled Integral LED Light Fixture. These are often called flushmounted LED ceiling lights. Such LED light fixtures are widely used. However, they have not heretofore been accompanied with nightlights. Other types of LED light fixtures including canless downlights, puff lights, low profile flushmount lights, LED lights connectable to a junction box for receiving electric power therefrom, and the like, are not known where the main light is accompanies by the nightlight.

LED light fixtures such as LED ceiling light fixtures in general are well known in the art. For example, as discussed above, LED downlights generally include a housing mountable in a ceiling or wall, LED components located in the housing, a driver with electronic circuitry for providing electrical power to the LED components and a diffuser for transmitting diffused LED illumination from the LED light sources. LED ceiling lights for installation on a ceiling include LED ceiling lights installed on a junction box are likewise well known. Since ceiling LED lights are often installed in a wall, the term LED ceiling/wall lights will be used herein. The LED lights typically emit luminosity with a fixed value of correlated color temperature ("CCT"), which luminosity can be varied in its intensity by a dimmer switching circuit that is installed in the room or other facility for controlling the electricity in the electrical interface in which the LED downlight is mounted. There are LED nightlights for emitting LED illumination of low intensity which are used to provide a lower end of illumination at night time. Such nightlights are typically mounted in electrical receptacles located near a floor or on a wall. Nightlights were not heretofore known to be a component of LED flushmounts, LED downlights, LED ceiling/wall lights or other LED lights.

Nightlights are very well known and widely in use. Nightlights are often used to alleviate fear in dark rooms, particularly fears of children. Nightlights are also widely used to prevent stumbling over objects on floors, difficulties in traversing stairs in the dark and to prevent falling in the dark in general. Nightlights use little electrical power.

A puff light is generally known as a round or square flushmount light fixtures having a cloud-shaped, white, acrylic diffuser to evenly distribute light across a room. Puff lights have a lower profile flushmount installation.

A low profile flushmount light has about the same definition as a puff light. The low profile flushmount is installed against a ceiling, and has a small depth.

LED light fixtures such as LED ceiling light fixtures in general are well known in the art. LED ceiling lights for installation on a ceiling include LED ceiling lights installed on a junction box are likewise well known. Since ceiling LED lights are often installed in a wall, the term LED ceiling/wall lights will be used herein.

A bedside wall lamp is disclosed in Chinese Patent CN 107726164A, wherein a rod is connected to a pedestal mounted on a wall, and its other end is connected to a lamp holder. The lamp holder has a central disk with a nightlight assembly on one side of the disk and an illuminating assembly on the other side of the disk. Each assembly has a housing, and each housing has a light source chamber. Each of the light sources are LED light sources.

Another Chinese Patent reference is CN 106151934A entitled "LED Lamp Bulb Integrated with Lighting and Night Lamp Functions." This patent includes a bulb and nightlight LED filaments. The LED filaments are disposed peripherally around the filament. The LED lamp bulb has filaments with a light guide assembly for guiding light generated by the assembly for nightlight illumination. An LED filaments is disposed around the periphery of the light guide of the guide assembly for providing light for regular illumination.

In the Chinese Patent CN 205877991U, there is disclosed a lamp with a main lighting ability and an emergency nightlight. A power supply is provided in connection with a battery for emergency situations. A touch switch actuates the LED nightlight. The nightlight-emergency light is nested outside of a main lamp body.

In International Publication WO 2011/098063 A1, a recessed lamp for land or water vehicles is provided having a lamp with a central illumination portion for normal illumination, and a night or emergency lighting which is relatively weak to serve as a night or emergency lighting that is sufficient for indicating the recognition of escape routes without being disruptive. The light source is fluorescent and the peripheral area has Fresnel lenses for scattering the light.

An integrated light fixture with a nightlight is disclosed in U.S. Pat. No. 8,500,313 (DeVries, et al., 2013) which discloses a downward facing light fixture for bathrooms having a downwardly facing set of sockets for incandescent or fluorescent lamps and one or more downward facing LED lights having relatively dim illumination. By means of the bathroom wall switch, one or the other is actuable for normal illumination or nightlights illumination by certain actuation of a switch.

Referring next to U.S. Pat. No. 6,909,239 (Gauna, 2005), an LED/incandescent light fixture is disclosed having a downwardly facing array of LEDs for providing illumination after darkness, and an incandescent light located in the same light fixture. The LED array is illuminated when a light sensor detects the occurrence of darkness, and a motion detector actuates the incandescent lamp upon the detection of motion in the vicinity of the light fixture.

A stand lamp assembly is the subject of U.S. Pat. No. 6,642,659 (Hsieh, 2003) which includes an upright stand body, an auxiliary lamp unit having an upright frame unit in which is disclosed a night lamp socket for receiving a night lamp. The night lamp is removably attached to the socket. A light sensor, connected to the night lamp, actuates the night lamp according to ambient light conditions. A rotatable cover body is provided that can be opened to enable removal of the night lamp. These lamps are incandescent lamps.

A floor lamp having a relatively long supporting post and a generally parallel supporting post adjacent thereto, the latter including a swing arm extending from the supporting post, is disclosed in U.S. Patent Publication No. 2004/0257814 A1 (Eusterbrock, 2004). The latter is only of the general interest. The swing arm extending upwardly therefrom a nightlight. The nightlight includes a dimmer knob for providing dimming capabilities to the nightlight.

Chinese Patent CN 1457622A discloses a translucent cover in the form of a bulb housing for holding a strong lighting element that acts as a normal light source, and a weak lighting element that acts as a nightlight, the latter also serving as a security device. A switch is provided for selecting an appropriate one of the light sources. The lighting elements are disposed inside an outer bulb.

U.S. Patent Publication No. 2002/0136002 (Hoernig, 2002), discloses a wall mounted light fixture in which a main light is disposed in a globe, and a lower light is also disposed in a globe, the lower light being a nightlight. The two lights are operated independently of each other or at the same time.

Referring next to U.S. Pat. No. 6,322,228 (Feldman, 2001), a light fixture is disclosed which is a combination of a table lamp and a nightlight. In one embodiment, a number of electroluminescent light sources are located in a transparent enclosure for serving as a nightlight, and are in a circuit with a bulb. In another embodiment, a desk lamp also includes photoluminescent light sources and a bulb. An additional embodiment is a table lamp with an additional switch for the photoluminescent light sources for each of the main light and the nightlight.

Another electroluminescent lighting device is disclosed in U.S. Pat. No. 6,280,053 (Chien, 2001) which discloses in one embodiment a flashlight with an electroluminescent nightlight, the nightlight having an incandescent lighting element powered by a battery, and an LED is also powered by a battery to provide lower illumination where there is low power or a low battery level. The flashlight is generally cylindrical and has an incandescent or a halogen bulb. The nightlight is provided with an electroluminescent panel, or which could be mounted in grooves or indents for the cylindrical body of the flashlight. The light is stated as being usable as a safety light, a nightlight or some secondary-illumination lighting device. This is made possible by a relatively low-powered light. The secondary light is actionable by means of the same switch that operates the primary light with which the secondary light is associated.

Another lighting device is disclosed in U.S. Pat. No. 5,548,494 (Blackman, 1996). This patent discloses an under-cabinet lighting fixture that has a fluorescent light bulb with a removable flashlight and a battery recharger. When a power failure occurs, the power source switches to a battery. In one embodiment, each of the fluorescent light and the nightlight bulb have separate switches. In another embodiment, a lantern includes a Mercury-vapor or halogen torch light in combination with at least one electroluminescent element, which can also include a fluorescent tube, a radio, a tool holder and a handle. Also disclosed is a table lamp combined with a nightlight. Included is an incandescent lightbulb, and a three way light switch.

However, as discussed below, none of the foregoing prior art discloses the unique features of the present invention including its various embodiments.

BRIEF SUMMARY OF THE INVENTION

An object of the present invention is an LED light fixture for illumination accompanied by an LED nightlight.

The provision of an LED ceiling light which also includes an LED nightlight is an additional object of the present invention.

Another object of the present invention is an LED nightlight for being mounted on a ceiling.

An additional object of the invention is the provision of a light fixture having a main light and a nightlight wherein said nightlight can be operated independently of said main light.

It is a further object of the present invention to provide a downlight having a downlight mode and a nightlight mode.

An additional object of the present invention is the provision of an LED light fixture such as a downlight having a one form of illumination mode and a nightlight mode, the one form of illumination mode having a variable correlated color temperature, also referred to as a "variable color temperature."

It is a further object of the present invention to provide an LED light fixture having both a general illumination mode and an alternate nightlight mode.

A still further object of the present invention is to provide an LED light fixture having an illumination mode whose CCT can be varied between various modes such as a warm light mode, a soft white mode, a cool white mode, a bright white mode and a daylight mode, where the foregoing modes can be selected, and a nightlight, also known as an accent mode.

An object of the present invention is an LED ceiling/wall light with an LED nightlight.

Another object of the present invention is an LED nightlight for being mounted on a ceiling or a wall.

It is a further object of the present invention to provide a flushmount having a full illumination mode and a nightlight mode of illumination.

An additional object of the present invention is the provision of an LED light fixture such as an LED ceiling/wall light having a first form of illumination mode and a nightlight mode, the one form of illumination mode having a variable CCT.

It is a further object of the present invention to provide an LED ceiling/wall light with LED nightlight having both a general illumination mode and an additional mode of illumination.

It is also an object of the present invention is to provide an LED ceiling/wall light with LED nightlight that can be operated with a dimmer switch.

A still further object of the present invention is to provide an LED ceiling/wall light with LED nightlight having a general illumination mode whose CCT can be varied between various modes such as a warm light mode, a soft white mode, a cool white mode, a bright white mode and a daylight mode, where the foregoing modes can be selected, and a nightlight mode which is also an accent mode, operable with a dimmer switch.

Another object of the present invention is the provision of an LED ceiling/wall light with another mode of operation such as an LED nightlight and a variable CCT wherein the switch for the variable CCT is not normally accessible but can be rendered accessible for manual operation.

A further object of the present invention is to provide an LED ceiling/wall light with an LED nightlight for emitting general illumination having selectable correlated color temperatures, and additionally incorporating another mode of illumination such as an LED nightlight, which LED light fixture is economical to manufacture, easy to install and can be operated by an ordinary user without requiring any special skills or education.

These and other objects will be apparent from the description to follow and from the appended claims.

The present invention in one respect provides an LED light fixture which in one form comprises an LED illumination source for being mounted on a ceiling to provide main light illumination for such purposes as to illuminate a space, and a nightlight for providing a subdued LED illumination.

The present invention in one embodiment provides an LED ceiling/wall light with LED nightlight which in one form comprises an LED illumination source for being mounted on a ceiling or wall to provide illumination for such purposes as to illuminate a space, and a nightlight for providing a subdued LED illuminating source. The LED illumination incorporates a variable CCT and can be dimmed. The nightlight can also be used as an accent light.

A ceiling/wall LED light with LED nightlight when in its preferred embodiment, can be installed primarily on ceiling, but could also be installed walls, floors and the like. The inventive ceiling/wall LED light with LED nightlight has some very new, important and useful features. It can provide illumination by means of a "main light," as opposed to a nightlight as discussed below, in various manually selectable CCTs varying from a warm white light, a soft white light, a cool white light, a bright white light and daylight (or a smaller number of variations), and which can be dimmed with a dimmer switch. In order to change the CCT of the LED ceiling/wall light with LED nightlight in its preferred embodiment, a finger actuable switch is provided for determining the color temperature of the luminosity which varies from warm white to daylight as indicated above. The LED ceiling/wall light with LED nightlight according to a preferred embodiment of the invention is discussed below, wherein the LED nightlight can be selectively activated to provide a low luminosity of preferably 40 lumens at 2000 k color temperature (CCT), which requires very small input energy, preferably around 3.5 watts. The finger actuable switch is located in a compartment or cavity defined by a base and a lens or diffuser, the latter being removable to render them manually operable.

The LED ceiling/wall light with LED nightlight according to a preferred embodiment of the invention is usually mounted in a ceiling or wall, and has a downward (or forward) facing face, and around which is an annular or peripheral portion. The downward or forward face oftentimes has a circular cross-section, but the invention is not limited to either a circular or a generally cylindrical shape. It could have corners or other shapes, so the inventive LED lighting fixture could have the general configuration of a cylinder, a rectangular, parallelepiped, a truncated cone, a hexagonal prism, a spheroid end portion and combinations of the foregoing, and the like, or have an irregular configuration. The LED nightlight provides luminosity through an annular or other peripheral edge which preferably surrounds an upper portion or rearward face (proximate the ceiling or wall and distal the floor or an opposite wall) of the inventive LED ceiling/wall light with LED nightlight. The LED nightlight could be located on the rearward or forward part of the LED ceiling/wall light with LED nightlight, but it is advantageously disposed on the rearward part in the preferred embodiment. The forward face typically would incorporate a diffuser. As mentioned above, the LED nightlight is advantageously proximal the ceiling or wall in which the LED ceiling/wall light with LED nightlight is mounted. The inventive LED ceiling/wall light with LED nightlight incorporates electronic circuitry for two illumination sections, the higher luminosity main light section and the lower illumination nightlight section. The electronic circuitry for each of the two illumination sections are advantageously operated independently of each other. Furthermore, the LED ceiling/wall light with LED nightlight according to the invention can incorporate a variable CCT. It could be dimmable. Either or both of the main light section and the nightlight section usually modifies or treats either or both of the main light and the nightlight by passing the emitted light through one or more transmitting functional items such as a lamp shade, a diffuser or lens, a transparent cover, a light guide sheet or plate, a reflector, a transparent cover with light modifying features, reflective sheeting, and a transmittance mask.

The present invention in one of its forms provides an LED lighting fixture preferably for being mounted on a ceiling such as a flushmount, a puff light, a low profile flushmount, a downlight or a canless downlight. A downlight when in one of its preferred embodiment can be installed in many installed recessed housings. The inventive downlight has some very new, important and useful features. It can provide illumination in various pre-selected CCTs varying from a warm white light, a soft white light, a cool white light, a bright white light and daylight. In order to change the CCT of the downlight in its preferred embodiment, a finger actuable switch is provided for determining the CCT of the luminosity which varies from warm white to daylight as indicated above. Moreover, the downlight according to a preferred embodiment of the invention further incorporates a nightlight which can be selectively activated to provide a low luminosity of preferably 40 lumens at 2000 k CCT, requiring very small input energy, preferably around 3.5 watts The downlight is usually mounted in a ceiling, and has a downward (or forward) directed face, and around which is an annular or peripheral portion. The face usually has a circular cross-section, but the invention is not limited to a circular shape. It could have corners or other shapes. The nightlight provides luminosity through an annular edge which preferably surrounds the visible portion or forward face of the inventive downlight. The forward face typically would incorporate a diffuser, and the nightlight is proximal both the diffuser of the inventive downlight and the ceiling in which the downlight is mounted. The inventive downlight incorporates electronic circuitry for two illumination sections, the downlight section and the nightlight section. Each section has a light output provided by separate sets of LEDs. However, the inventive concept also includes a ceiling-mounted LED nightlight.

The operation of this aspect of the inventive downlight in one of its preferred form is very simple. Once the inventive downlight is properly installed, typically in a ceiling, can or housing, the electronic circuitry is operated by a switch such as a conventional wall switch. When the wall switch is changed from the "off" position to the "on" position, a main light set of LEDs for the downlight section is actuated, causing the downlight LEDs to emit illumination according to the pre-set CCT. Whenever the illumination of the nightlight is sought, the user moves the wall switch from the "on" position for activating the main set of LEDs, to the off position and finally back to the on position to turn the main set of LEDs off and to actuate nightlight LEDs. The switching arrangement is due to the switching circuitry connected to the wall switch and to the downlight nightlight.

The rearward portion of the nightlight in one of its preferred forms has a digitally movable switch which can be moved between the various color temperatures to which the downlight can be set for generating illumination of the desired color temperature. The switch makes appropriate changes in the electric circuitry to make the selected variation in the CCT. The desired color temperature can be set by removing the downlight from the housing in which it is installed or prior to installation, and setting the switch to the desired color temperature.

As used herein, the word "forward" refers to the direction of illumination, and the term "rearward" refers to the direction behind the source of illumination. Thus "rearward" means behind the light fixture and proximal the ceiling or wall, and "forward" means in front of the light fixture and proximal the floor for a ceiling mounted LED light fixture.

The term "array of LEDs" is used in this application. The exact nature of the LEDs is not significant with respect to the invention. The term "array of LEDs" means any type of LEDs. This includes one or more LEDs, string or strip LEDs, or any length of the LED assembly, equally spaced, selectively spaces or randomly spaced LEDs, all of the latter fall within the meaning of the term "array of LEDs" as used herein.

The term "printed circuit board" is used to define the structure to which an array of LEDs is mounted. Although printed circuit board usually includes circuitry included in the printed circuit board, the term printed circuit board is used more broadly in this document. The term "printed circuit board" means herein any support for LEDs, whether or not all or part of an electric circuit is included in the printed circuit board.

BRIEF DESCRIPTION OF THE DRAWINGS

FIGS. 26A-26E are respectively a perspective view of a spring with an end component, a rear side view of the assembly shown in FIG. 26A, a side view of the spring shown in FIGS. 26 and 26B without the first component, a side view of the device shown in FIGS. 26A and 26B, and an enlarged detail view of one of a coil spring shown in FIGS. 26A-26D.

FIGS. 29A-29D are respectively a perspective view, a top view, a side view and an end view of a driver holding box incorporated in the embodiment of the invention shown in FIG. 22.

FIGS. 33A-33D are respectively a perspective view, a top view, a front side view and a rear side view of a cap of a junction box shown in FIG. 22.

FIGS. 35A-35B are respectively a side view and an end view of a male plug incorporated in the presently described embodiment of the invention and shown in FIG. 22.

FIGS. 36A-36B are respectively a perspective view and a side view of a nut incorporated in the presently described embodiment of the invention.

FIGS. 37A-37C respectively are a side view and opposite ends view of a female plug assembly according to the present described embodiment of the invention as shown in FIG. 22.

FIGS. 46A-46C are a plan view, a first side view and a cross-sectional view taken in the direction of arrows 46C-46C in FIG. 46A of the driver cover incorporated in the embodiment of the invention shown in FIG. 41 in an exploded view.

FIGS. 47A-47E are a perspective view, a plan view, a cross-sectional view taken in the direction of the arrows 47C-47C in FIG. 47B, a cross-sectional view taken in the direction of arrows 47D-47D in FIG. 47B, and an inverted side view of the base shown in FIG. 47A.

FIGS. 50A-50E are, respectively, a perspective view, a first side view, a top view, another side view and a cross-sectional view taken in the direction of arrows 50D-50D in FIG. 50C of the junction box shown in the embodiment of the invention in the exploded view in FIG. 41.

FIGS. 56A-56D are, respectively, a perspective view, a plan view, a side view and a cross-sectional view taken in the direction of arrows 56D-56D of an optical lens incorporated in the exploded view of the embodiment of the invention shown in FIG. 53.

FIGS. 62A-62F are, respectively, a perspective view, a plan view, a first side view, a cross-section view taken in the direction 62D-62D in FIG. 62B, and a first detailed view of the portion of the outer frame shown in the phantom circle marked 62E in FIG. 62D, and a second detailed view of the phantom circle marked 62F shown in FIG. 62E.

FIGS. 66A-66C are, respectively, a plan view, a cross-sectional view taken in the direction shown by arrows 66B-66B in FIG. 66A, and a side view of a power cover incorporated in the apparatus of this embodiment of the invention shown in FIG. 61.

FIGS. 67A-67E are, respectively, a perspective view, a bottom view, a cross-sectional view taken in the direction of arrows 67C-67C in FIG. 67B, a side view and a top view of a switch cap incorporated in the apparatus shown in this embodiment of the invention as illustrated in FIG. 61.

FIGS. 75A-75D are, respectively, a perspective view, an end view, a top view and a cross-sectional view taken in the direction of arrows 75D-75D in FIG. 75C of a driver box incorporated in the apparatus shown in the embodiment of the invention depicted in FIG. 70.

FIGS. 76A-76D are, respectively, a perspective view, a plan view and two side views of a portion of a transmittance mask shown in FIG. 70.

DETAILED DESCRIPTION OF THE PREFERRED EMBODIMENTS

Figure 1:
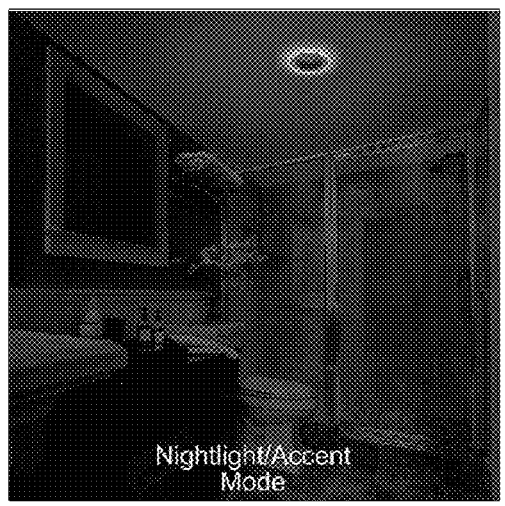
FIG. 1 is a perspective view of an LED downlight according to a preferred embodiment of the invention, shown in its operation in its nightlight/accent mode.
Figure 2A:
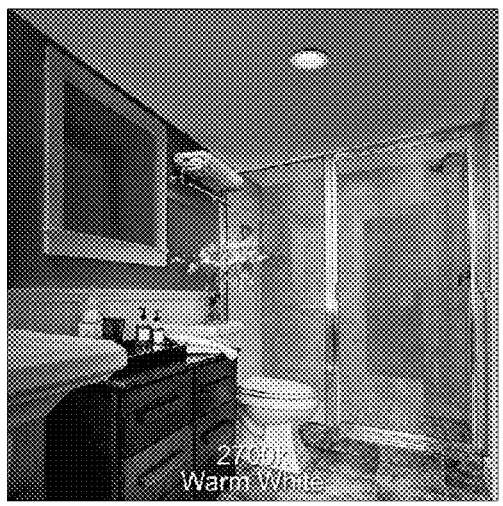
FIGS. 2A-2E are perspective views showing an LED downlight according to a preferred embodiment of the invention, wherein it is mounted in a bathroom, emitting alternatively, a warm light, a soft white light, a cool white light, a bright white light and a daylight illumination.
Figure 2B:
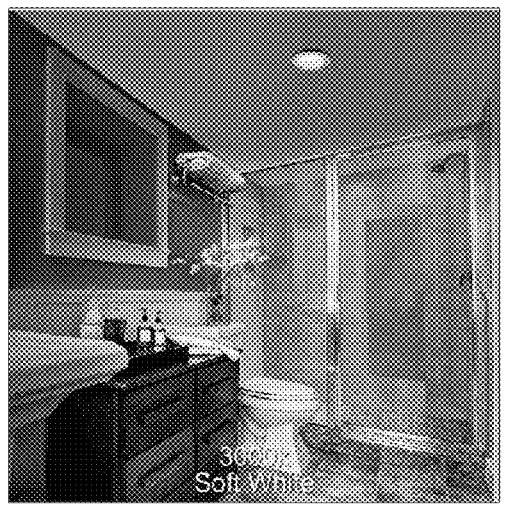
Figure 2C:
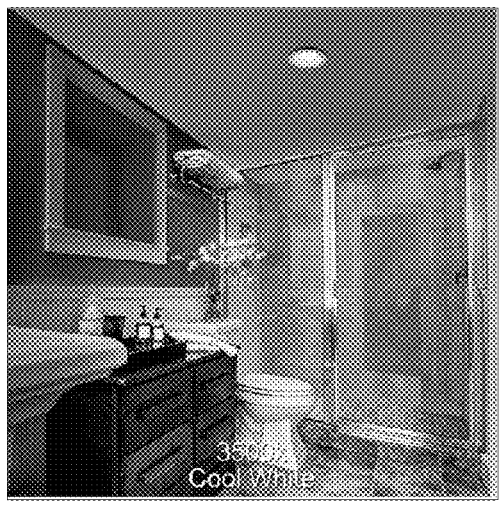
Figure 2D:
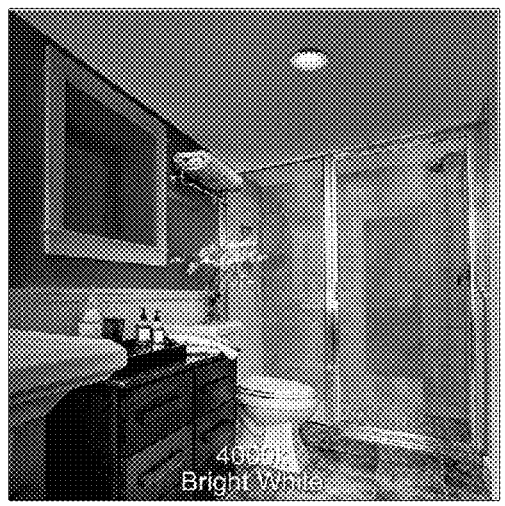
Figure 2E:
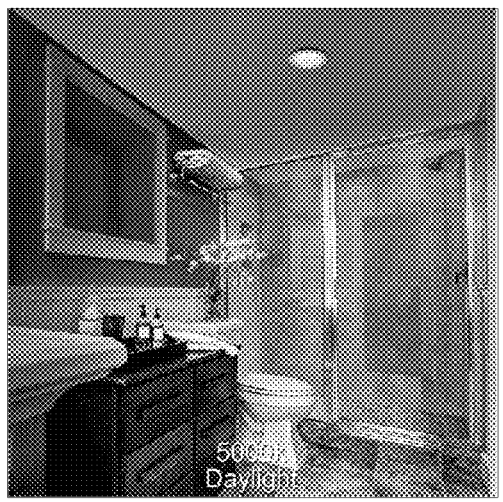

FIG. 1 illustrates the use of a downlight according to a preferred embodiment of the invention, with only the nightlight or accent mode (the nightlight and accent are the same mode of operation) in its low energy and low luminosity mode. The nightlight or accent mode is actuated by turning the operating switch for the inventive downlight portion (which can be a wall switch, for example) from the off position to the on position, then to the off position and back to the on position, thereby first actuating the downlight. As used hereinafter, the overall lighting unit in this embodiment is referred to as "the downlight." The nightlight requires a very small input electrical energy, oftentimes of about 3.5 watts. Each of FIGS. 1 and 2A-2E demonstrate the use of the inventive downlight in a bathroom. As indicated initially, FIG. 1 shows nightlight emitting illumination in the nightlight/accent mode. FIG. 2A shows illumination when the downlight is set by a downlight mode switch described hereinafter to the warm white mode of 2700 k. In FIG. 2B, the downlight mode switch is set to 3000 k to set the CCT in a soft white mode. When a cool white mode is desired, the CCT switch is set to 3500 k and the luminosity is a cool white mode as shown in FIG. 2C. A bright white mode illumination occurs when the CCT switch is set to the 4000 k setting illustrated in FIG. 2D. Finally, when a daylight mode is desired, the downlight CCT switch is set to 5000 k as shown in FIG. 2E.

Figure 3A:
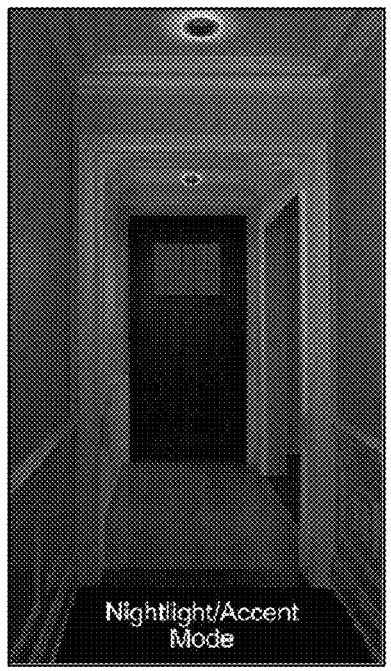
FIGS. 3A-3F illustrate two LED light fixtures according to the preferred embodiment of the invention, the LED light fixtures being mounted in adjacent parts of a hallway, each light fixture emitting illumination having varying CCTs or "color modes," displayed respectively as a nightlight/accent mode, a warm white mode, a soft white mode, a cool white mode, a bright white mode and daylight mode.
Figure 3B:
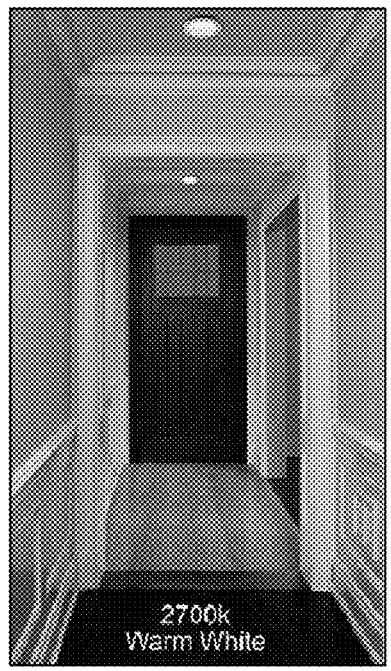
Figure 3C:
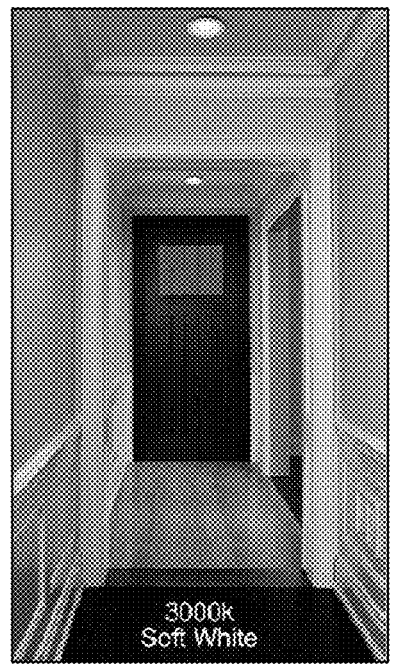
Figure 3D:
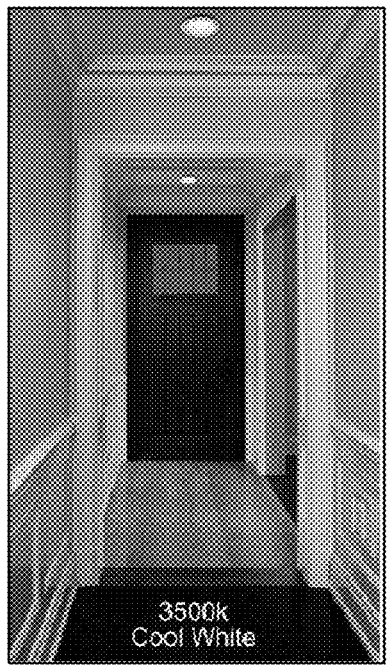
Figure 3E:
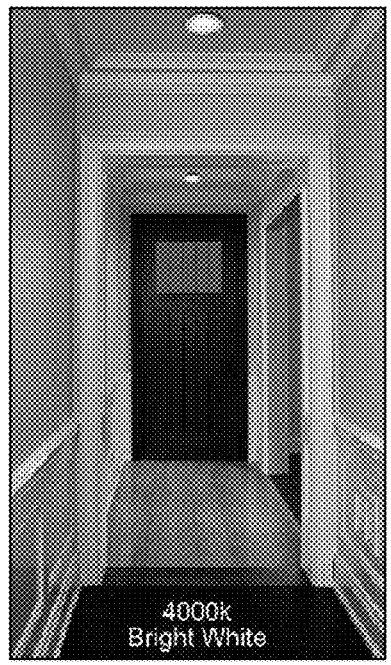
Figure 3F:
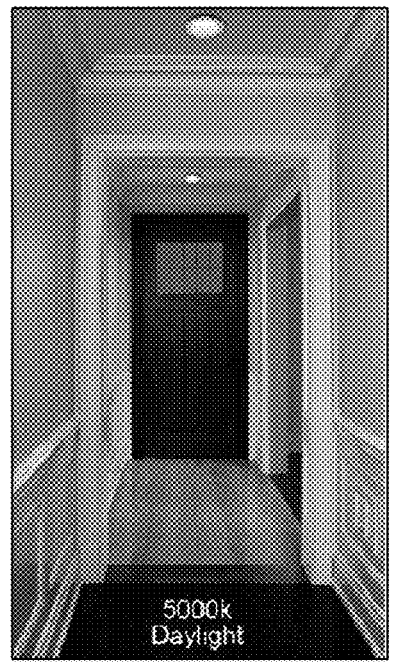

FIGS. 3A-3F show a pair of downlights according to the preferred embodiment of the invention in adjacent sections of a hallway. The nightlight/accent mode is shown in FIG. 3A. When a warm white mode is selected, the downlight mode switch is set to 2700 k and illumination is as shown in FIG. 3B. A soft white mode of illumination is depicted in FIG. 3C with the setting of the downlight mode switch at 3000 k. When the setting is set to 3500 k, a cool white mode is set as shown in FIG. 3D. The bright white mode is shown in FIG. 3E when the setting is set to 4000 k, and when the setting of the downlight mode switch is made to 5000K, the daylight mode of illumination is emitted as shown in FIG. 3F.

FIGS. 4-7 depict various views of the preferred embodiment of an inventive downlight-with-nightlight 10. Downlight 10 includes nightlight 11 whose diffuser is located in the edge of downlight-with-nightlight 10 as discussed further below. Nightlight 11, when activated, has a low luminosity of, advantageously, 40 lumen, and a color temperature of, advantageously, 2000 k and is ideal as a nightlight for bathrooms, hallways, kitchens and outdoor spaces.

A driver cover 12 (also called a driver box as discussed below) forms the rear part of downlight-with-nightlight 10 and incorporates most of the electronic circuitry of the downlight. Driver cover 12 is attached to a housing (also referred to herein as a surface ring) 14 incorporating further portions of downlight-with-nightlight 10. Between driver cover 12 and housing 14 are a set of three, equiangularly disposed, radially extending arms or springs 16. Arms 16 are used to position downlight-with-nightlight 10 in an installed recessed housing or can (not shown) (can is short for "canister") usually located in a ceiling, and arms 16 are provided with plastic end coverings 18 to aid in the relocation and holding process. Notches 20 are provided in each of driver cover 12 and housing 14 for receiving and properly locating arms 16.

An annular inner trim 22 (which is integral with housing surface ring 14 described hereinafter) circumvents housing 14, which is held in place by means of screws 24. A removable annular insulating trim 26 is concentric with annular inner trim 22. Trim 26 provides a cushion between trim 22 and the ceiling in which downlight-with-nightlight 10 is installed.

An annular outer nightlight holder 28 is concentric with and proximal to outer trim 26. Nightlight holder 28 has an annular parametric groove 30 for holding an annular nightlight diffuser 32. Nightlight holder 28 is integral with a ring of back cover or annular component support discussed later.

Figure 8:
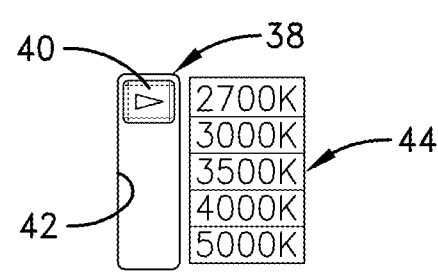
FIG. 8 is a detailed top view of correlated color temperature ("CCT") switch incorporated in the LED light fixture in FIGS. 4-7.
Figure 9A:
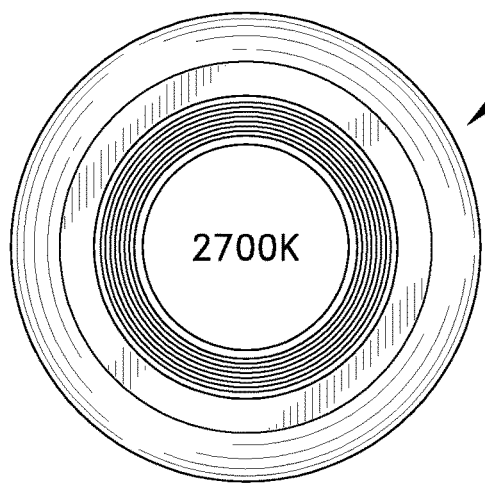
FIG. 9A is a plan front view of a nightlight according to a preferred embodiment of the of the invention with an alpha-numeric symbol of the CCT illumination at 2700K.
Figure 9B:
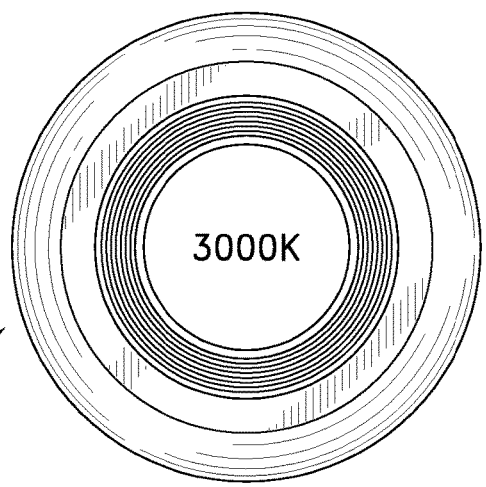
FIGS. 9B-9E are likewise plan front views of a downlight according to a preferred embodiment to the invention showing, respectively, alpha-numeric symbols of the CCT illumination thereof at 3000 k, 3500K, 4000K and 5000K.
Figure 9C:
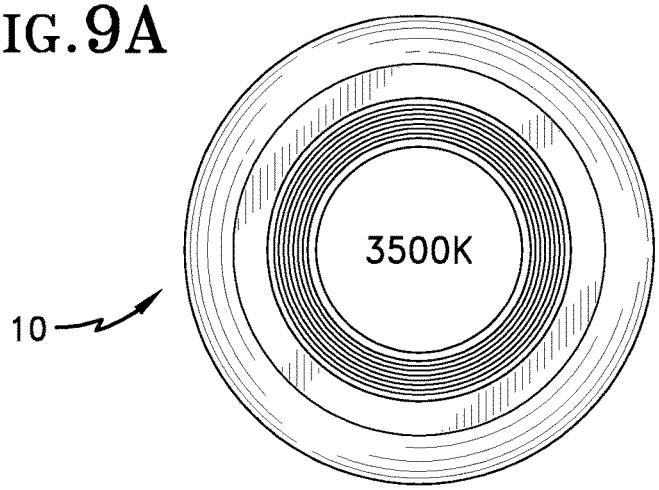
Figure 9D:
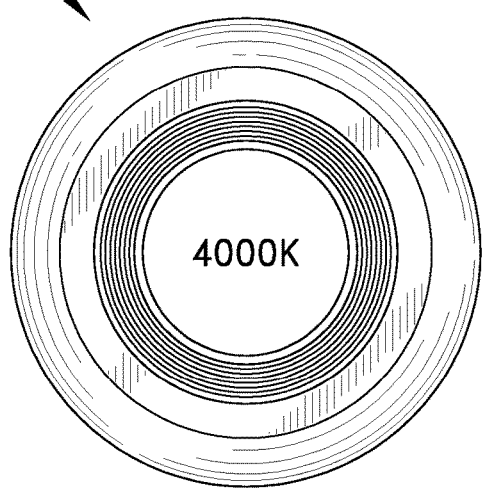
Figure 9E:
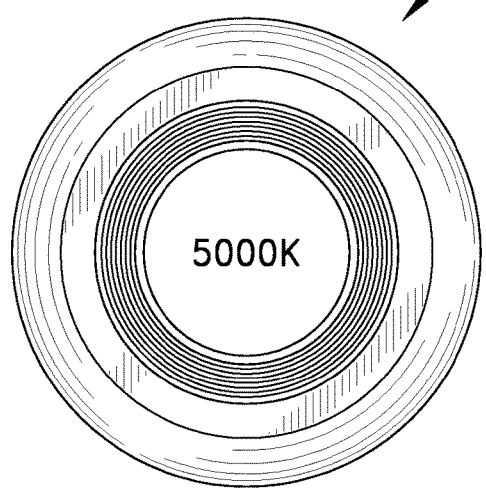

Driver cover 12 has an end wall 34 in which are disposed an electric connection receptacle 36 to be discussed below, and a color temperature selection or CCT switch 38. Referring to FIG. 8, color temperature selection switch 38 includes a digitally movable slide lever 40 which slides in a groove 42, and temperature indicia 44 indicating the specific color temperatures to which downlight-with-nightlight 10 can be set. Temperature indicia are illustrated as noted previously at respective 2700 k, 3000 k, 3500 k, 4000 k and 5000 k.

Figure 5:
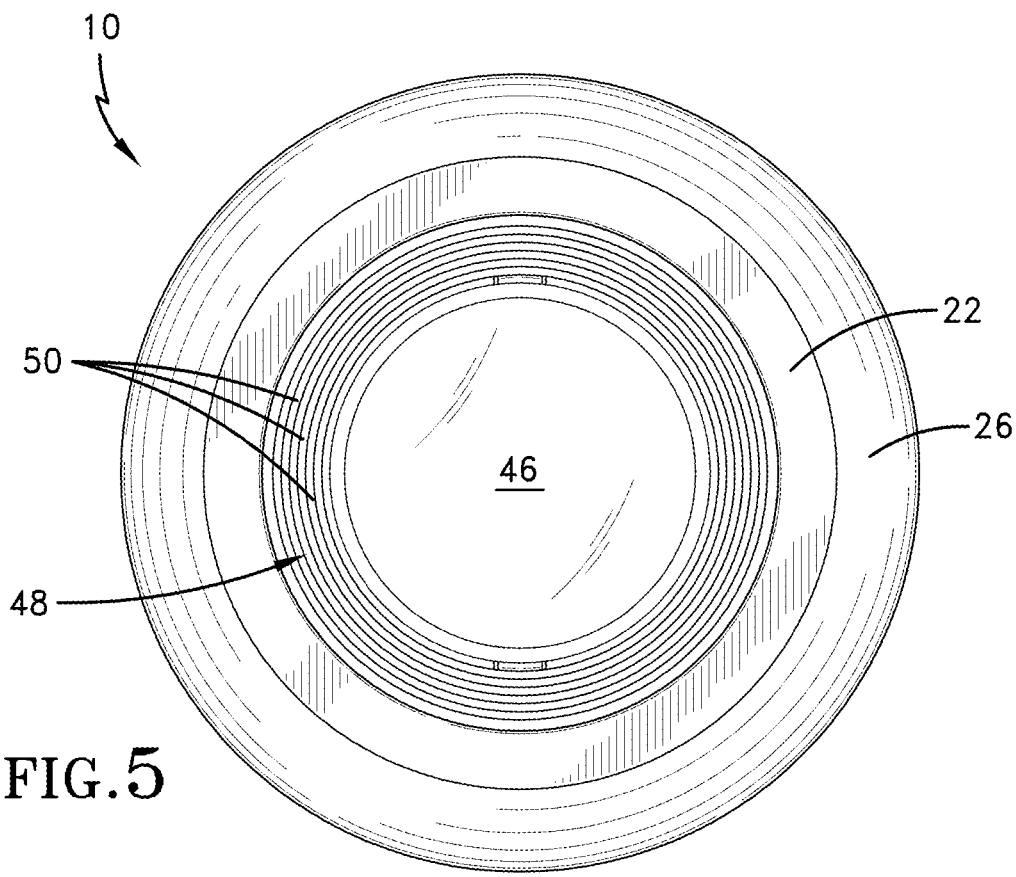
FIG. 5 is a plan view of the downlight shown in FIG. 4, depicting the front of the downlight.

FIG. 5 is a plan view of downlight-with-nightlight 10. A diffuser 46 is shown at the center of downlight-with-nightlight 10, and has a circular perimeter. An annular baffle 48 surrounds diffuser 46 and is provided to present illumination from being emitted too far radially, and direct radiation in a generally downward direction. Baffle 48 includes a series of parametric, annular steps 50 to accomplish the purpose of baffle 48 by limiting the illumination in the radial direction.

Figure 4:
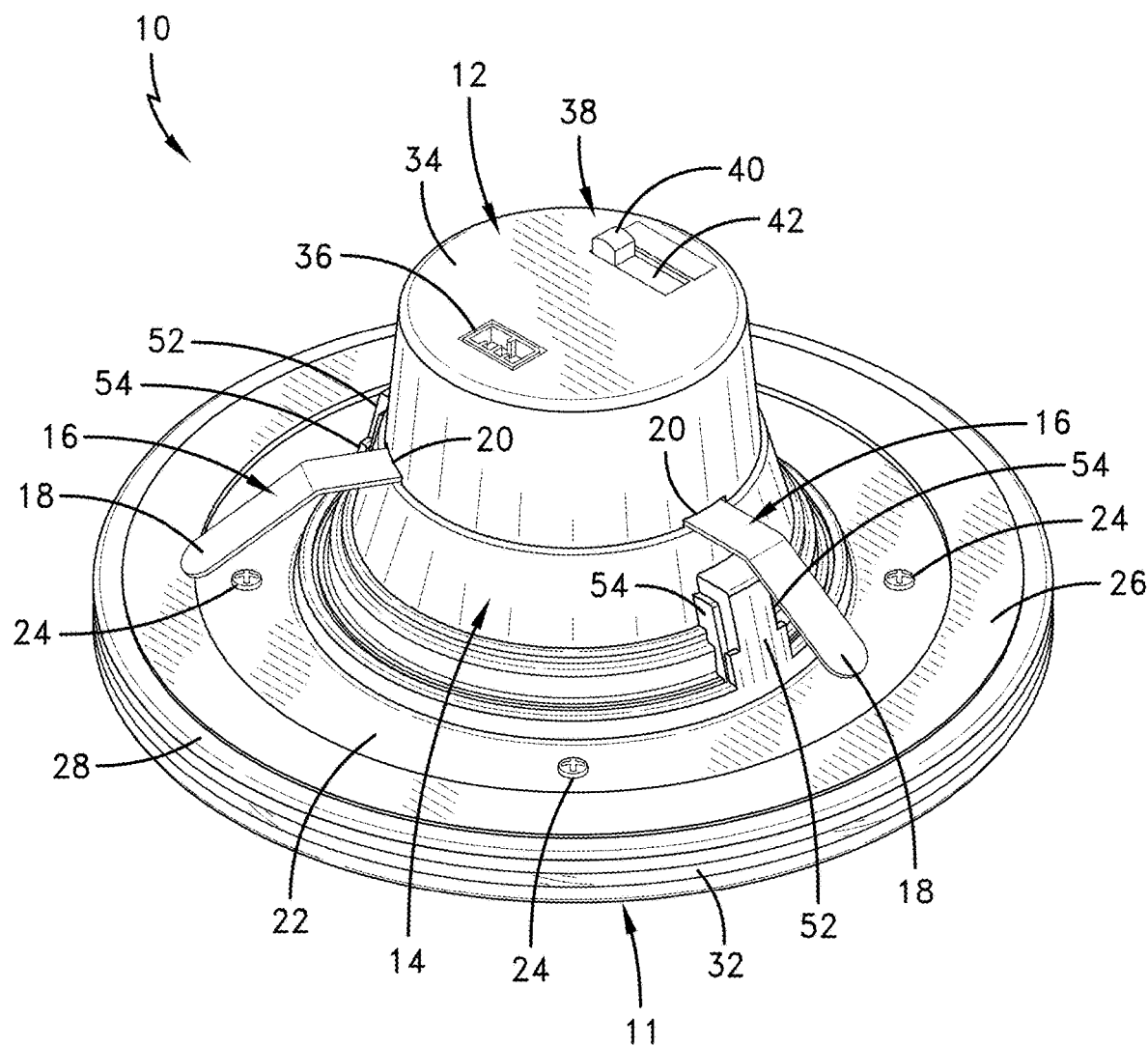
FIG. 4 is a top perspective view of an LED downlight according to the preferred embodiment of the invention.
Figure 6:
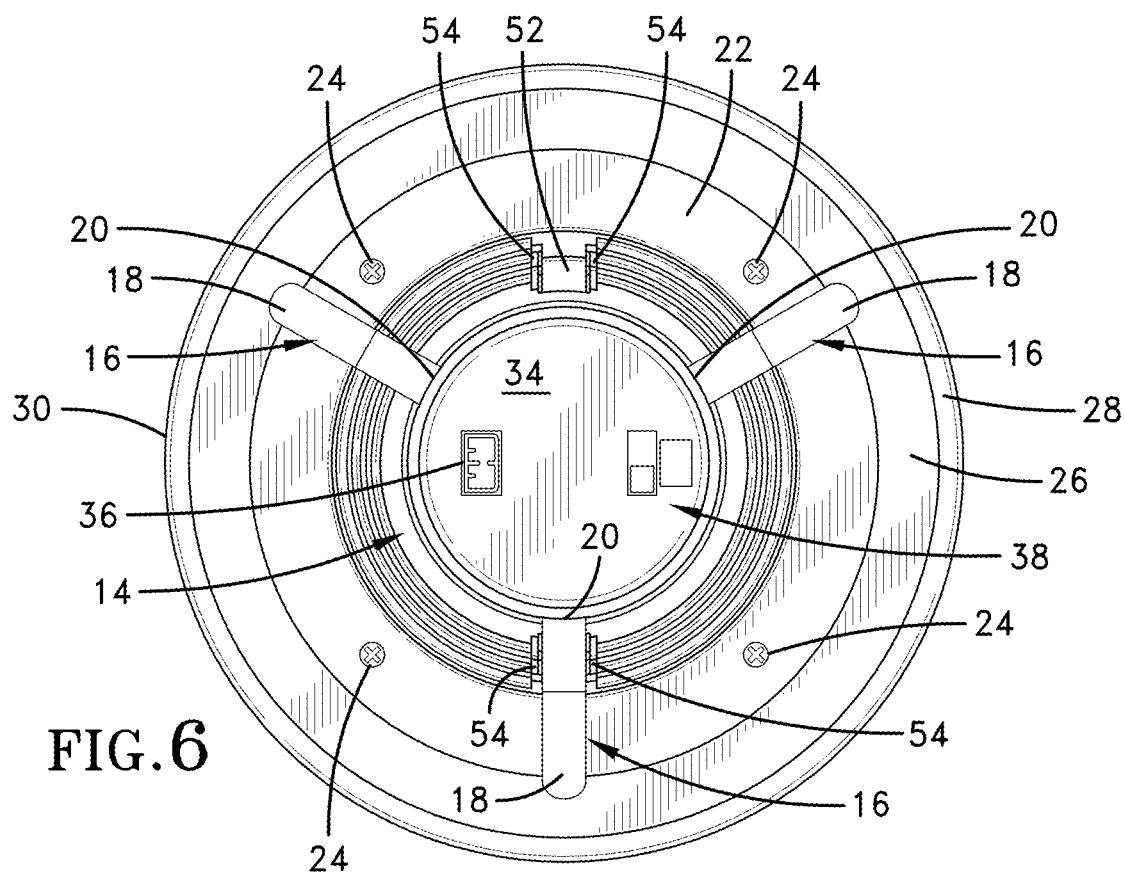
FIG. 6 is a plan view of the downlight shown in FIGS. 4 and 5 depicting the back of the downlight.

Another plan view of downlight-with-nightlight 10 is shown in FIG. 6. A post 52 is located between two radial arms 54 as shown in FIGS. 4 and 6. This construction prevents the angular movement of housing 14 relative to inner trim 22.

Figure 7:
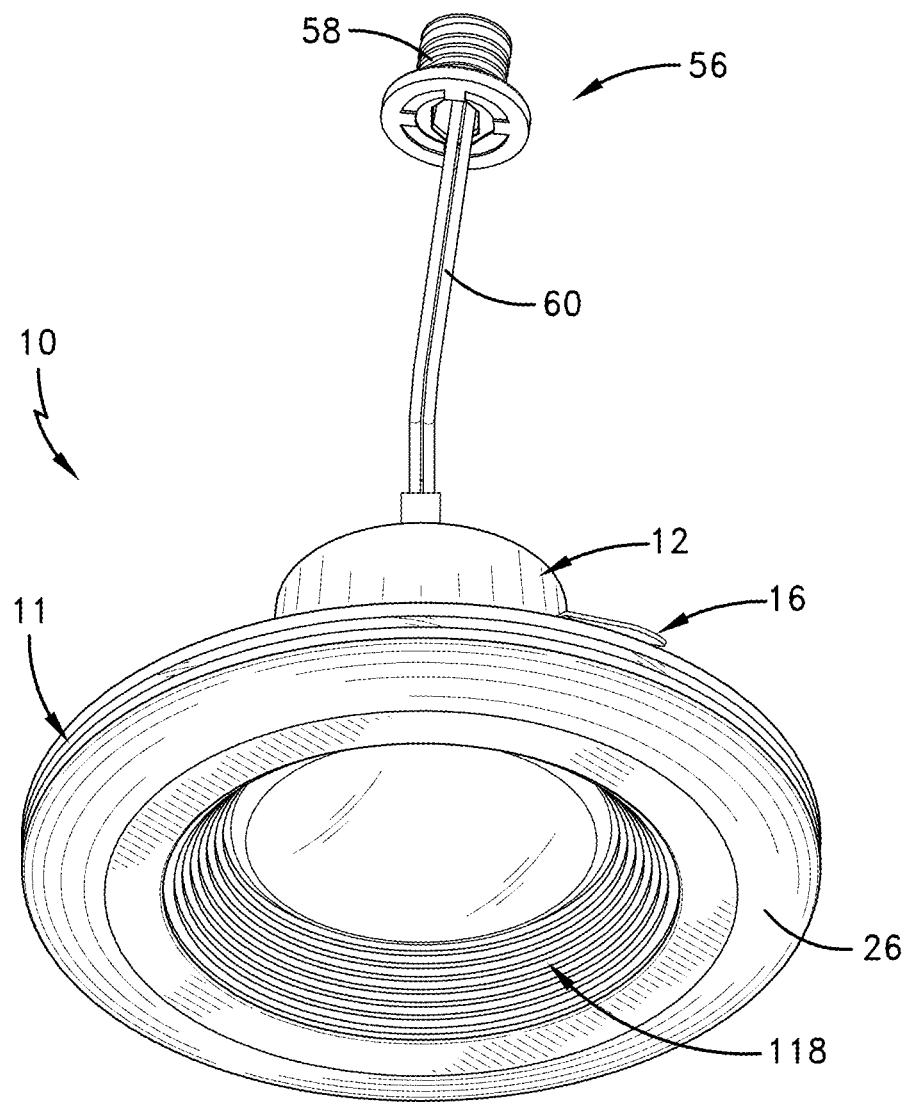
FIG. 7 is a rearward perspective view of the downlight shown in FIGS. 5-7 having an electrical connector incorporated thereon.

FIG. 7 is another perspective of downlight-with-nightlight 10. Further shown in FIG. 7 is an electrical connector 56. Electrical connector 56 includes socket 58 which can be screwed into an Edison receptacle to provide, through wire electrical leads 60, electricity to power the electrical components including the LEDs incorporated in the main light of downlight 10 and the LEDs in nightlight 11 incorporated therein.

FIG. 9 is a plan view of downlight-with-nightlight 10. FIGS. 9A-9E illustrates the respective illuminations for each of CCTs 2700 k, 3000 k, 3500 k, 4000 k and 5000 k.

The present invention is further discussed below with an additional set of drawings, some of which are at least partially duplicative of those discussed above. Some parts are repeated with new identifying numbers.

Figure 10:
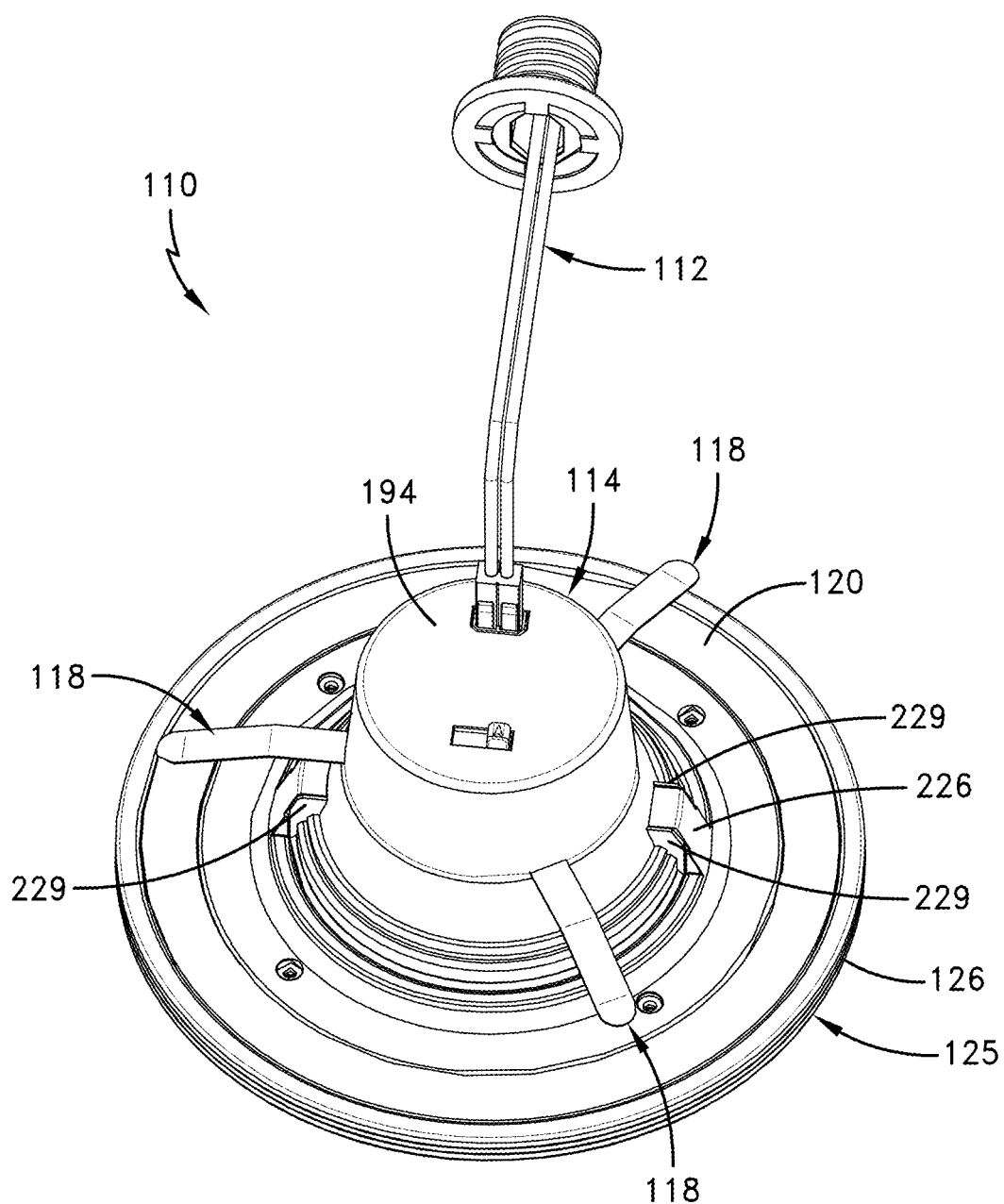
FIG. 10 is a perspective figure of a downlight according to the previously described embodiment of the invention showing the rear portion of the LED downlight.
Figure 11:
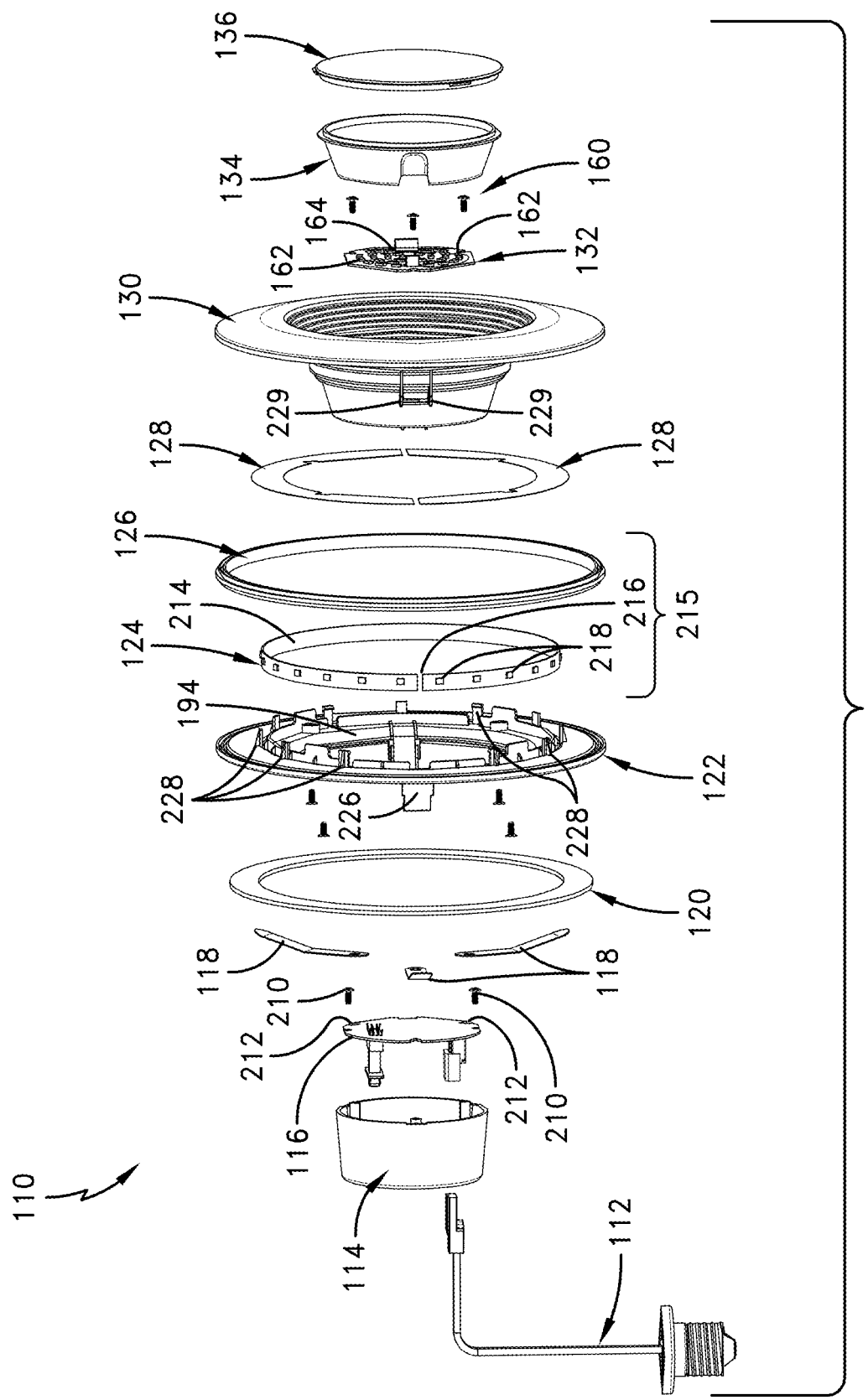
FIG. 11 is an exploded view of the embodiment of the invention shown in FIG. 10.

FIG. 10 is a perspective view of a downlight-with-nightlight 110 according to one preferred embodiment of the invention, and FIG. 11 is an exploded view of downlight-with-nightlight 110. Downlight-with-nightlight 110 includes a socket adaptor 112, a driver box 114, a driver accessory 116 (FIG. 11), a metal spring assembly 118, a sponge 120, a ring of back cover or annular component support 122 (FIG. 11), a lateral nightlight LED component 124 (FIG. 11), a circular lamp shade 126, an insulating trim 128, a surface ring assembly or housing 130 (FIG. 11), an LED component 132 (FIG. 11), a reflective cup 134 (FIG. 11) and a cover 136 (FIG. 11). For the description of downlights as used herein, the term "body portion" relates to the portion of the downlight-with-nightlight that is used for mounting the downlight in a ceiling, wall, places on the ground, etc., as well as the main light section, as opposed to nightlight section, of a light fixture. This would include housing 130 and driver box 114 in FIGS. 10 and 11 for example.

Turning first to housing 130, reference is made to FIGS. 12A-12F, housing 130 has a generally closed truncated conical structure. Housing 130 has a rearward (in the description to follow, "forward" refers to the direction of illumination, and rearward refers to the portion to be embedded in or closest to the ceiling) end cap 138, with an integral side wall 140 which merges into a more outwardly inclined, stepped, truncated walled component 142, an annular forward ring 144 that is integral with walled component 142 and has a flat (perpendicular to the perpendicular central axis of the fixed coaxial components of downlight-with-nightlight 110) inner ring component 146 and an outer ring component 148. Stepped truncated wall component 142 is provided with a number of concentric, axially aligned cylindrical steps 150 for helping to prevent the random discharge of light from downlight-with-nightlight 110. Downlight-with-nightlight 110 has four screw hole posts 152 to be discussed below. In addition, three screw holes 121 extending into end caps 138 as explained below.

Figure 12A:
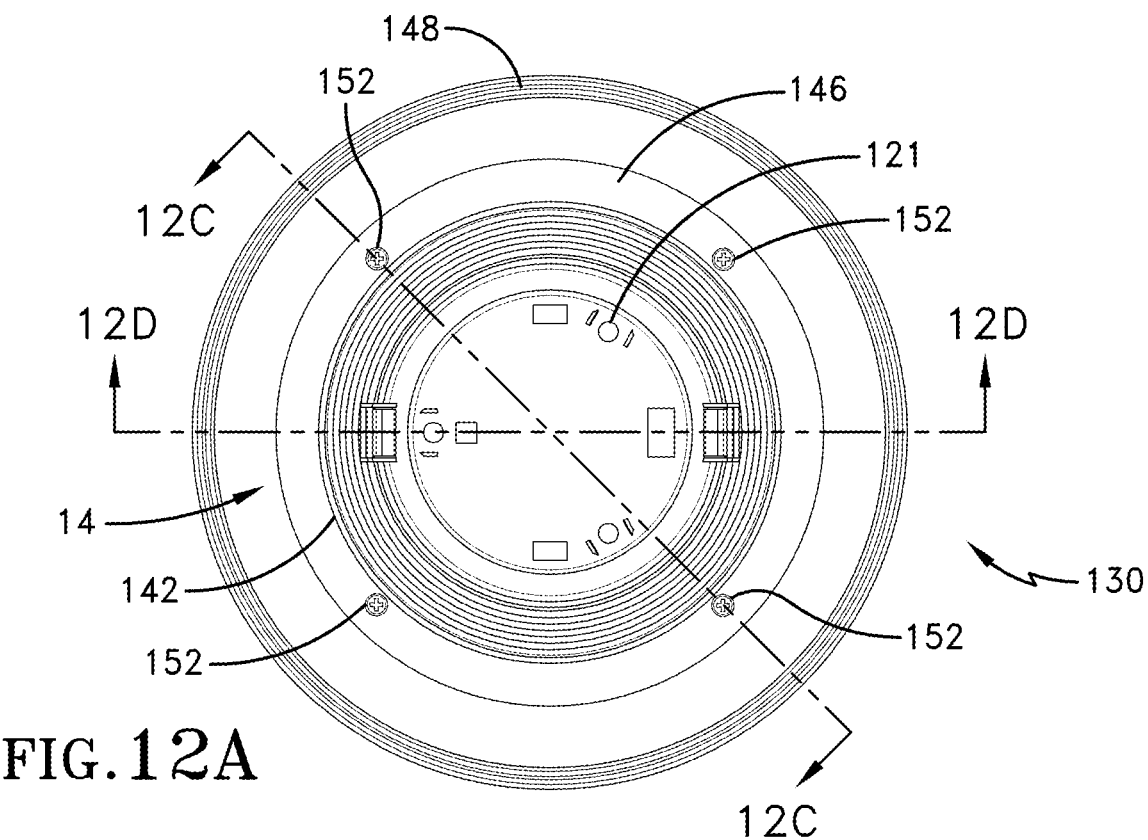
FIG. 12A is a front plan view of a surface ring incorporated in the embodiment shown in FIGS. 10 and 11.
Figure 12B:
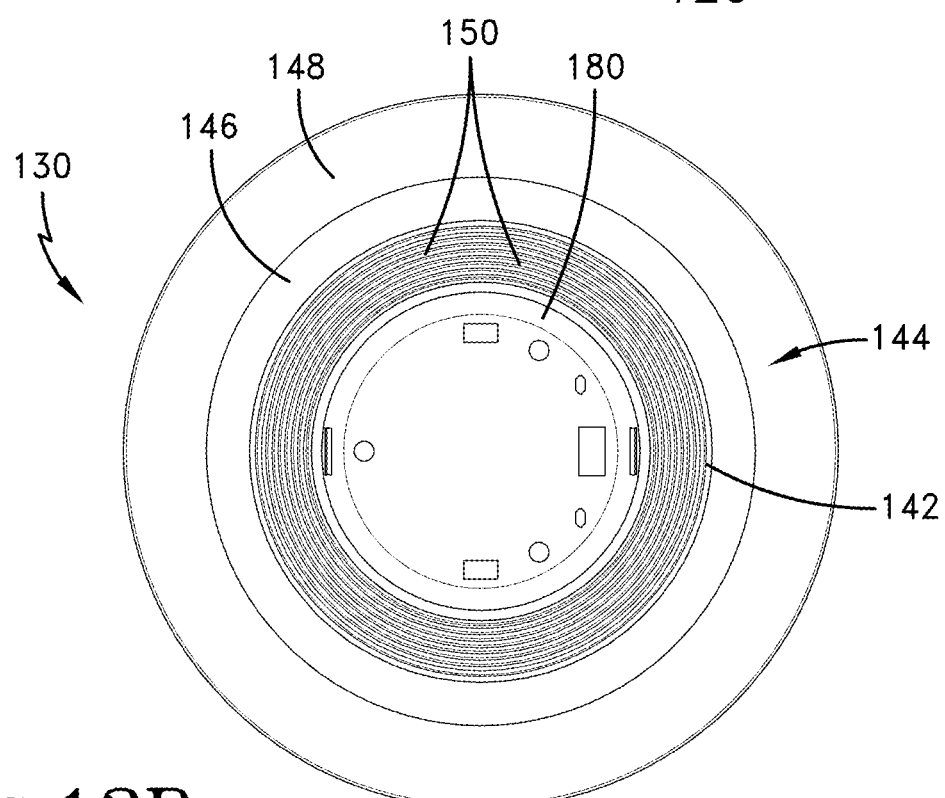
FIG. 12B is a front plan view of the surface ring assembly shown in FIG. 12A.
Figure 12C:
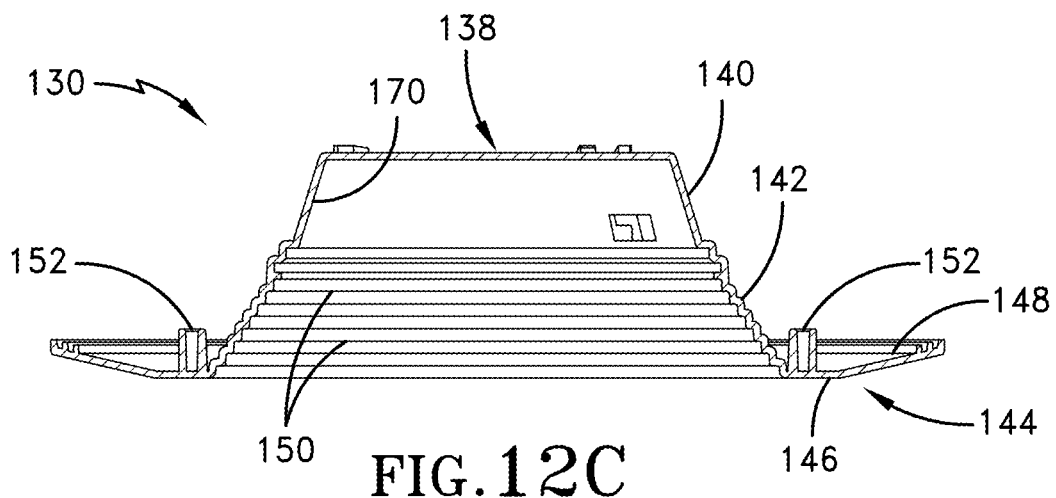
FIG. 12C is a cross-sectional view taken along the line 12C-12C in FIG. 12A.
Figure 12D:
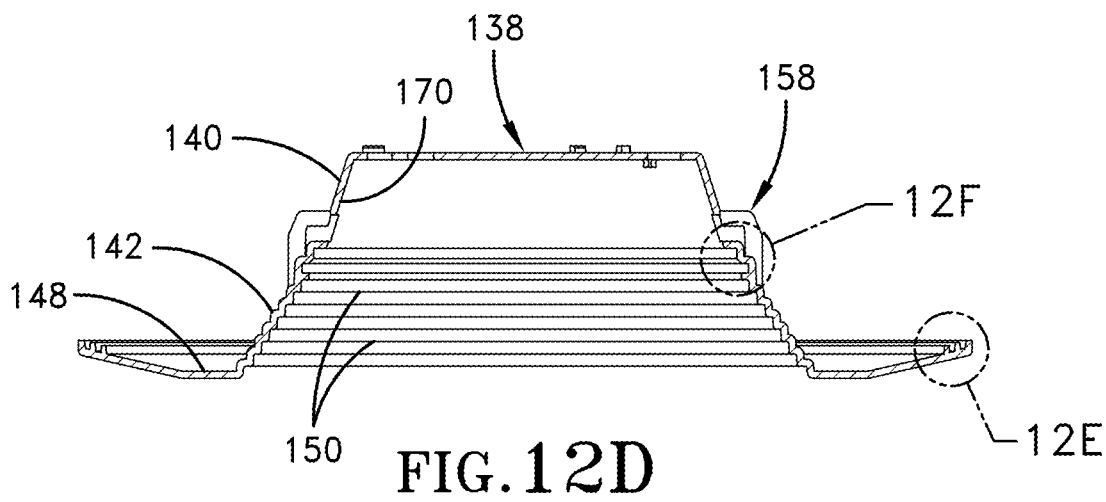
FIG. 12D is a cross-sectional view taken along the line 12D-12D in FIG. 12A.
Figure 12E:
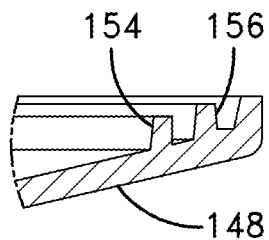
FIG. 12E is a detailed, enlarged view taken of the circle marked in FIG. 12D as FIG. 12E.
Figure 12F:
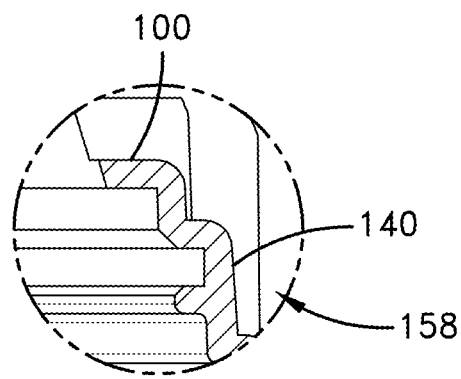
FIG. 12F is a detailed, enlarged view of the circled detail marked in FIG. 12D as FIG. 12F.
Figure 13B:
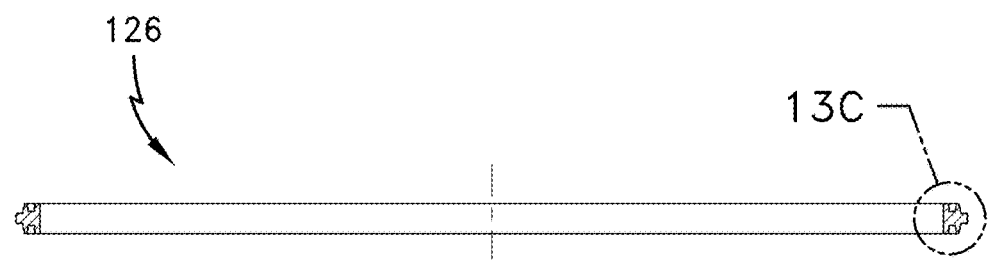
FIG. 13B is a cross-sectional view of the lamp shade taken along the line 13B-13B shown in FIG. 13A.
Figure 13C:
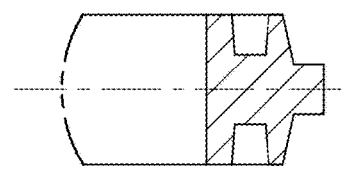
FIG. 13C is a detailed, enlarged view of the circled portion marked 13C shown in FIG. 13B, and marked FIG. 13C.
Figure 13A:
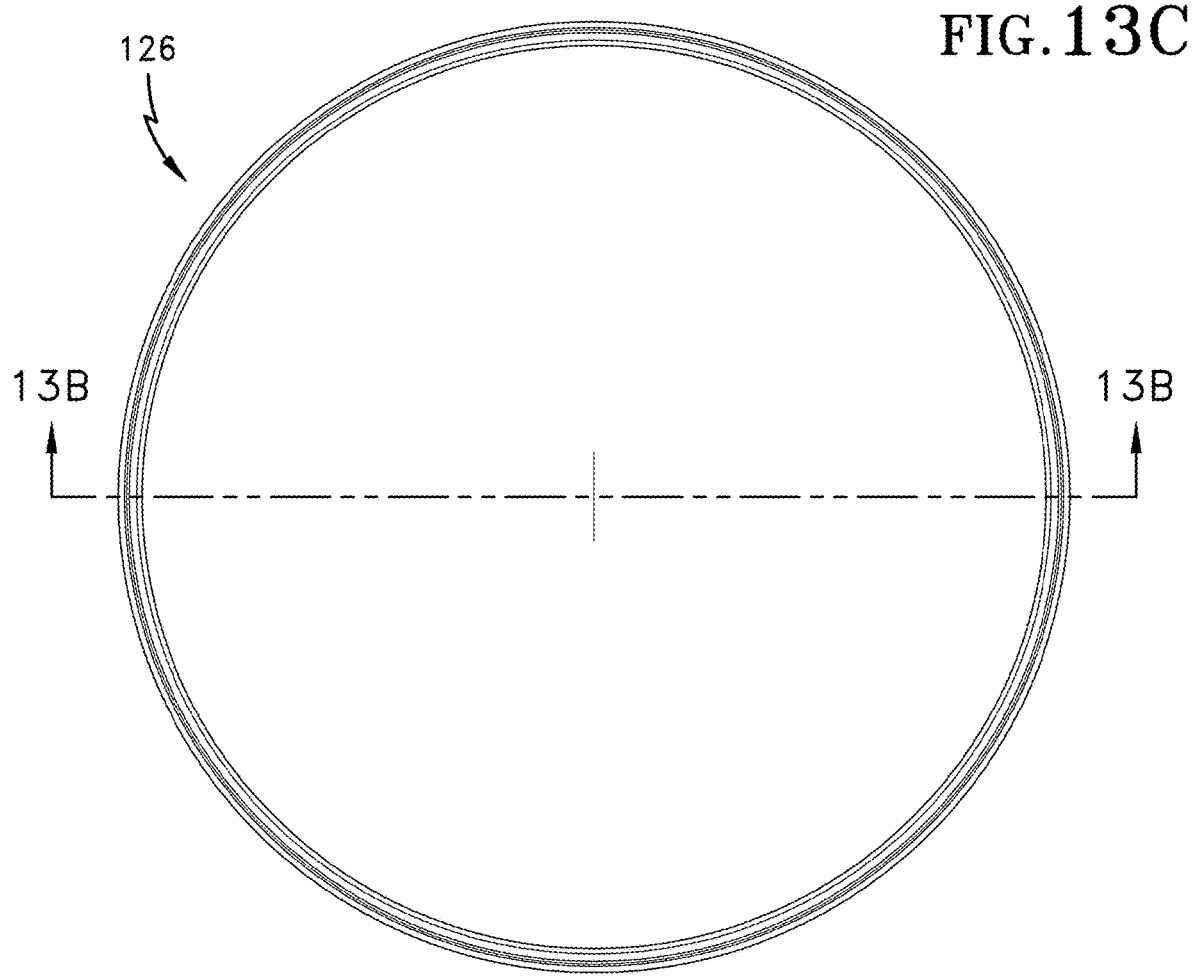
FIG. 13A is a plan view of a lamp shade incorporated in the embodiment shown in FIGS. 10 and 11.

FIG. 12E is an enlarged detail of a portion of outer ring component 148 showing rearwardly extending concentric and axially offset ridges 154, 156. Ridges 154, 156 are provided for adding strength to outer ring components 138 and to assist in preventing stray illumination from being emitted from downlight-with-nightlight 110. FIG. 12F is an enlarged detailed view of a transition 158 between integral side wall 140 and outwardly inclined stepped, truncated wall 142. The angled components add strength to a transition 158.

LED component 132 illustrated in FIG. 11 is attached to the forward side of end cap 138 of housing 129 by means of screws 160. Screws 160 extend through screw holes 162 in a printed circuit board 164 of main light LED component 132, as shown in FIG. 11. LED component 132 is composed of printed circuit board 164 and electronic components also identified broadly by indication number 164, which include the set of main light LEDs. LED component 132 is attached to reflective cup 134 which in turn is supported by driver accessory 116.

Reflective cup 134 is positioned against an interior wall 170 (shown in FIGS. 12C and 12D) of integral side wall of housing 129 as shown in FIG. 11. Reflective cup 134 reflects illumination emitted by a set of main light LEDs 168. Referring to FIGS. 20A-20D, reflective cup 134 includes a rearward, annular ring 172 that is integral with a coaxial truncated wall 174. The forward end portion of truncated wall 174 includes a flared out portion 176 and a flat, cylindrical, coaxial, outwardly extending portion 178 from which extends at a perpendicular angle to annular ring 172, that is also coaxial with the central axis of downlight 110 and rests against a flat inner ring component 180 of surface ring 130 as shown in FIG. 12B.

Figure 20B:
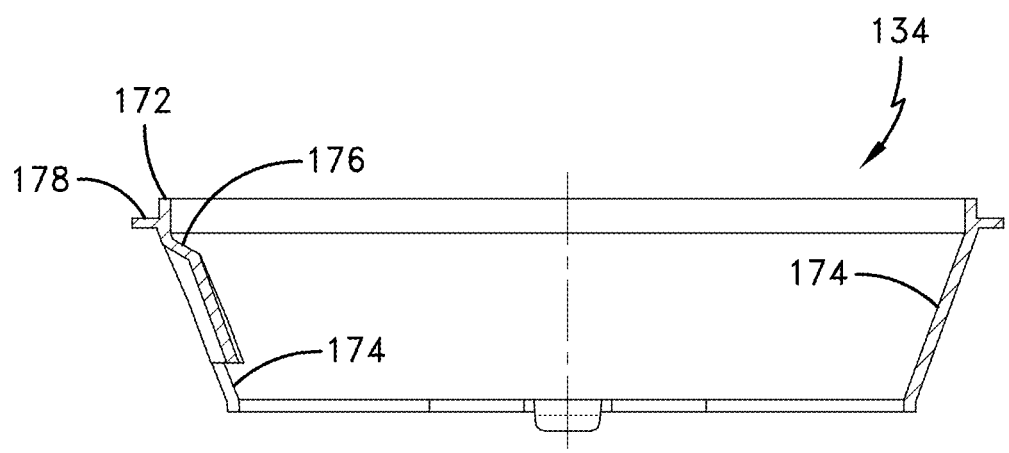
FIG. 20B is a view taken along the line 20B-20B in FIG. 20A.
Figure 20A:
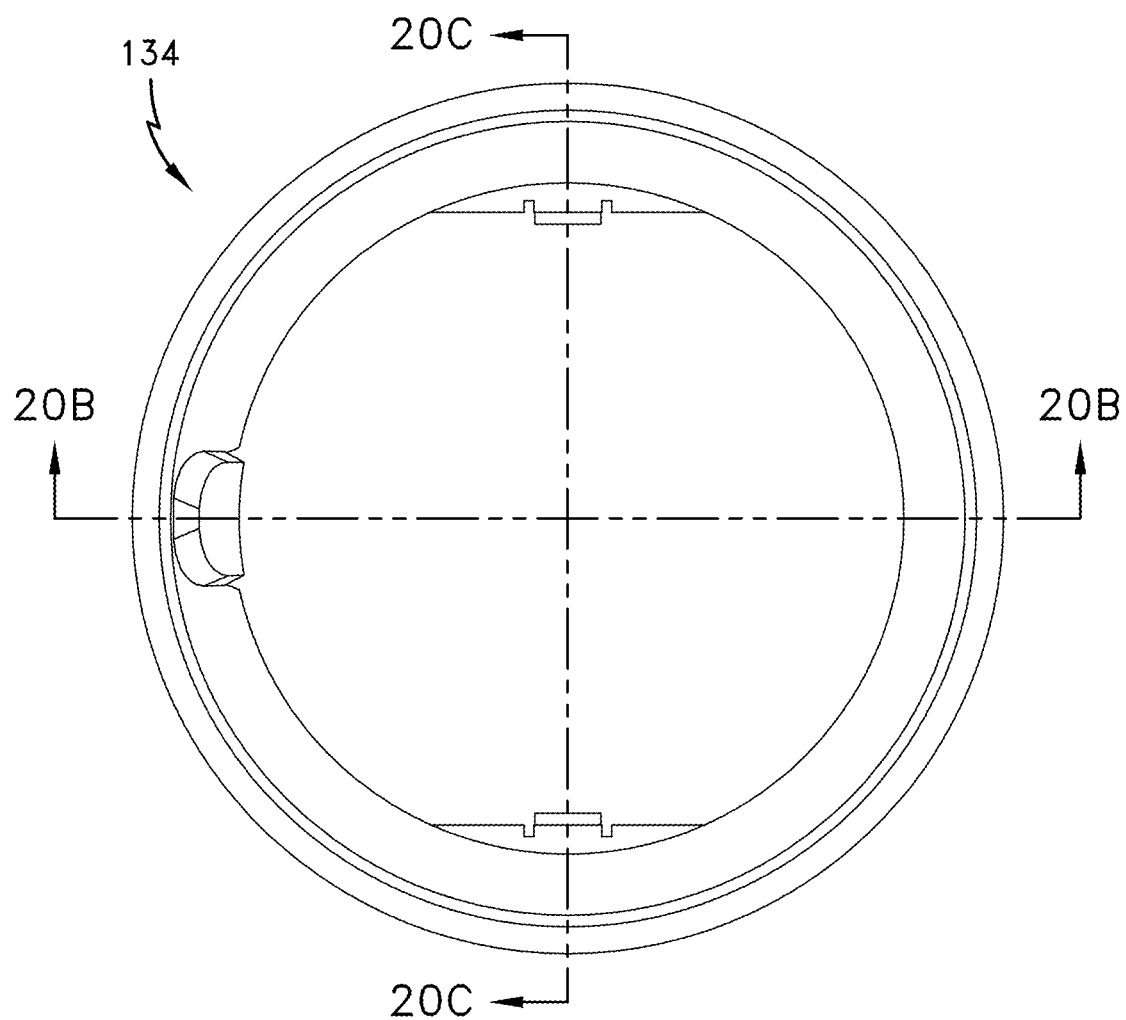
FIG. 20A is a front plan view of the reflective cap shown in FIG. 11.
Figure 20C:
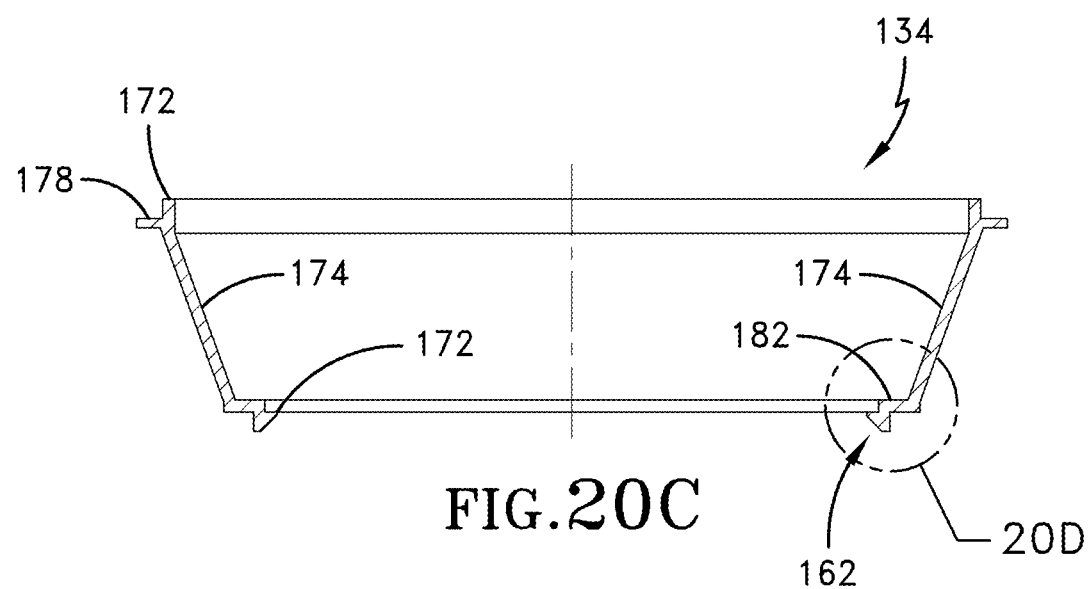
FIG. 20C is a cross-sectional view taken along the line 20C-20C in FIG. 20A
Figure 20D:
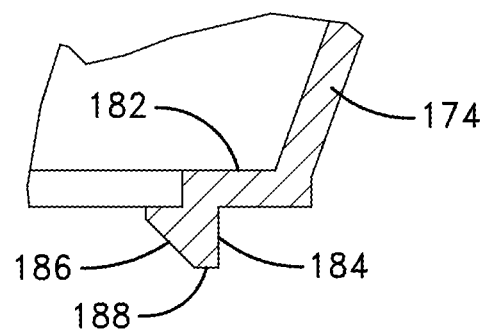
FIG. 20D is an enlarged, detailed view taken in the circled detail marked 20D in FIG. 20C.

FIG. 20D is a detailed, enlarged view as indicated in FIG. 20C of the transition between rearward, annular ring 182 and truncated wall 174. Also shown in FIG. 20D is an innermost cylindrical inner wall having a cylindrical outer surface 184 and a rearwardly, outwardly inclined surface 186, the latter surfaces meeting at a flat surface 188 perpendicular to the longitudinal axis of downlight-with-nightlight 110.

FIGS. 16A-16E depict cover 136 which is positioned on the forward portion of reflective cup 134. Cover 136 has a forwardly, spherically bowed central portion 190. Cover 136 has a cylindrical wall 192 for engaging the outer surface of cylindrical, coaxial portion 178 (FIGS. 20A-20C) of reflective cup 134. The rearward base of cylindrical wall 192 engages cylindrical coaxial portion 178 of reflective cup 134. Thus, cover 136 is held in place on reflective cup 134. Cover 136 is an integral unit preferably made of light transmitting plastic material such as polygonal chloride (PCE 94-V0).

Turning next to the rearward portion of downlight-with-nightlight 110, socket adapter 112 is attachable to driver box 114. Driver box 114 is shown in detail in FIGS. 17A-17D. Driver box 114 has a rearward cylindrical base 194 that is integral with which the rearward end of a generally truncated, coaxial driver box side wall 196. Extending from cylindrical base 194 are three screw receiving posts 198, two of which are diametrically opposed and one is angularly and equally disposed between the opposing, screw-receiving posts 198. Posts 198 are each basically equal in height above base 194 and equal to the height of side wall 196. Another shorter screw-receiving post 200 is angularly spaced from one of posts 198. A basically three-sided wall 208 extends forwardly from base 194 at the lower part of post 198.

Driver accessory 116 is attached to driver box 114 for supporting LED component 132 as illustrated in FIG. 11. Two screws 210 extend through screw holes 212 and into two posts 174.

An important aspect of the present invention is the provision of a nightlight in combination with other components of a downlight. One component of a nightlight pursuant to the present invention is lateral LED component 124 shown in FIG. 11. Lateral LED component 124 is composed of a nearly cylindrical, sheet-like support or band 214 having a small gap 216. Wire leads are disposed in gap 216 for the electrical circuit that includes a set of nightlight LEDs 218. Set of nightlight LEDs 218 has a relatively low level of brightness is connected in an electrical circuit as noted.

Lateral nightlight LED component 124 is a flexible sheet-like support or band 214 to which nightlight LEDs 218 are attached. Nightlight LED component 124 is basically woven between forwardly, thin supports 222 (FIG. 14A) extending forwardly on annular component support 122 to render sheet-like support concentric with the central longitudinal axis of downlight-with-nightlight 110. Annular component support 122 is shown in detail in FIGS. 14A-14G. Annular component support 122 includes an annular outer ring 220. Outer ring 220 has a grooved outer annular portion 222, and an inner annular portion 224, and a pair of lateral, rearwardly extending and diametrically opposed supports 226 parallel with the central axis of downlight-with-nightlight 110. Supports 226 extend between two pairs of radially flanges 229 extending in opposite directions from outer ring 220. Four equiangular screw holes 230 are located in an annular ring portion 232. FIG. 14D is an enlarged detail taken in the direction 14D-14D of FIG. 14A, showing an annular hooked wall 234 and an annular outer wall 220.

Figure 14A:
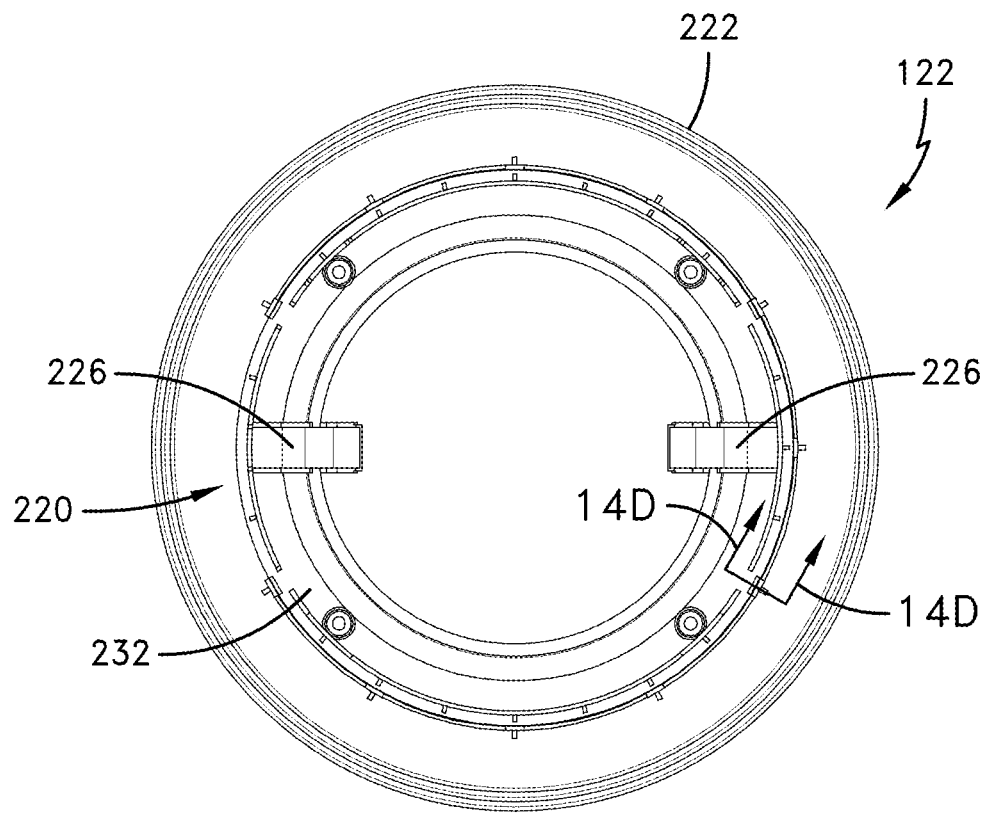
FIG. 14A is a front plan view of the ring of a back cover or an annular component support shown in FIG. 11.
Figure 14B:
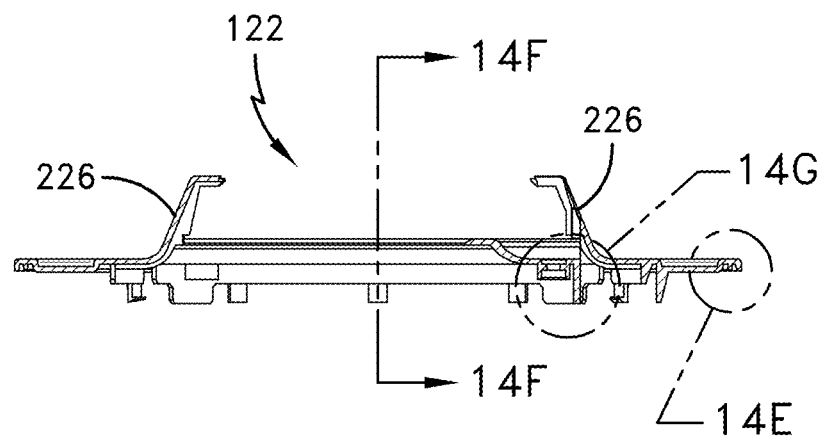
FIG. 14B is a cross sectional view of the annular component support taken in the direction of arrows 14B-14B in FIG. 14C.
Figure 14C:
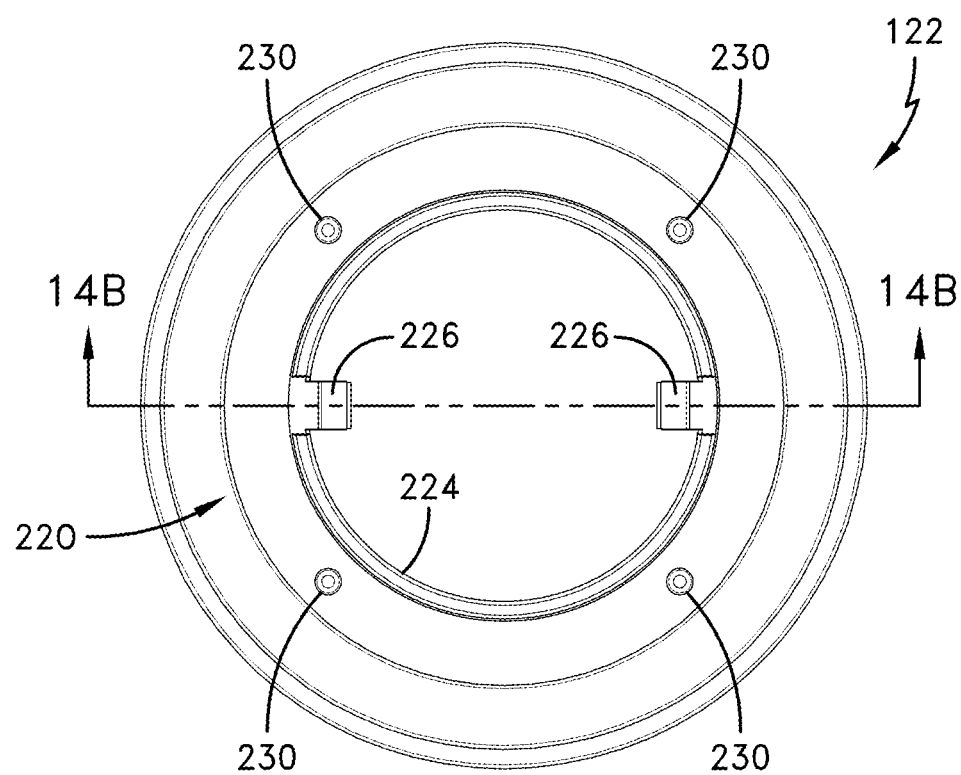
FIG. 14C is a rear plan view of the annular component support shown in FIG. 14A.
Figure 14F:
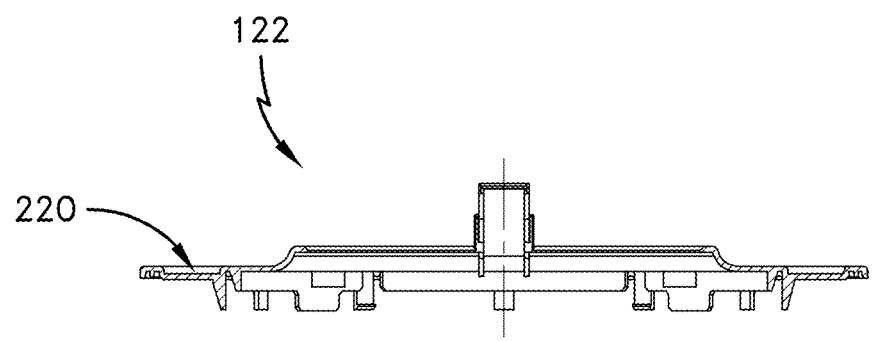
FIG. 14F is taken along the line 14F-14F in FIG. 14B.
Figure 14D:
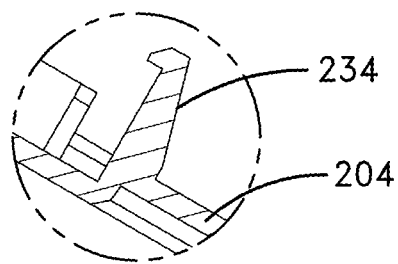
FIG. 14D is a detailed enlargement taken in the direction of arrows 14D-14D shown in FIG. 14A.
Figure 14E:
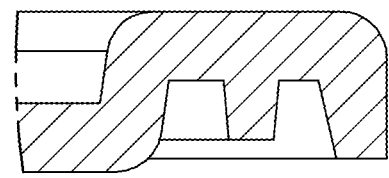
FIG. 14E is a detailed, enlarged view of a part of the annular component support as shown in the circle composed of a phantom circle marked 14E in FIG. 14B.
Figure 14G:
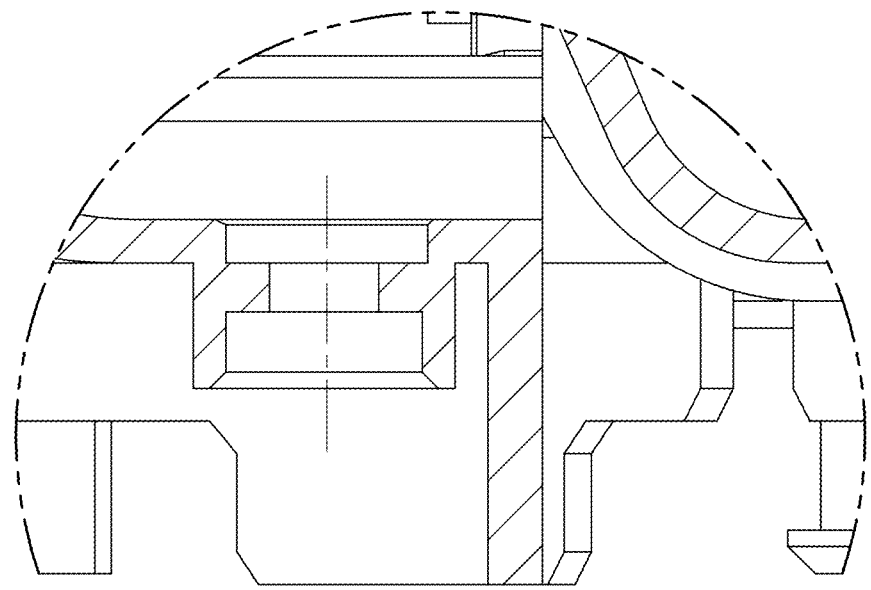
FIG. 14G is an enlarged, detailed view of the circled detail marked 14G in FIG. 14B.

FIG. 14E is an enlarged cross-section from FIG. 14A. FIG. 14F is an enlarged cross-section of FIG. 14B. FIG. 14G is an enlarged cross-section shown in the phantom circle marked 14G in FIG. 14B.

Circular lamp shade 126 is clamped in position between back cover 122 and housing 130 as shown in FIG. 11. Lamp shade 126 functions as a diffuser for emitting illumination from set of nightlight LEDs 218 on support 214 of lateral LED component and is part of a nightlight 215. Insulating strip 128 is an annular insulator and is disposed against inner ring component 146 of housing 130.

Figure 15:
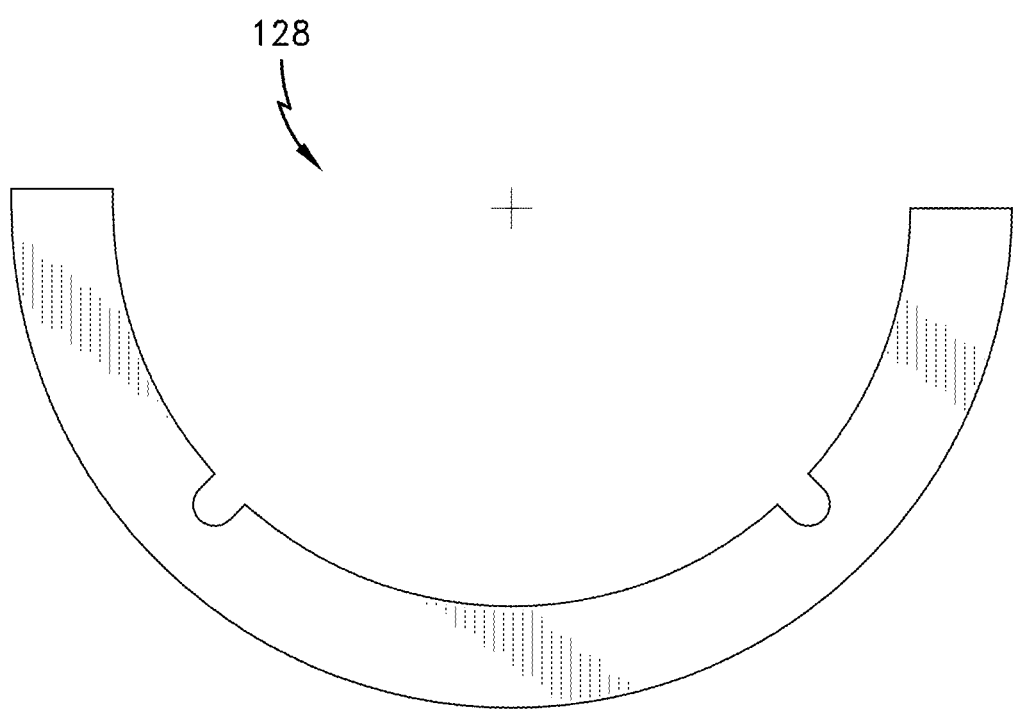
FIG. 15 is a plan view of a portion of the insulating trim shown in FIG. 11.
Figure 16A:
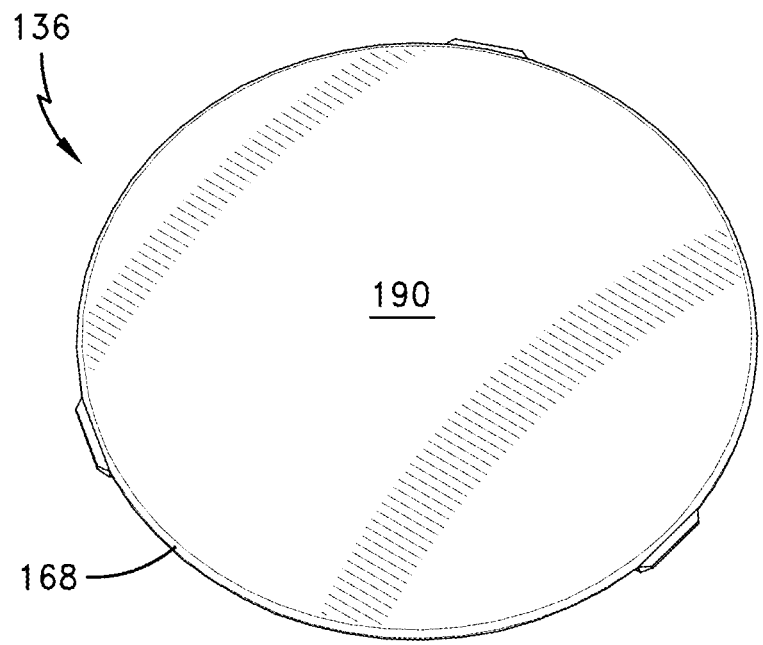
FIG. 16A is a perspective front view of the diffuser shown in FIG. 11.
Figure 16B:
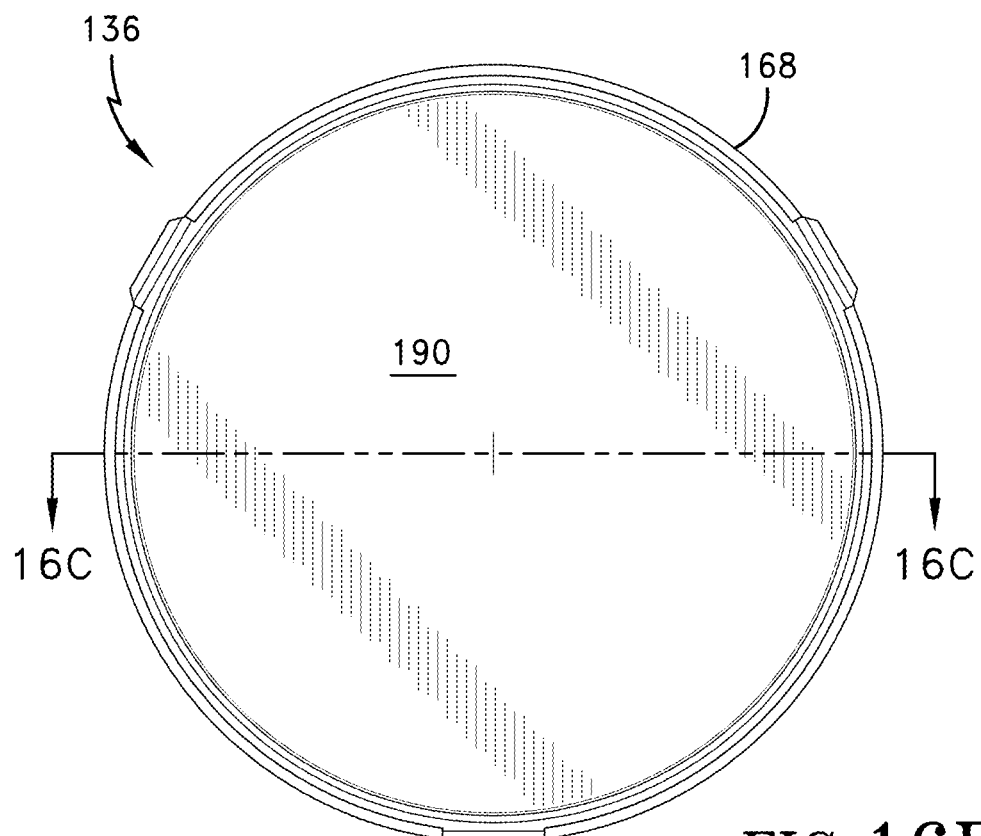
FIG. 16B is a rear view of the foregoing diffuser.
Figure 16C:
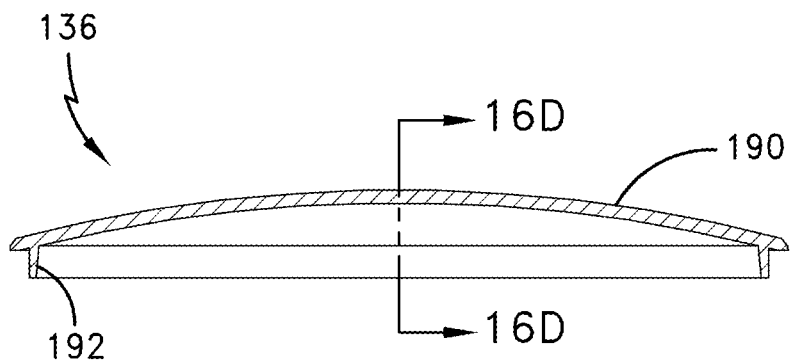
FIG. 16C is a view taken along the line 16C-16C in FIG. 16B.
Figure 16D:
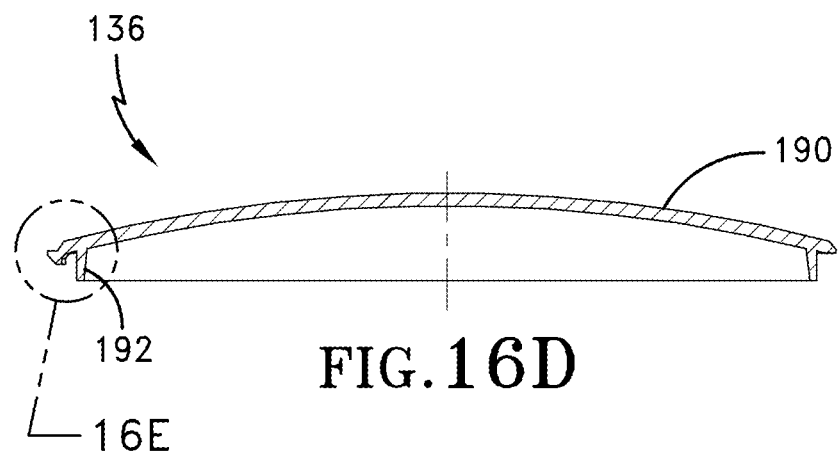
FIG. 16D is a cross-sectional view taken along the line 16D-16D in FIG. 16C.
Figure 16E:
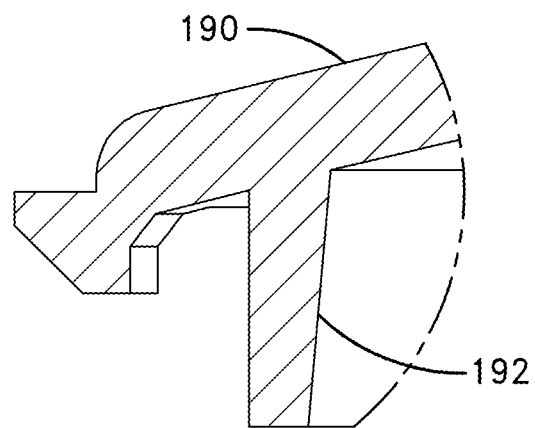
FIG. 16E is an enlarged, detailed view of the circle portion marked 16E in FIG. 16D.
Figure 17A:
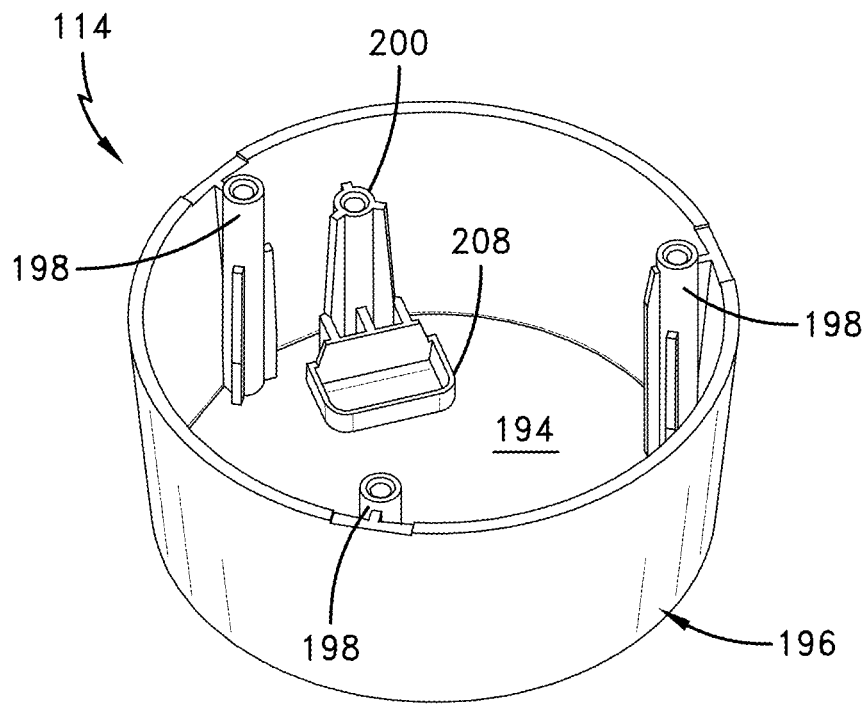
FIG. 17A is a perspective view of the driver box shown in FIGS. 10 and 11.
Figure 17B:
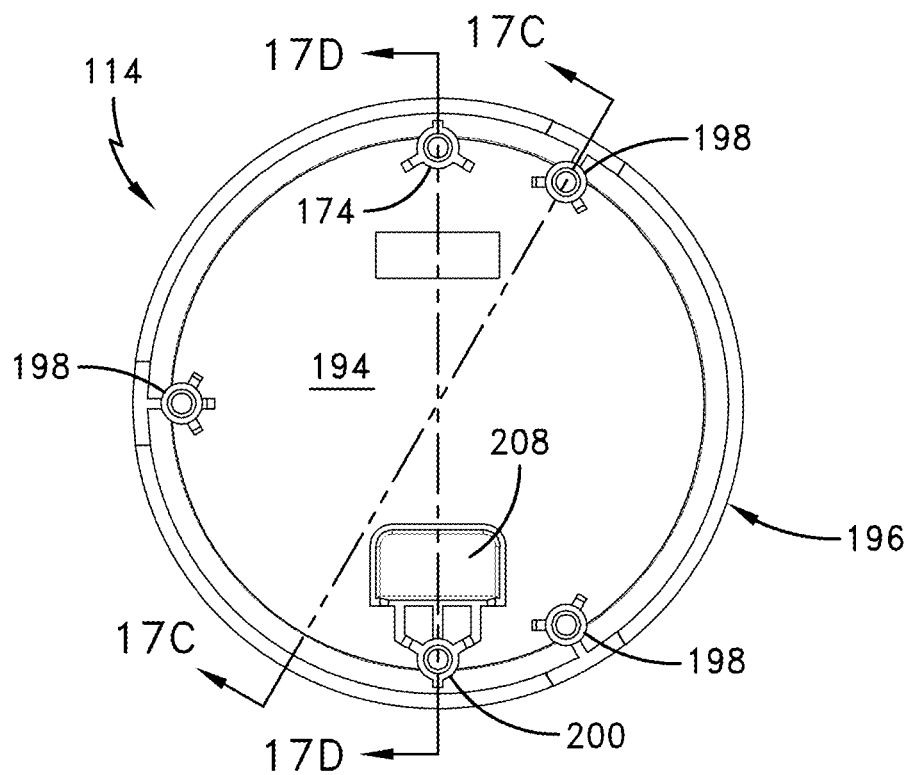
FIG. 17B is a front plan view thereof.
Figure 17C:
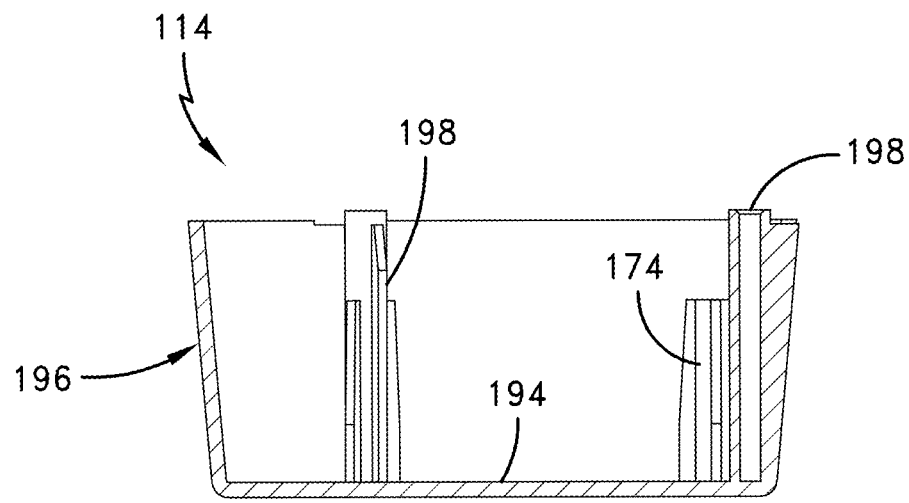
FIG. 17C is a cross-sectional view taken along the line 17C-17C in FIG. 17B.
Figure 17D:
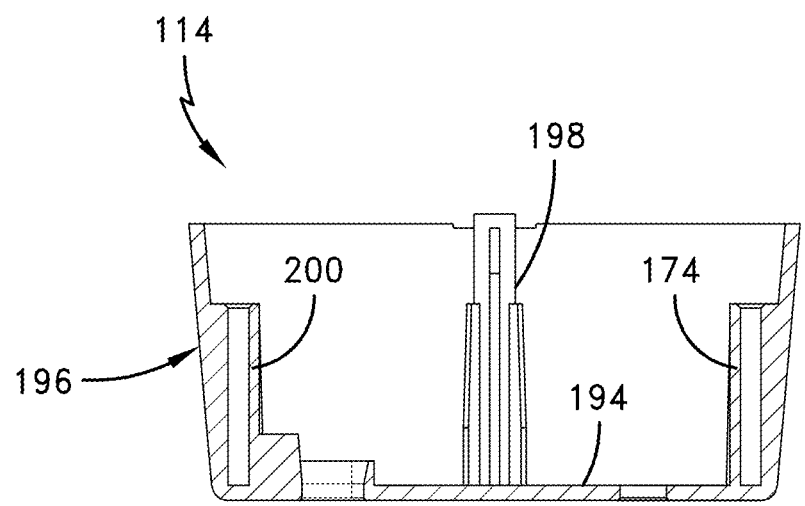
FIG. 17D is a view taken along the line 17D-17D in FIG. 17B.

Insulator 128 is illustrated in FIG. 15. Insulator 128 is attached to inner ring component 146 of housing 130 shown in FIGS. 12A-12C.

Figure 18A:
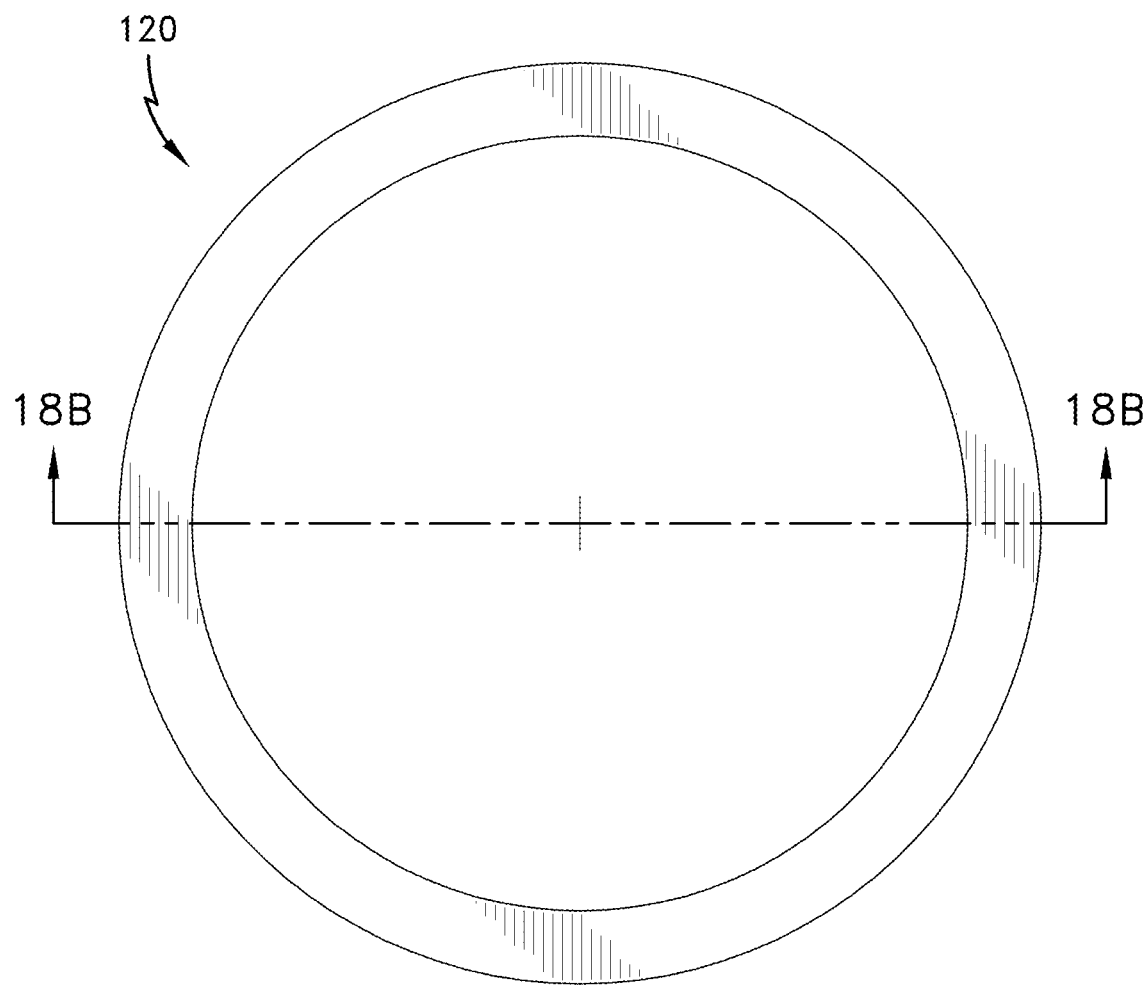
FIG. 18A is a plan view of the sponge used in the embodiment shown in FIGS. 10 and 11.
Figure 18B:
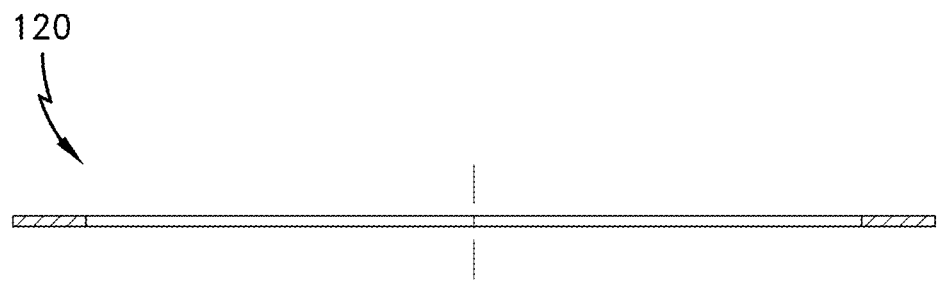
FIG. 18B is a cross-sectional view taken along the line 18B-18B in FIG. 18A.

Sponge 120 rests on the rearward side of annular component support 122 and is held in place by three metal springs 118. See FIG. 11. Metal springs 118 are clamped in place by opposing driver box 114 and housing 130. Sponge 120 is used to absorb physical vibrations, and is shown in FIGS. 18A and 18B.

Figure 19A:
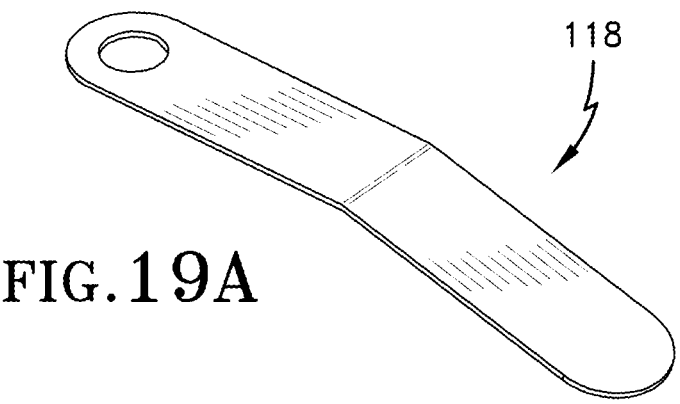
FIG. 19A is a perspective view of a metal spring shown in FIG. 11.
Figures 19B, 19C:
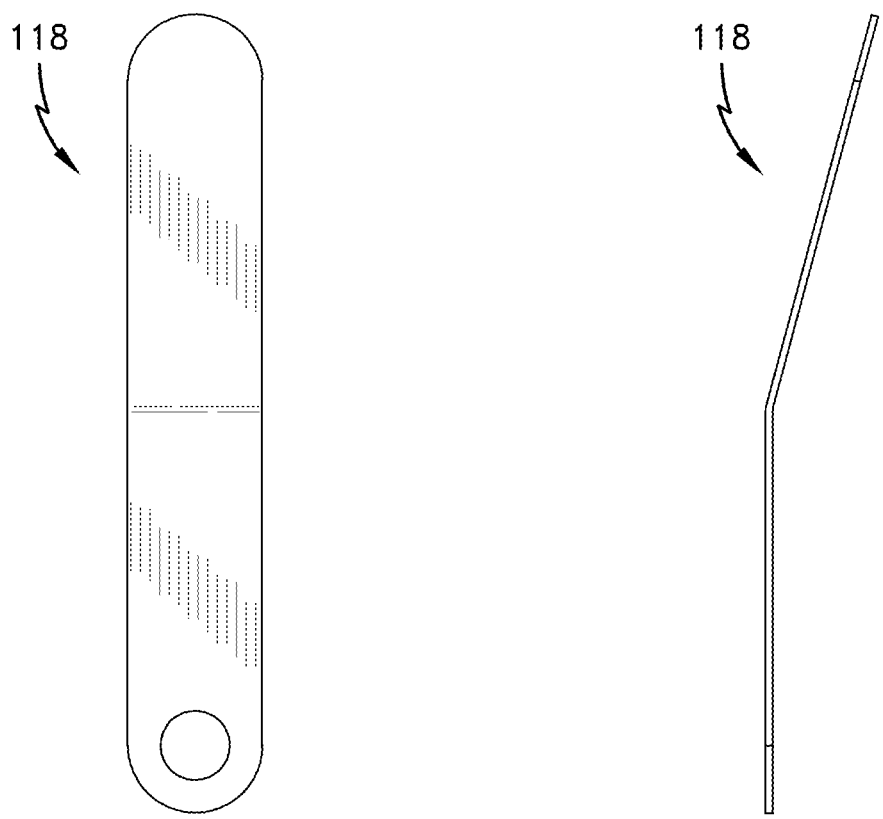
FIG. 19B is a side view of the latter spring.
FIG. 19C is a plan view of the metal spring shown in FIGS. 19A and 19B.

FIGS. 19A-19C depict metal springs 118. Each spring functions to engage the inside surface of a can in which downlight-with-nightlight 110 is mounted to hold downlight-with-nightlight 110 firmly in place.

Figure 21:
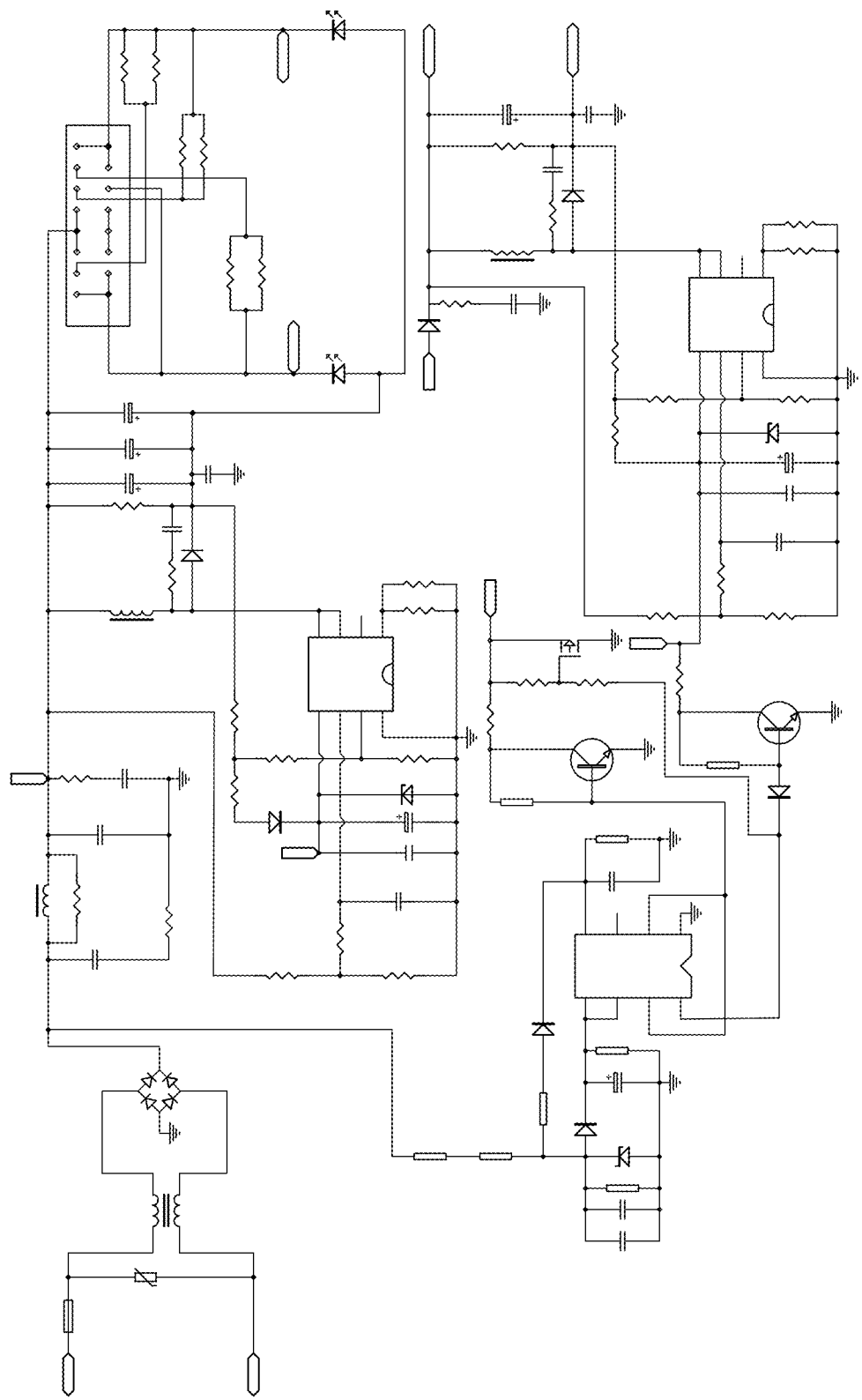
FIG. 21 is an electric circuit diagram for the circuit incorporated in the downlight shown in FIGS. 10 and 11.

FIG. 21 is an electric circuit diagram. The circuitry enables the variance of the CCT of the main light of downlight 110. The CCT of accent light of downlight-with-nightlight 110 is not varied, but circuitry could be provided to vary the CCT of the downlight. This type of circuitry can be used in each of the embodiments in this application. Various changes can be determined by those of ordinary skill in the art of LED light fixtures. The same is true for possible variations in the LED circuitry such as that in FIG. 40 discussed hereinafter.

Figure 22:
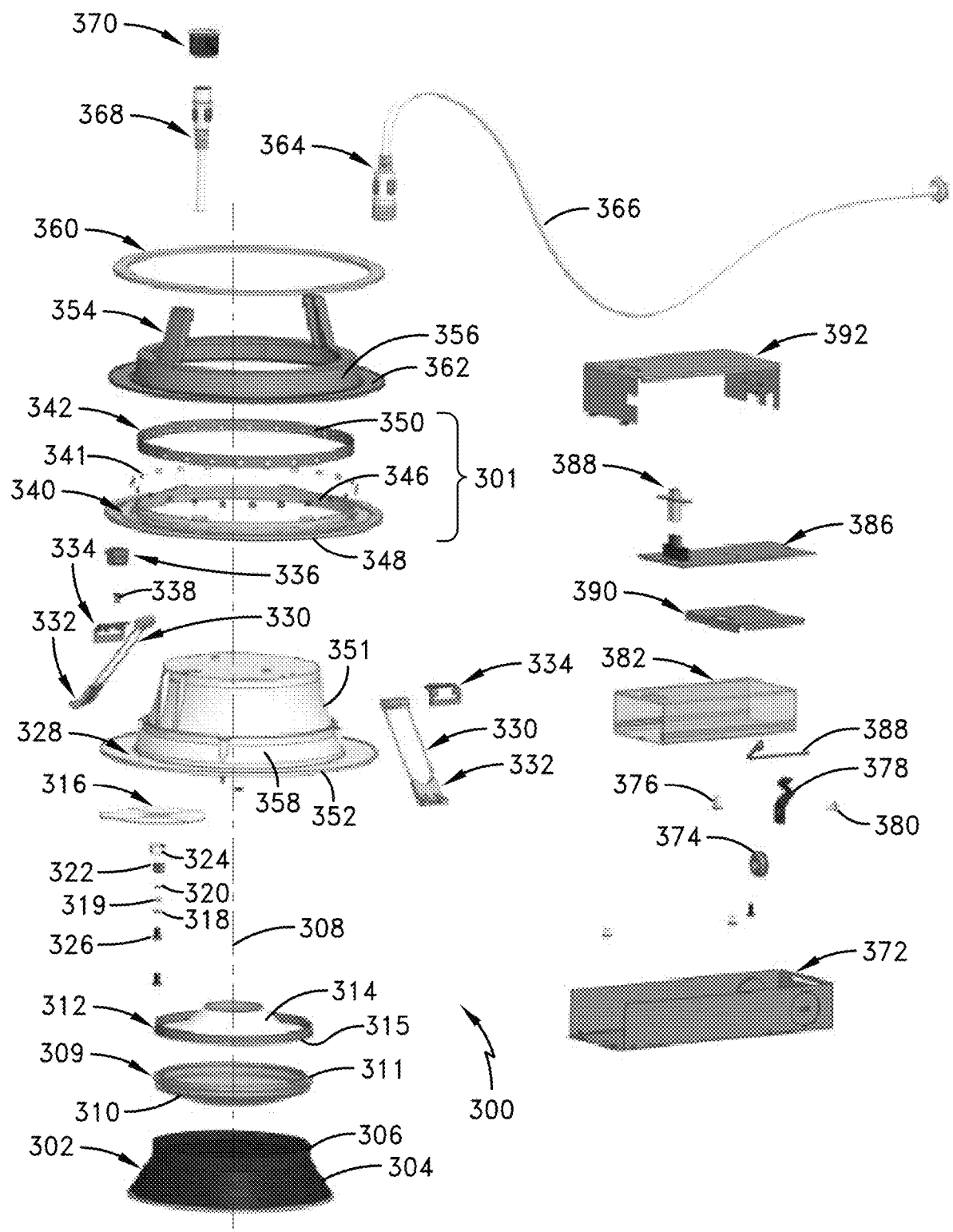
FIG. 22 is an exploded view of a canless downlight with a nightlight according to another embodiment of the invention.
Figure 23A:
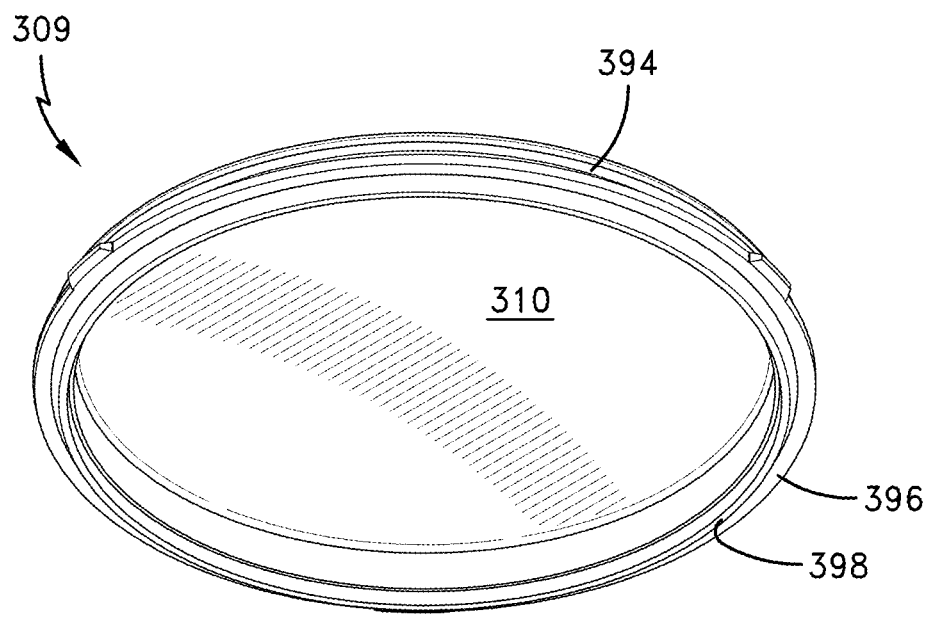
FIGS. 23A-23D are respectively a perspective view, a side view, a top view and a cross-sectional view, of a diffuser shown in FIG. 22, taken along the arrows 23D-23D in FIG. 23C.
Figure 23B:
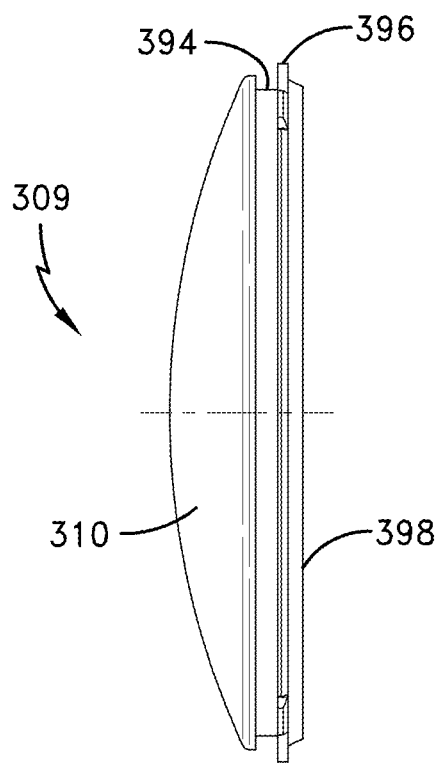
Figure 23C:
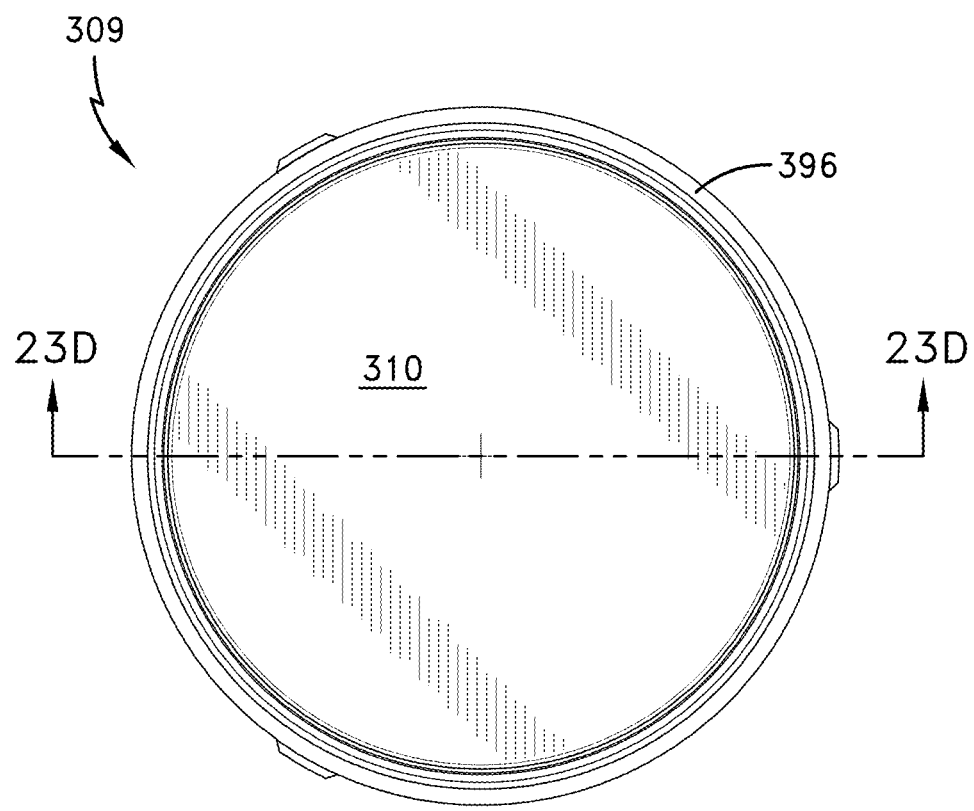
Figure 23D:
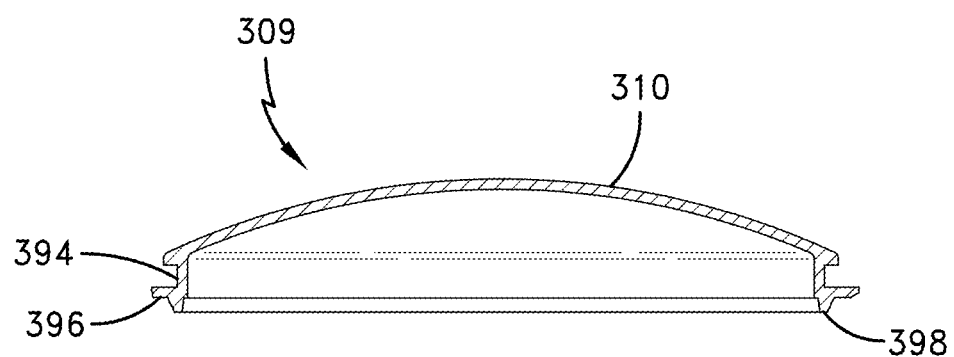
Figure 24A:
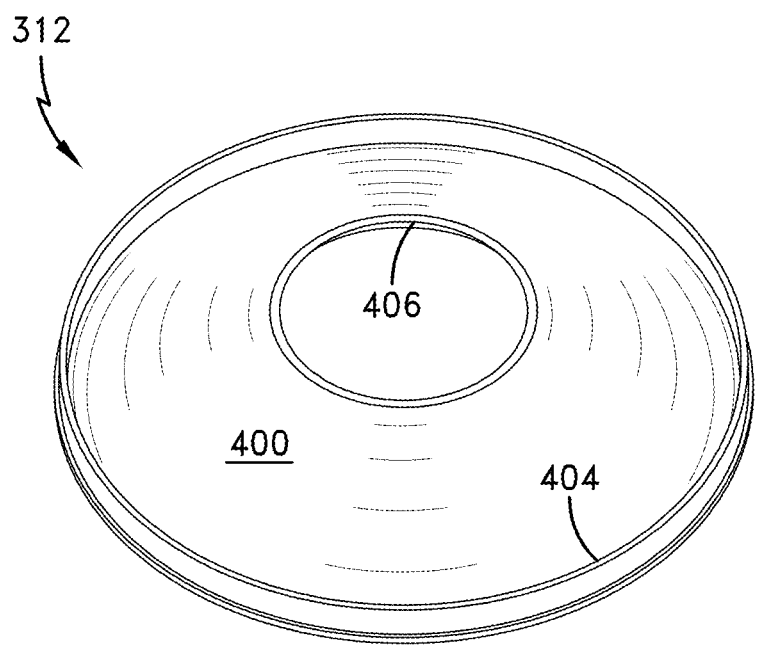
FIGS. 24A-24D are respectively a perspective view, a top view, a side view and a cross-sectional view taken along line 24D-24D in FIG. 24B, of the reflector shown in FIG. 22.
Figure 24B:
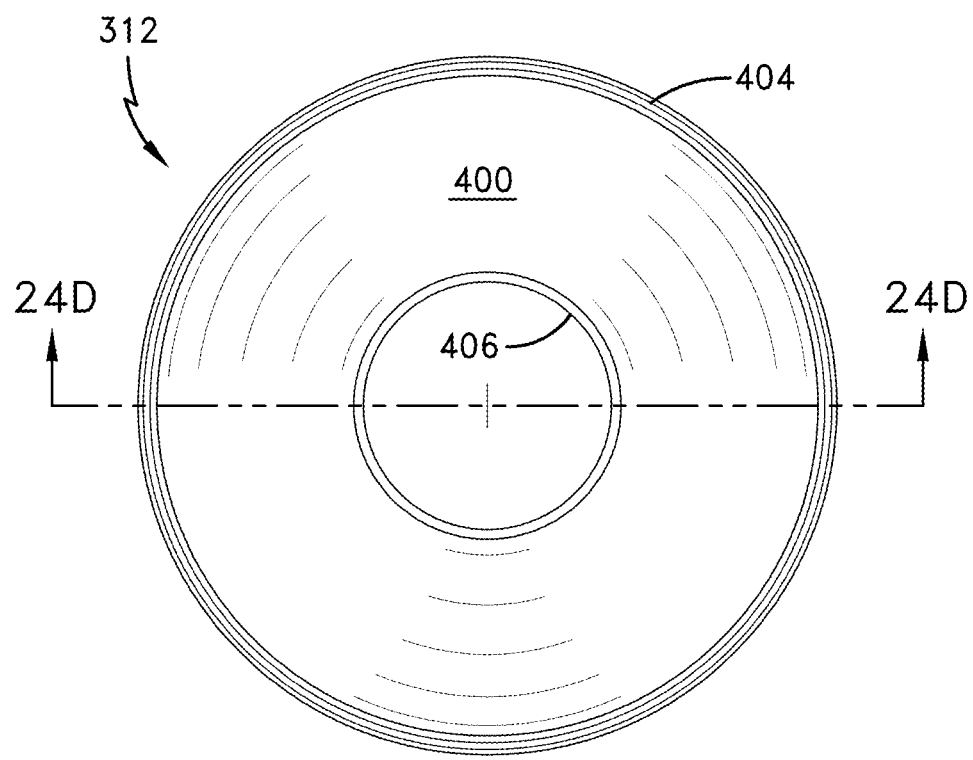
Figure 24C:
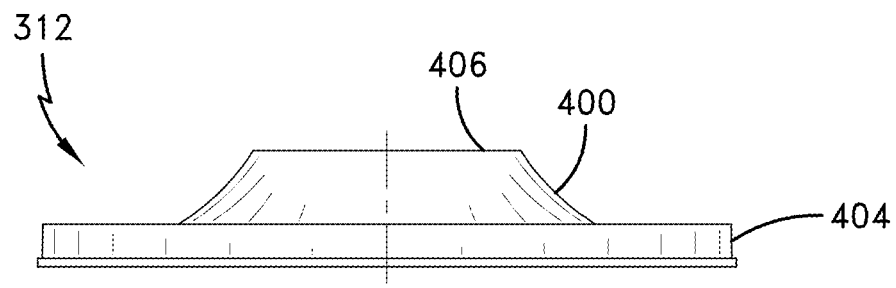
Figure 24D:
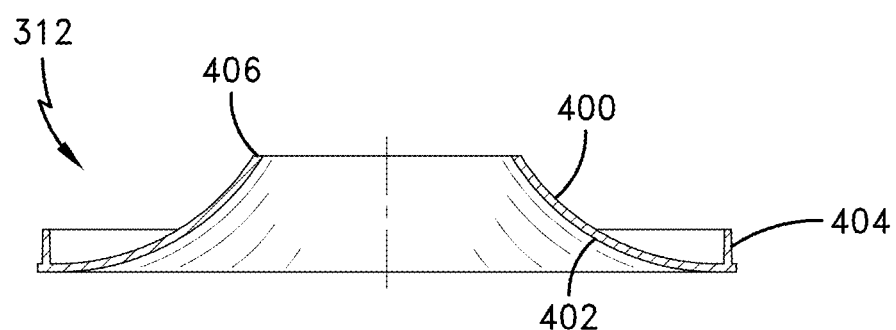
Figure 25A:
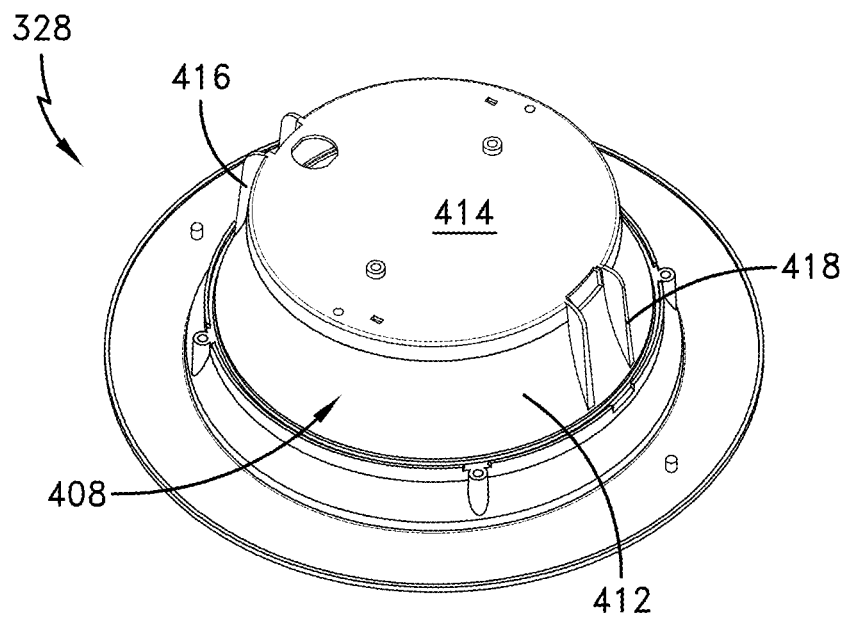
FIGS. 25A-25E are respectively a perspective view, a top view, a cross-sectional view taken in the direction of arrows 25C-25C in FIG. 25B, a side view and an enlarged cross-sectional view taken within the phantom circle marked 25E shown in FIG. 25C, of the heat sink shown in FIG. 22.
Figure 25B:
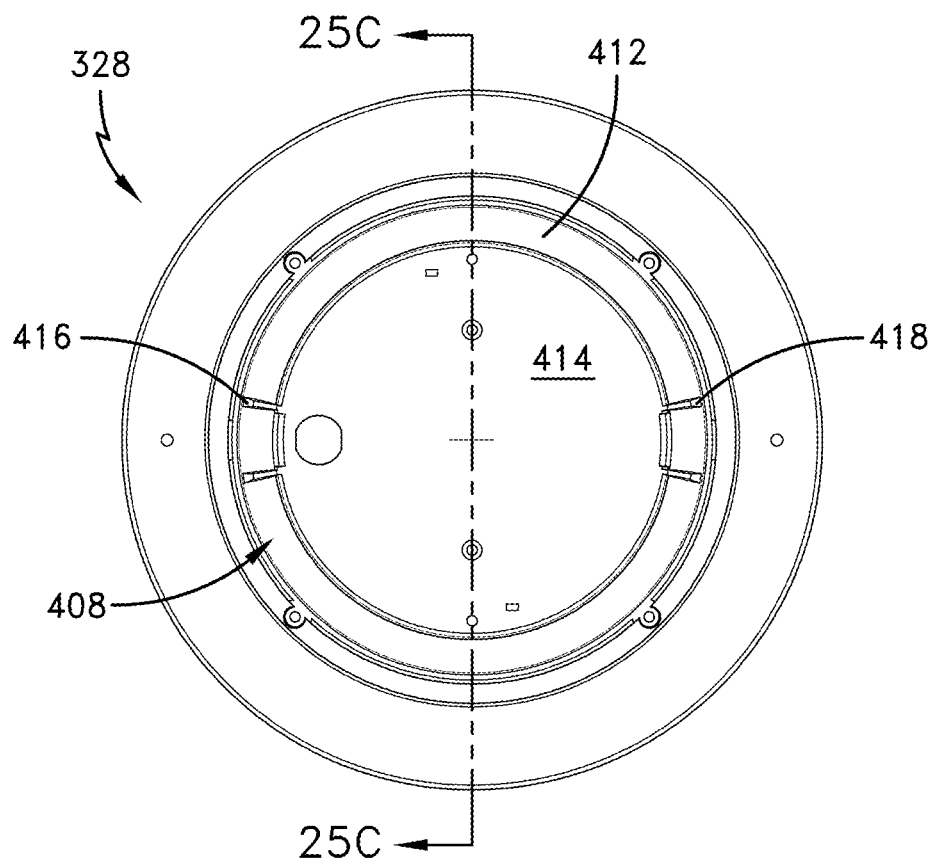
Figure 25C:
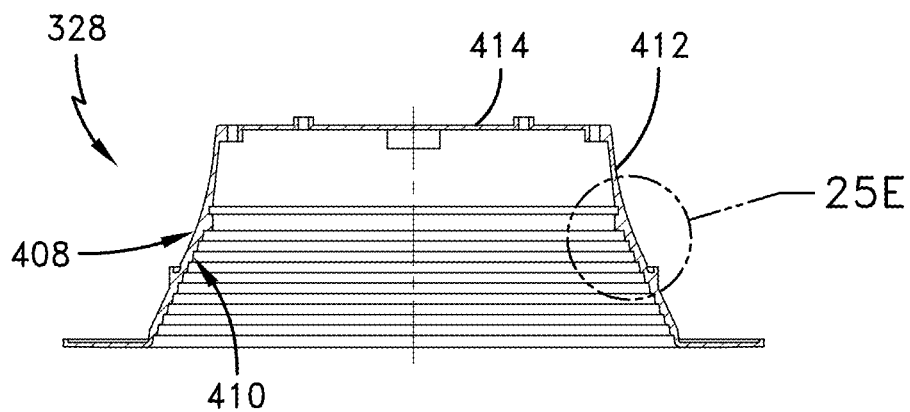
Figure 25D:
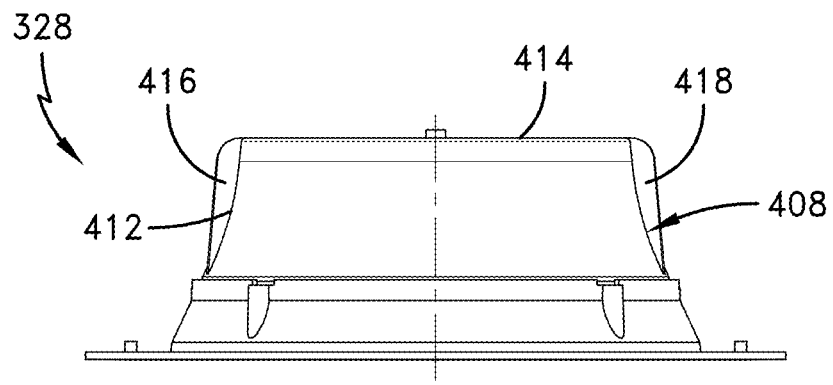
Figure 25E:
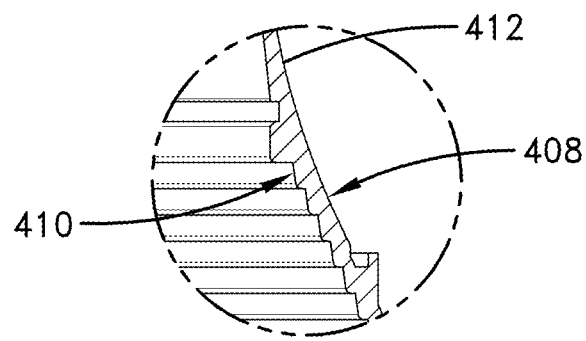

Referring to FIG. 22, an exploded view of a four inch or six inch canless with downlight-with-nightlight 300 according to an embodiment of the invention as shown. A canless downlight is not mounted in a canister (or can), but rather is located in a hole in one of a ceiling, a wall, or a floor or ground, for example. This embodiment includes axially directed main light LED lumination assembly which would be directed downwardly when mounted on a horizontal ceiling, and an LED nightlight 301 directed transversely to the direction of the foregoing axial axially direction. The forwardmost component is an inner baffle ring 302 including an outwardly flared baffle 304 extending from the forward portion of an annular ring 306 which is concentric with a central longitudinal axis 308 of downlight-with-nightlight 300. Disposed rearwardly of baffle ring 302 is a diffuser 309 which includes a forwardly extending domed portion 310 for transmitting illumination, and a peripheral ring 311 which is coaxial with inner baffle ring 302 for fitting inside of annular ring 306 of flared baffle 304 of inner baffle ring 302. A rearwardly located, aligned coaxially with baffle ring 302 and diffuser 308, is a reflector 312. Reflector 312 includes a rearwardly inclined, truncated reflecting component 314 whose forwardly facing curved side is a reflecting surface for reflecting illumination in the forward direction. Reflector 312 includes a forwardly located, circular rim 315 having as its central axis, axis 308. Centrally located on axis 308 is a main light printed circuit board 316 carrying electronic circuitry for the source of main light discussed below. A set of three LEDs 318, 319, 320 are attached to printed circuit board 316. A socket 322 and a terminal 324 are attached to printed circuit board by means of screws 326.

A heat sink 328 surrounds the rearward part of printed circuit board 316 for absorbing the heat generated by LEDs 318-320. A pair of springs 330 each engage heat sink 328 to retain heat sink 328 in place and the components attached to heat sink 328 in proper position in a support for canless downlight 300. A spring cover 332 of spring 330 protects the surface of springs 330 from deleterious items. A spring bracket 334 is operationally connected to each of springs 330. A wire buckle 336 and a screw 338 are also included for their purpose as is known in the art for attaching the respective springs 330 to heat sink 328. Springs 330 maintain downlight-with-nightlight 300 in a support therefor for holding same in place. Screw 338 attaches wire buckle 336 in place.

A transparent cover 340 for holding and being disposed on the exterior surface of a printed circuit board 342 on which are mounted an array of nightlight LEDs 341. Transparent cover 340 is a unitary piece, preferably made from molded plastic includes rearwardly extending, annular inner and outer rings 346, 348, that are concentric with axis 308. Transparent cover 340 transmits illumination from nightlight LEDs 341 therethrough. Inner ring 346 of transparent cover 340 engages the exterior of an inner wall 351 of heat sink 328 to maintain the former in a fixed location. Outer ring 348 of transparent cover 340 engages a forward, generally horizontal ring 352 of heat sink 328. A back board 354 composed of a rearwardly inclined cylindrical wall 356 for engaging a similarly shaped forward wall 358 of heat sink 328, is provided. A sponge 360 sits on a forwardly disposed, flat annular ring 362 of back board 354 that is concentric with axis 308.

Disposed rearwardly of the foregoing components is a female plug 364 attached to a power cord 366. There is also a male plug 368 attached to the circuitry by means of a nut 370.

An electronic holding box 372 holds a driver box 382. A rivet 376 is provided for a switch spring 378. Switch spring 378 is connected to the electrical assembly described herein by means of rivets 380. A driver 386 with its switch 388 is located in driver box 382. Also included is a cap 390 for a junction box. A driver box cover 392 for driver box 382 is provided for closing driver box 382 and electronic holding box 372.

Different parts of downlight-with-nightlight 300 with nightlight 301 will now be discussed. Diffuser 309 is shown in FIGS. 23A-23D, and includes domed portion 310 which is spherically shaped and protrudes forwardly. Diffuser 309 has a rearward, annular, cylindrical portion 394 that is coaxial with axis 308, and has a forward, outwardly extending rim 396 that is the outer portion of domed portion 310, and a rearward, outwardly extending rim 398, all of whose axes is axis 308.

FIGS. 24A-24D illustrate reflector 312. Reflector 312 has concave surface 400 having a forward, inner reflecting surface 402 for reflecting light incident thereon. The central longitudinal axis of reflector 312 is axis 308. Reflector 312 has an outer annular, rearwardly extending rim 404. Concave surface 400 and rim 404 have the common longitudinal central axis 308. Reflector 312 further has an inner rim 406 defining an aperture and having longitudinal central axis 308.

Reference is now made to FIGS. 25A-25E for a detailed description of heat sink 328. Heat sink 328 includes a truncated, rearwardly extending cone portion 408, having an interior, cylindrical stepped portion 410. Stepped portion 410 is composed of cylinders having as their central axis, central axis 308, the cylinders having rearwardly decreasing diameters. A rearward, truncated, inwardly bowed but nearly cylindrical portion 412, is inwardly inclined with an inclination less than the inclination of forward wall 358 of heat sink 328. The rear part of heat sink 328 is a cylindrical cap 414. Cylindrical cap 414 has as its longitudinal central axis, axis 308. A pair of rearwardly extending, parallel spring holding walls 416, 418 are on opposite sides of cylindrical portion 412. Heat sink 328 absorbs heat generated by LEDs mounted on printed circuit board 316.

One of springs 330 is shown in detail in FIGS. 26A-26E. Spring 330 is composed of a coil spring 422 having at its end coils a pair of opposed bent arms 424, 426. Each bent arms 424, 426 has linear, opposing parallel straight arms 428, 430. Arms 428, 430 terminate at their ends with a pair of inwardly slanted opposing arm portions 432, 434 which terminate at their opposing end portions distal coil spring 422 at a pair of parallel, coplanar, opposing straight short arms 436, 438 which are joined at their respective end portions by spring cover 440. Spring cover 440 covers parallel short arms 436, 438.

Figure 27A:
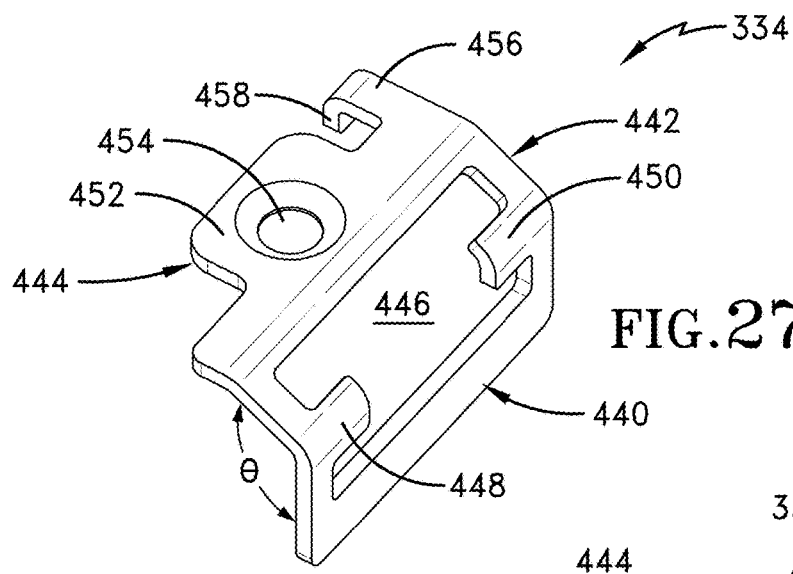
FIGS. 27A-27D are respectively a perspective view, a top view, a different top view and a side view of a spring bracket shown in FIG. 22.
Figure 27D:
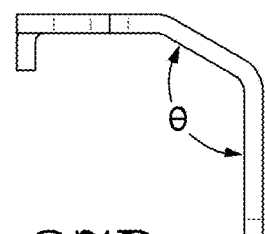
Figure 27B:
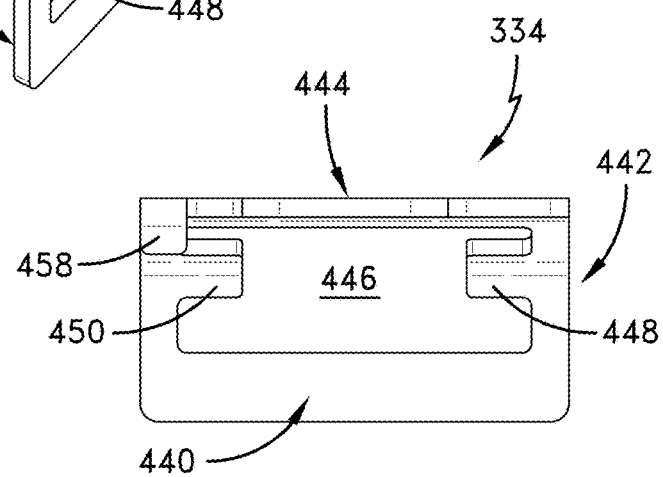
Figure 27C:
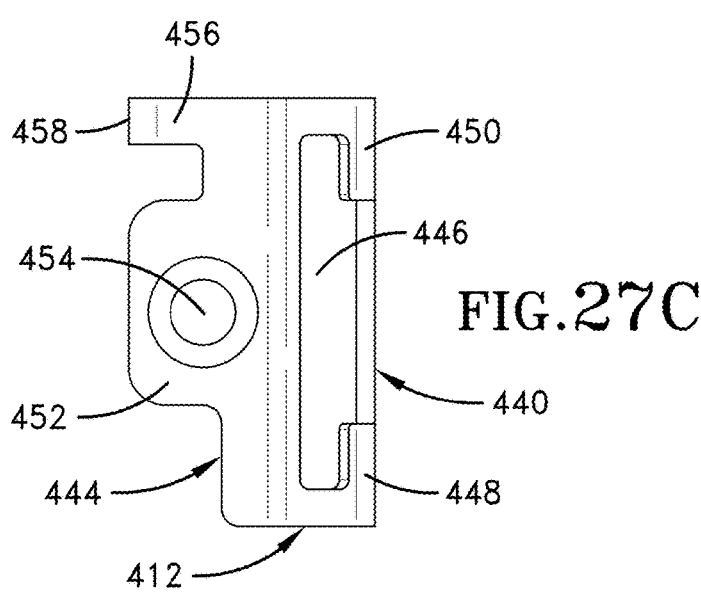
Figure 28A:
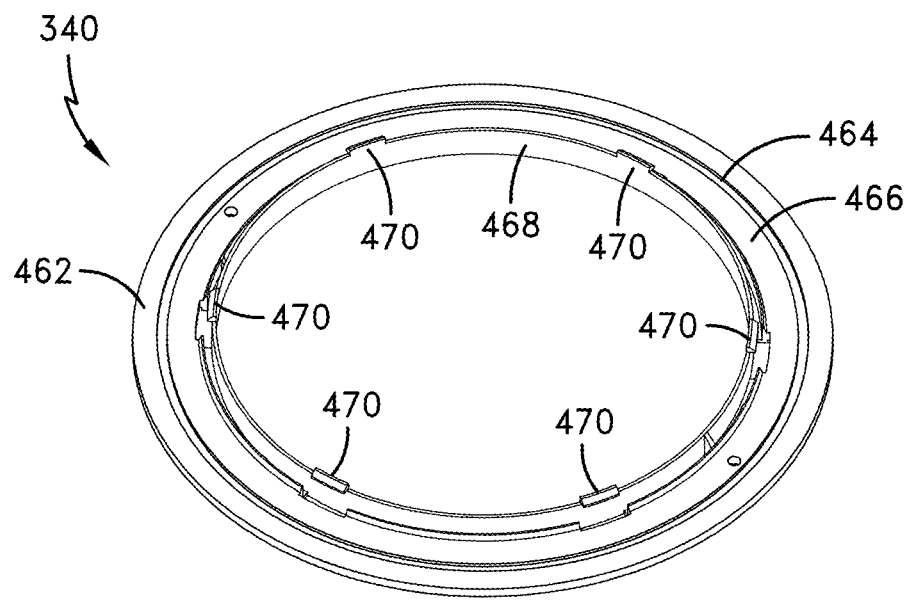
FIGS. 28A-28E are respectively a perspective view, a top view, a side view, a cross-sectional view taken along the arrows 28D-28D in FIG. 28B and an enlarged view of the detail shown in the phantom circle marked 28E in FIG. 28D of the transparent cover shown in FIG. 22.
Figure 28B:
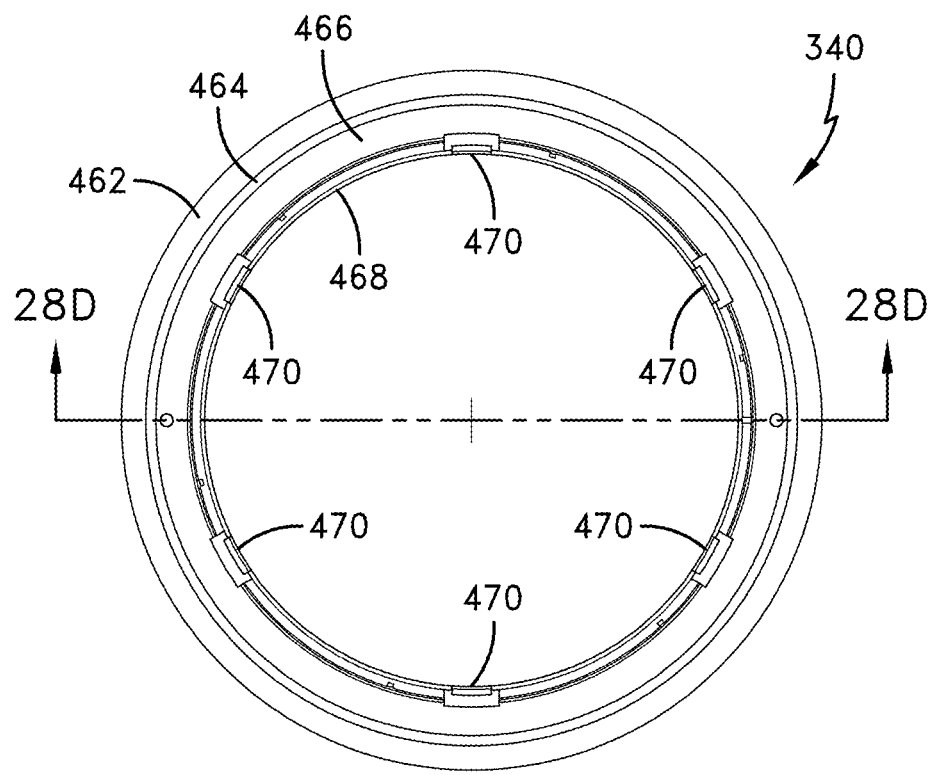
Figure 28C:
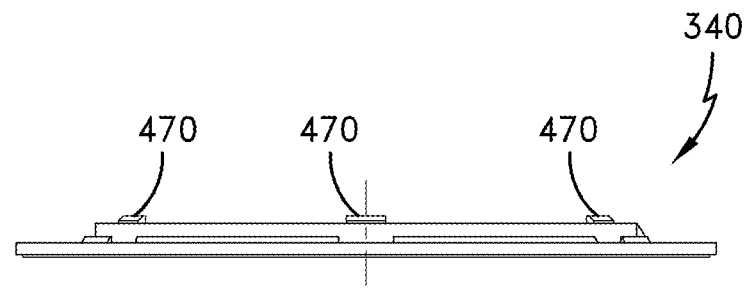
Figure 28D:
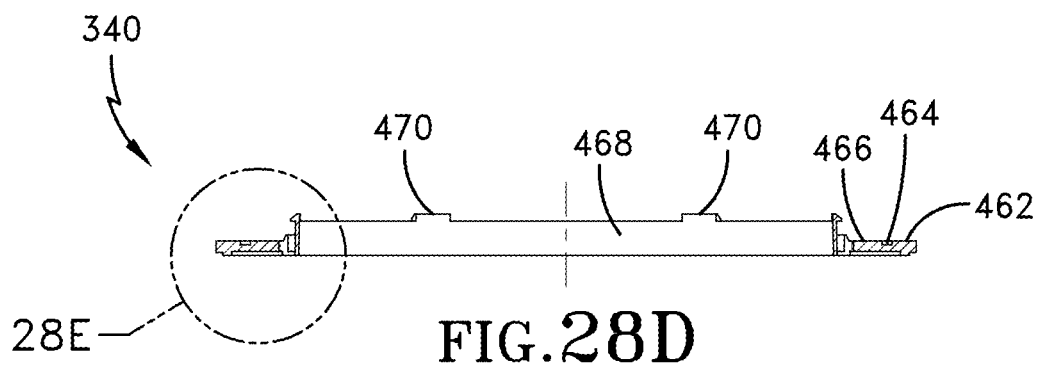
Figure 28E:
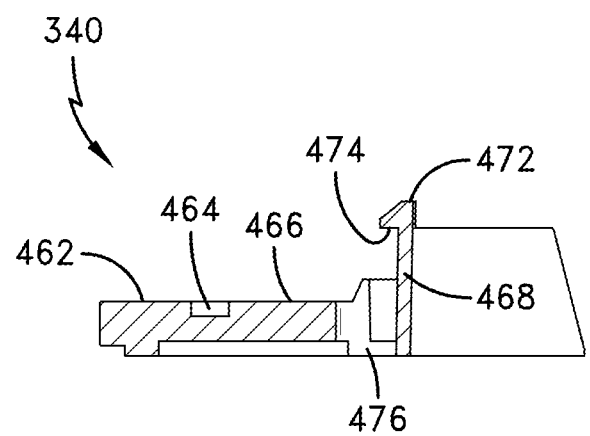
Figure 30A:
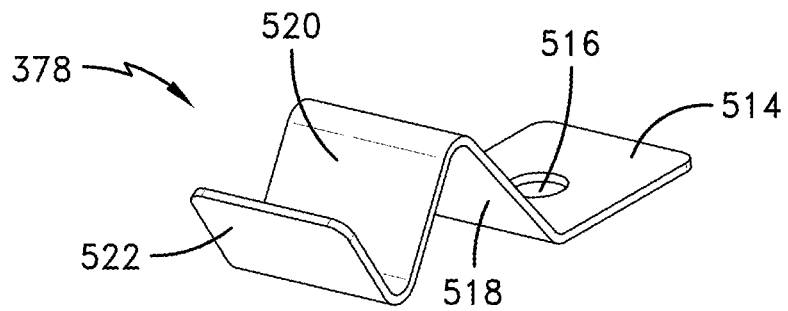
FIGS. 30A-30D are respectively a perspective view, a front view, a side view and an end view of a spring switch incorporated in the embodiment of the invention shown in FIG. 22.
Figure 30B:
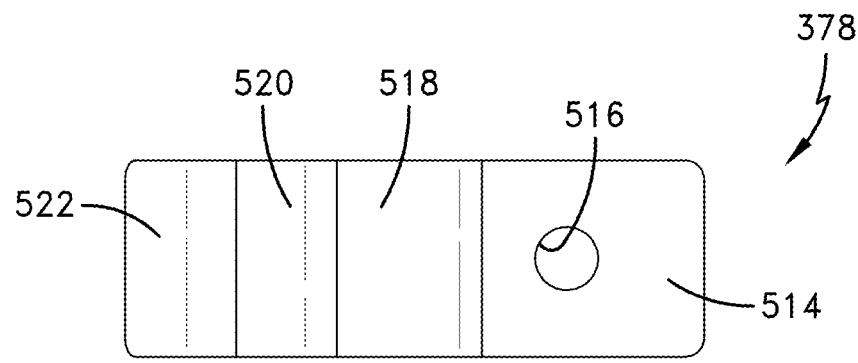
Figures 30C, 30D:
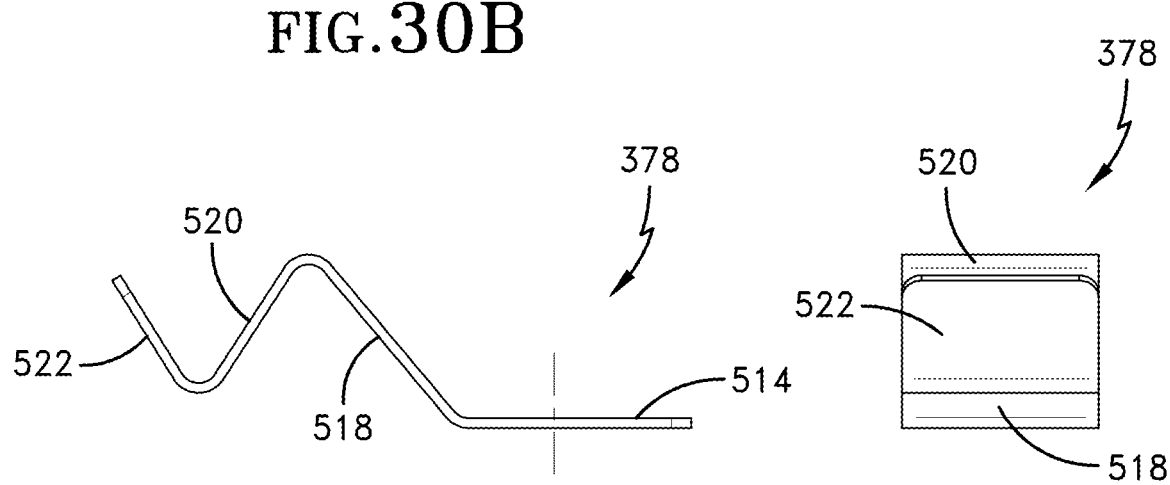

Spring bracket 334 illustrated in FIGS. 27A-27D is preferably made from an appropriate hard metal and is bent into three components, a first end component 440, a middle component 442 and a second end component 444. An internal angle Q between first end component 440 and middle component 442 has been determined for the present embodiment to be 120°, but this is not crucial. First component 440 and middle component 442 define a closed internal opening 446, whose contours are further defined by a pair of opposing sections 448, 450 that protrude into, and help define, opening 446 to have the shape of a bent capital H as shown in FIG. 27A. Second end component 440 with respect to middle component 442 has a basically flat surface including a middle portion 452 with a bevelled fastener hole 454 having a longitudinal axis parallel to first component 440, and a side portion 456 having part of the flat surface, from which a protrusion 458 extends in a direction perpendicular to the flat surface.

Transparent cover 340 for nightlight 301 is shown in detail in FIGS. 28A-28E. Transparent cover 340 is made of a unitary, hardened plastic material and is composed of a set of concentric annular ring portions concentric about axis 308. An outermost annular ring 462 is peripheral about an indented annular trough 464, which separates ring 462 from a similar interior ring 466 having an upper surface that is coplanar with ring 462.

A cylindrical annular flange 468 is concentric with each of outermost annular ring 462, annular trough 464 and interior ring 466. Cylindrical flange 468 is composed of features to be described below, including a set of six raised flanges 470 that are equiangularly spaced around cylindrical flange 468, each including an outwardly facing finger 472. Each finger 472 includes a shoulder 474 that is perpendicular to cylindrical flange 470 as shown most clearly in the enlarged cross-section shown in FIG. 28E.

A connecting component 476 connects outermost annular ring 462 and interior ring 466 to cylindrical flange 470. This is shown clearly in FIG. 28E.

Driver holding box 372 is depicted in FIGS. 29A-29D. Driver holding box 372 is of hard plastic construction and includes a flat base 478, a pair of opposing parallel side walls 480, 482 perpendicular to flat base 478, and an end wall 484. End wall 484 is perpendicular to base 478 and to each of side walls 480, 482. End wall 484 joins each of side walls 480, 482. A pair of parallel key-shaped openings 486, 488 equidistant from respective side walls 480, 482 and equally spaced from end wall 484 are provided. A truncated cone 490 extending from the center of base 478, and equidistant from each of key-shaped openings 486, 488, is provided. Truncated cone 490 is on the opposite side of key-shaped openings 486, 488 from end wall 484, and has a central orifice 492 perpendicular to base 478. An open end 494 of driver box 374 faces end wall 484. A pair of identical slots 496, 498 having a central longitudinal axis perpendicular to each of side walls 480, 482 with straight opposing sides and rounded end portions, are proximal an open end 494 of flat base 478. An orifice 512 is located on the open end of driver box 372. It is equidistant from each of side walls 480, 482. A slot 502 is located at the top of end wall 516. Opposing cylindrical indentions 504, 506 are provided in each of side walls 480, 482, they respectively have rectangular openings 508, 510 therein. A circular hole 512 is in flat base 478, and is located inwardly from slots 496, 498 in flat base 478.

Switch spring 378 is illustrated in FIGS. 30A-30D. Switch spring 378 is a unitary piece of metal bent into a flat first portion 514 having an orifice 516 near but not at the central portion thereof. A first bent section 518 attached thereto, a second bent section 520 bent with respect to section 518 at preferably an angle of 73°, and a third section 522 at an opposite end to section 524, and at an interior angle of preferably 65° from section 520.

Figure 31:
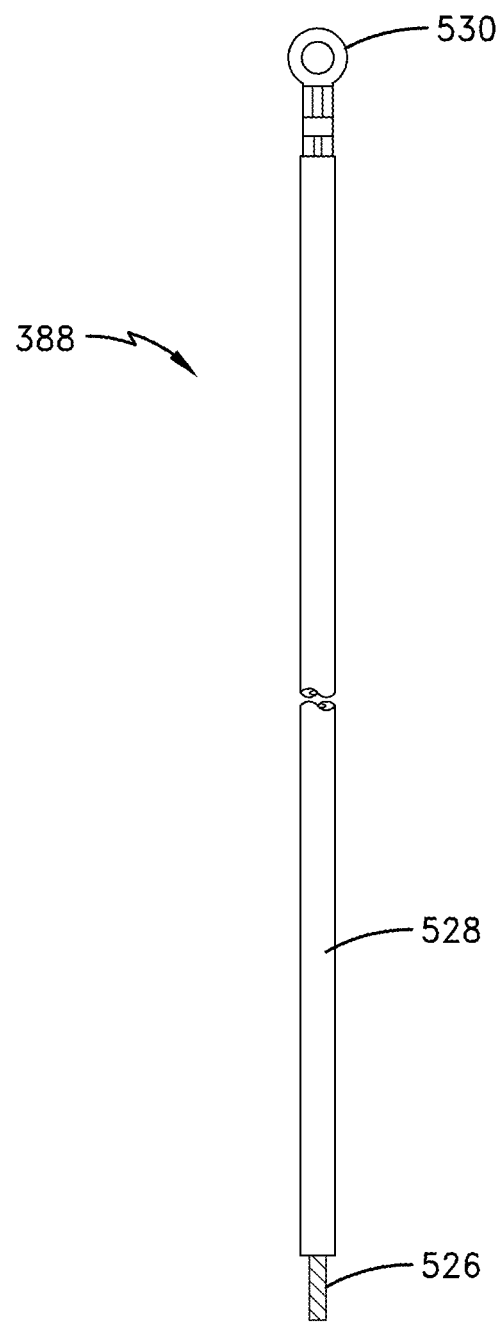
FIG. 31 is a side view of a ground wire incorporated in the presently described embodiment of the invention shown in FIG. 22.

FIG. 31 shows ground wire 388. Ground wire 388 includes an inner conducting wire 526 covered by an insulating layer 528. An end connecting ring 530 attached to conducting wire 526.

Driver box 382 is illustrated in FIGS. 32A-32F. Driver box 382 is a four sided box having a rectangular top wall 532, and an opposing, parallel bottom wall 534, a first side wall 536 perpendicular to and joining top wall 532 and bottom wall 534, and a second side wall 538 opposing side wall 536, parallel thereto, and joining top wall 532 and bottom wall 534. Bottom wall 534 has three apertures, aperture 540 at the center near one end of bottom wall 534, a second aperture 542 at the middle bottom wall 534, and a third aperture 544 aligned with apertures 540, 542, near the end opposite to which aperture 540 is located. Top wall 532 has a rectangular aperture 546 proximate and at the middle of an end section 548 at top wall 532, with opposing long side walls 550, 552. Rectangular aperture 546 has short opposing walls 554, 556.

Figure 32A:
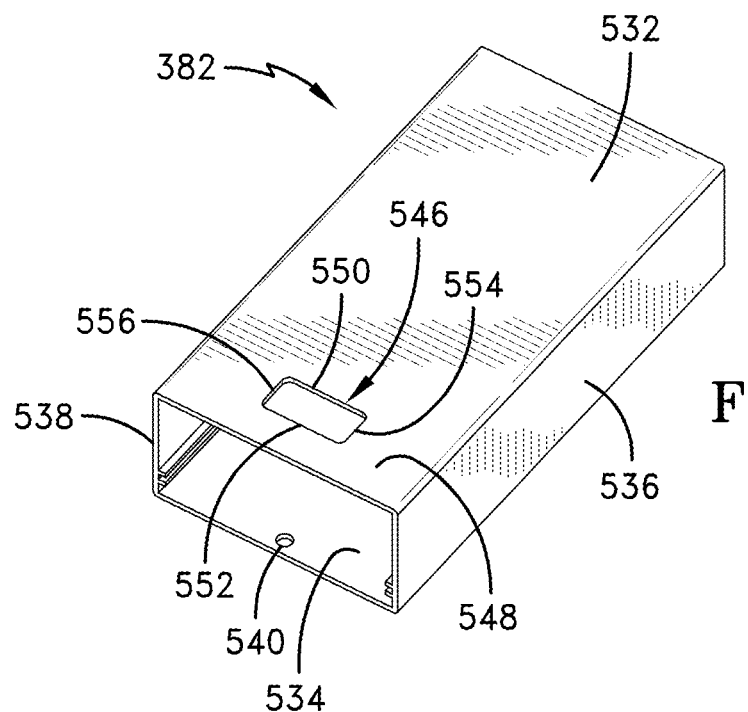
FIGS. 32A-32F are respectively a perspective view, an end view, a top view, a side view, a bottom view, and a detailed view taken from the phantom circle marked 32F shown in FIG. 32B of the electric box incorporated in presently described embodiment of the invention shown in FIG. 22.
Figure 32F:
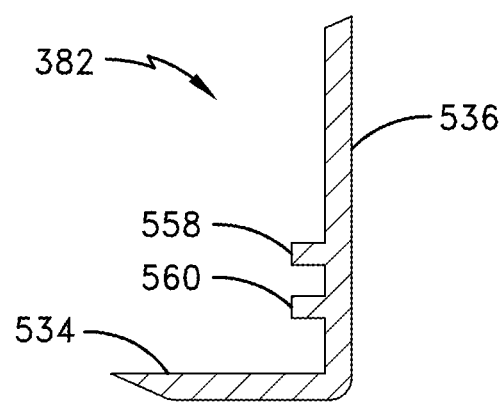
Figure 32E:
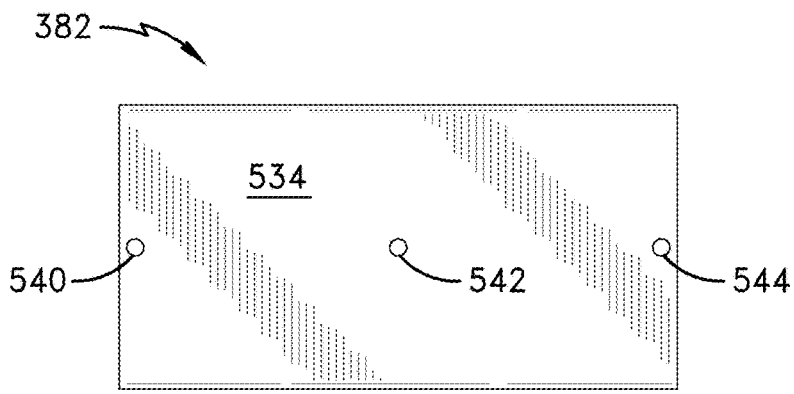
Figure 32D:
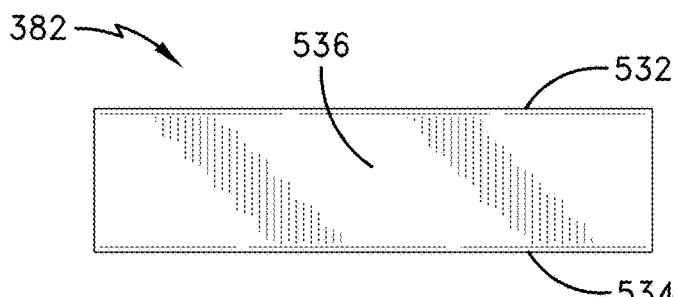
Figure 32B:
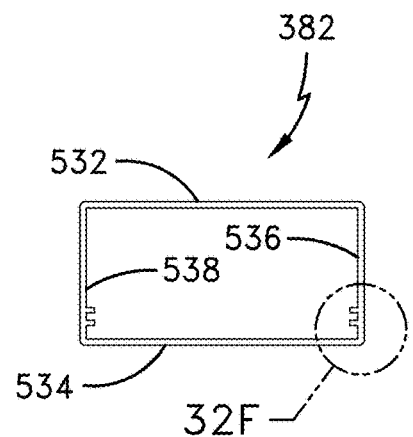
Figure 32C:
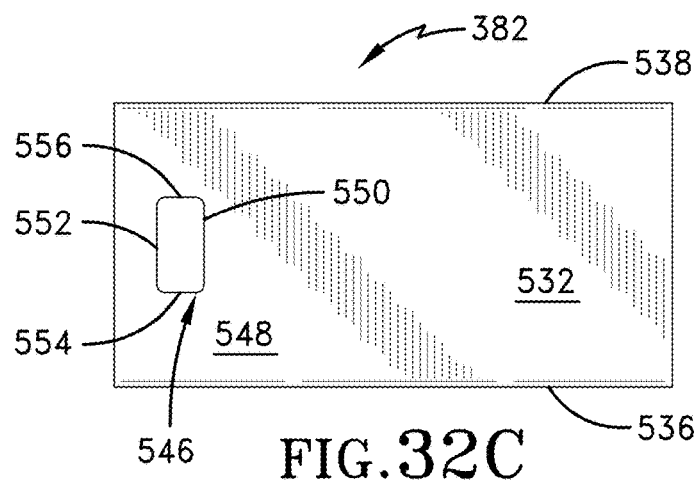
Figure 34A:
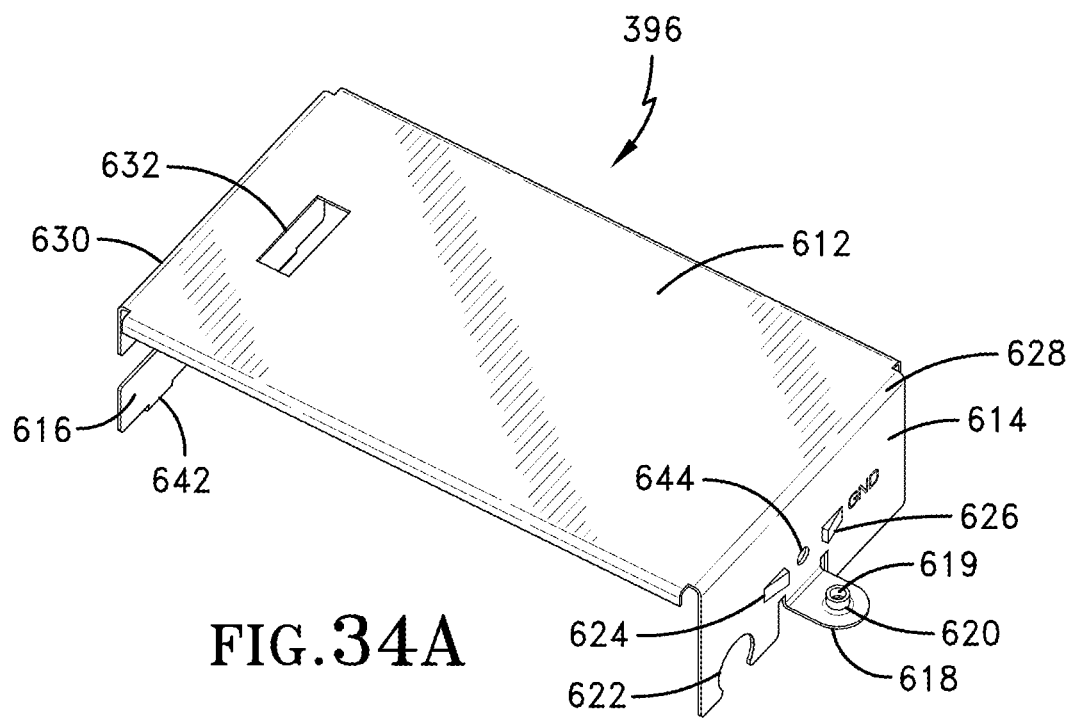
FIGS. 34A-34E are respectively a perspective view, a top view, a side view, an end view and a reverse end view of a cover for the driver holding box shown in FIGS. 29A-29D, of a cover for driver box as depicted in the exploded view in FIG. 22.
Figure 34B:
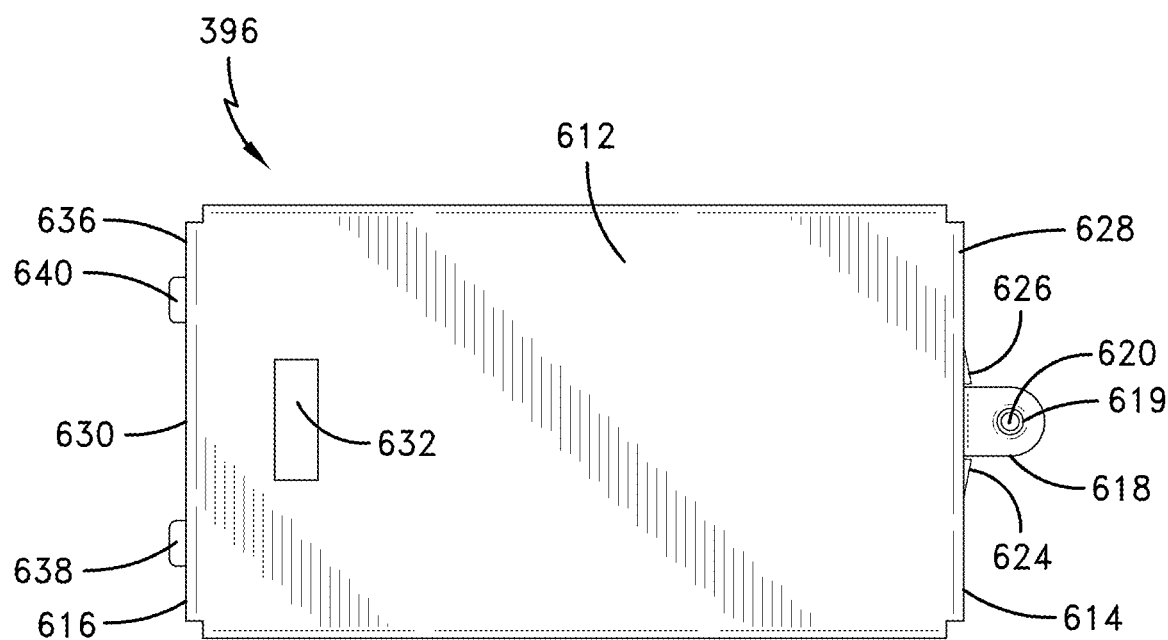
Figure 34C:
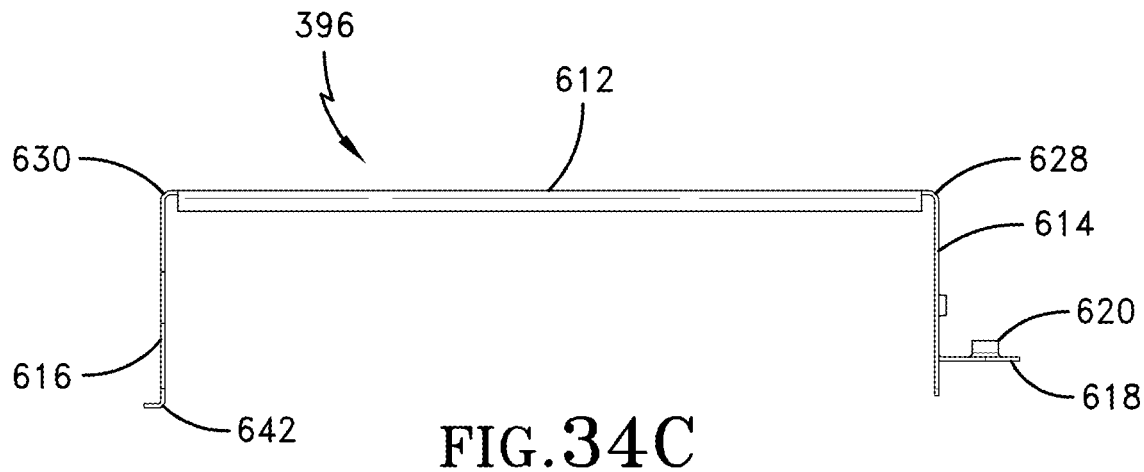
Figure 34D:
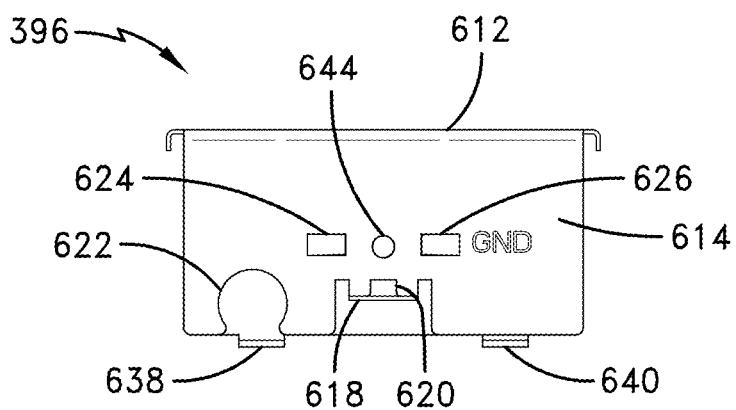
Figure 34E:
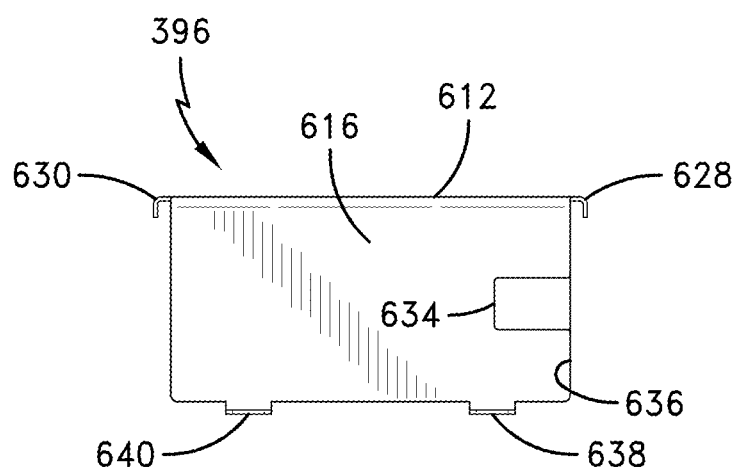
Figure 38A:
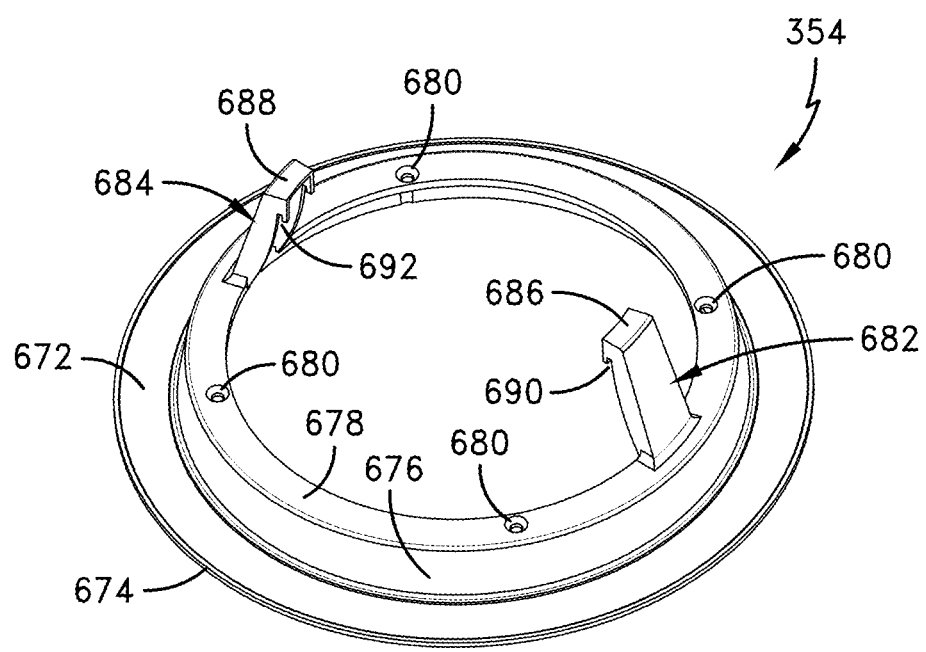
FIGS. 38A-38E are respectively a perspective view, a rear view, one side view, a second side cross-section view taken at 90° from the view shown in FIG. 38C, taken along the arrows 38D-38D in FIG. 38B and a detailed enlarged view of a portion of back board shown in the phantom circle marked 38E in FIG. 38D of the back board shown in FIG. 22.
Figure 38B:
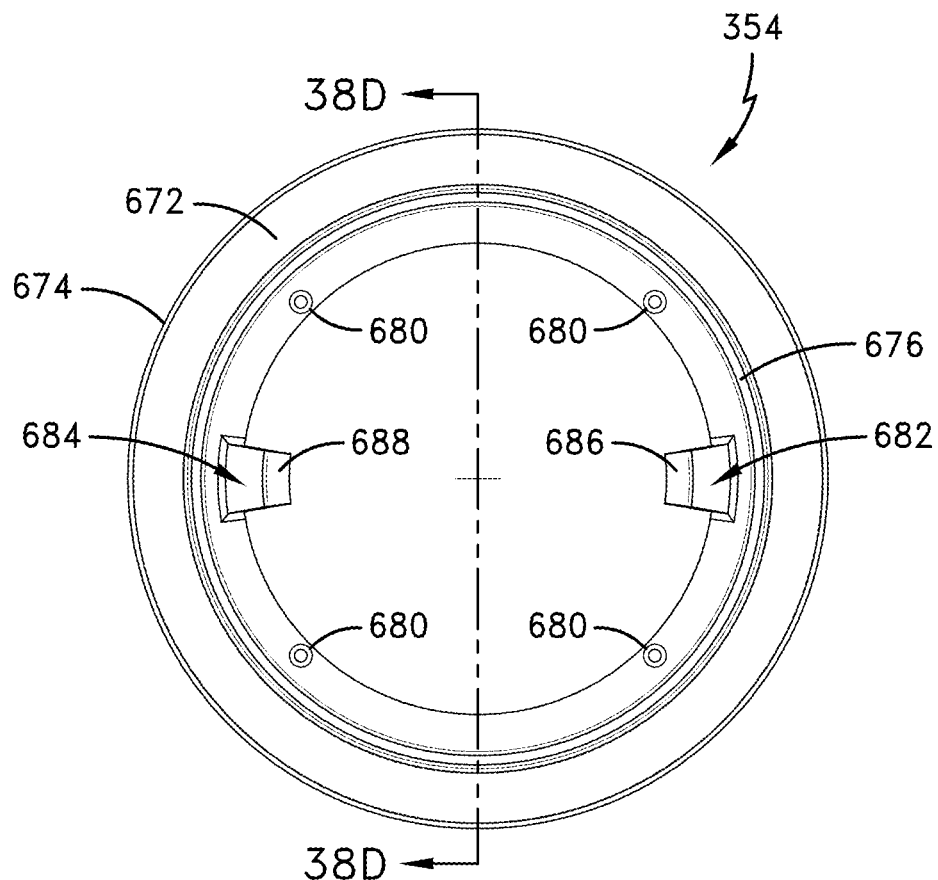
Figure 38C:
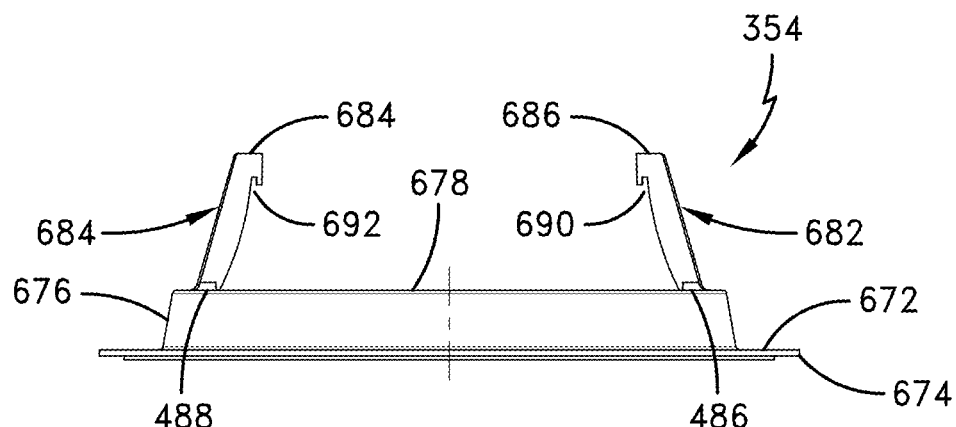
Figure 38D:
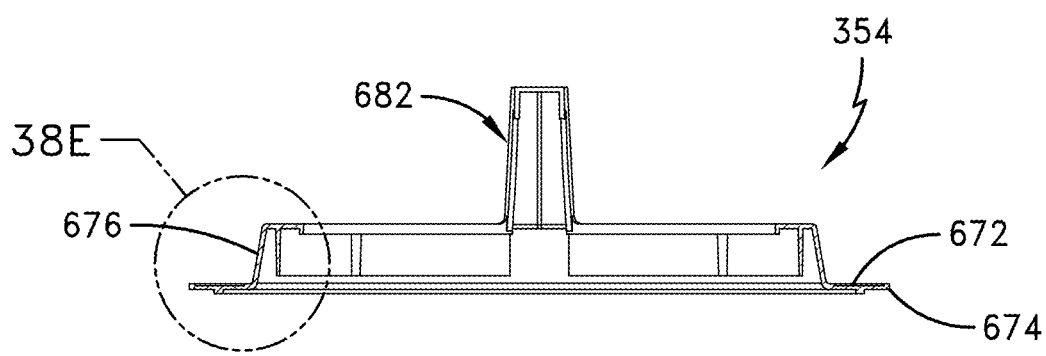
Figure 38E:
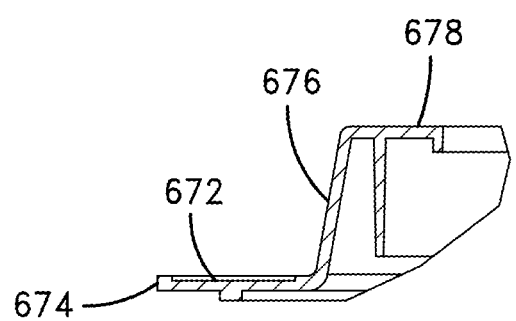

FIG. 32F is an enlarged portion of FIG. 32B as indicated by phantom circle marked 32F in FIG. 32B. FIG. 32B shows parallel, interior flanges 558, 560 parallel to each of top wall 532 and bottom wall 534.

Turning next to FIGS. 33A-33D, cap 390 of a junction box is illustrated. Cap 390 has a main top wall 562 with a generally rectangular configuration, with a long wall 564, an opposing parallel long wall 566 of equal length, a relative, a relatively short opposing pair of walls 568 perpendicular to and joining walls 564, 566. Long wall 564 has a perpendicular, downwardly bent lip 570. Opposing, parallel wall 566 has a centrally disposed L-shaped lip 572 having a portion 574 perpendicular to main top wall 562, and an outwardly extending lower lip 576. Portion 574 is located inwardly from an outer edge 578 of main wall 562.

A centrally disposed, rectangular orifice 580 is adjacent to wall 572. Wall 572 has corners 582, 584 at its opposite ends.

Cover 396 of driver box 382 is depicted in FIGS. 34A-34E. Cover 396 includes a rectangular cover top 612, a first end wall 614 and a second end wall 616. End walls 614, 616 have an opposing relationship and are at opposite ends of top 612. First end wall 614 includes an outwardly extending, horizontal tab 618 with an aperture 619 at the end of a vertical tube 620. An aperture 622 having a periphery of part of a circle, rises from the base of first end wall 614. First end wall 614 further includes oppositely inclined facing tabs 624, 626. Top 612 has opposite parallel end edges 628, 630, and a rectangular aperture 632 is proximate edge 630. End wall 616 has a rectangular aperture 634 at an edge 636, thereof. Outwardly extending tabs 638, 640 are located at a base edge 642. An aperture 644 is located between tabs 624, 626 of first end wall 614.

Male plug assembly 370 is shown in FIGS. 35A and 35B. Male plug assembly 370 is composed of an electrical cord 650, a male socket 652 whose front view is subject of FIG. 35B and an opposite socket 654. Nut 372 is shown in FIGS. 36A and 36B. Nut 372 is a hexagonal fastener.

Female plug assembly 366 attached to an appropriate power cord 367 is shown in FIG. 37A. Female plug assembly 366 includes a female plug 656, and an opposite male plug 658. End views of the respective opposite ends of female plug assembly 366 are shown respectively in FIGS. 37B and 37C respectively.

Back board 354 is shown in detail in FIGS. 38A-38D. Back board 354 is a unitary molded plastic part composed of various portions. There is a forward annular base portion 672, composed of a peripheral rim 674. A rearwardly inclined truncated portion 676 is an inner annular portion 678 having four equiangularly spaced fastener holes 680 extending in a direction parallel to central longitudinal axis 308 for attachment to the rearward side of horizontal ring 352 of heat sink 328. Extending rearwardly from annular ring 678 are a pair of gripping flanges 682, 684, which are inclined towards longitudinal central axis 308. Flanges 682, 684 have inwardly extending generally flanges 686, 688 with claw portions 690, 692 for abutting cone portion 410 of heat sink 328. The engagement occurs on opposite sides of heat sink 328 to maintain back board 670 in a proper and stable position.

Figure 39:
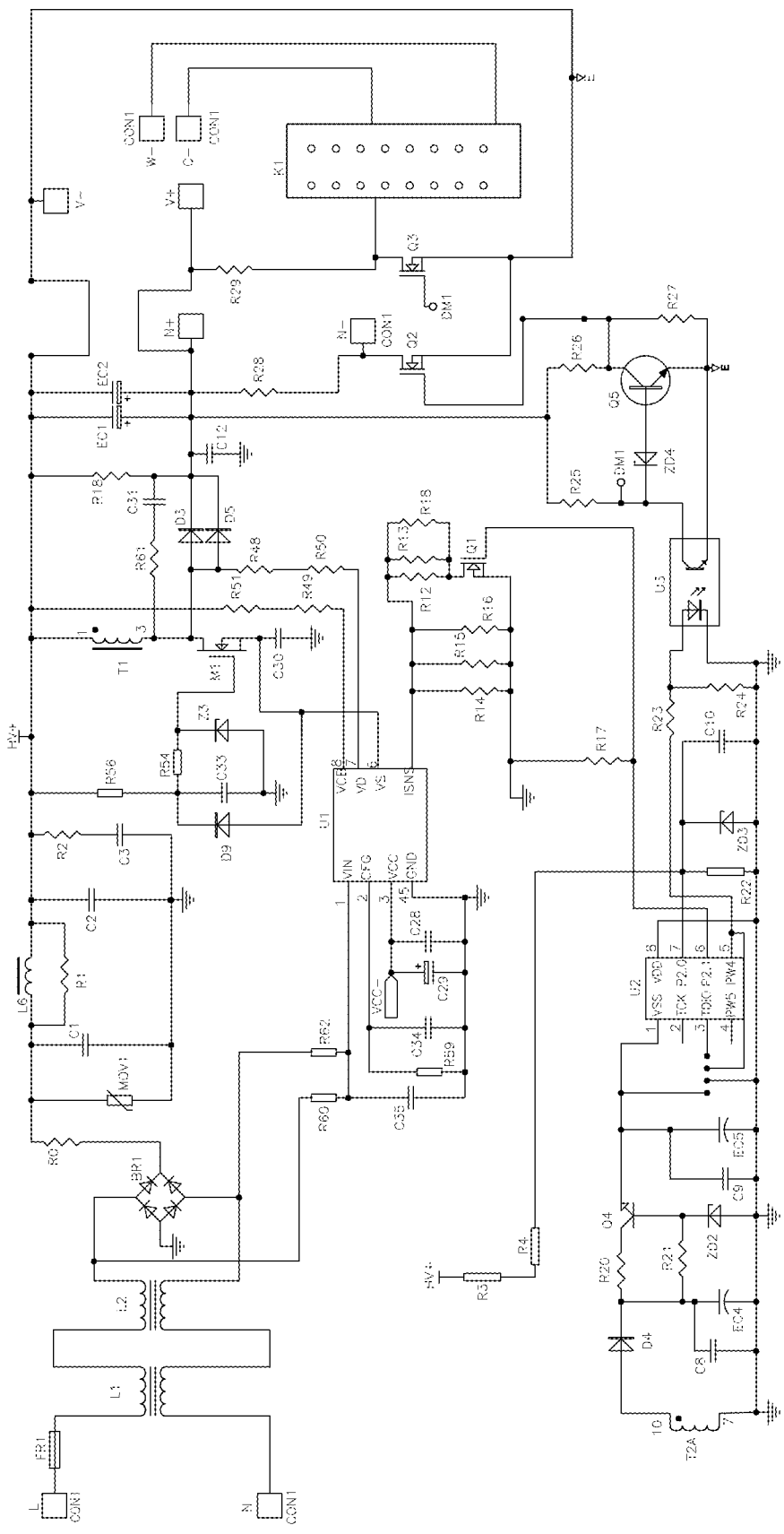
FIGS. 39 and 40 are an electric circuit diagram and an LED circuit diagram of the embodiment of the invention shown in FIG. 22.
Figure 40:
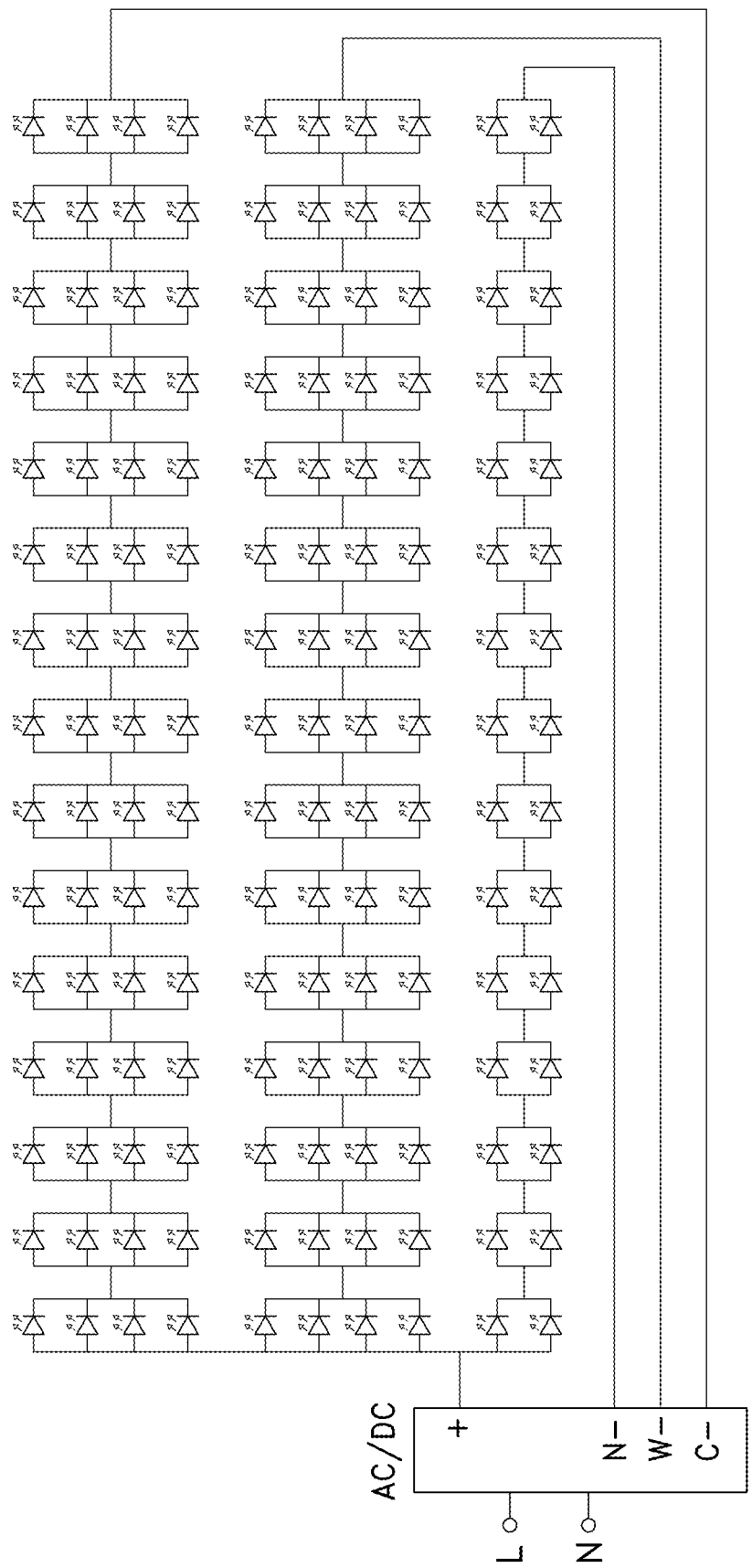

FIG. 39 is an electric circuit diagram for downlight with nightlight 300. The circuitry for LEDs 318-320 and array of LEDs 341 is shown in FIG. 40.

Figure 41:
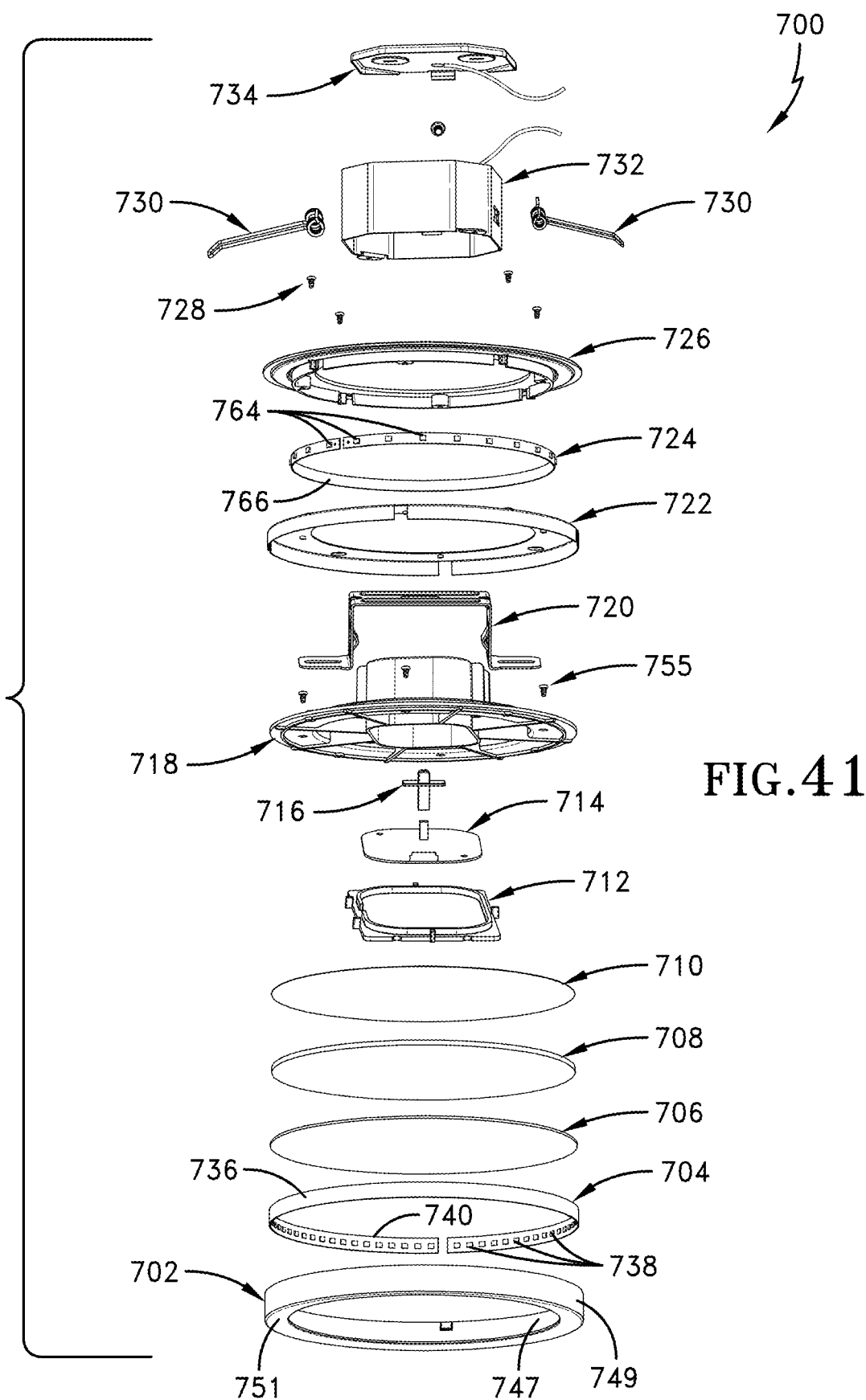
FIG. 41 is an exploded view of an embodiment of the invention of a ceiling light with a nightlight according to another embodiment of the invention.

FIG. 41 is an exploded view of a ceiling-light-with-nightlight 700. Ceiling-light-with-nightlight 700 is shown as a 7.5 inch ceiling light with nightlight, but the size does not affect the scope of the invention. Ceiling-light-with-nightlight 700 incorporates an outer ring 702, a main light assembly 704, a diffuser 706, a light guide sheet 708, a reflector plate 710, a driver cover 712, a driver 714, a switch cap 716, a base 718, a mounting bracket 720, a heating panel 722, a nightlight assembly 724, a top cover 726, screws 728, a pair of spring assemblies 730, a junction box 732, and a junction box cover 734.

Figure 42C:
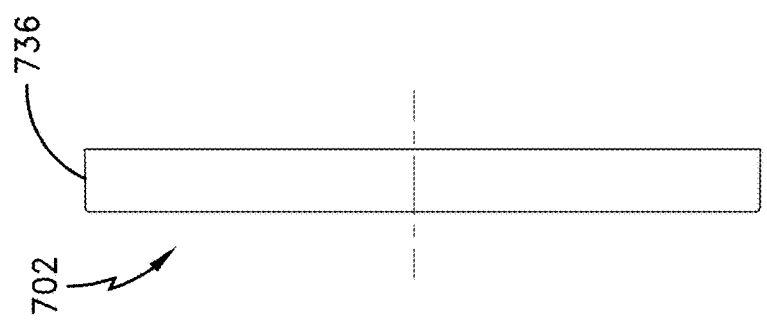
FIGS. 42A-42C are a plan view, a cross-sectional view taken in the direction of arrows 42b-42B in FIG. 42A, and a side view of the outer ring incorporated in the ceiling light with nightlight shown in FIG. 41.
Figure 42A:
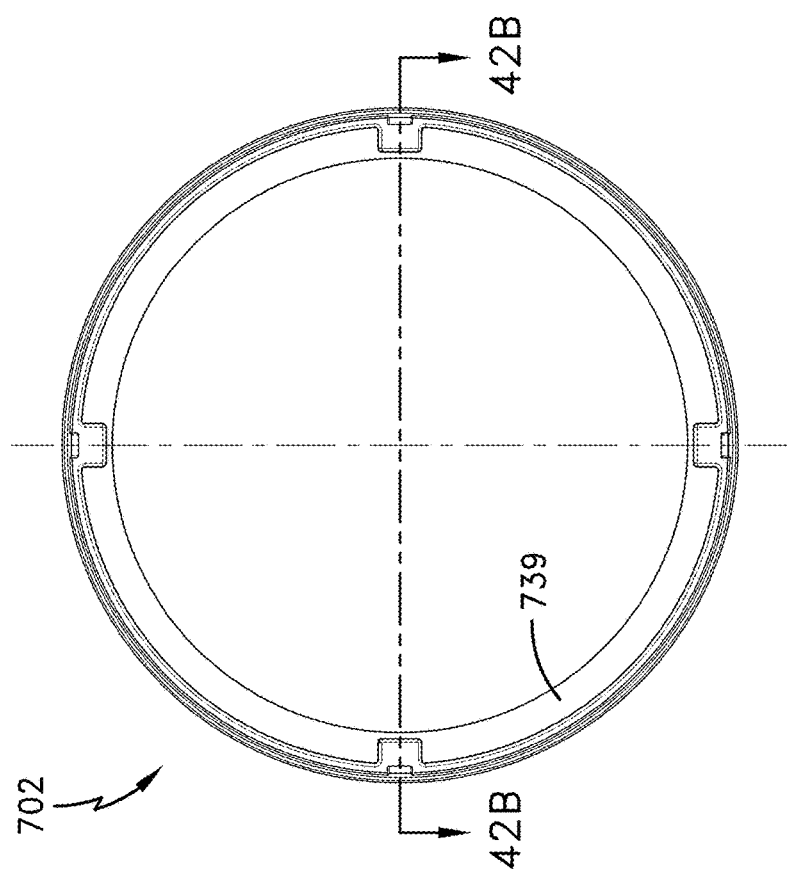
Figure 42B:
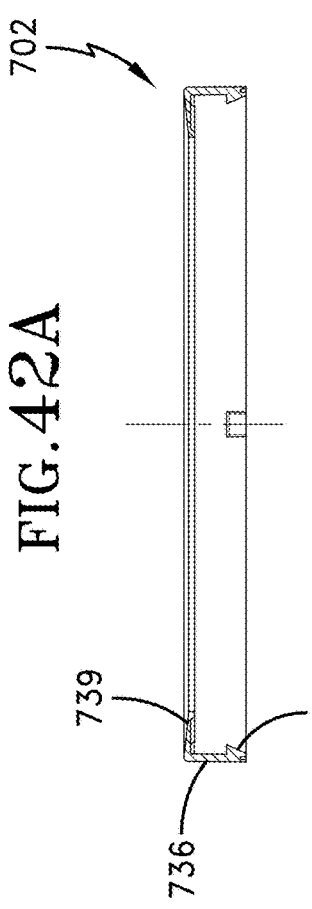

The components of ceiling light with nightlight 700 are described as follows. Referring to FIGS. 42A-42C, outer ring 702 is the forwardmost part of ceiling-light-with-nightlight 700. Outer ring 702 has a cylindrical ring 736 with a shoulder 737 and rear inwardly extending ring 739 for supporting main light assembly 704 with its array of main light LEDs 738 attached to its inner surface 740 thereof. The purpose of outer ring 702 is to absorb the heat generated by main light LEDs 738.

Figure 43A:
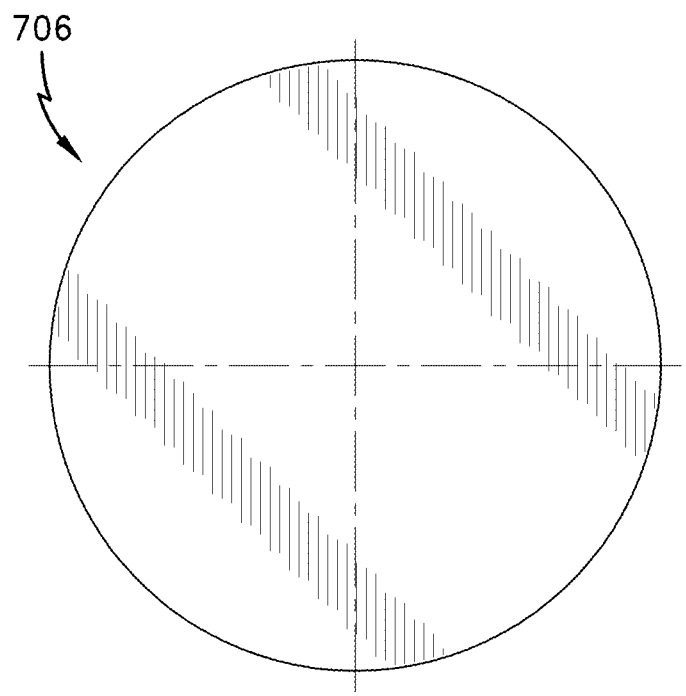
FIGS. 43A-43B are a plan view and a side view of the diffuser shown in FIG. 41.
Figure 43B:
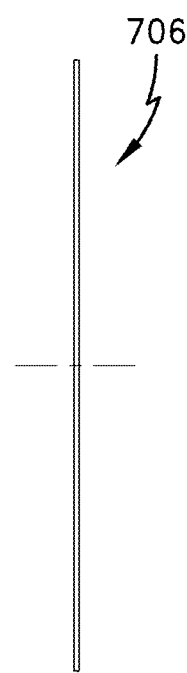
Figure 44A:
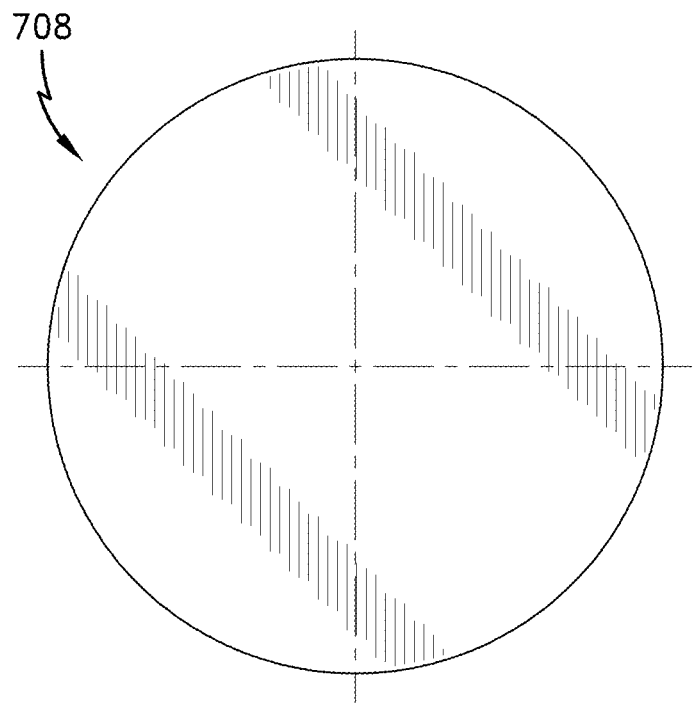
FIGS. 44A-44B are a plan view and a side view of a light guide sheet incorporated in the ceiling light with nightlight shown in FIG. 41.
Figure 44B:
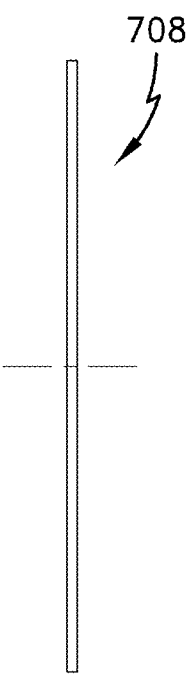

Diffuser 706 is preferably made of a molded translucent hardened plastic shown in FIGS. 43A-43B. Diffuser 706 is circular in plan view, and is a thin cylinder. Light guide sheet 708 is also a thin sheet provided for propagating LED lights by total internal reflection and distributing light emissions uniformly across the emitting surface light guide sheet 708, and is shown in FIGS. 44A and 44B. The function of a light guide sheet (also called a light guide plate), is to propagate lights from main light LEDs by total internal reflection and distribution of light emissions uniformly across the emitting surface.

Figure 45:
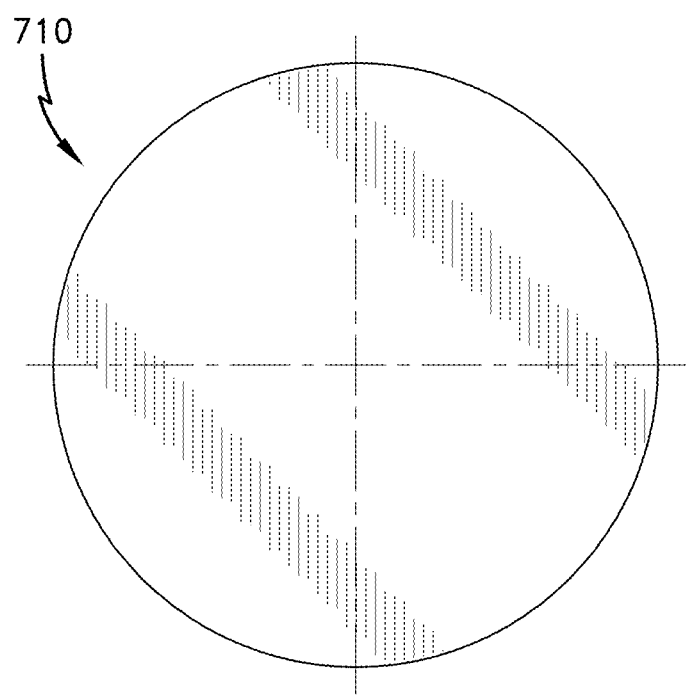
FIG. 45 is a plan view of a reflector plate shown in the exploded view in FIG. 41.
Figure 47A:
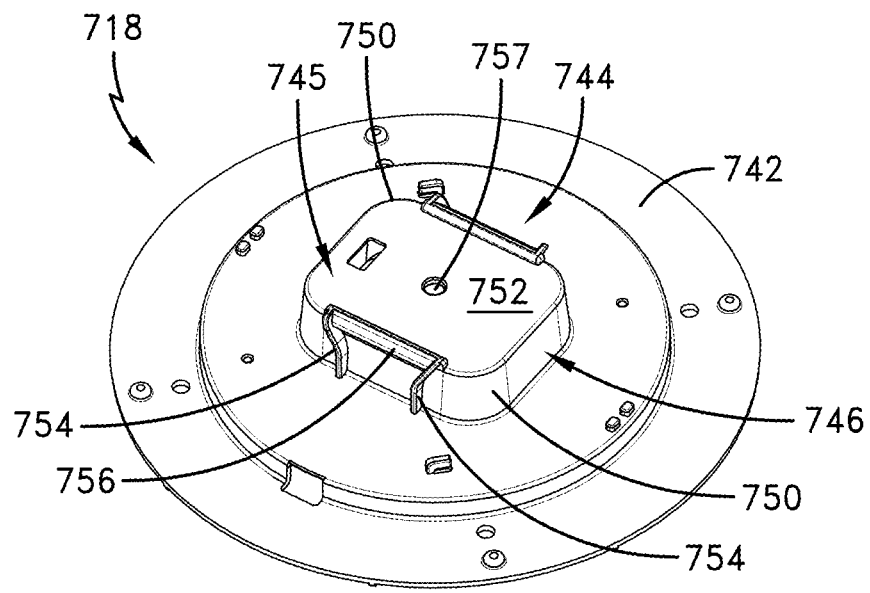
Figure 47B:
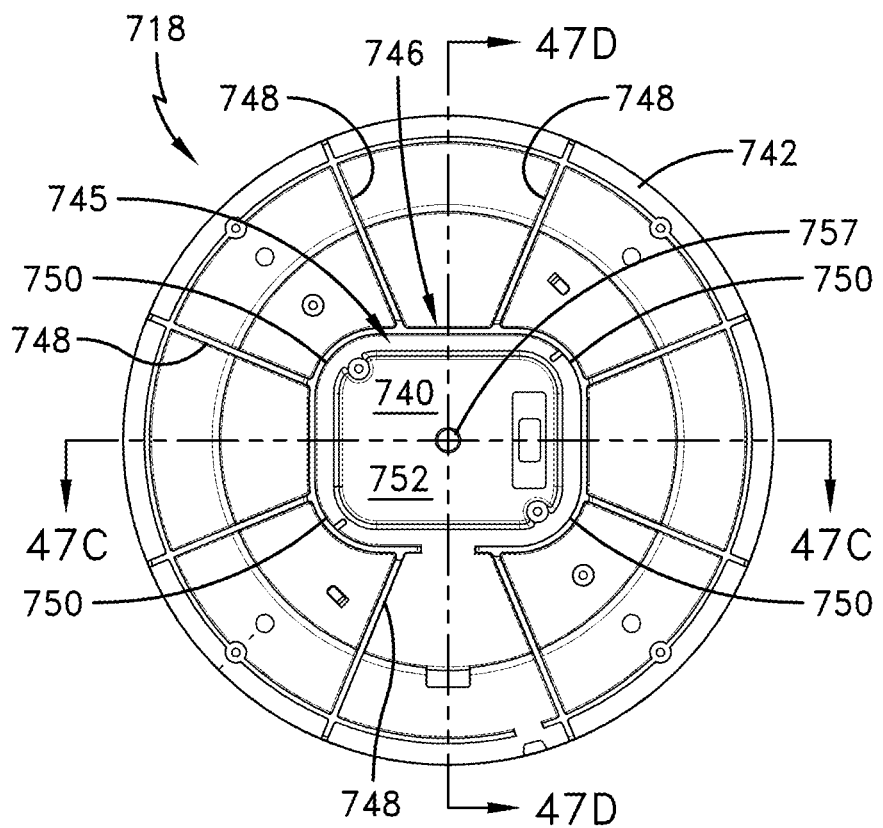
Figure 48C:
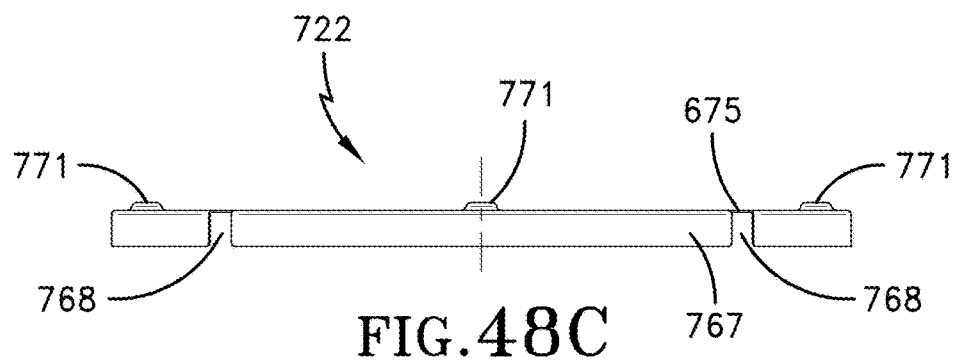
FIGS. 48A-48C are respectively a plan view, a cross-sectional view taken in the direction of arrows 48B-48B in FIG. 48A; and a side view of a heating panel shown in the product that is illustrated in FIG. 41.
Figures 48A, 48B:
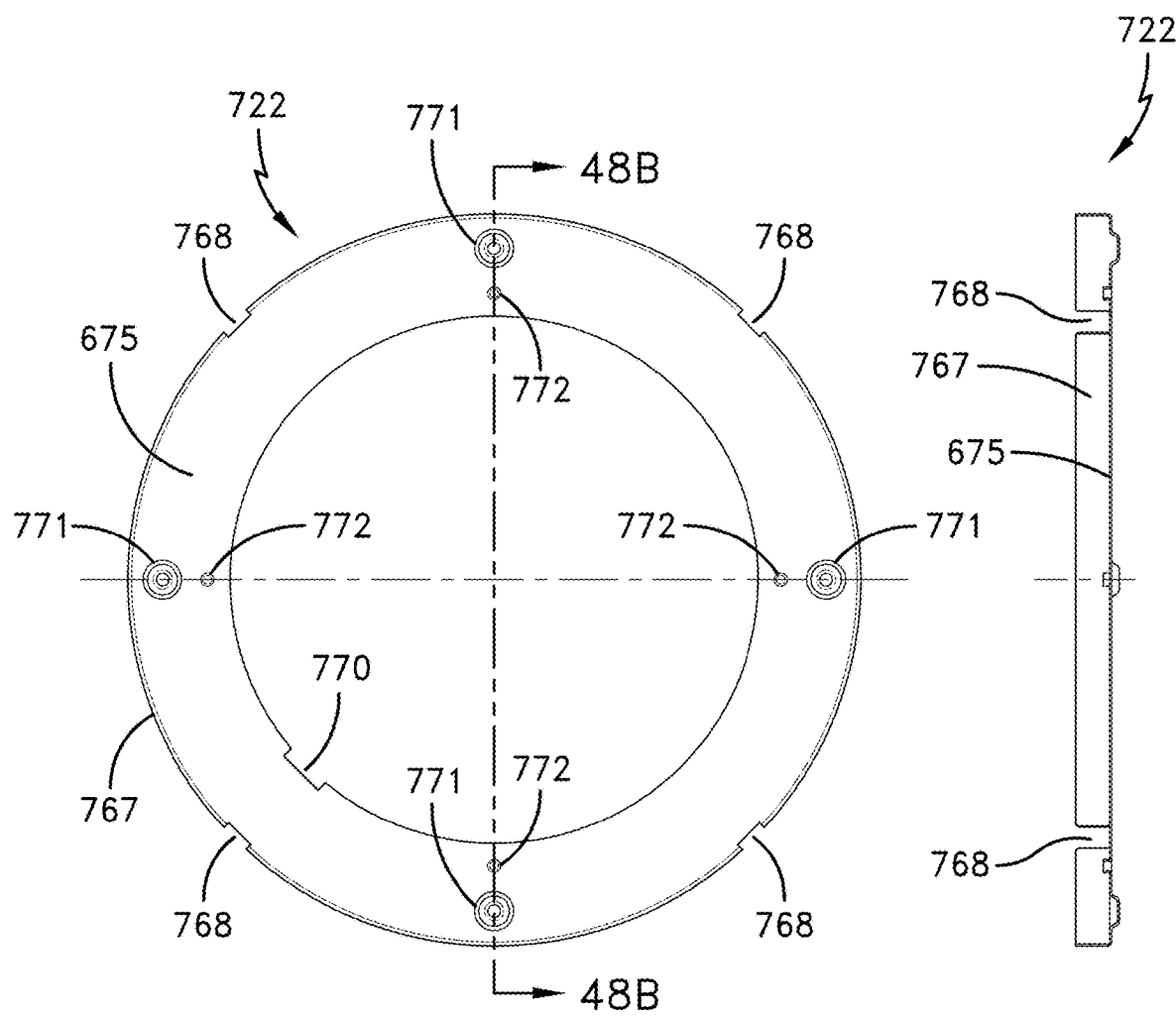

Reflector plate 710 is illustrated in FIG. 45. Reflector plate 710 reflects the main light generated by main light LEDs 738 of main light assembly 704 into a main space illumination, and functions both to diffuse light and suppress glare.

Driver cover 712 is configured to cover a forward central opening 740 in base 718 described below. It is illustrated in FIGS. 46A-46C. Driver cover 712 supports driver 714 in base 718. Driver cover 712 is preferably constructed from a hard plastic. The rearward surface includes a raised border rim 768 defining a locating position for driver 714, which rests on a flat surface 769 within a rim 768. An outer forwardly extending base rim 760 is also provided. Locating recesses 761 for cooperating with receptacles on the forward side of base 718 are also provided. Likewise, locating posts 762 which cooperate with aligned recesses in base 718 are included as well.

Turning to FIGS. 47A-47E, base 718 of ceiling light 700 with nightlight is shown. Base 718 is preferably a molded, hard plastic component composed of an annular flat outer ring 742, and a centrally disposed, rearwardly extending, cylindrical portion 744. Portion 744 includes a rearwardly extending, hollow housing 745 bordered by four walls 746 connected respectively by rounded corners 750. A set of eight, radially extending support walls 748 extend from the forward part of housing 745. Support walls 748 extend through cylindrical wall 761 proximal ring 761 on the forward surface of base 718. Housing 745 has a rearward top wall 752.

A pair of identical, inwardly curved walls 754 extend from opposite ends of a flat wall 756 attached to a pair of opposing walls 746 of housing 745. A hole 757 is located at the center of rearward top wall 752. Housing 745 contains switch cap 716 (FIG. 41), which in turn includes an axially extending tube which extends through hole 757 in housing 745.

Outer ring 702 cooperates with base 718 to keep each of main light assembly 704, diffuser 705, light guide sheet 708, reflector plate 710, driver cover 712, driver 714 and switch cap 760 in their respective proper positions. Outer ring 702 has inner and outer coaxial peripheral cylinder 747, 749, joined by an annular ring 751. The foregoing components are sandwiched between outer ring 702 and base 718.

Mounting bracket 720 is attached to base 718 by means of a set of screws 755 as indicated in FIG. 41. Mounting bracket 720 is furthermore attached to junction box 732 as discussed below.

Driver cover 712 supports and holds driver 714 with switch cap 716 in housing 745 of base 718 to supply electric power to main light LEDs 738 of main light assembly 704 and to an array of nightlight LEDs 764 attached to the exterior surface of a rearwardly disposed support cylindrical ring 766 of nightlight assembly 724.

Nightlight assembly 724 is supported within top cover 726 and a heating panel 722. Top cover 726 covers a nightlight assembly 724, heating panel 722 and sits on base 718. Referring to FIGS. 41 and 48A-48C, heating panel 722 basically comprises a flat ring 765 with a perpendicular, forwardly extending cylindrical ring 767. Cylindrical ring 767 includes a pair of notches 768 and an opposing notch 770. There are four screw holes with surrounding walls 771 located 90° from each other in flat ring 765. Four screw holes 772 are radially aligned with screw holes with surrounding walls 771 and of equal radial distances as each other.

Figure 49A:
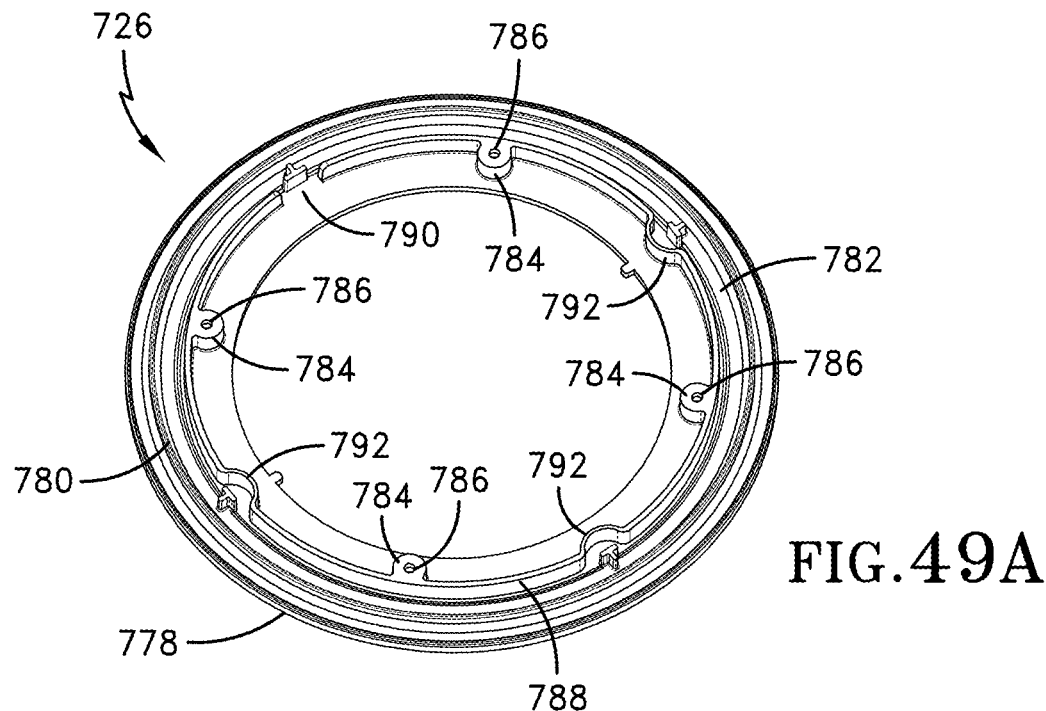
FIGS. 49A-49C are, respectively, a perspective view, a plan view and a cross-sectional view taken in the direction of arrows 49B-49B in FIG. 49C, of the top cover shown in the embodiment of the invention in the exploded view in FIG. 41.
Figure 49C:
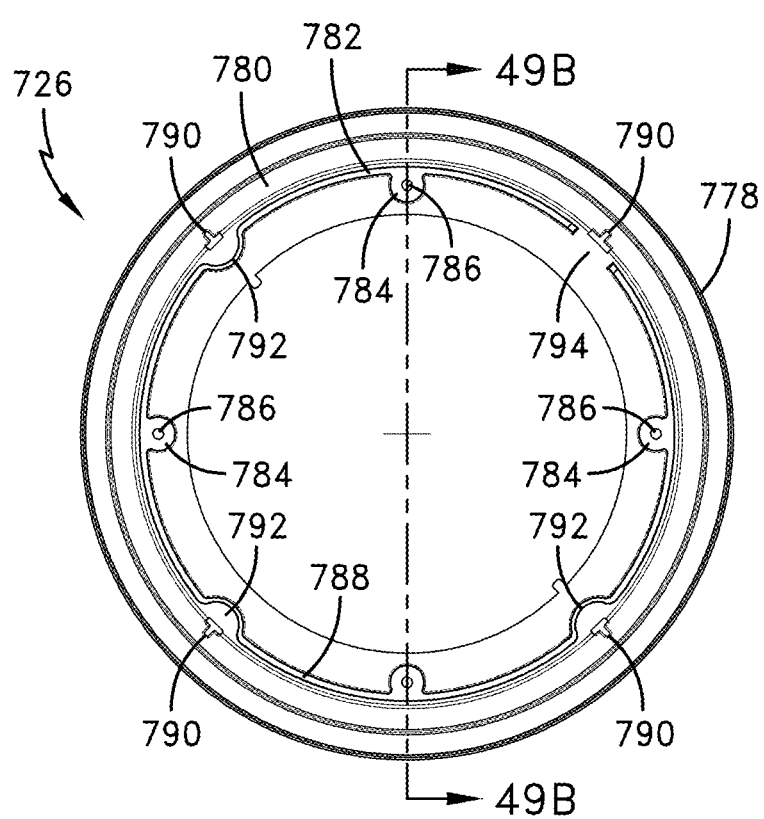
Figure 49B:
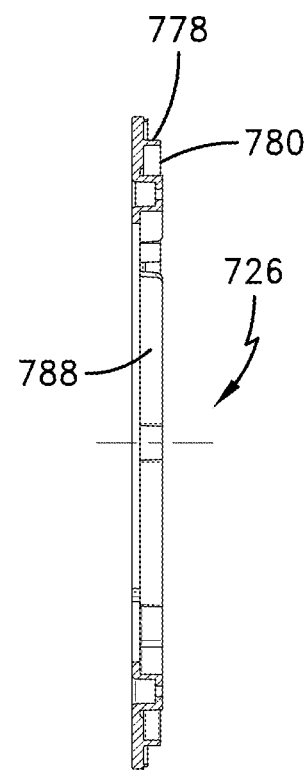

Top cover 726 is illustrated with its details in FIGS. 49A-49C. Top cover 726 is a unitary, hard plastic piece mainly composed of a series of concentric components including an outer cylindrical rim 778, an inner forwardly facing channel 780, an inner annular wall 782 having both four tabs 784 with screw holes 786 extending therethrough, and three inwardly curved walls 788, located between three of the respective tabs 786. Four T-shaped protrusions 790 are spaced between tabs 784. Wall 788 has three bowed wall portions 792 inside of and partially enclosing T-shaped protrusions 790. An open space 794 is provided inside of one T-shaped protrusion 790.

The foregoing components are attached to forwardly positioned base 718 and a rearwardly positioned rear junction box cover 734. Nightlight assembly 724 is nested between heating panel 722 and junction box cover 734.

Junction box 732 is illustrated in detail in FIGS. 50A-50E. Junction box 732 is an eight sided component having opposing sides 794, 796, 798, 800, 802, 804, 806, 808. Opposing sides 794, 796 include forwardly located tabs 810, 812, having respective fastener holes 815, 816. Opposing sides 798, 800 each have inwardly extending cylindrical protrusions 818, 820, each with centrally located, horizontally extending linear orifices 822, 824. Side 800 includes a latch slot 826.

Figures 51A, 51B:
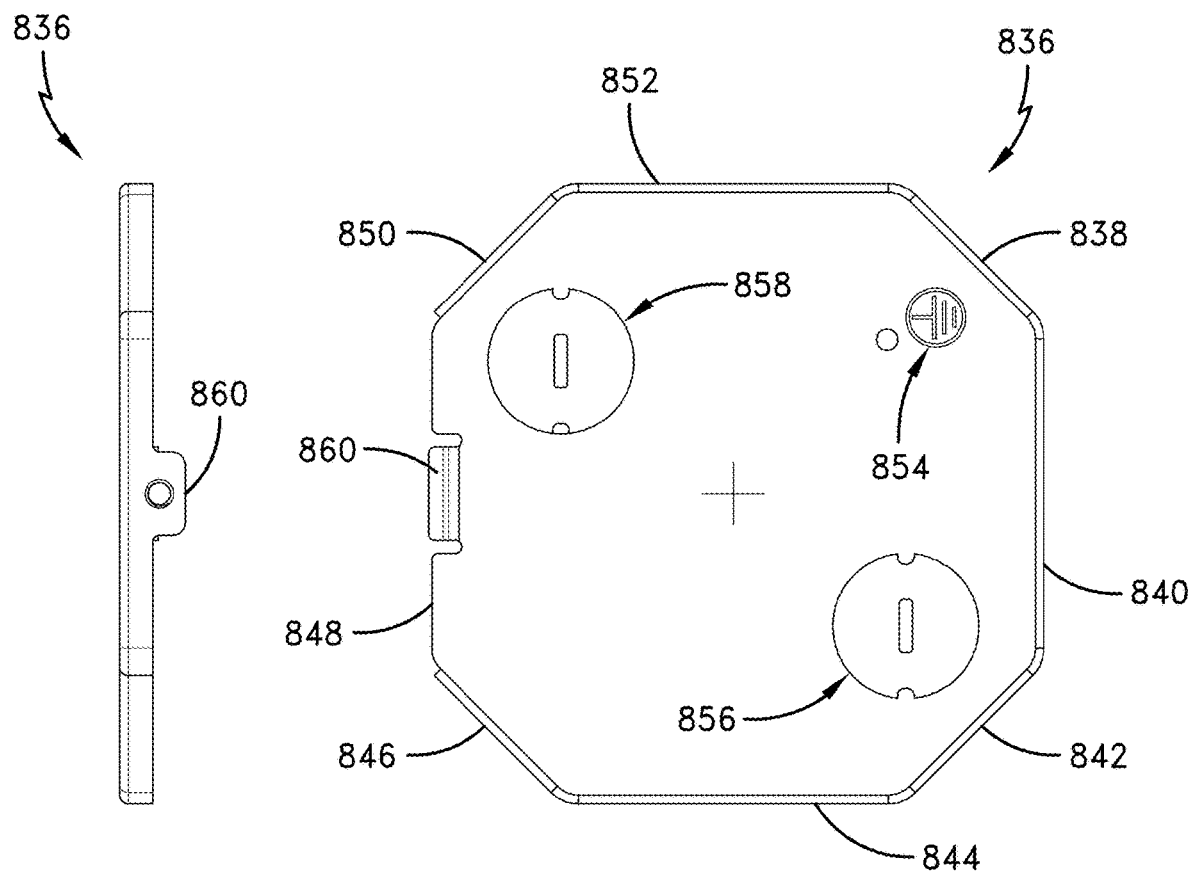
FIGS. 51A-51C are, respectively, a plan view, a side view, and another side view of the junction box cover shown in the embodiment of the invention shown in the exploded view in FIG. 41.
Figure 51C:
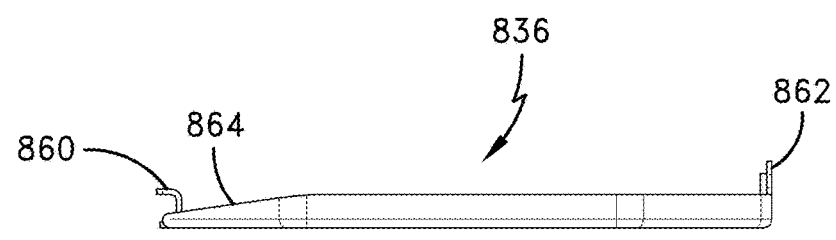
Figure 52A:
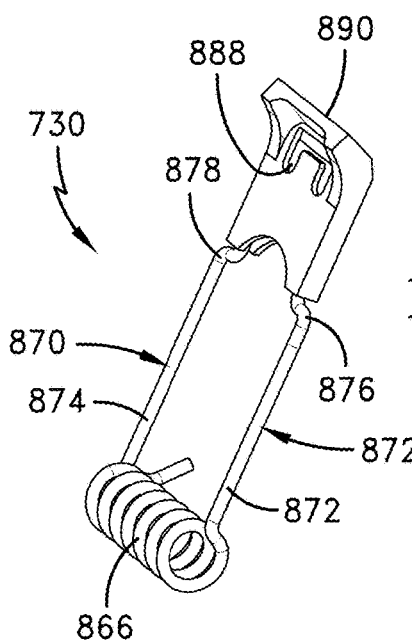
FIGS. 52A-52D are, respectively, a perspective view, a plan view, a side view and a disassembled top view of a spring assembly incorporated in the embodiment shown in the exploded view in FIG. 41.
Figure 52B:
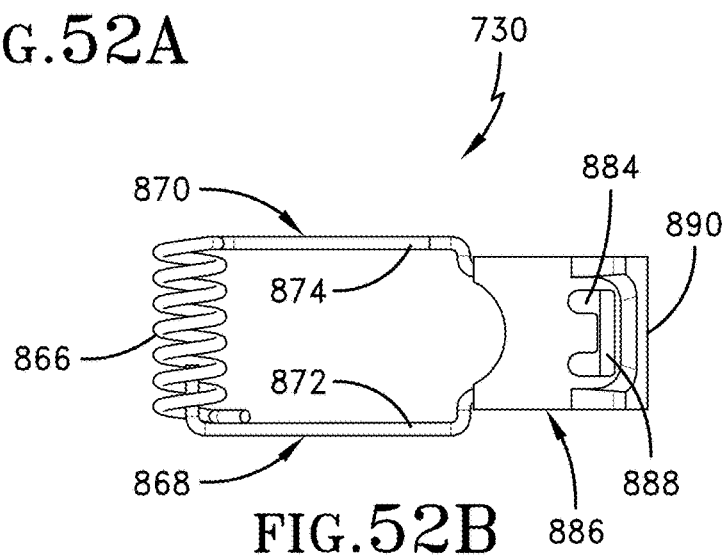
Figure 52C:
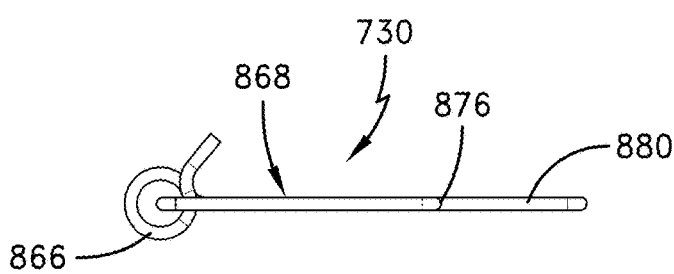
Figure 52D:
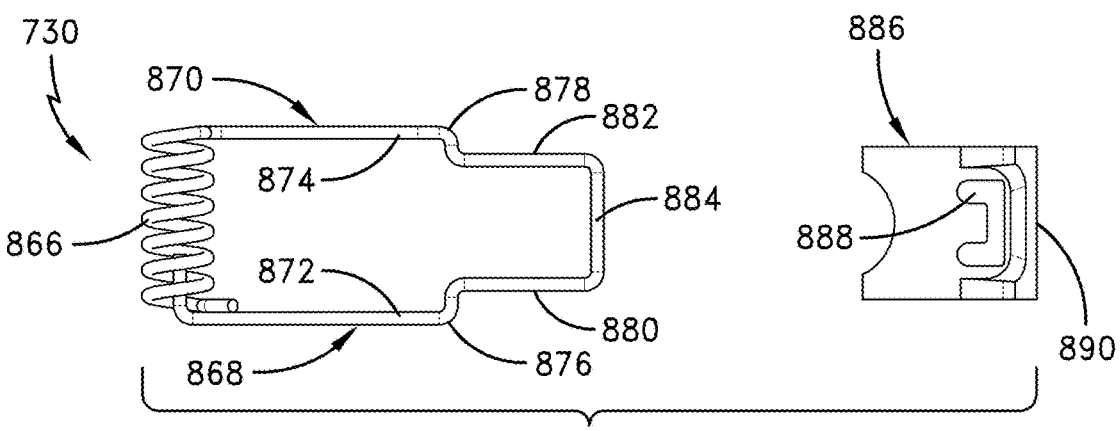

Junction box cover 836 is shown in FIGS. 51A-51C. Junction box cover 836 is composed of eight sides for fitting on and enclosing junction box 732. Junction box cover 836 is thus composed of eight sides, 838, 840, 842, 844, 846, 848, 850 and 852. Junction box cover 836 include two indentations 856, 858 with apertures therein. A latch 860 having an L-shaped configuration is provided for releasably entering slot 826 of junction box 732 to secure junction box cover 836 to junction box 732. A latching component 862 depends from the opposite side from latch 860 of junction box cover 836. Junction box cover 836 further includes a forwardly-inclined surface 864 from which latch 860 depends.

Spring assemblies 730 seat ceiling light 700 in a holding device or can be located in a ceiling, wall or other supporting location. One spring assembly 730 is shown in FIGS. 52A-52E. Each spring assembly 730 includes a coil spring component 866. As shown in FIG. 41, coil spring components 866 are positioned in contact with sides 806, 808 of junction box 732, and are respectively seated in orifices 807, 809, the latter being configured to properly seat respective spring assemblies 730 in junction box 732. Each spring 732 has opposing outwardly extending arms 868, 870. Arms 868, 870 include outwardly extending arm portions 872, 874. Each arm 868, 870 has an inwardly bent portion 876, 878, and are each an inner portion of narrowly-spaced, opposed, parallel arms 880, 882, which are joined at opposite ends by a cross-piece 884. An advantageously plastic cover piece 886 nearly completely envelops the outer end of spring assemblies 730. Cover piece 886 has a window 888 rendering cross-piece 884 visible. Each cover piece 886 has a forwardly biased end portion 890 for engaging the supporting structure in which a ceiling light with nightlight 700 is mounted.

Figure 53:
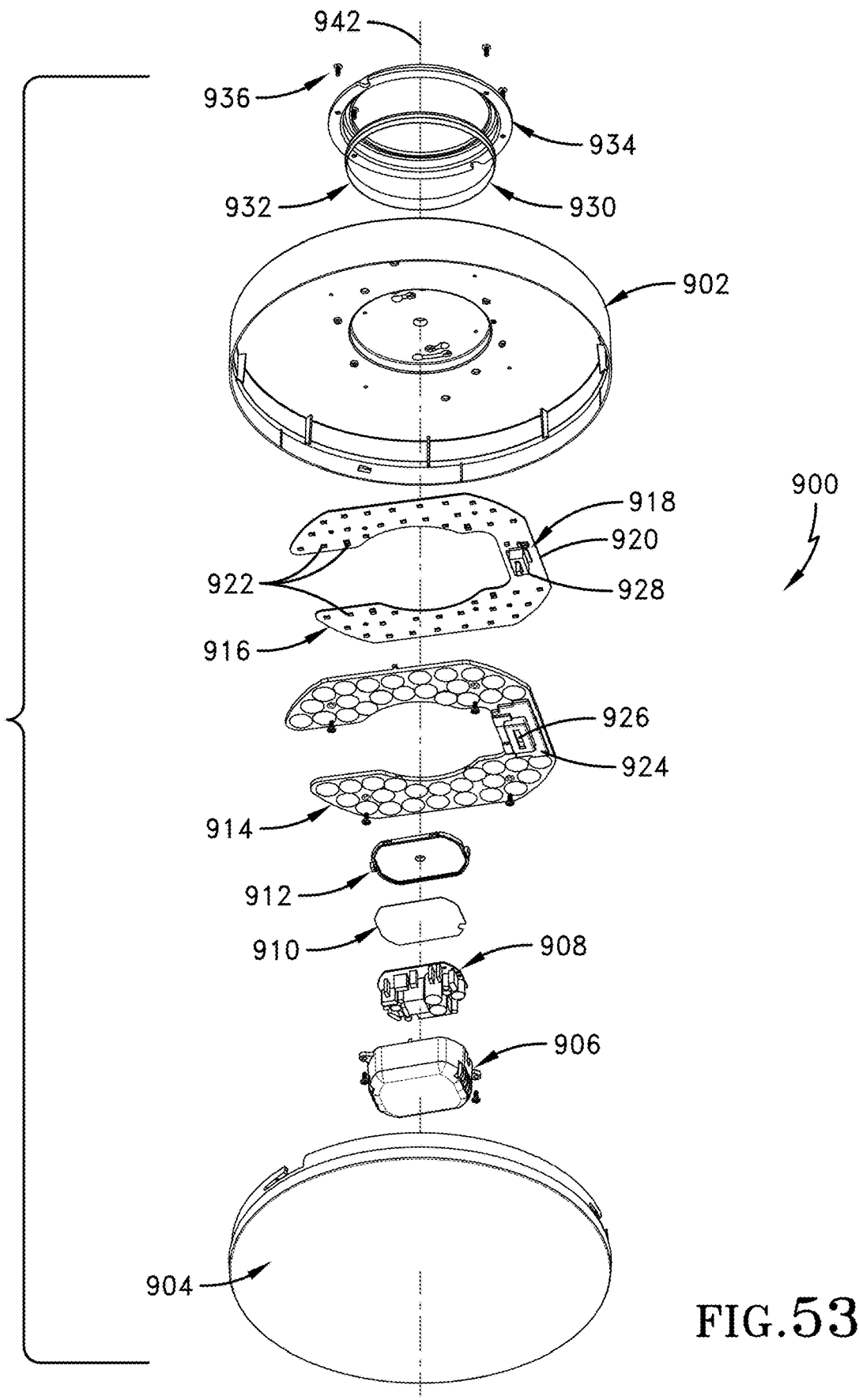
FIG. 53 is an exploded view of a low profile flushmount LED light fixture according to another preferred embodiment of the invention.
Figure 54A:
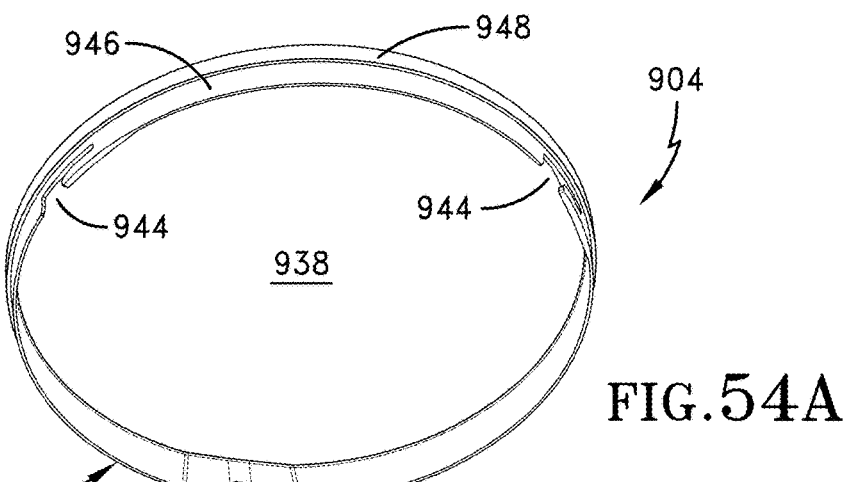
FIGS. 54A-54D are, respectively, a perspective view, a plan view, a cross-sectional view taken in the direction of arrows 54C in FIG. 54B, and a side view of a lens incorporated in the low profile flushmount light fixture shown in FIG. 53.
Figure 54B:
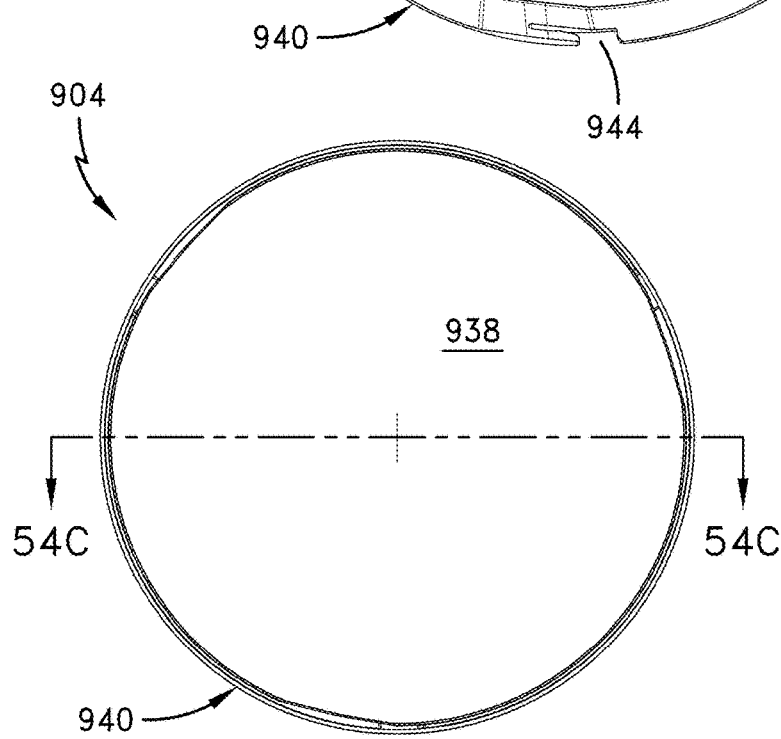
Figure 54D:
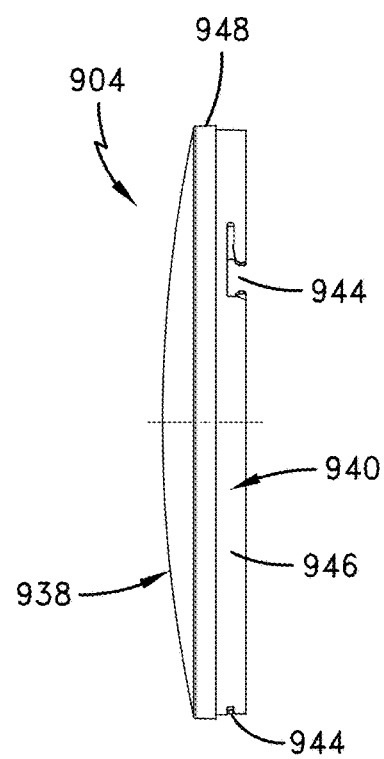
Figure 54C:
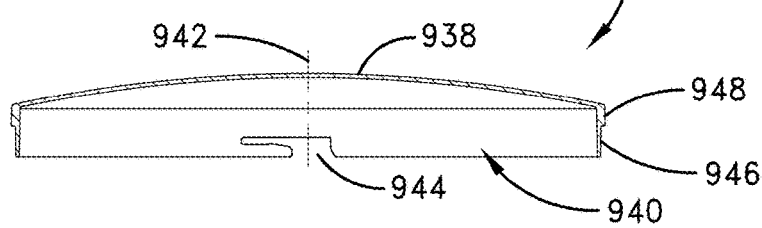
Figure 55B:
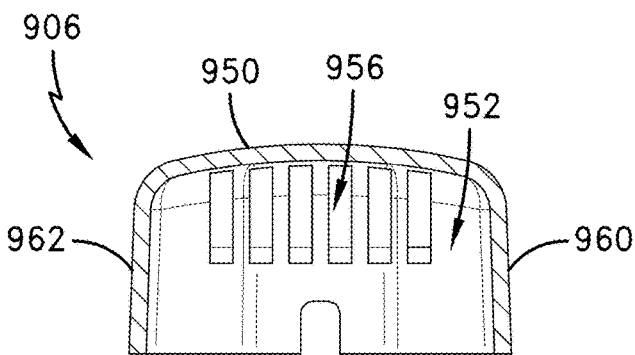
FIGS. 55A-55E are, respectively, a perspective view, a first cross-sectional view taken in the direction of arrows 55B-55B in FIG. 55C, a top view, an end view and another cross-sectional view taken in the direction of arrows 55E-55E in FIG. 55C of a top cover of the driver box for the driver shown in the exploded view of this embodiment of the invention in FIG. 53.
Figure 55A:
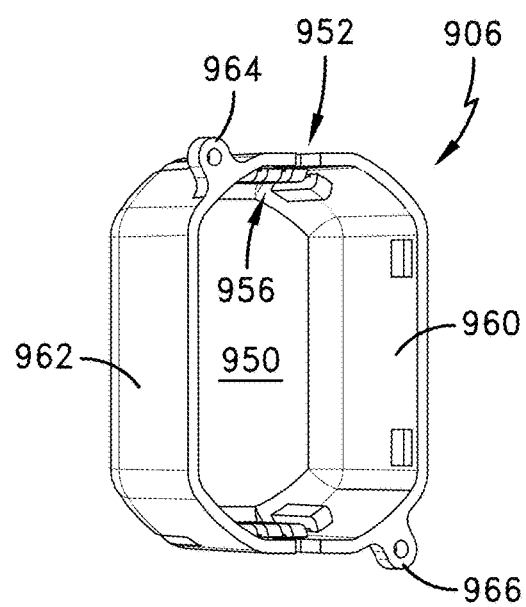
Figure 55C:
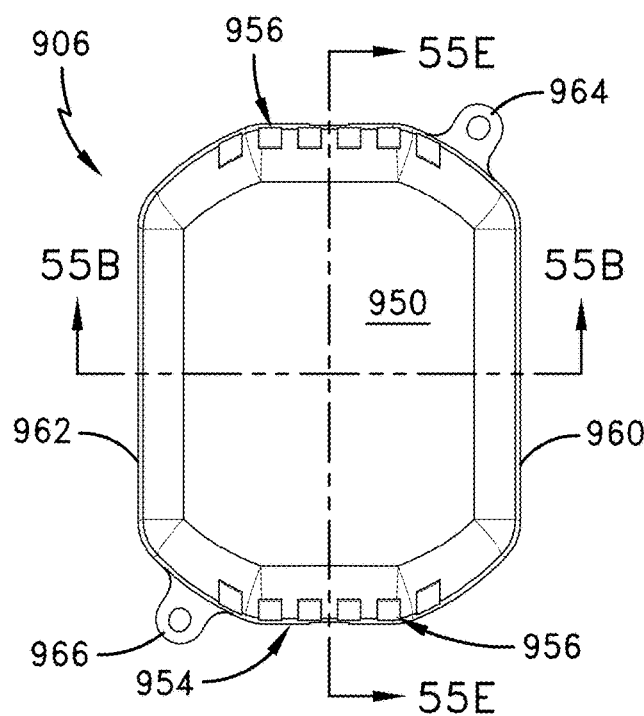
Figure 55E:
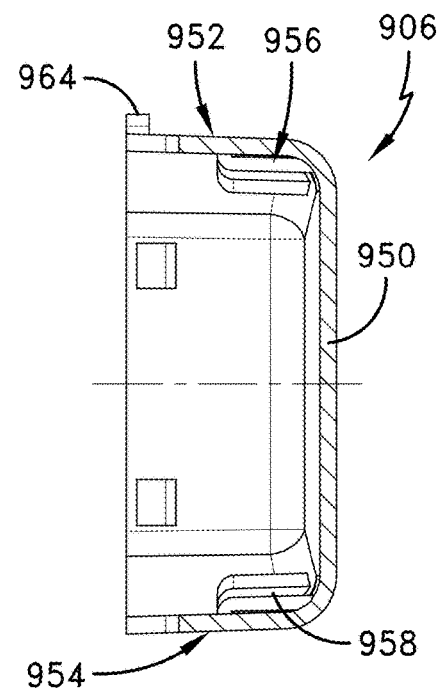
Figure 55D:
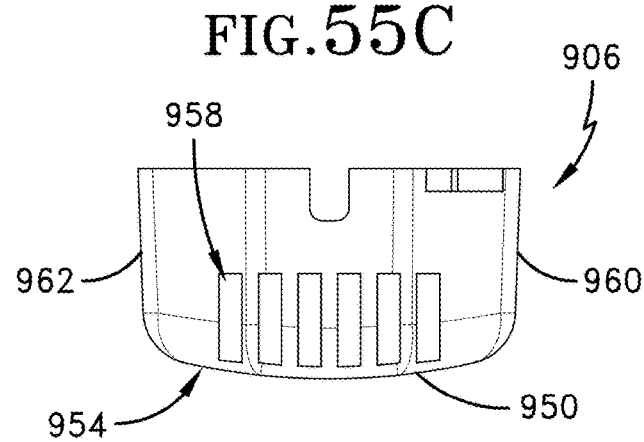
Figure 57A:
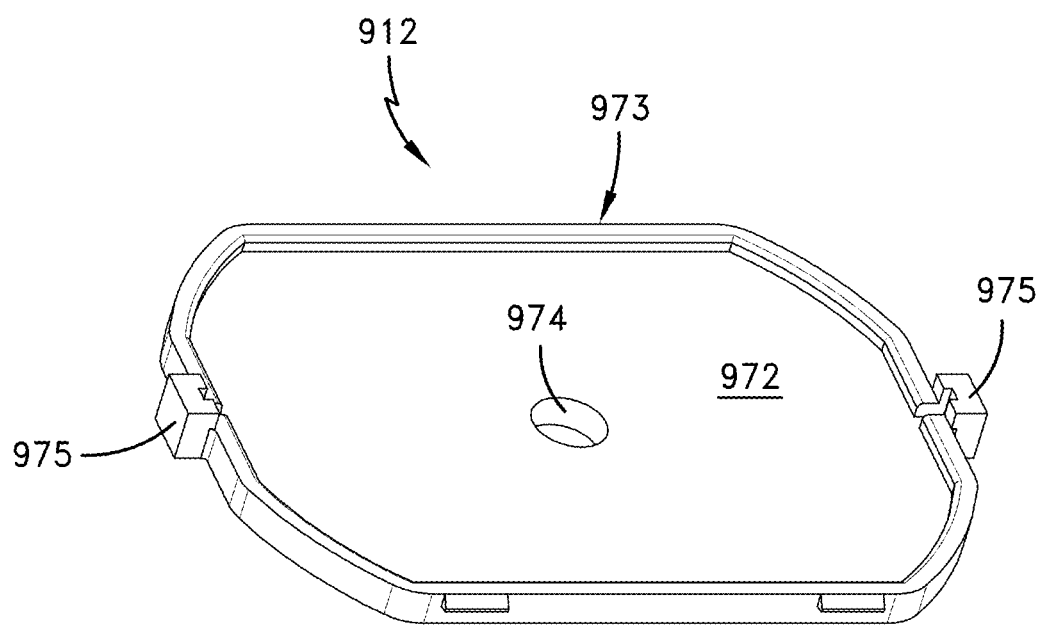
FIGS. 57A-57E are, respectively, a perspective view, a bottom view, a cross-sectional view taken in the direction of arrows 57C-57C in FIG. 57B, a plan view and an end view of a bottom cover of the driver box shown in the exploded view of this embodiment of the invention in FIG. 53.
Figures 57D, 57E:
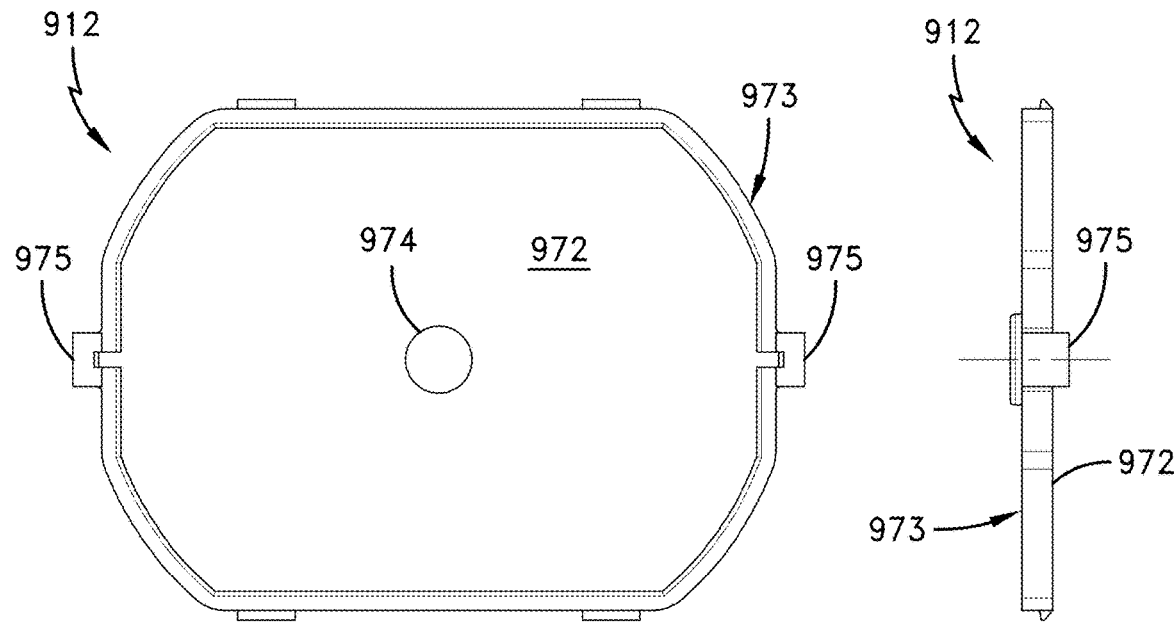
Figure 57C:
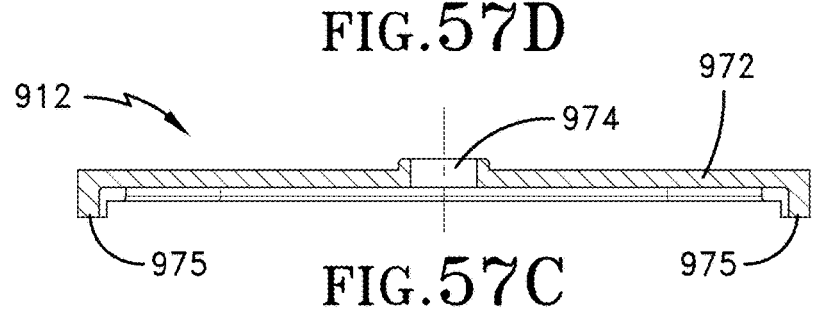
Figure 57B:
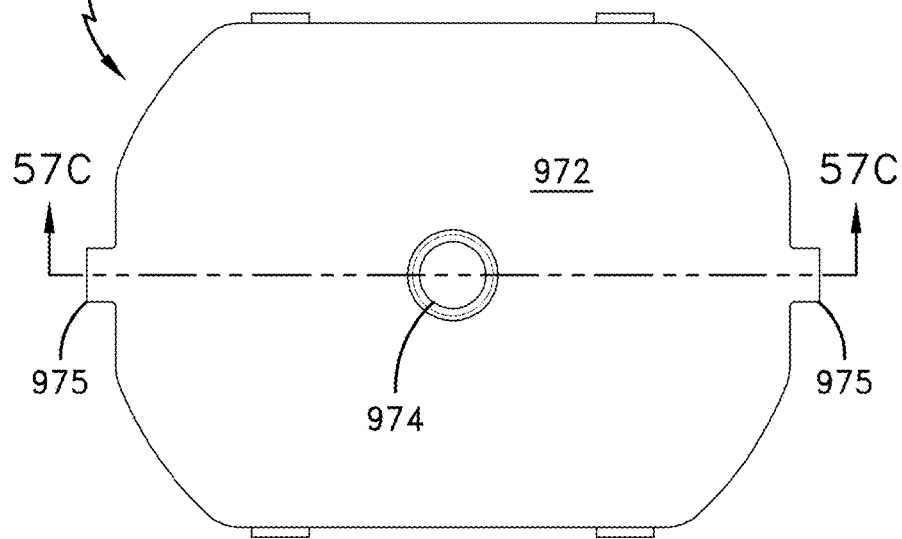
Figure 58B:
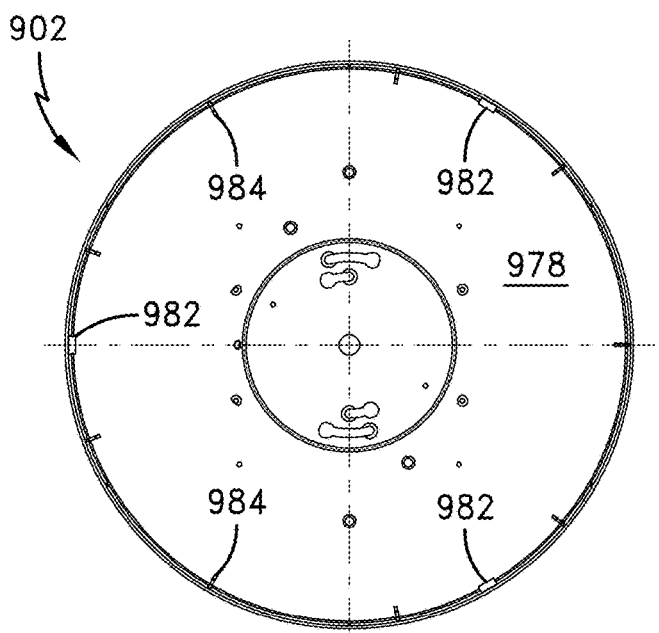
FIGS. 58A-58E are, respectively, a perspective view, an interior plan view, a side view and exterior plan view and another side view of a lamp base incorporated into the apparatus shown in the exploded view of this embodiment of the invention in FIG. 53.
Figure 58A:
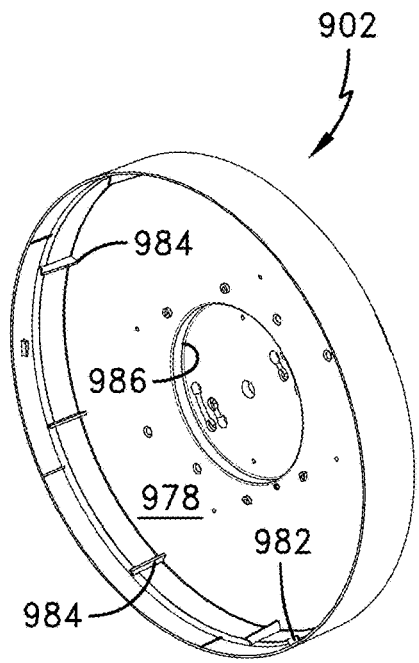
Figure 58C:
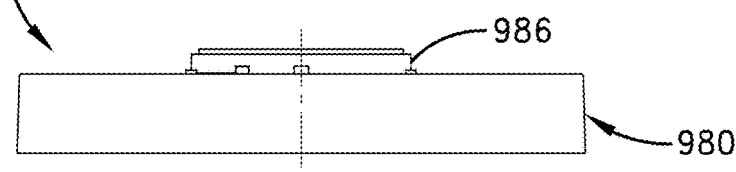
Figure 58D:
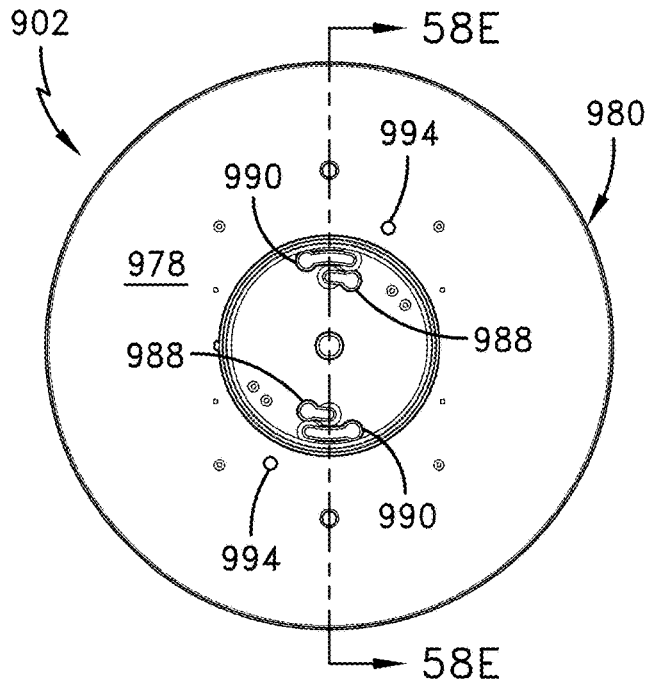
Figure 58E:
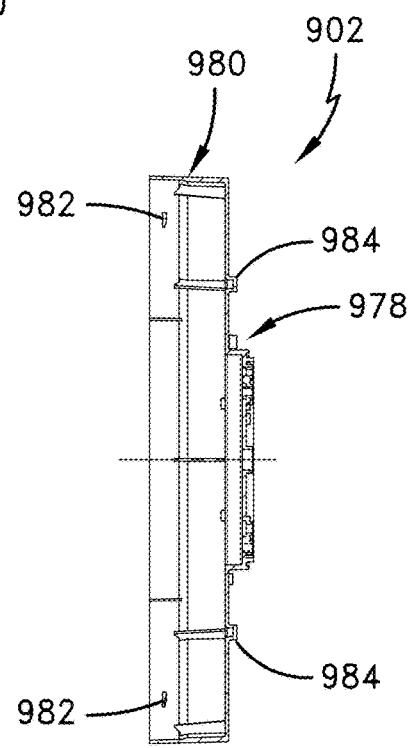
Figure 59A:
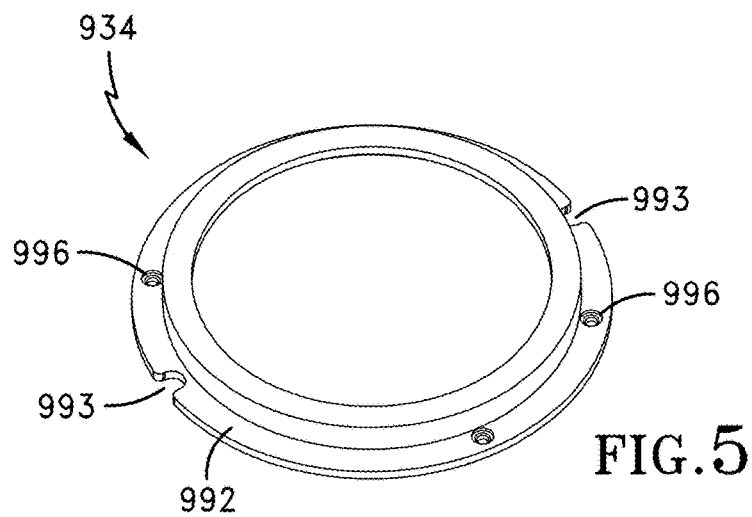
FIGS. 59A-59D, are, respectively, a perspective view, a plan view, a first cross-sectional view taken in the direction of arrows 59C-59C in FIG. 59B and a second cross-sectional view taken in the direction of arrows 59D-59D in FIG. 59B of a lens of the nightlight in the apparatus shown in the exploded view of this embodiment of the invention in FIG. 53.
Figure 59C:
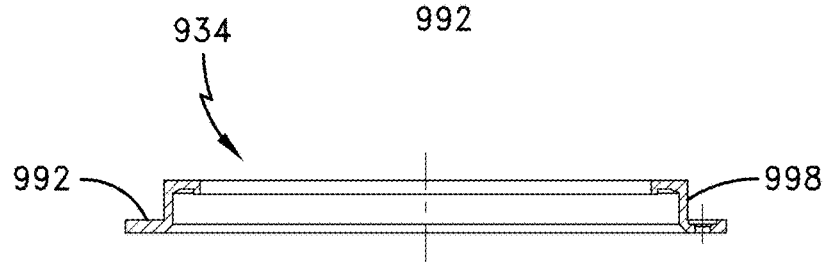
Figure 59B:
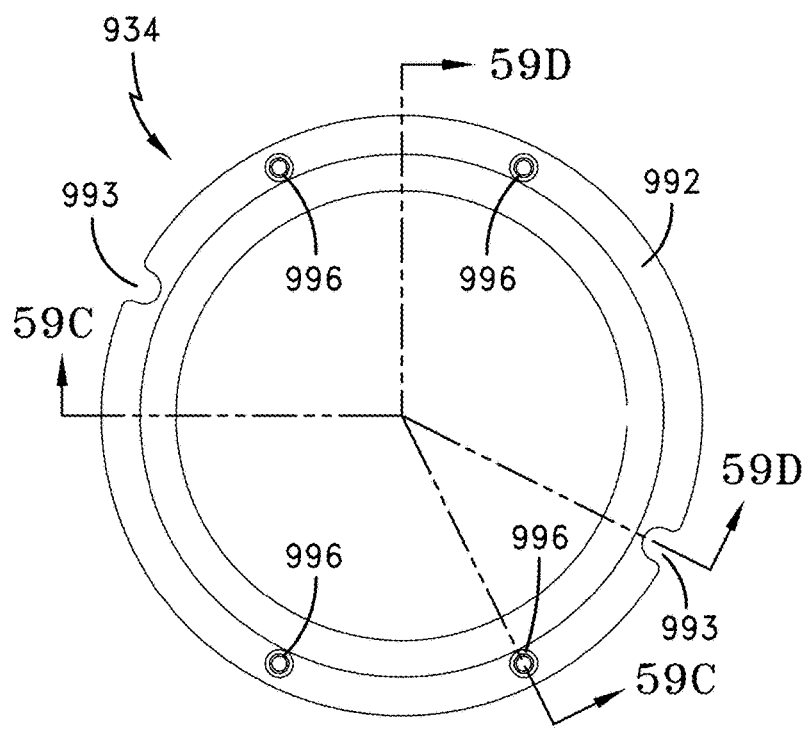
Figure 59D:
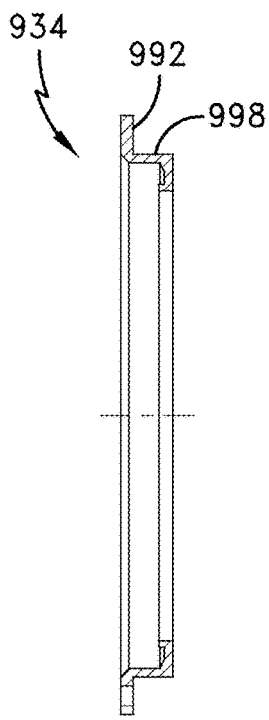

An exploded view of low profile flushmount light with nightlight 900 is shown in FIG. 53. Low-profile-flushmount-with-nightlight 900 includes a diffuser 904, a driver box. 906, which contains a set of electronic components 908 and has closure 910, and a bottom cover 912 of driver box 906. A generally horseshoe-shaped optical lens 914 covers and is aligned with a horseshoe-shaped printed circuit board 916, the latter being attached to a lamp base 902.

A CCT switching component 918 is mounted on printed circuit board 916 at a crosspiece 920 thereof for manually varying the correlated color temperature of the illumination emitted by an array of main light LEDs 922 attached to printed circuit board 916. Optical lens 914 has a switch container 924 mounted thereon for containing CCT switching component 918. Switching container 924 includes a slot 926 through which a finger-slidable switch 928 extends and which is movable by a person's finger. Diffuser 904 would have to be removed from back housing component 902 in order to provide access to CCT switching component 918. A portion of the electronics for adjusting the CCT is found within the set of electronic components 908 located in electronics container box 906.

Attached to the rearward side of back housing component 902 (not visible in FIG. 72) is a printed circuit board 930 having mounted on the outwardly facing side thereof, an equiangularly-spaced array of nightlight LEDs to form a nightlight illumination device 932. In this embodiment, the shape of printed circuit board 916 conforms to the direction in which the main light illumination is to be directed. In the depicted low-profile-flushmount-with-nightlight 900, the main light illumination is passed through diffuser 904. A generally, cylindrical-shaped, transparent lens-of-nightlight 934 covers a large portion of a printed circuit board assembly 930 which comprises a band on the outside portion on which an array of main light LEDs are mounted. Printed circuit board 930 cooperates with a generally cylindrical wall, discussed below, for enclosing LED nightlight illumination device 932. Printed circuit board 930 is therefore basically composed of annular nightlight LEDs 922 that are mounted thereon to project illumination radially from printed circuit board 930 along the ceiling on which low profile flushmount light with nightlight 900 is mounted. Nightlight housing 934 is attached to the rearward side lamp base 902 by means of screws 936 extending through recesses. The individual components of low-profile-flushmount-light-with-nightlight 900 will now be discussed.

Referring to FIGS. 54A-54D, diffuser 904 is shown. Diffuser 904 is a unitary, molded, translucent acrylic component having a convex, domed component 938 including a cylindrical side wall 940 extending cylindrically, rearwardly thereof and sharing a common longitudinal central axis 942 as shown in FIG. 53. Side wall 940 has three, equiangularly-spaced, generally L-shaped openings 944 for receiving flanges on the inside of lamp base 902 as discussed below, to releasably retain diffuser 904 on lamp base 902. Cylindrical side wall 940 of diffuser 904 includes a rearward peripheral portion 946, of slightly less diameter than a forward portion 948 to allow a rearward portion 946 to slide on the inside of a peripheral rim 980 of lamp base 902 as discussed below.

FIGS. 55A-55E are detailed views of driver box 906. Driver box 906 is basically composed of a rearward wall 950, opposite end walls 952, 954, each having cooling vents 956, 958, respectively. Driver box 906 further has opposing side walls 960, 962, diagonally opposed, screw hole tabs 964, 966 for receiving screws to attach driver box 906 to back housing component 902.

Horseshoe-shaped optical lens 914 is shown in detail in FIGS. 56A-56D. Horseshoe-shaped optical lens 914 includes opposing arms 967, 968, which are joined by crosspiece 920. Arms 967, 968 are covered with adjacent hollow cup portions 969, 970. Cup portions 969, 970 each partially cover respective LEDs on horseshoe-shaped printed circuit board 916 and project illumination therefrom through diffuser 904 and into the surrounding space. Cup portions 969, 970 are translucent and rounded to facilitate the desired projection of the illumination from LEDs. Horseshoe-shaped optical lens 914 further has screw holes 971 for receiving respective screws to fasten horseshoe-shaped optical lens 914 to back housing component 902.

Bottom cover 912 of electronics container box 906 is shown in FIGS. 57A-57E. Bottom cover 912 includes a planar portion 972 and eight opposing side walls identified generally as side walls 973. A hollow tube 974 is provided in the center of bottom cover 912 for receiving wires transmitting electricity between electronic components 908 located in driver box 906 and a power source. A pair of opposing flanges 975 enable the connection of bottom cover 912 to driver box 906.

Reference is made to FIG. 53 for a detailed description of horseshoe-shaped printed circuit board 916. The shape of printed circuit board 916 is similar to, but slightly smaller than horseshoe-shaped optical lens 914. Printed circuit board 916 includes an array of main light LEDs 922 disposed around the forward facing side of printed circuit board 916.

FIGS. 58A-58E show in detail lamp base 902. Lamp base 902 includes a generally cylindrical base portion 978 having a cylindrical, peripheral rim 980. Cylindrical peripheral rim 980 has a series of inwardly extending locking flanges 982 for entering openings 944 in diffuser 904 to releasably lock diffuser 904 to lamp base 902. A set of flanges 984 on the interior of cylindrical peripheral rim 980 that are parallel with longitudinal axis 942 limit the amount in which diffuser 904 be inserted into lamp base 902 to assist in holding diffuser 904 in place. Lamp base 902 further includes a rearwardly extending, cylindrical recess defined by a cylindrical wall 986 for receiving electronics container box 906. In addition, a set of keyhole shaped holes in 988, 990 are provided to enable the releasing and latching of low-profile-flushmount-with-nightlight 900 to the holding component on the ceiling in which low-profile-flushmount-with-nightlight 900 is to be attached. The exterior of cylindrical wall 986 can be seen in FIG. 58C.

Nightlight housing 934 is depicted in FIGS. 59A-59D. Nightlight housing 934 is composed of an outer disk-like annular flange 992 having a pair of recesses 993. Nightlight housing 934 further includes a set of screw holes 996 to enable nightlight housing 934 to be fastened to lamp base 902. Nightlight housing 934 further includes a rearwardly extending cylindrical wall portion 998 for covering the lateral portion of LED nightlight illumination device 932 for permitting the transmission of illumination from nightlight LEDs on LED nightlight illumination device 932 to be transmitted therethrough in a direction parallel to the ceiling, assuming the ceiling is horizontal.

Figure 60:
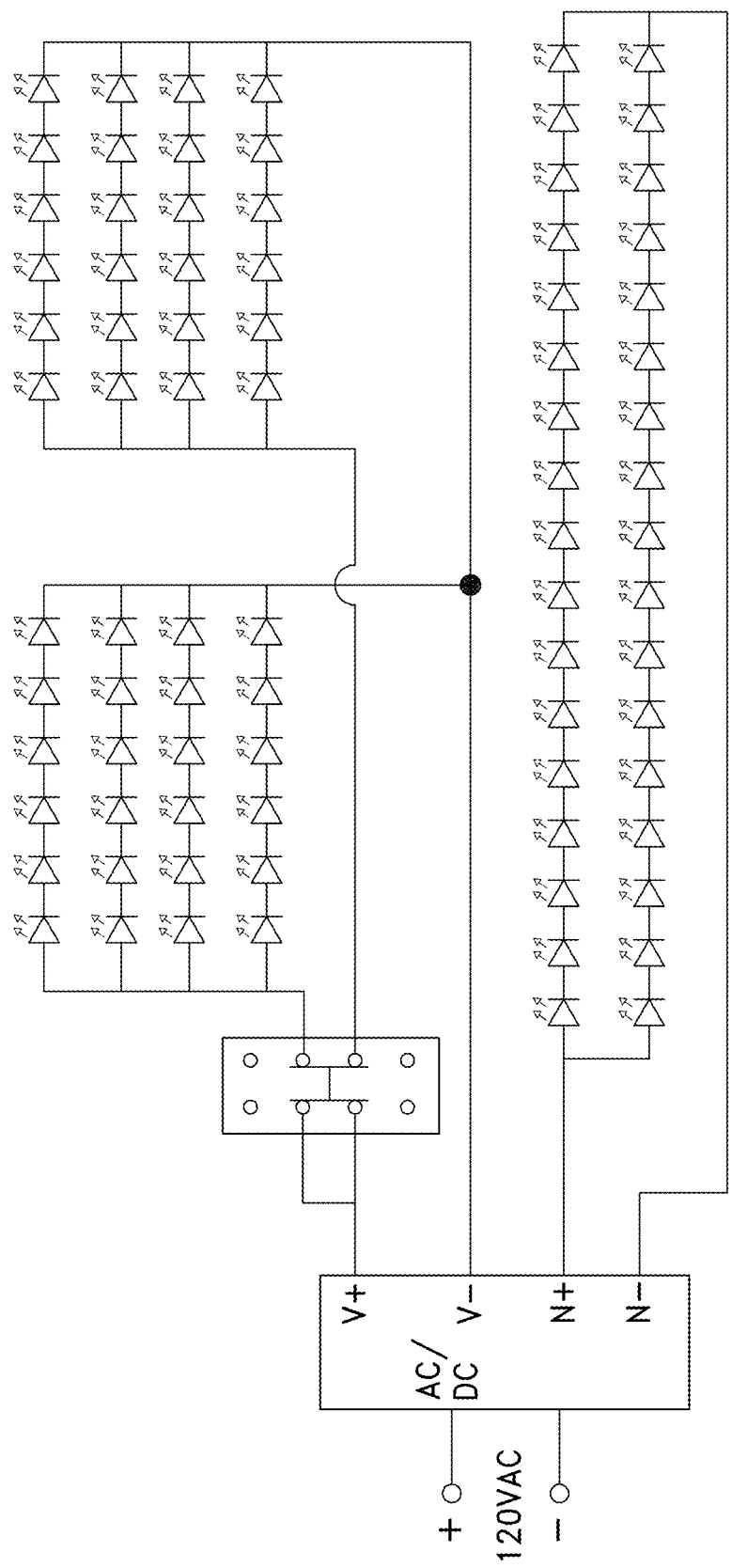
FIG. 60 is a circuit diagram of the LED components of the apparatus shown in FIG. 53.

FIG. 60 is a circuit diagram showing the arrangement of the respective LEDs for emitting light of one of the selected CCTs, shown respectively as 2000K, 3000K and 5000K CCTs.

An LED light fixture of the type described below is referred to as an LED puff light. Puff lights are typically square or round in their perimeter when doing them facing the main part of the illumination surface. They generally have a diffuser for distributing, illumination in an even matter. They generally are mounted on a ceiling. The puff light described herein is unique in various, aspects, particularly with respect to that it includes a regular light and a nightlight.

Figure 61:
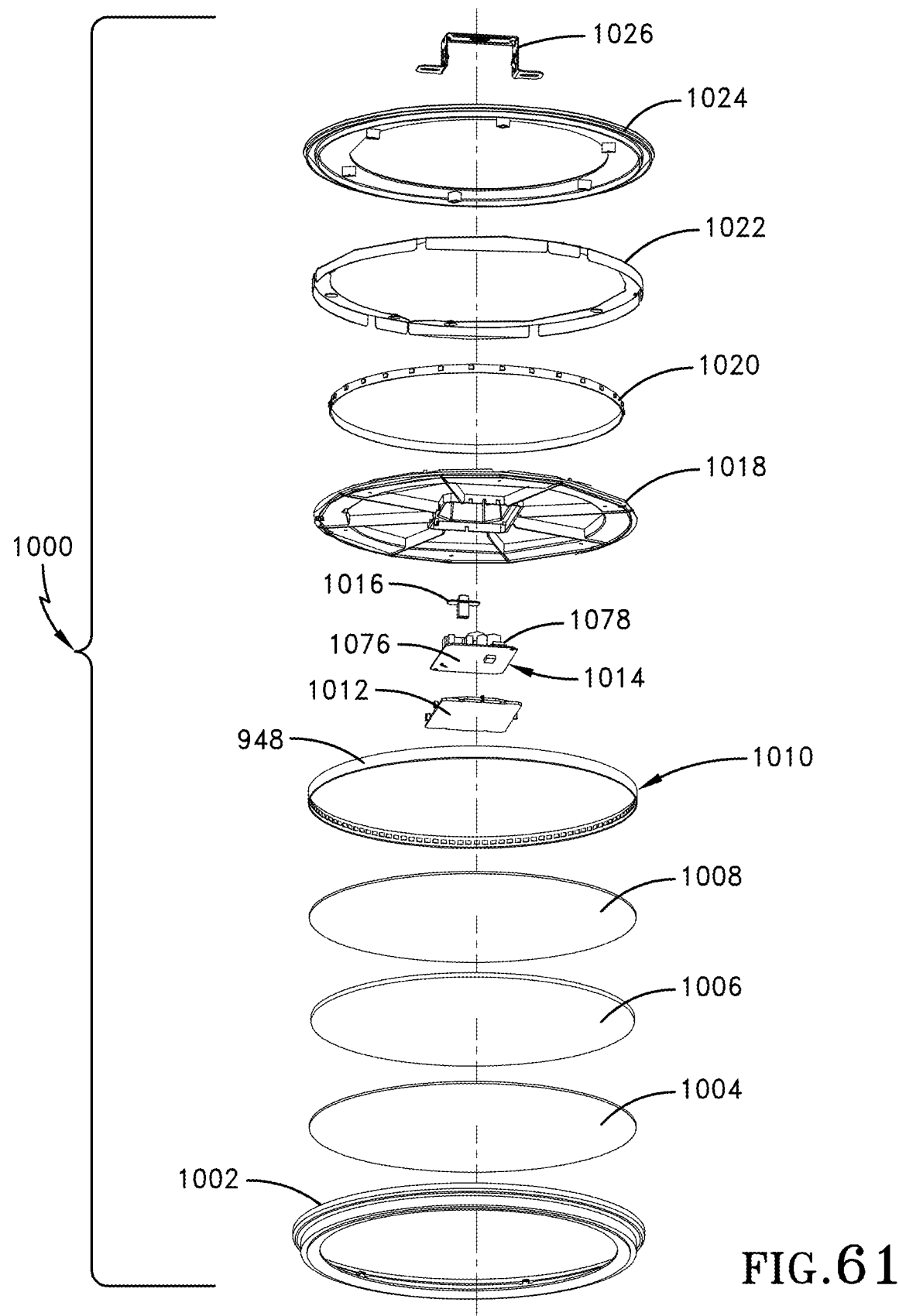
FIG. 61 is an exploded view of a puff-light-with-nightlight according to a preferred embodiment of the invention.
Figure 61A:
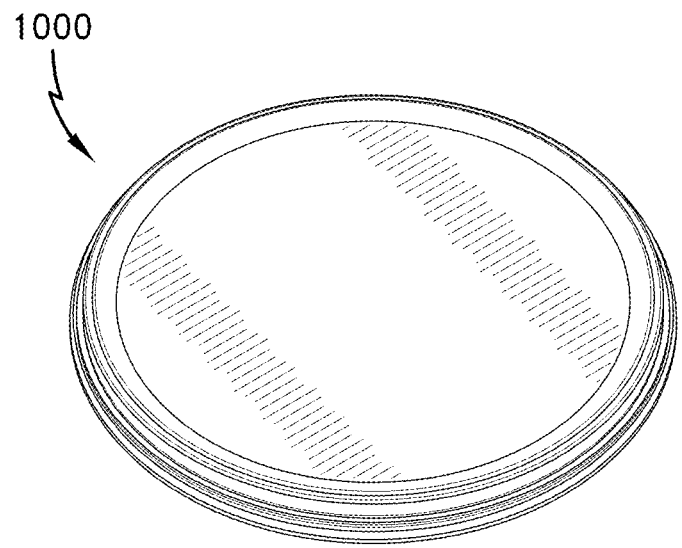
FIG. 61A-61B show a front perspective view and a rear perspective view of the puff-light-with-nightlight shown in FIG. 61.
Figure 61B:
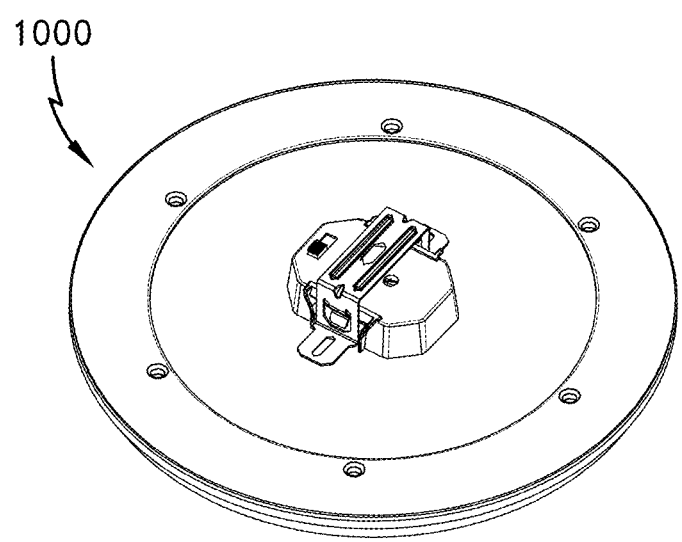

A puff-light-with-nightlight 1000 according to another preferred embodiment of the invention is depicted in an exploded view in FIG. 61. It includes from its forward component to its rearward component an outer frame 1002, a diffusion plate 1004, a light guide plate 1006, reflective sheeting 1008, a lamp assembly 1010, a power cover 1012, power supply module 1014, a switch 1016, a base board 1018; a nightlight assembly 1020, a radiator plate 1022, an upper cover 1024 and a mounting bracket 1026. FIG. 61A shows puff-light-with-nightlight 1000 in a front perspective view, and puff-light-with-nightlight 1000 is shown in a rear perspective view in FIG. 61B. As discussed hereinafter, puff-light-with-nightlight 1000 generates a main light with variable correlated color temperature (CCT) of advantageously 3000K, 4000K and 5000K. Puff-light-with-nightlight 1000 in a preferred form generates main light with a luminous flux of 900 LM. Puff-light-with-nightlight 1000 advantageously operates at a voltage of 120V, a frequency at 60 Hz and power at 14 W+10%. FIG. 61 does not show the various connecting components including various screws and nuts. Outer frame 1002 is revealed in detail in FIGS. 62A-62F. FIG. 62A, is a front perspective view depicting outer frame 1002 as a unitary structure, including an outer peripheral ring 1028, shown in an enlarged detailed cross-sectional view FIG. 62E. Outer peripheral ring 1028 comprises an outer peripheral longitudinal section 1030 that terminates at a transverse section 1032, which thereafter forms a roughly U-shaped section 1034 having a U-shape with a rearwardly open U-portion 1036. U-portion 1036 forms a rearwardly extending U, disposed rearwardly of a cylindrical section 1038 which terminates at its forward end in a transverse wall 1040, which in turn ends at a forward inclined wall section 1042. Portions of the latter construction depicted in an enlarged, detailed cross-section shown in FIG. 62F.

Outer peripheral ring 1028 is concentric with an inner ring 1044. Inner ring 1044 shown has including six, equiangularly spaced recesses 1046 that are opened outwardly facing outer peripheral ring 1028.

Figures 63A, 63B:
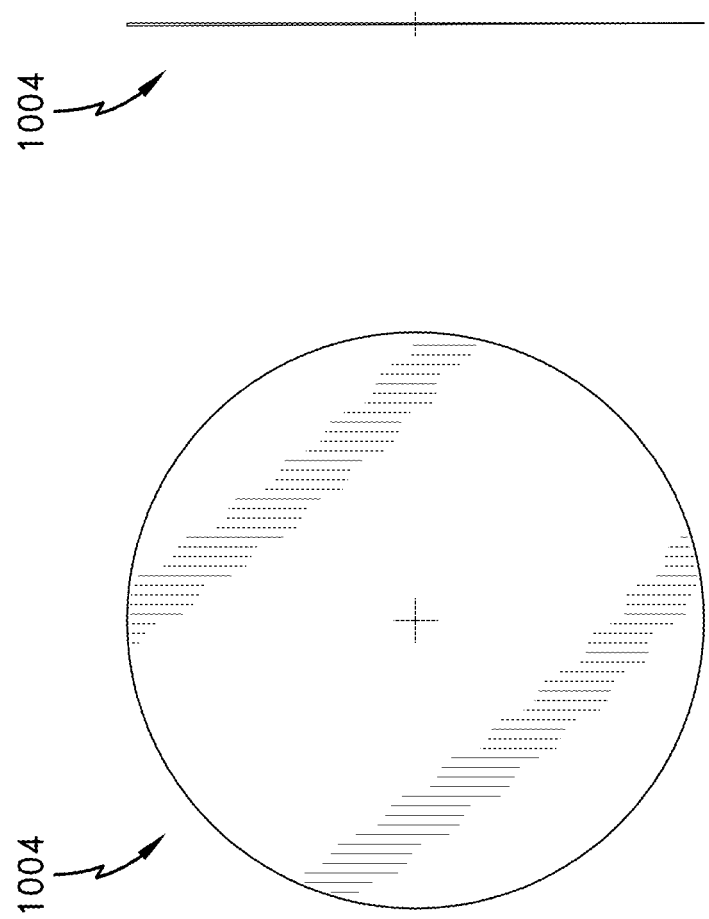
FIGS. 63A-63B are, respectively, a plan view and a side view of the diffusion plate shown in the apparatus depicted in the exploded view of this embodiment of the invention shown in exploded form in FIG. 61.

Diffusion plate 1004 is illustrated in FIGS. 63A and 63B. Diffusion plate 1004 should have the following technical requirements. Namely, diffusion plate 1004 should be an optical grade diffusion plate with a fire protection grade HB, meet ROHS environmental protection standards. The surface of diffusion plate 1004 should be milky white, without scratches, black spots, impurities and other poor appearance characteristics. There should be no warpage on diffuser plate 1004. The transmittance is preferably at least 85%. The mist should be more than 80%, and that diffusion should exceed 95%.

Figures 64A, 64B:
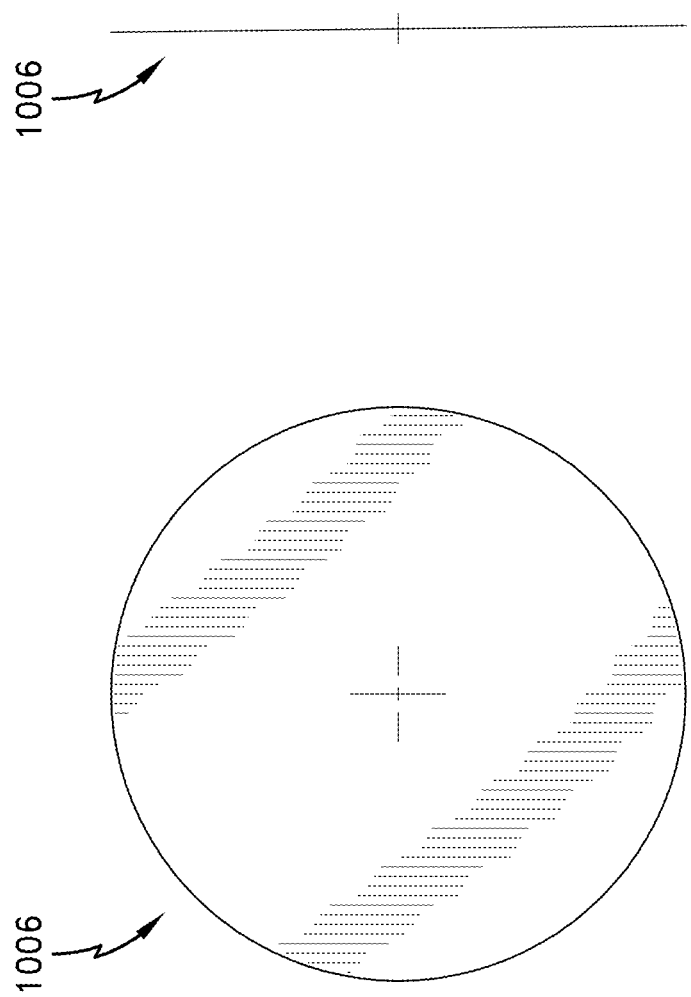
FIG. 64A-64B are, respectively, a plan and a side view of the light guide plate incorporated in to the apparatus shown in FIG. 61, the exploded view of the embodiment of the invention.

Light guide plate 1006 is shown in detail in FIGS. 64A and 64B. Light guide plate 1006 is required to be optical grade light with a fire protection grade HB. Light guide plate 1006 is required to meet ROHS environmental protection standards. Its transmittance should exceed 90%, uniformity should exceed 80% and the laser dotting effect of light guide should be uniform. With respect to the surface of light guide plate 1006, there should be no yellowing, no scratches, impurities or other poor appearance characteristics. There also should not be any warping of light guide plate 1006. Light guide plate 1006 should be protected on both sides to ensure the safety of transportation and should be an avoidance of any scratches. Light guide plate 1006 should have a glossy surface, and reflective paper should be stuck on the block light as required. Light guide plate 1006 should be PMMA and be transparent.

Figures 65A, 65B:
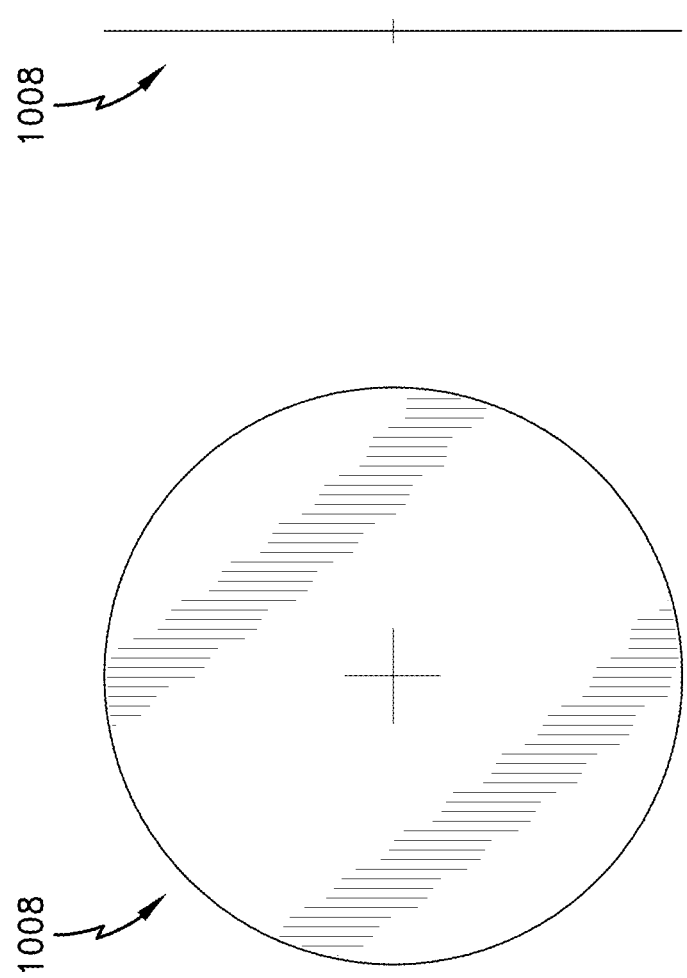
FIG. 65A-65B are, respectively, a plan view and a side view of the reflective sheeting incorporated in the apparatus shown in the exploded view in FIG. 61 of this embodiment of the invention.

Reflective sheeting 1008 is illustrated in FIGS. 65A and 65B. Reflective sheeting 1008 should be made from PET. Its reflectivity should exceed 95%. The flame retardant grade of reflective sheeting 1008 should be UL 94-HB, and in line with ROHS environmental protection standards. The surface of reflective sheeting 1008 should have a white surface without scratches, black spots, impurities or other characteristics of poor appearance.

Lamp assembly 1010 is preferably constructed of the material in a thin cylindrical made from FR-1 board and 2835 beads if puff-light-with-nightlight 1000 has an 11 inch diameter.

Power cover 1012 is shown in detail in FIGS. 66A-66C. Power cover 1012 is composed of an essentially flat forward surface 1050, a wall 1052 with openings 1060, 1062 and 1064. Wall 1052 includes diagonally opposite curved wall sections 1054, and broken curved sections with respective openings 1060 and 1062 as just noted. Curved wall sections 1054 are arranged to form portions of a rectangular structure with curved corners. Curved sections 1054 define an opening 1064 that is larger than openings 1060 and 1062. A set of rearwardly extending posts 1066, 1067, 1068, 1069 and 1070 extend from the edges of power cover 1012. Posts 1067 and 1070 are located between the respective pairs of recesses 1072 and 1074 in power cover 1012. Power cover 1012 is advantageously is made from PBT having 30% GF and 94-VO. It is a DL yellow card. The color is white according to the color palette. The component parts of power cover 1012 should not be changed. Shrink, pike and other injection molding changes should be avoided.

Switch cap 1016 detailed in FIGS. 67A-67E. Switch cap 1016 is comprised of a stem 1080, rectangular in cross-section and having a top end piece 1082 closing the top portion. Top end piece 1082 has a set of parallel protrusions 1084 to enable a further engagement by a user's fingers thereon. A stop piece 1086 limits the depression of switch cap into a channel in power supply module 1014 for receiving switch cap 1016. Switch cap 1016's stem 1080 has parallel, opposing longitudinal interior rails 1088 for cooperating with rails in the piece receiving stem 1080 to assure longitudinal movement of switch cap 1016 as desired. Switch cap 1016 is made of an appropriate hard plastic made of flame retardant UL94-VO material meeting ROHS.

Figure 68:
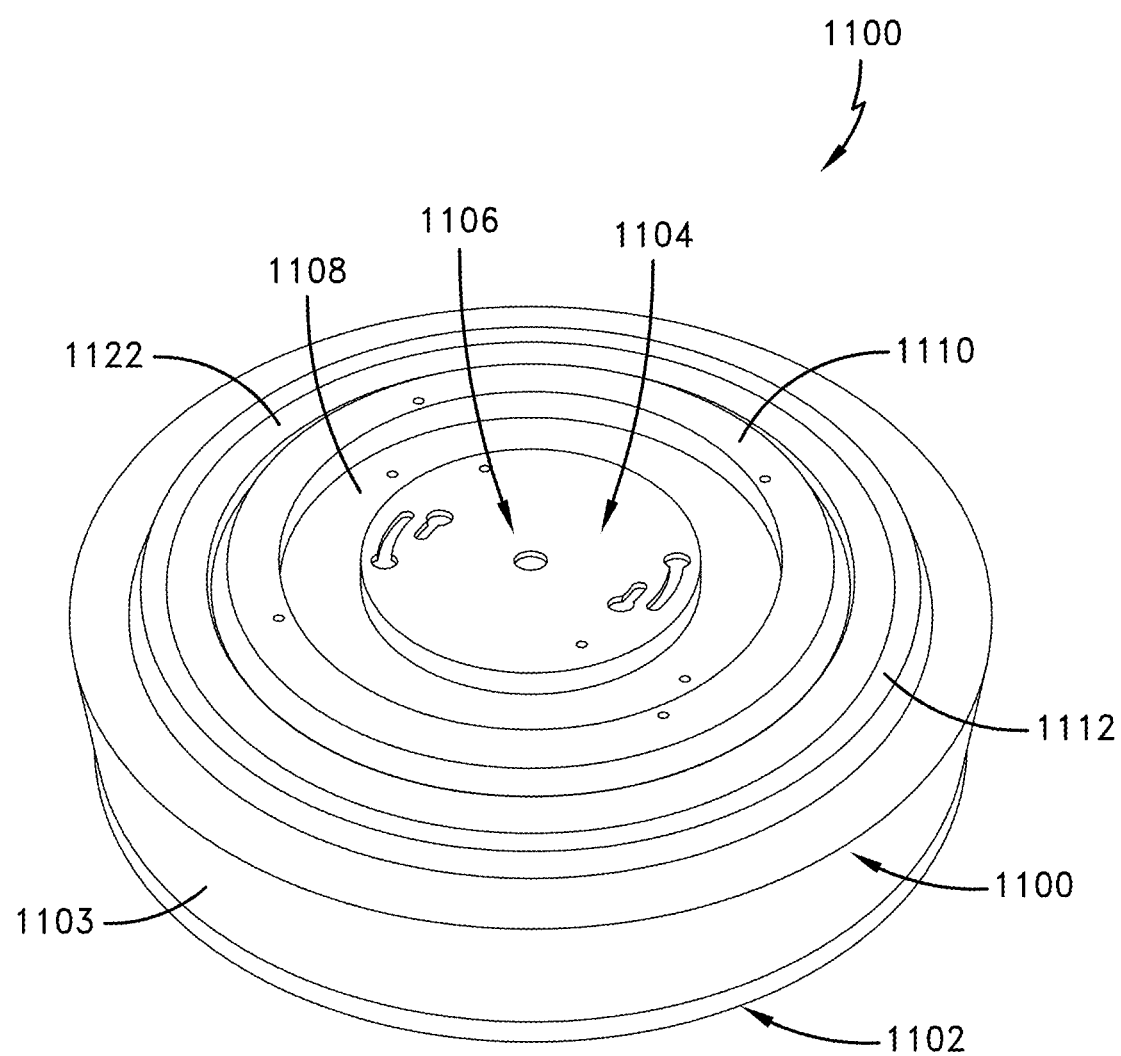
FIG. 68 is a perspective view of a flushmount LED light with nightlight according to another embodiment of the present invention.
Figure 69:
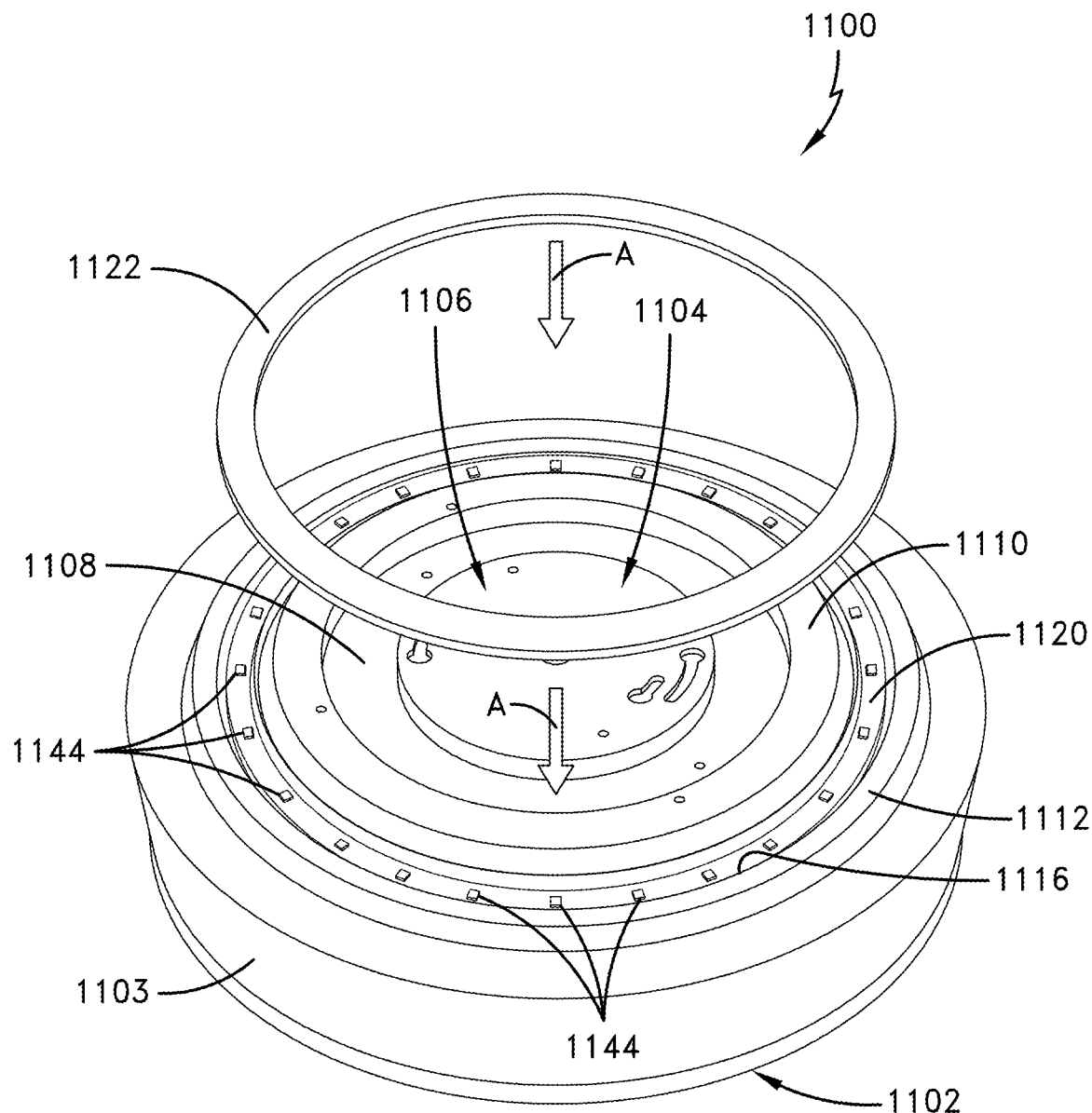
FIG. 69 is a perspective view of a flushmount as shown in FIG. 68, with a transmittance mask about to be installed on the flushmount.

FIGS. 68 and 69 are perspective views of the rear portion of an LED ceiling/wall-light-with-LED-nightlight 1100 according to a preferred embodiment of the invention. LED ceiling/wall-light-with-nightlight 1100 includes a lens or diffuser 1102 preferably made of a translucent plastic having a cylindrical outer wall 1103.

Figure 70:
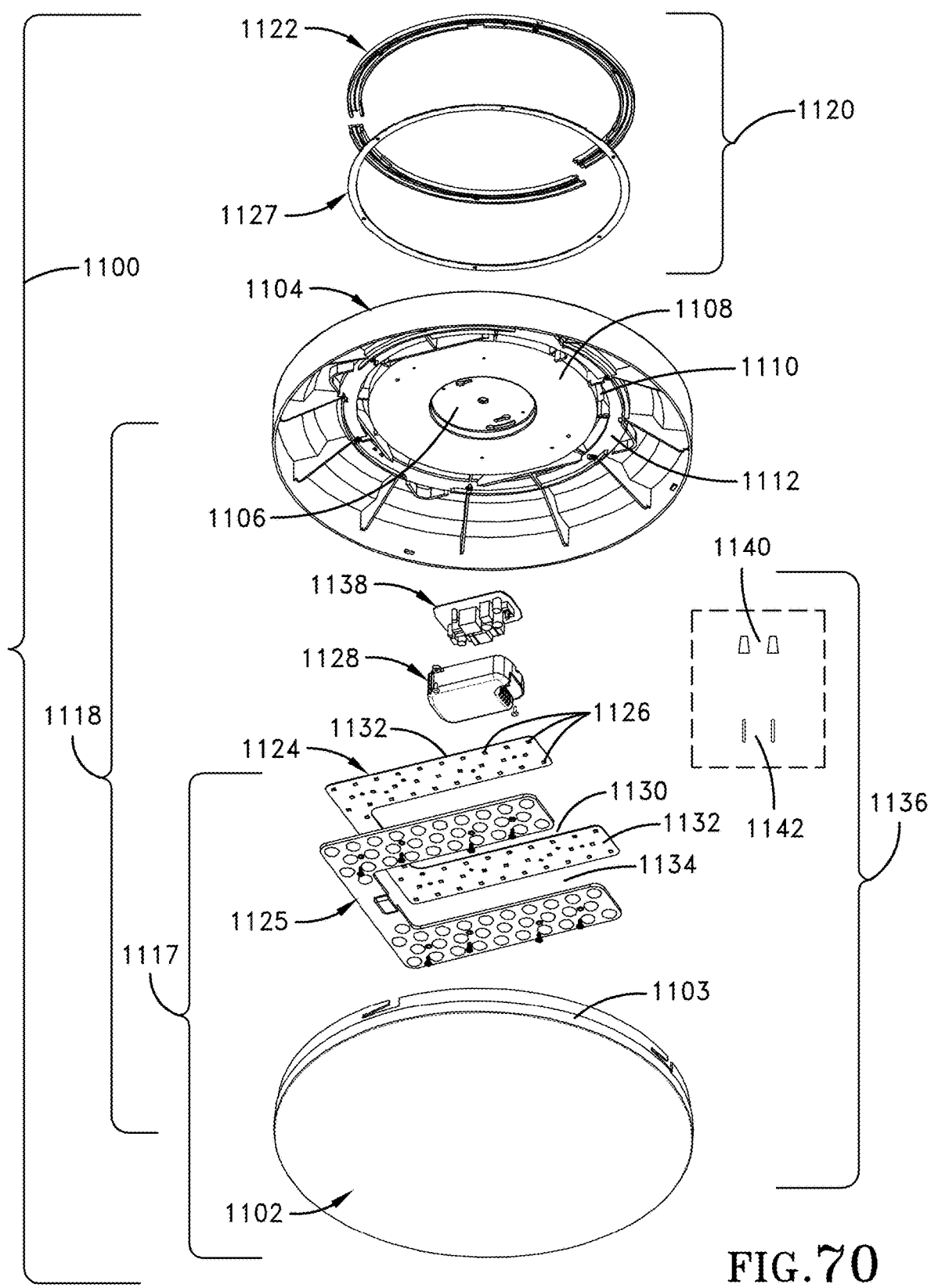
FIG. 70 is an exploded view of the ceiling light with nightlight of the embodiment of the invention shown in FIG. 69.
Figure 71A:
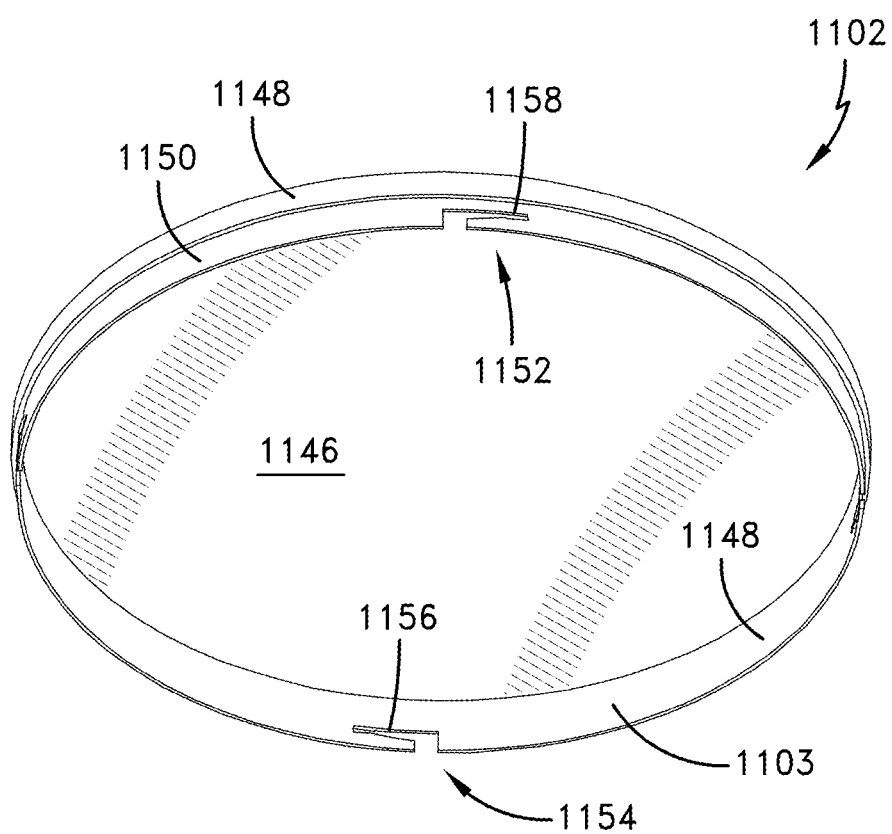
FIGS. 71A-71D are, respectively, a perspective view, a plan view, a cross-sectional view taken in the direction 71C-71C in FIG. 71B and a side view of a diffuser shown in the embodiment of the invention depicted in FIG. 70.
Figures 71B, 71D:
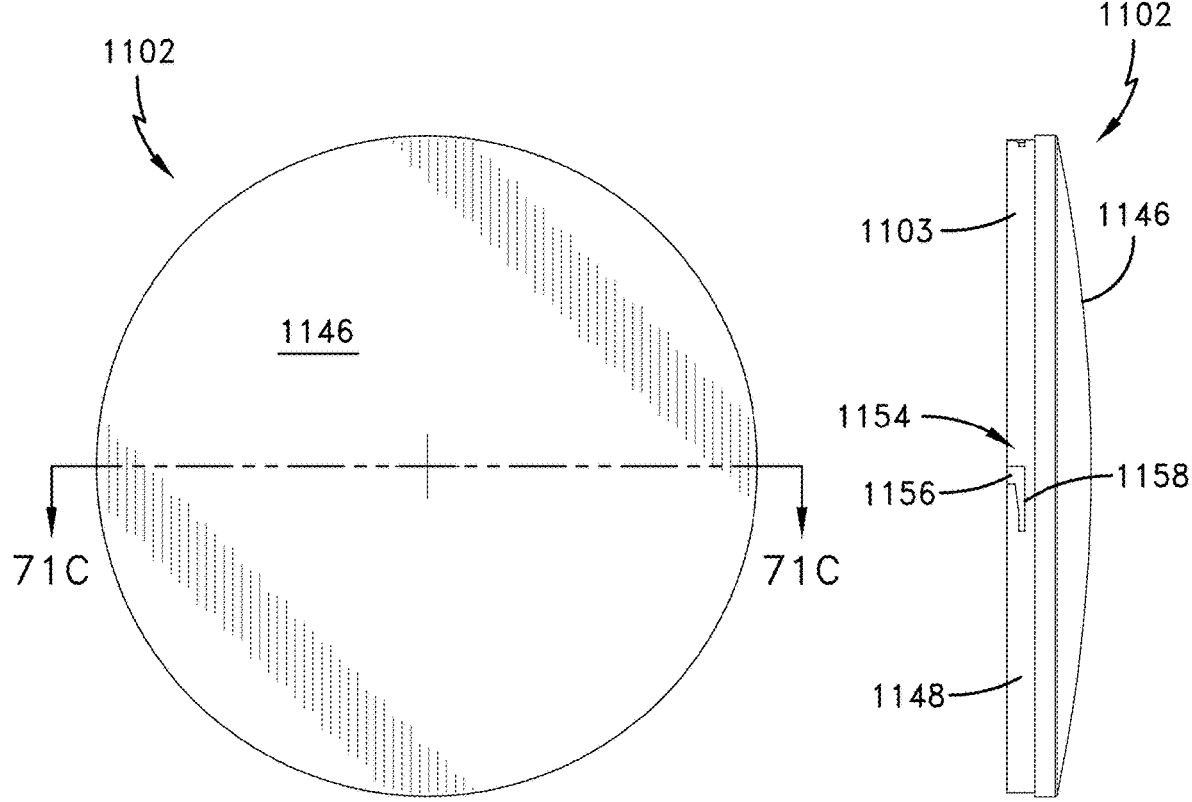
Figure 71C:
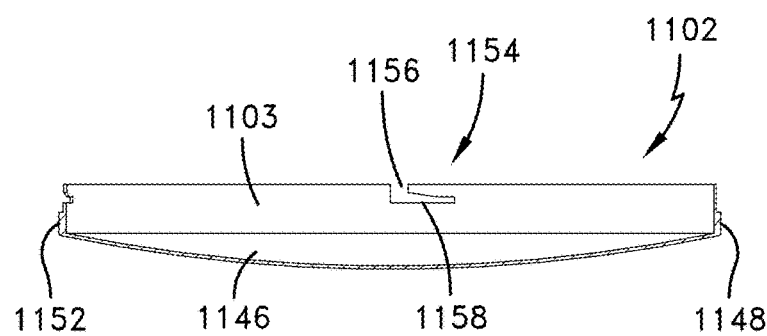

Positioned rearwardly of diffuser 1102 is a base 1104. Base 1104 is shown in the exploded view of FIG. 70. Various views of diffuser 102 are shown in FIGS. 71A-71E. With particular reference to FIG. 72D of the exterior of base 1104, base 104's exterior is composed of rearward center piece 1106, a flat, annular, forwardly protruding recessed section 1108 concentric with center piece 1106, and having an outwardly disposed, raised (rearwardly extending), concentric outer annular ring or portion 1110 and an inner outer annular ring or portion 1112. Annular portions or rings 1110 and 1112 define between them an annular (forwardly extending) recess 1116 which is concentric with annular portions 1112 and 1114. With reference to FIG. 70, LED ceiling/wall-LED-light-with-nightlight 1100 includes a main light 1117 and a nightlight printed circuit board or nightlight 1120 discussed below. With respect to nightlight 1120, a transmittance mask 1122 as installed, is shown in FIG. 68. Transmittance mask 1122 is shown in FIG. 69 as being installed in the direction of imaginary arrows A rearwardly of and superimposed on an LED nightlight printed circuit board 1127. A transmittance mask is used to increase the transmittance of light through the mask to improve the luminous efficiency of the LED nightlight.

Referring to FIG. 70, diffuser or lens 1102 is the forward-most component of LED ceiling/wall-light-with-nightlight 1100. Base 1104 is the next rearward component (there are other components located between diffuser 1102 and base 1104), and an optical lens 1126 for functioning in conjunction with LED main light printed circuit board 1124 is on the forward part of base 1104.

Main light 1118 is composed of main light printed circuit board 1124 having mounted thereon a set of main light LEDs 1125. Main light LEDs 1125 provide the main illumination (as distinguished from the LED nightlight illumination discussed below). Optical lens 1126 is in forward close proximity to printed circuit board 1124. Optical lens 1126 and main light printed circuit board 1124 are each U-shaped. A driver box 1128 is positioned in a gap 1130 between parallel legs 1132 of main light printed circuit board 1124 and a gap 1134 in optical lens 1126. Driver box 1128 contains electrical circuit components for main light 1118. Legs 1132 can be configured to accommodate center piece 1106 of base 1104 as discussed below.

Base 1104 is rearward of and attachable to diffuser 1102. Base 1104 and diffuser 1102 define a cavity 1136 in which each of optical lens 1126, LED printed circuit board 1124, and driver box 1128 are located. Cavity 1136 is indicated in FIG. 70. A wiring cap 1138 and screws 1140 and 1142 are also shown in FIG. 70.

An LED nightlight printed circuit board 1127 of nightlight 1120 is located in annular recess 1116 near inner annular ring 1110 and outer annular ring 1112 of base 1104, as shown most clearly in FIG. 69. Nightlight 1120 includes a set of equiangularly disposed nightlight LEDs 1144 as illustrated in FIG. 69. Transmittance mask 1122 for nightlight 1120 is located in recess 1116 rearwardly of and overlying LED nightlight 1120.

Turning to FIGS. 71A-71D, diffuser 1102 includes cylindrical outer wall 1103 of a forwardly bowed diffuser piece 1146. Cylindrical outer wall 1103 is further composed of a rearward cylindrical wall portion 1148 and a forward wall portion 1150. A pair of opposing notches 1154 is located in cylindrical outer wall 1103. Notches 1154 have an open end 1156 at their rearward end portion and a peripheral open portion 1158 extending from open end 1156 for receiving a latching device as explained below. Notches 1154 enable the attachment and detachment of diffuser 1102 from base 1104 as discussed hereinafter.

Figure 72A:
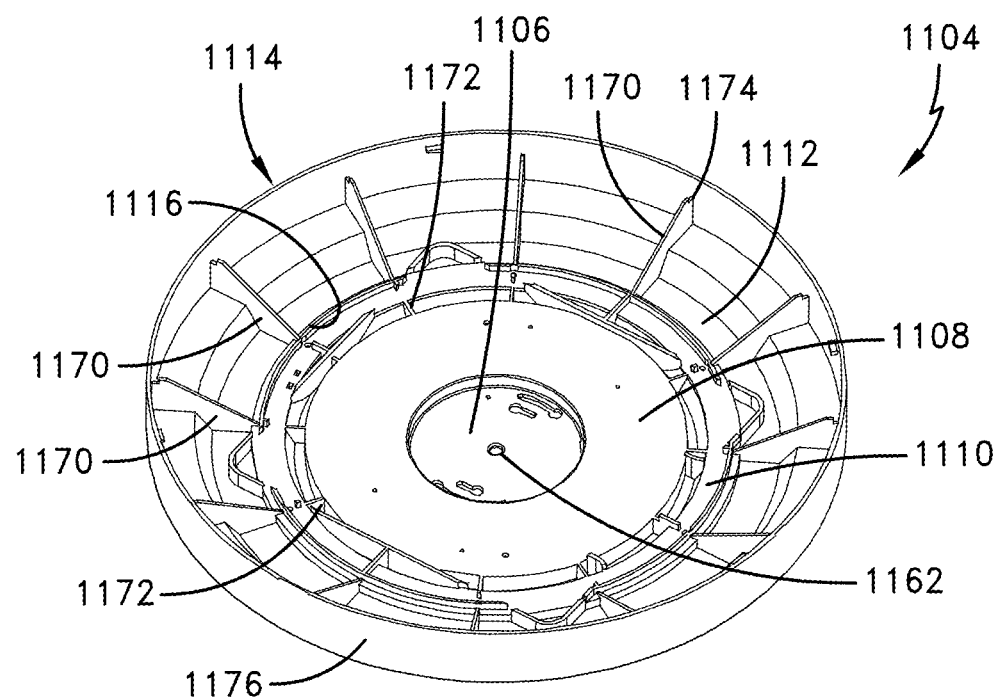
FIGS. 72A-72E are, respectively, a perspective view, front plan view, a side view, a rear plan view and a cross-sectional view of a base taken in the direction of arrows 72E-72E in FIG. 72D, of the base incorporated in the apparatus pursuant to this embodiment of the invention shown in FIG. 70.
Figure 72B:
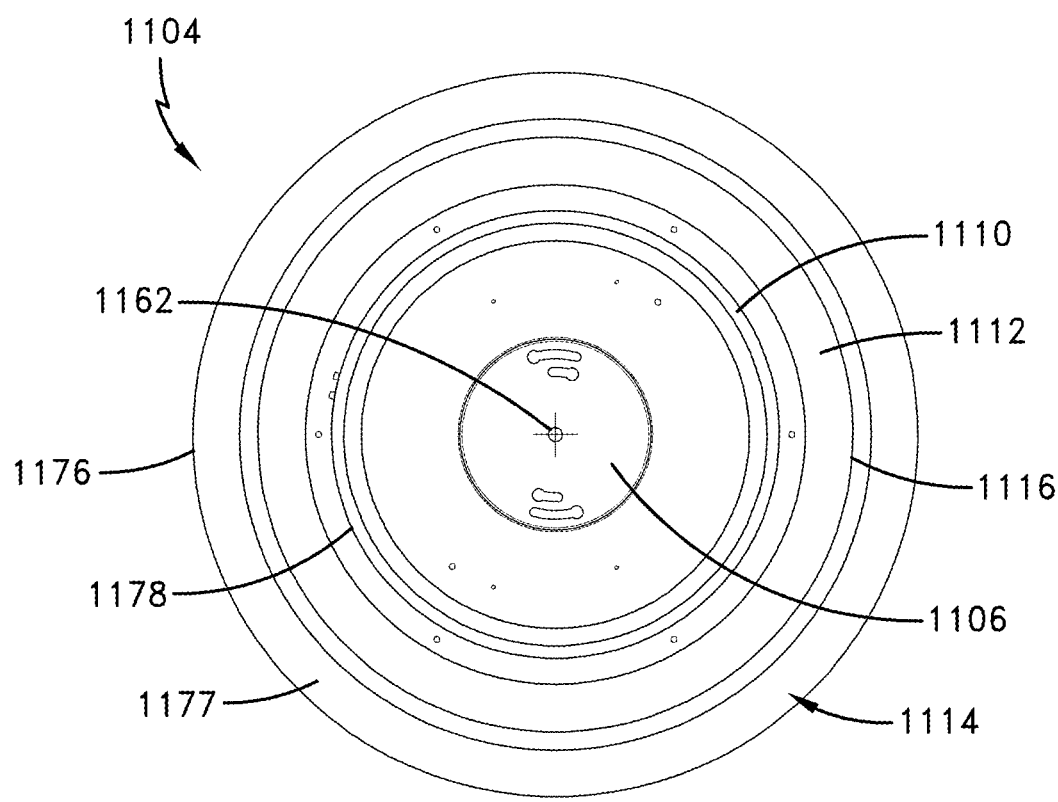
Figure 72E:
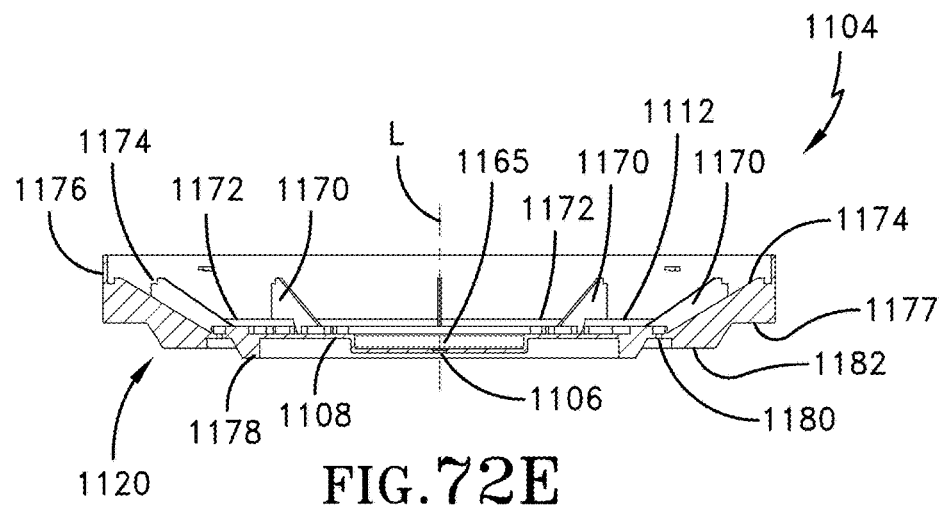
Figures 72C, 72D:
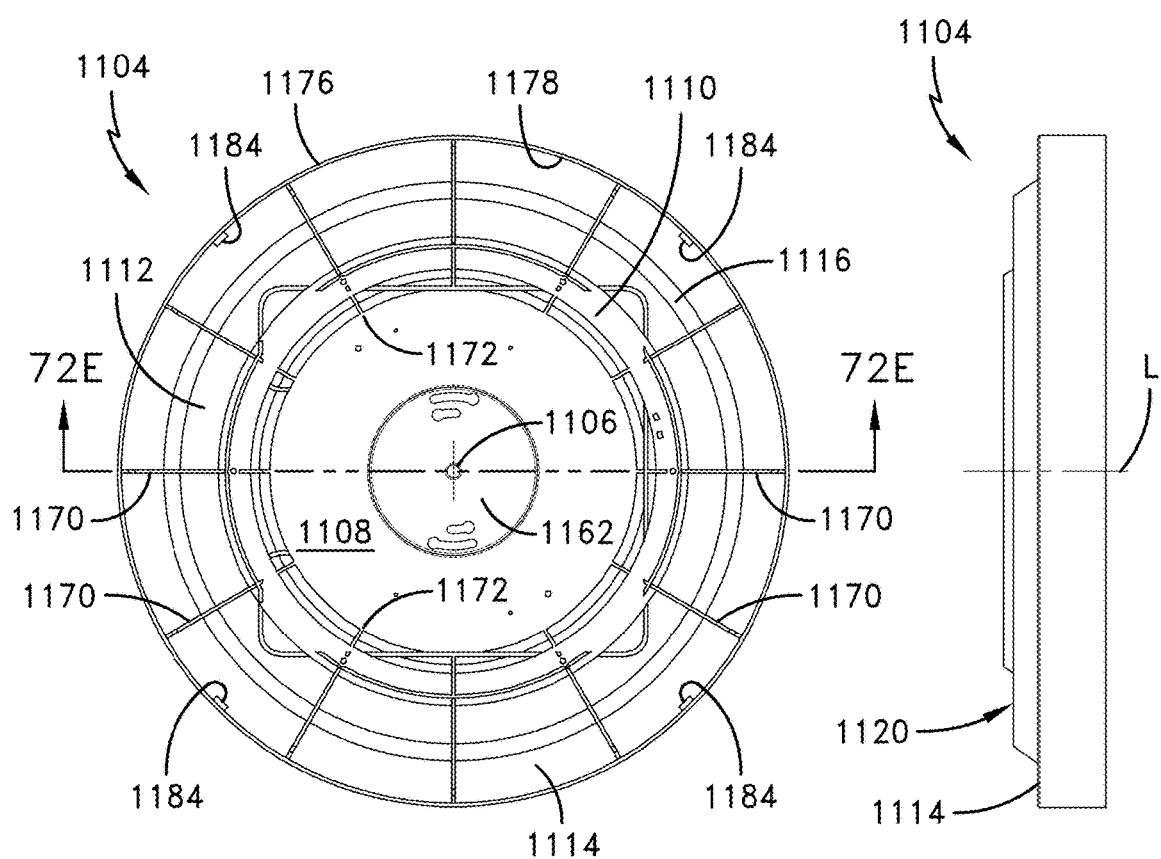

FIGS. 70 and 72A-72E illustrate base 1104. FIG. 72A is a perspective view of the interior of base 1104, revealing rearwardly extending center piece 1106 (base 1104 is shown in its inverted position), flat annular recessed section 1108, outer annular portion 1110, and inner annular portion 1112 The interior of base 1104 is shown in FIGS. 72A, 72D and 72E. Rearward center piece 1106 is flat and is concentric with a center point 1165 through which extend an imaginary longitudinal central axis L of base 1104, as well as of LED ceiling/wall-light-with-LED-nightlight 1100, extends. Base 1104 further includes flat annular recess 1116 having as its center, center point 1165 and is concentric with rearward center piece 1106. As indicated in FIG. 72E, the bulk of base 1104 is located forwardly of flat annular recess 1116 because in FIG. 72 base 1104 is inverted from its working position. Base 1104 has components for entering notches 1154 of diffuser 1102 through their respective notches 1154 to releasably secure diffuser 1102 to base 1104.

Base 1104 is generally the shape of a spherical segment as indicated in FIG. 72A. Base 1104 further includes a set of nine, radially extending, generally triangular in shape, flanges 1170. Each of flanges 1170 extends between a point 1172 at an innermost annular portion and an outer end portion 1174. The outermost part of base 1104 is an outer peripheral wall 1176 that is concentric with the longitudinal central axis L of base 1104. Base 1104 has a flat annular rim 1177 (FIG. 72B) which is proximal the ceiling or wall when LED-ceiling/wall-light-with-LED-nightlight 1100 is installed on a ceiling or wall. An annular recess 1180 (FIG. 72E) is located between an annular ring 1178 and a flat annular portion 1182. A set of four protruding tabs 1184 are provided, two of which enter notches 1154 in diffuser 1102 to releasably secure diffuser 1102 to base 1104.

FIG. 73A-73D illustrate in detail optical lens 1126 of LED-ceiling/wall-light-with-LED-nightlight 1100. Optical lens 1126 has parallel legs 1186, 1187 which depend from an end crosspiece 1188. Gap 1130 is located between legs 1186 of optical lens 1126. Optical lens 1126 includes a series of individual optical lenses 1190 disposed along the full length of each of legs 1186, 1187 and partly into crosspiece 1188 according to a preferred embodiment of the invention. Gap 1130 could be configured to accommodate an item or a recess in base 1104 if such would require the widening of gap 1130 between legs 1186, 1187. The opposing portions of legs 1186, 1187 could have rounded spaces to accommodate the recess formed by rearward center piece 1106 of base 1104.

Figures 73A, 73B:
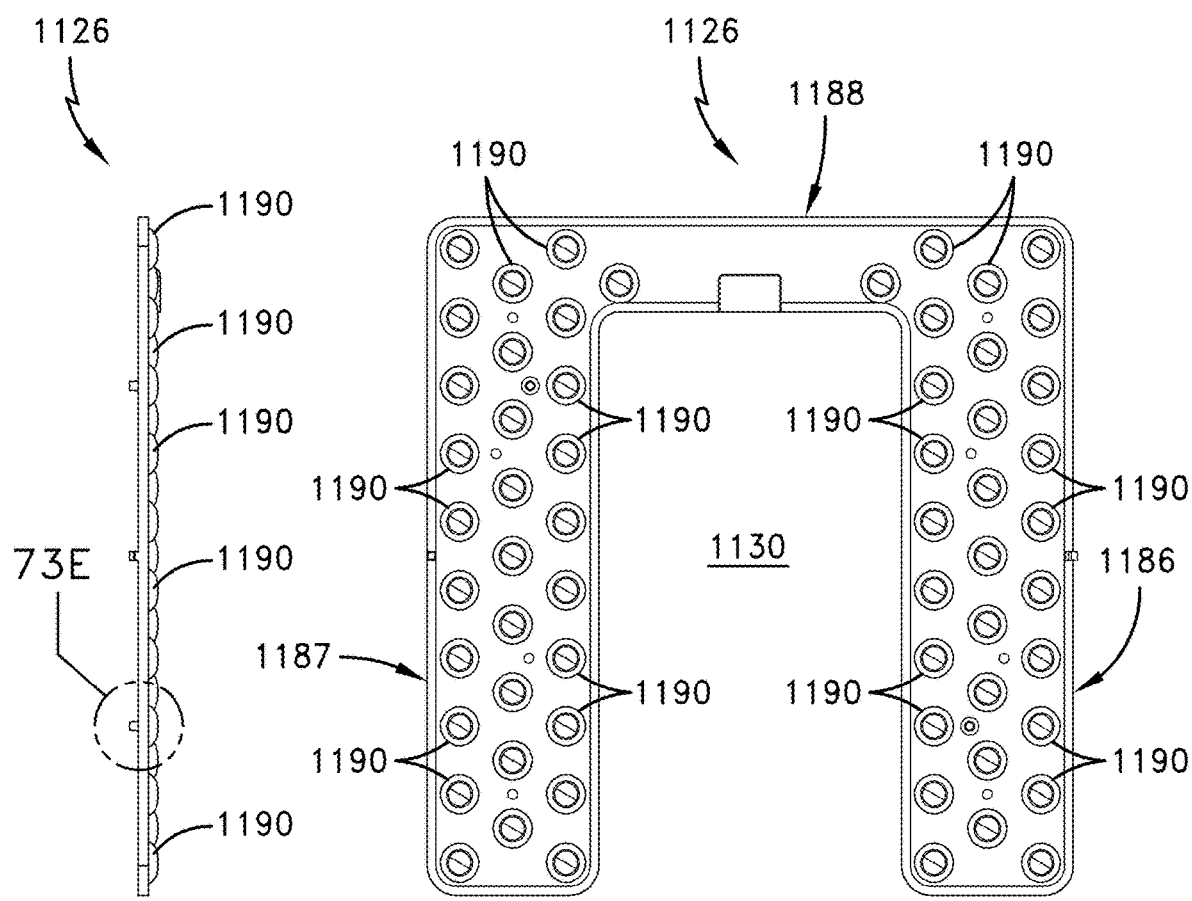
FIGS. 73A-73E are, respectively, a bottom plan view, a side view, an exterior plan view, another side view and a detailed view of an optical lens shown in the phantom circle marked 73E in FIG. 73B, the lens being incorporated in the apparatus shown in this embodiment of the invention illustrated in FIG. 70.
Figure 73D:
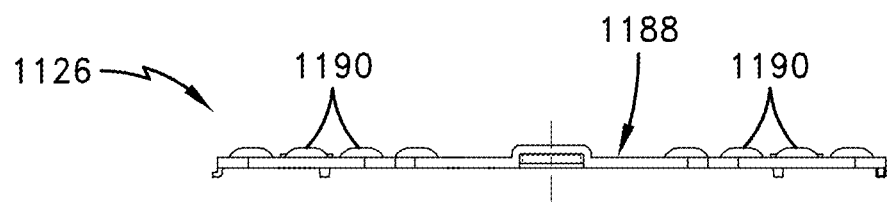
Figure 73C:
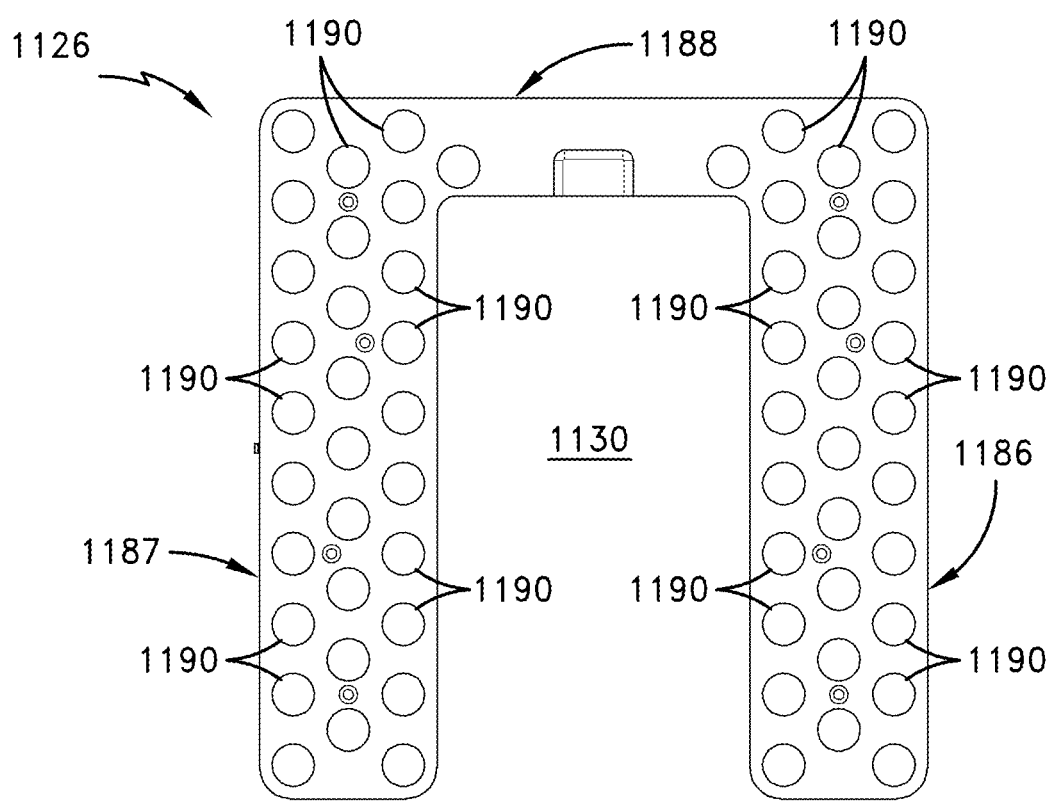
Figure 73E:
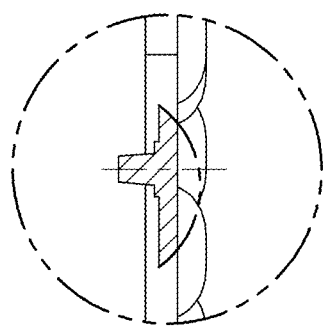

A detailed of a part of main light optical lens 1126 is shown in FIG. 73E. Individual main light optical lenses 1190 transmit light emitted by LEDs 1125 through diffuser 1102. Each main light optical lens 1190 is so configured.

Figure 74A:
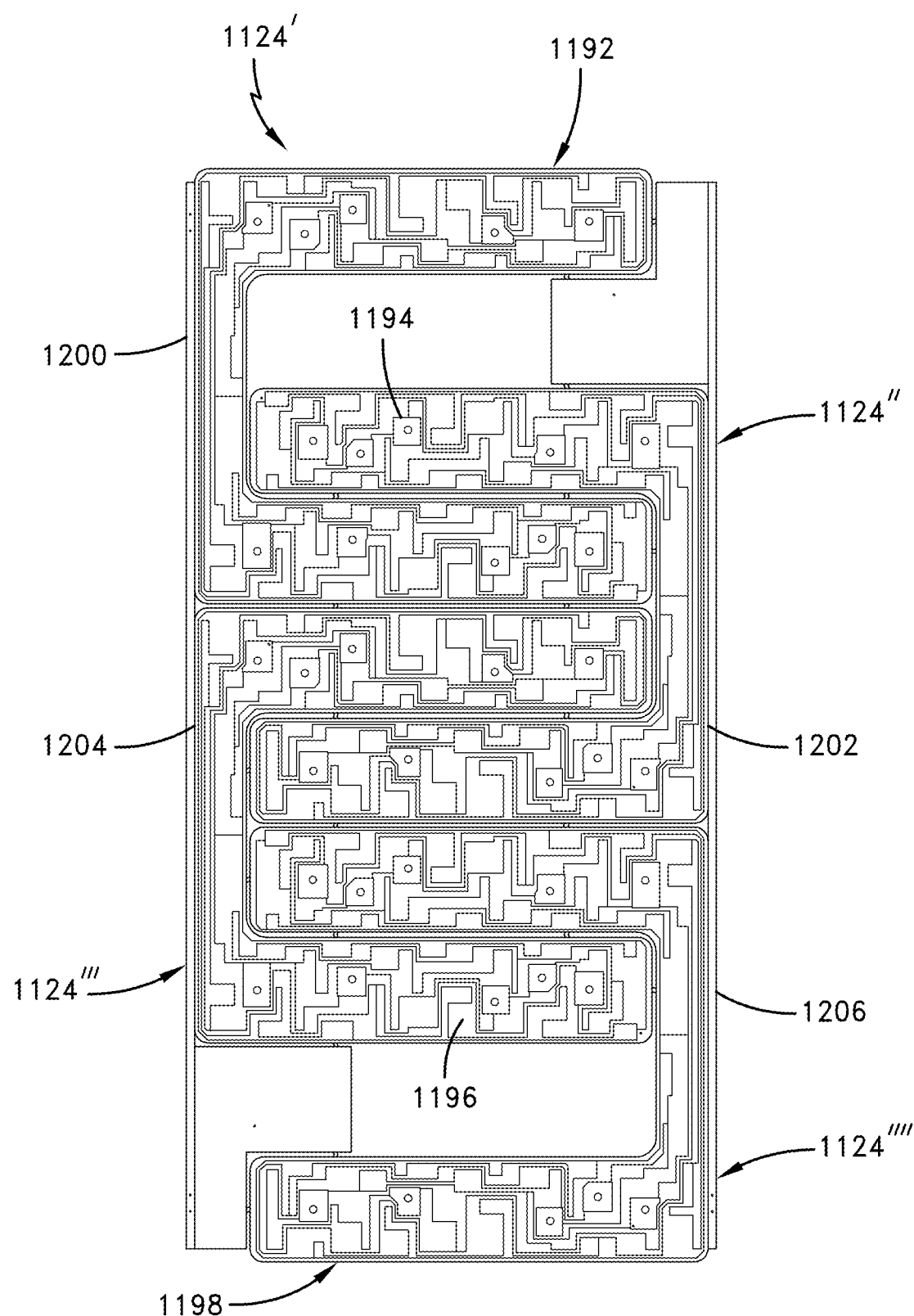
FIG. 74A-74B are, respectively, a plan view of a series of printed circuit boards, and a plan view of an individual printed circuit board for incorporation in the apparatus shown in the embodiment of the invention illustrated in FIG. 70.

FIG. 74A illustrates an alternative surface main light printed circuit board assembly 1124 composed of four intertwined main light printed circuit boards 1124', 1124", 1124''', 1124'''' with electronics for LED-ceiling/wall-light-with-LED-nightlight 1100. Main light printed circuit boards 1124', 1124", 1124''', 1124'''' have respective pairs of legs 1192, 1194, 1196, 1198. Main light printed circuit boards 1124', 1124", 1124''', 1124'''' have respective cross pieces 1200, 1202, 1204 and 1206. Main light printed circuit boards 1124', 1124", 1124''', 1124'''' are interlocked for compactness as shown in FIG. 74A to significantly reduce the space used by main light printed circuit boards 1124', 1124", 1124''', 1124''''.

Figure 74B:
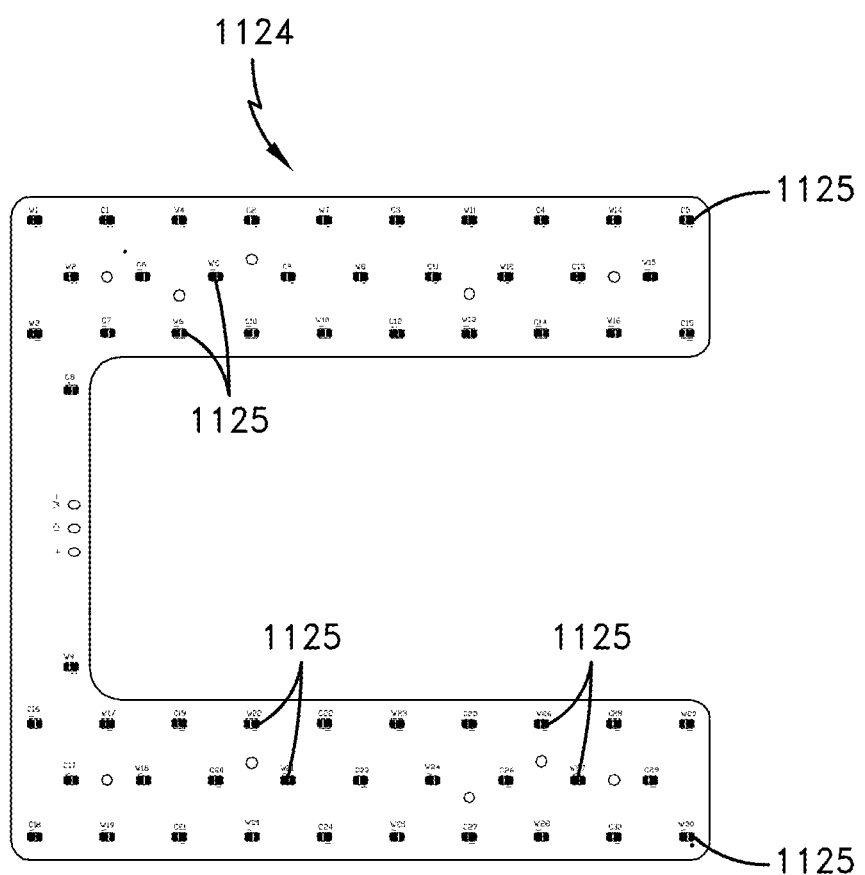
Figure 75A:
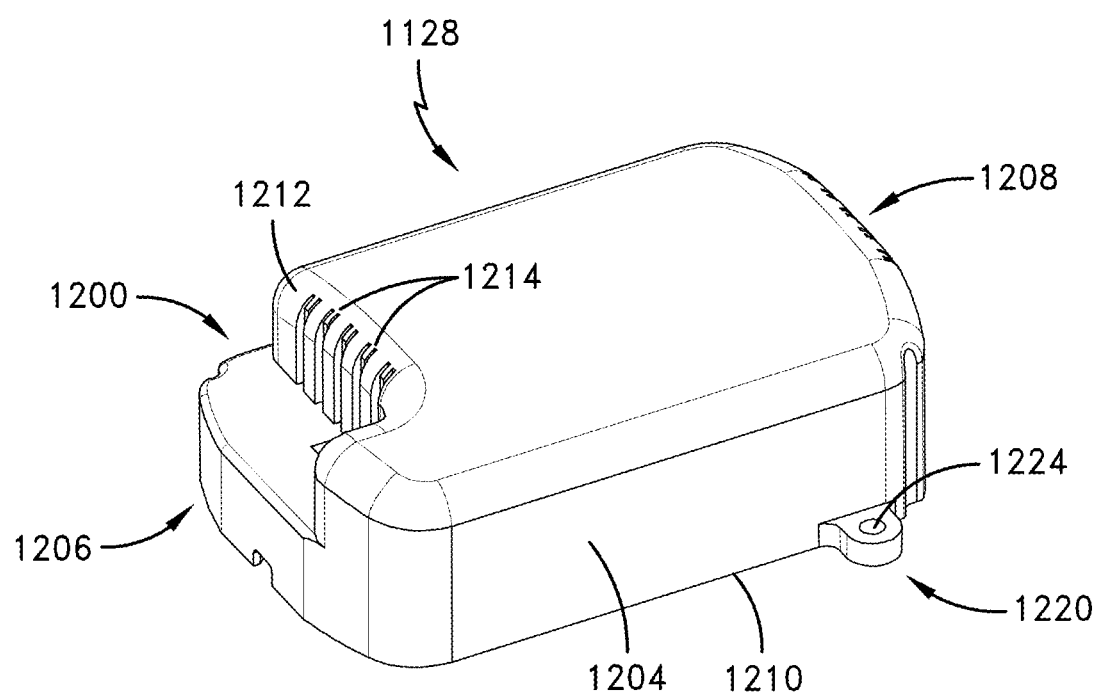

FIG. 74B illustrates main light printed circuit board 1124 on which are mounted LEDs 1125. FIG. 74A shows main light printed circuit boards 1124', 1124", 1124''', 1124'''' with LEDs mounted thereon.

FIGS. 75A-75D illustrate driver box 1128. Driver box 1128 is made of a hard plastic composition, and includes a forward-facing cover 1200, opposing side walls 1202 and 1204, an end wall 1206 and an opposing end wall 1208. Cover 1200 rests on a forward end of each of walls 1202, 1204. Driver box 1128 further includes a rearwardly disposed bottom wall 1210. End wall 1206 includes an indented portion 1212 having a set of parallel grooves 1214. Likewise, opposite end wall 1208 has a centrally disposed parallel grooves 1216. Tabs 1218 and 1220 have screw holes 1222 and 1224, respectively, for attaching driver box 1128 to base 1104. Driver box 1128 holds electronics for at least supplying electric power to LEDs 1125 on main light printed circuit board 1124 and to LEDs 1144 on nightlight printed circuit board 1120.

FIGS. 76A-76D show a segment of transmittance mask 1122 of nightlight 1120. FIG. 76A is a perspective view of a third of this component, and includes a band 1230 with a pair of equally spaced side walls 1232 extending forwardly from a flat part of an annular portion 1236 to define an annular channel 1242 into which LEDs on LED nightlight printed circuit board 1127 (FIG. 70) extend. A groove 1240 in the portion of annular channel 1242 partially envelopes LEDs on LED nightlight printed circuit board 1127. A peripheral inner wall 1244 and a peripheral outer wall 1246 act as shoulders for engaging base 1104. A notch 1248 is provided on the inner interior part of transmittance mask 1122 of LED nightlight 1120 for being engaged with a corresponding band to form loop of transmittance mask 1122. Transmittance mask 1122 of nightlight 1120 transmits lumination emitted by LEDs on LED nightlight printed circuit board 1127 sideways along an outer side of transmittance mask 1122 of LED-ceiling/wall-light-with-LED-nightlight 1100.

Figure 77:
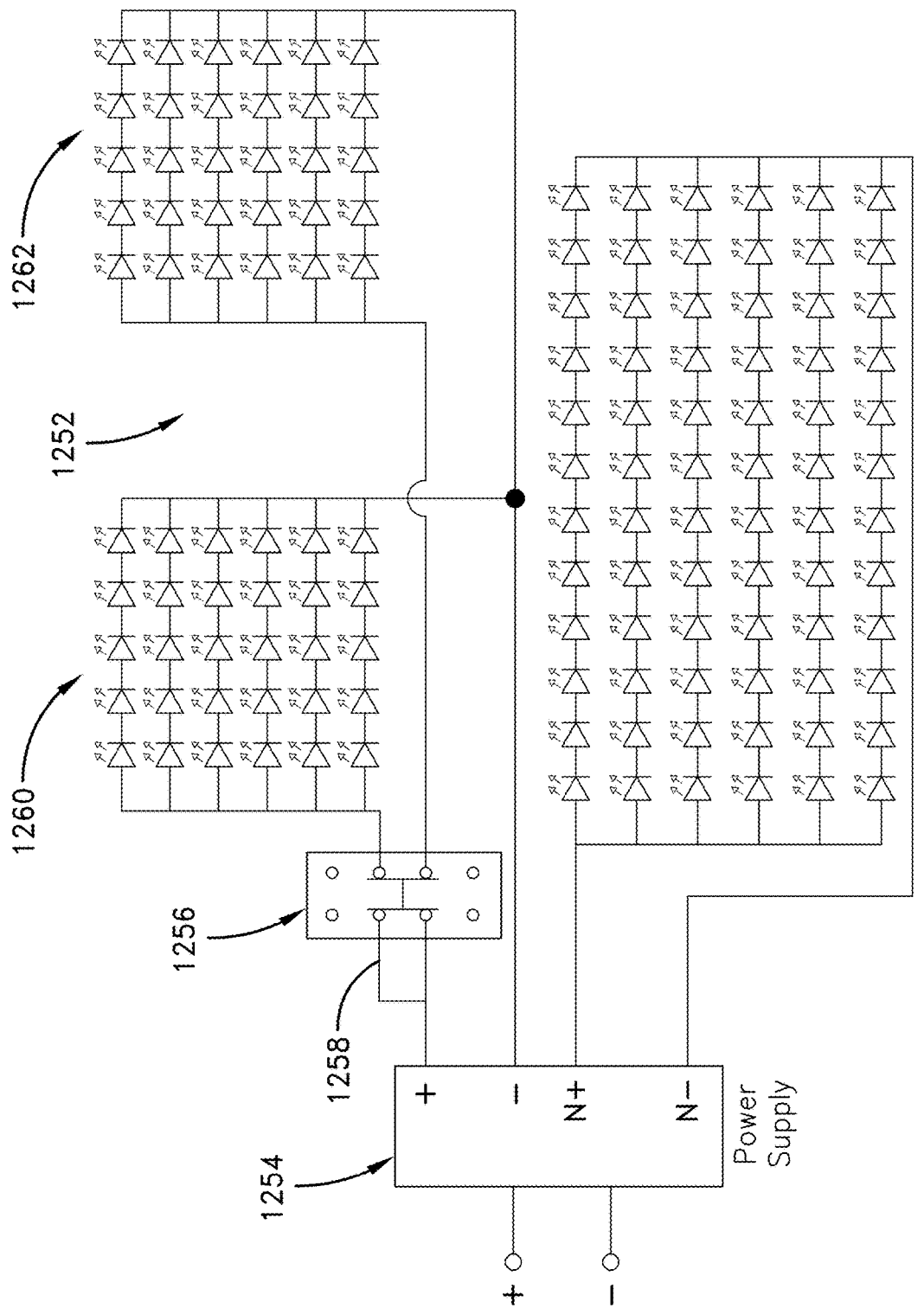
FIG. 77 is a circuit diagram of the LED circuitry incorporated in the apparatus shown in the embodiment of the invention shown in FIG. 70.

FIG. 77 is a circuit drawing for changing the CCT of main light LEDs 1126. It shows the electric circuit 1252 for LED main light 1118. Electric circuit 1252 is composed of a power supply 1254, a toggle switch 1256 with a switching device 1258, a first array 1260 of LEDs for a preselected first CCT, a second array 1262 of LEDs for preselected second CCT that is different from the CCT of first array 1260 and a third array 1264 of LEDs. Operation of electric circuit 1252 can selectively energize first array 1260 by moving switching device 1258 to its uppermost position, to selectively energize both first array 1260 of LEDs and second array 1262 of LEDs by putting toggle switch 1256 in its middle position as shown in FIG. 77, and to selectively energize third array 1264 by putting switching device 1258 in its bottom position.

Figure 78:
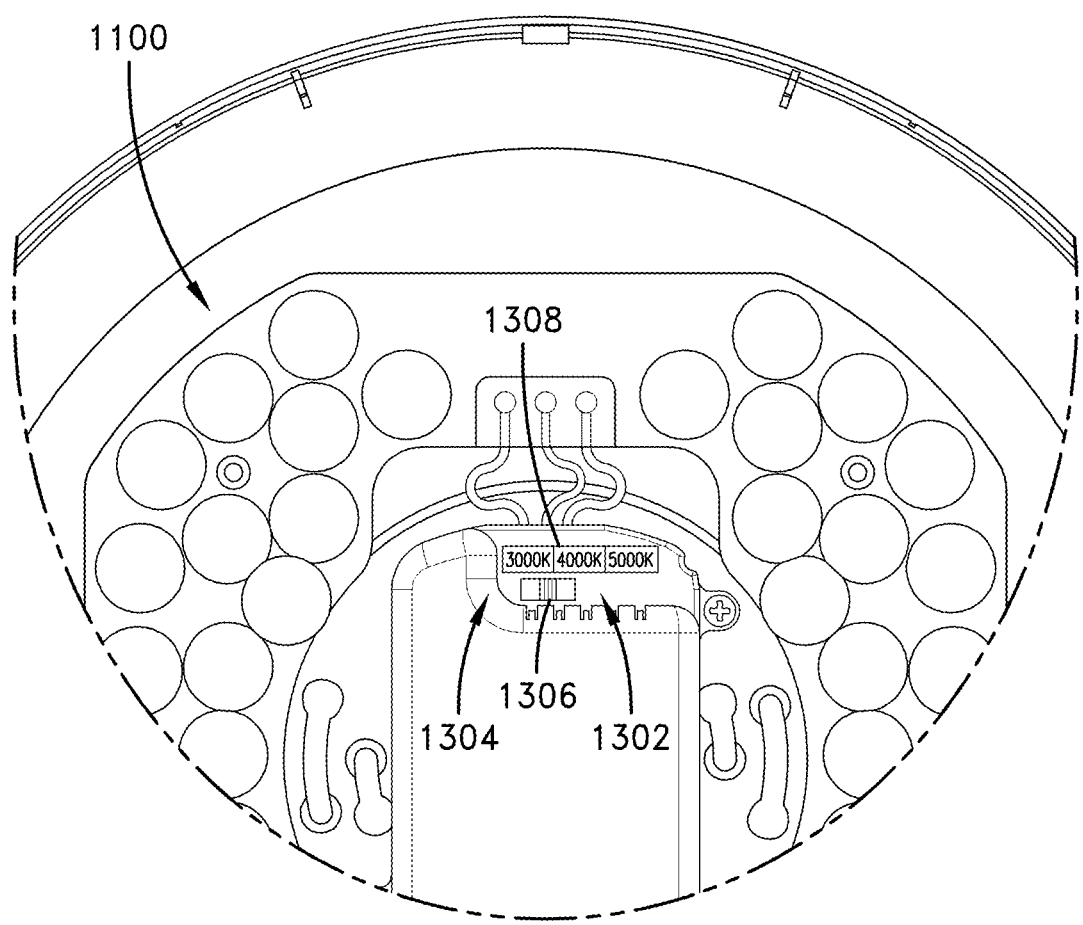
FIG. 78 is a perspective view of a portion of the apparatus for switching between several correlated color temperatures incorporated in the embodiment of the invention shown in FIG. 70.

In order to change the CCT for LED-ceiling/wall-light-with-LED-nightlight 1100 in its preferred form, it is desirable to use a manually actuable switch that is not visible nor easily accessible. This is accomplished by placing a manually accessible switching assembly in cavity 1118 that is accessible by removing diffuser 1102. FIG. 78 is a detailed view of the rear part of LED-ceiling/wall-light-with-LED-nightlight 1100 with diffuser 1102 removed. (Only three indicia legends 1308 are shown.) A manually accessible switching assembly 1304 (FIG. 79) includes a manually-operated switch 1306 that is movable according to an indicia legend 1308 to select the desired CCT. Diffuser 1102 is removed from base 1104 by twisting diffuser 1102 to remove tabs 1302 from notches 1154.

When LED-ceiling/wall-light-with-LED-nightlight 1100 is installed on a ceiling or wall for use, each of the LED ceiling/wall light and the LED nightlight 1100 has a respective electricity characteristic to cause the respective LED ceiling/wall main light LEDs 1125 and the LED nightlight LEDs 1144 to emit illumination of the respective relative high brightness and the relatively low brightness. LED-ceiling/wall-light-with-LED-nightlight 1100 incorporates electronic circuitry that responds to dimmer circuitry, which circuitry is typically incorporated is a wall switch with a manually operable dimmer switch.

Figure 79:
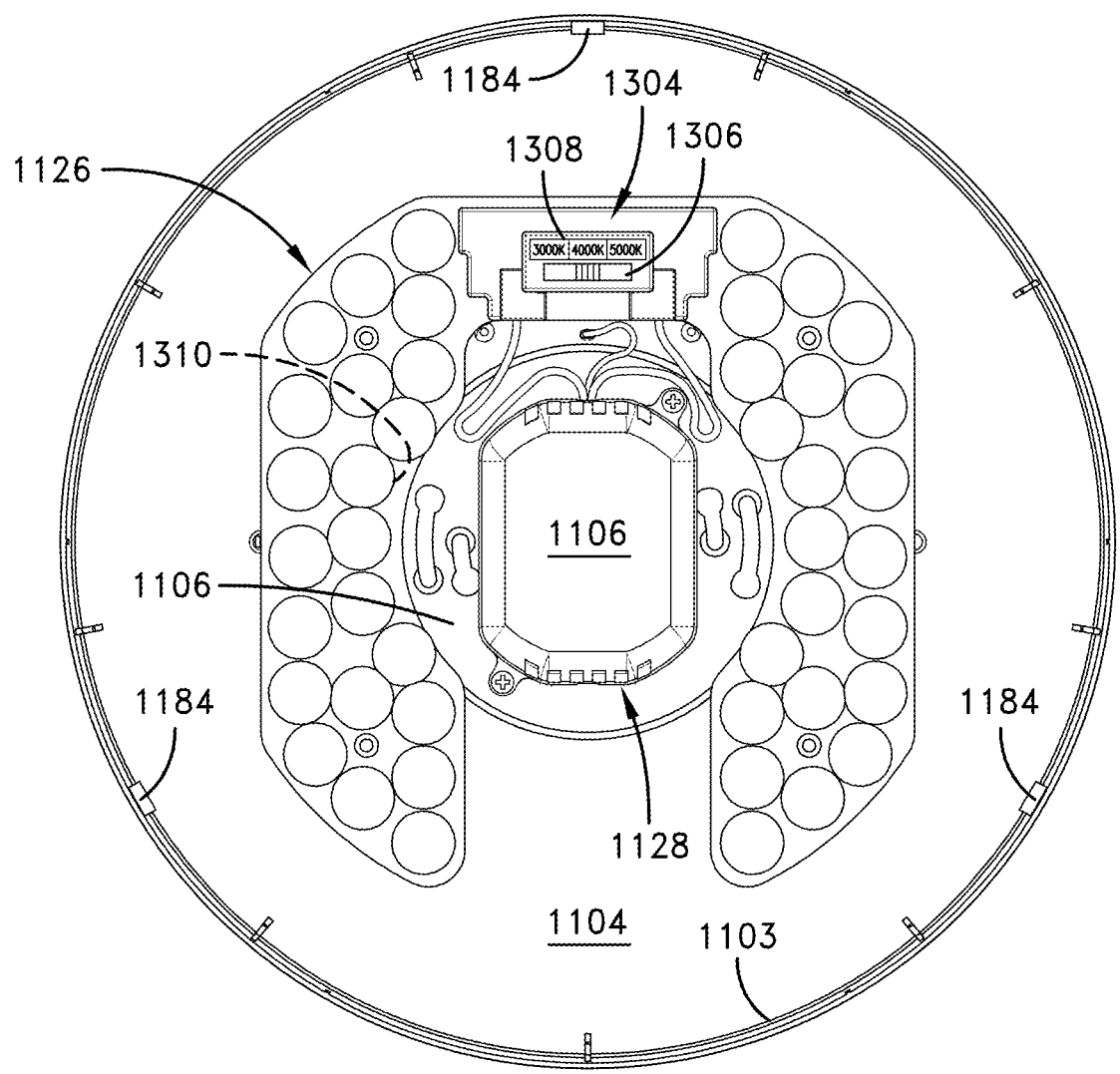
FIG. 79 is a perspective view of the interior of the apparatus shown in FIG. 70.

A flat peripheral view of base 1104 with its internal components and parts is shown in FIG. 79. Base 1104 includes its outer wall 1103 with tabs 1184. Driver box 1128 is positioned on rearward center piece 1106. Optical lens 1126 has opposing rearward depressions 1310. Manually accessible switching assembly 1304 includes manually operable switch 1306, and CCT indicia legend 1308 is observable once diffuser 1102 has been removed as shown.

Figure 80:
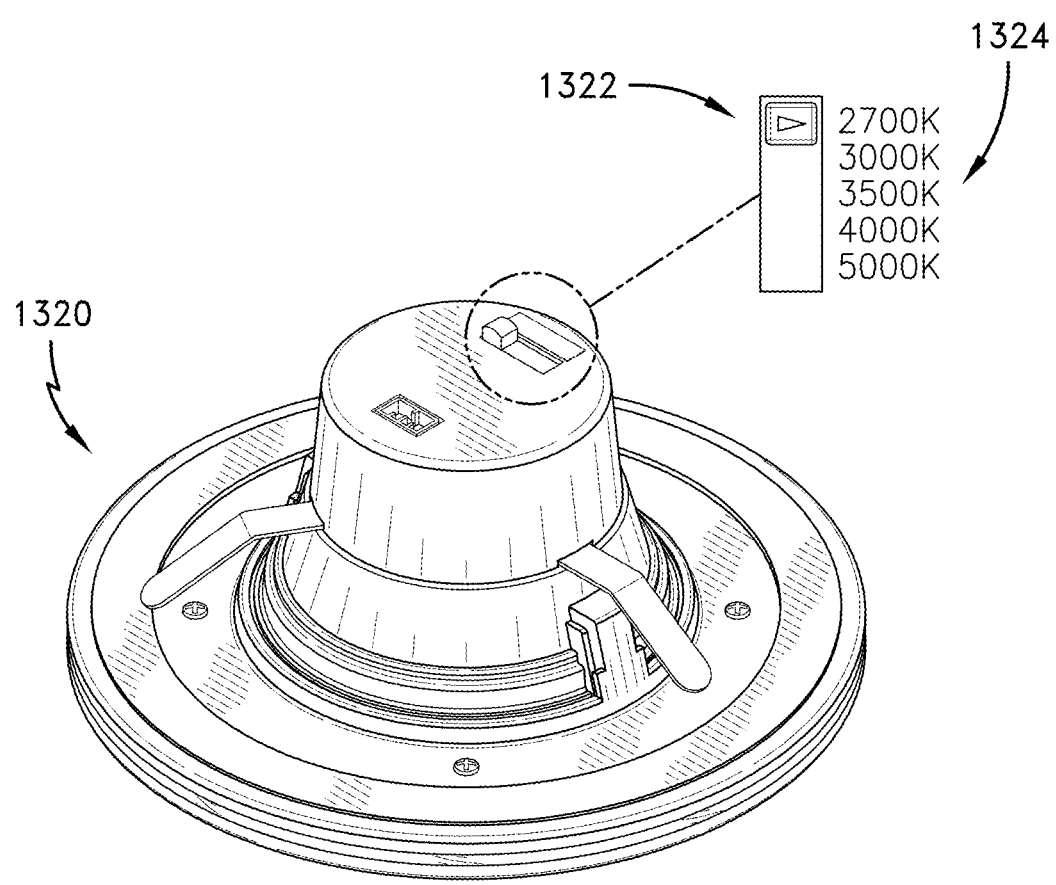
FIG. 80 is a perspective view of another downlight incorporated in the embodiment of the present invention with a detail of a switching device for selecting a variable correlated color temperature.

Another embodiment of the invention is a downlight 1320 shown in FIG. 80 having a slide switch 1322 for selecting one of five CCTs shown on an indicia legend 1324. These CCTs are 2700K, 3000K, 3500K, 4000K and 5000K.

Referring back to the embodiment shown in FIGS. 69-79, the operation of the inventive LED ceiling/wall-light-with-LED-nightlight 1100 in its preferred form is very simple. Once the inventive LED ceiling/wall light with LED nightlight 1100 is properly installed, the electronic circuitry is operated by a switch such as a conventional wall switch. When the wall switch is changed from the "off" position to the "on" position, main set of main light LEDs 1125 for the LED ceiling/wall light-with-LED-nightlight 1100 is actuated, causing the LEDs 1125 to emit illumination according to the pre-set CCT. Whenever the illumination of the nightlight is sought, the user moves the wall switch from the "on" position for activating the main set of LEDs 1125, to the off position and finally back to the on position to turn the main set of LEDs 1125 off and to actuate nightlight LEDs 1144. Nightlight 1120 can be used as an accent light for focusing light on a particular area or a particular item such as a piece of art. The switching arrangement is due to the switching circuitry connected to the wall switch and to nightlight 1120. The LED ceiling/wall light with LED nightlight 1100 pursuant to the invention also preferably includes a variable CCT capability, with the variable CCT switch being out of sight, and can be dimmed by means of a wall-mounted dimmer switch.

The present invention concepts can be used in known LED light fixtures. One area is canless downlights where the downlight does not require a canister or can to be installed operated.

Figure 81:
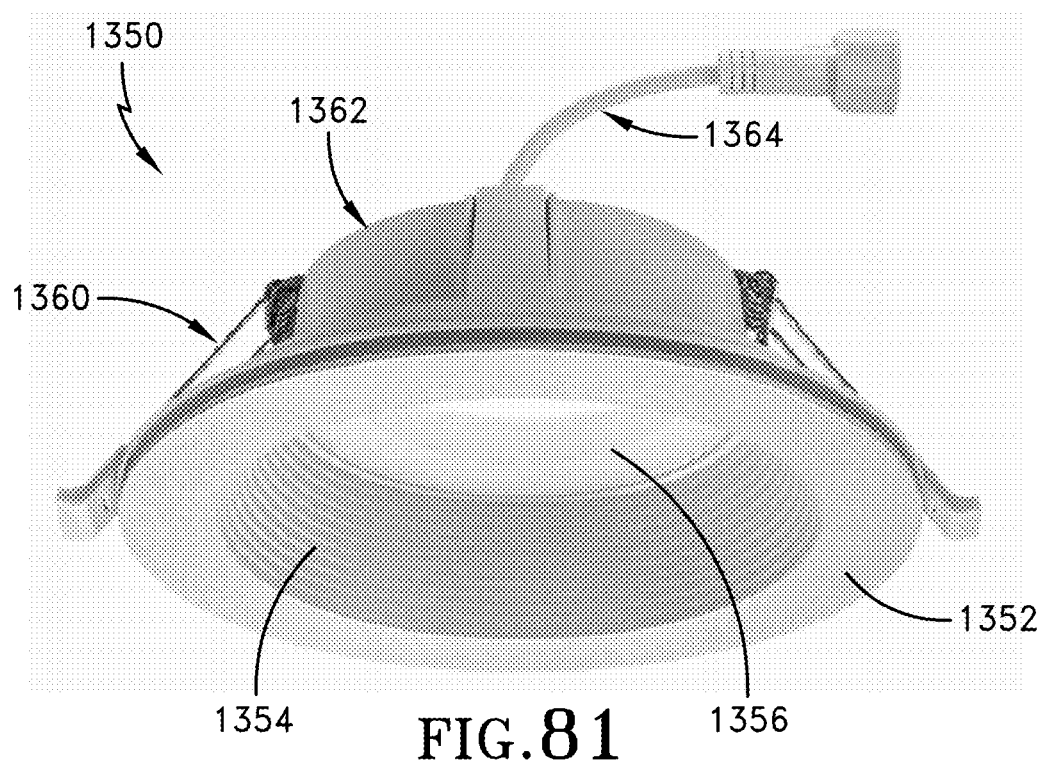
FIG. 81 is a front perspective view of a canless downlight with nightlight according to an embodiment of the present invention.

Referring first to FIG. 81, a canless downlight with a nightlight 1350 is shown as a front perspective.

Figure 82:
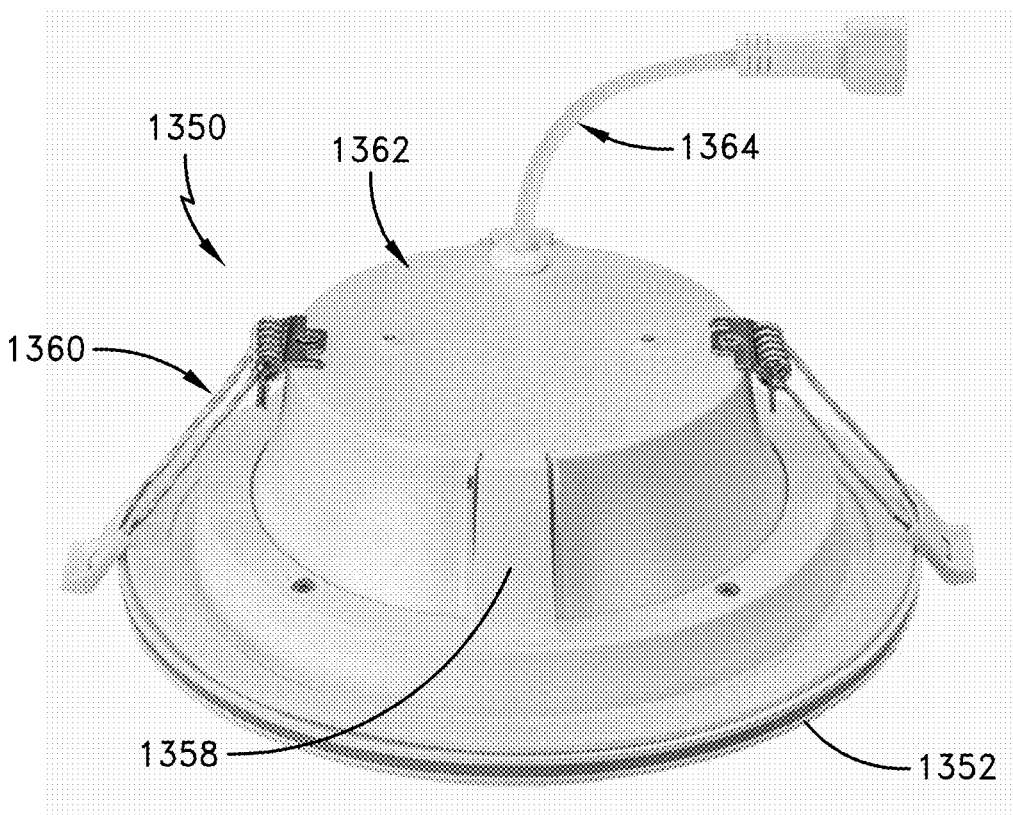
FIG. 82 is a rear perspective view of the canless downlight with nightlight shown in FIG. 81.
Figure 83:
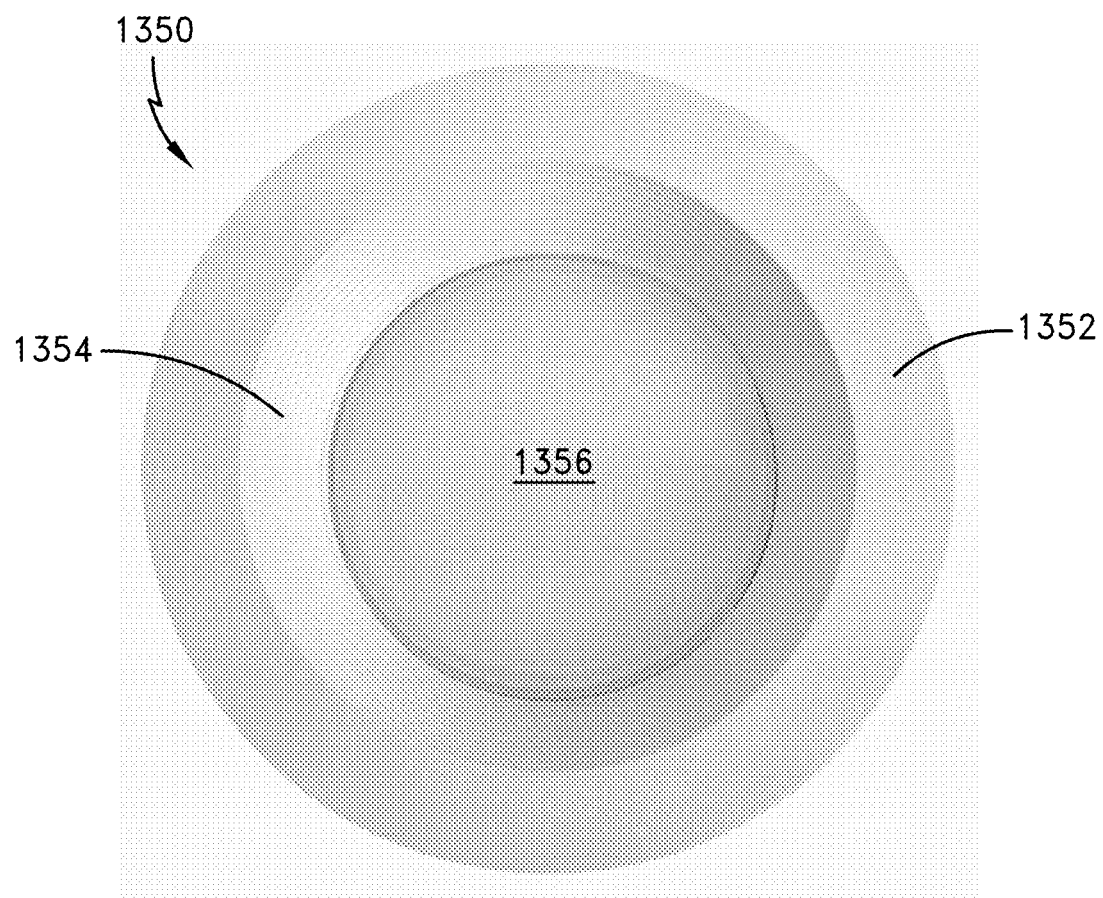
FIG. 83 is a plan view of the front of the canless downlight with nightlight shown in FIGS. 81 and 82.

Canless downlight with nightlight 1350 is also shown as a rear perspective in FIG. 82. FIGS. 81-89 show some of the respective components of canless downlight with nightlight 1350 in finished form as including horizontal ring 1352, outwardly flared baffle 1354, diffuser 1356, flange 1358, spring assembly 1360, heat sink 1362, and male plug assembly 1364.

Figure 84:
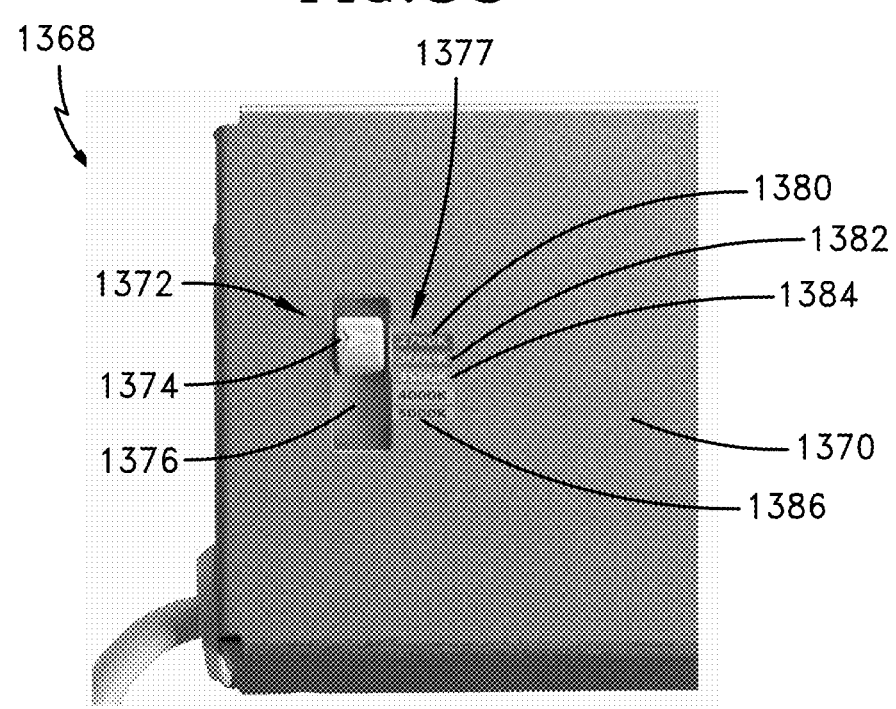
FIG. 84 is a front perspective view of a switch for controlling the CCT of the canless downlight with nightlight shown in FIGS. 81-83.
Figure 85:
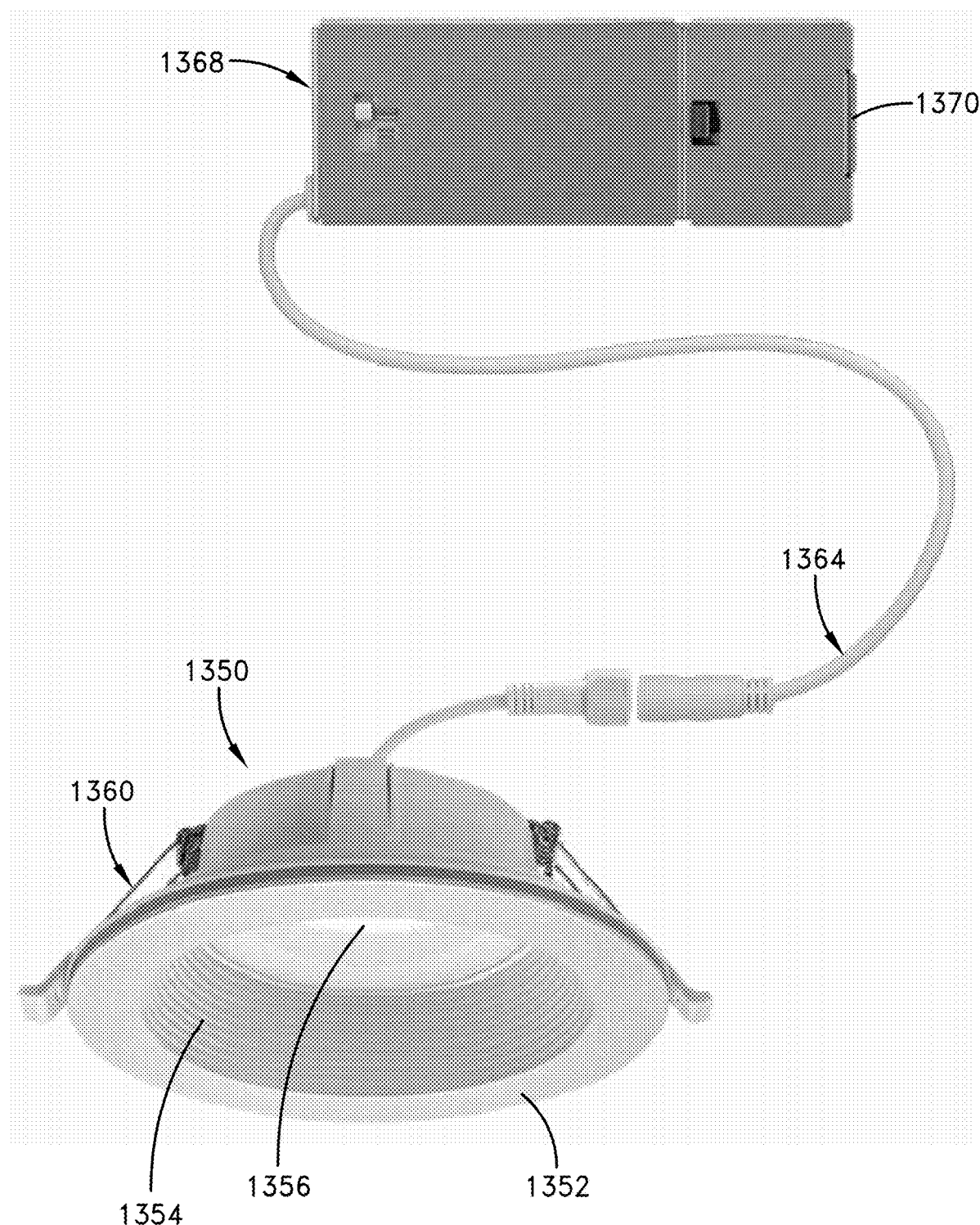
FIGS. 85 and 86 are perspective views of the canless downlight with nightlight attached to a switch for varying the CCT shown in FIGS. 81-83.
Figure 86:
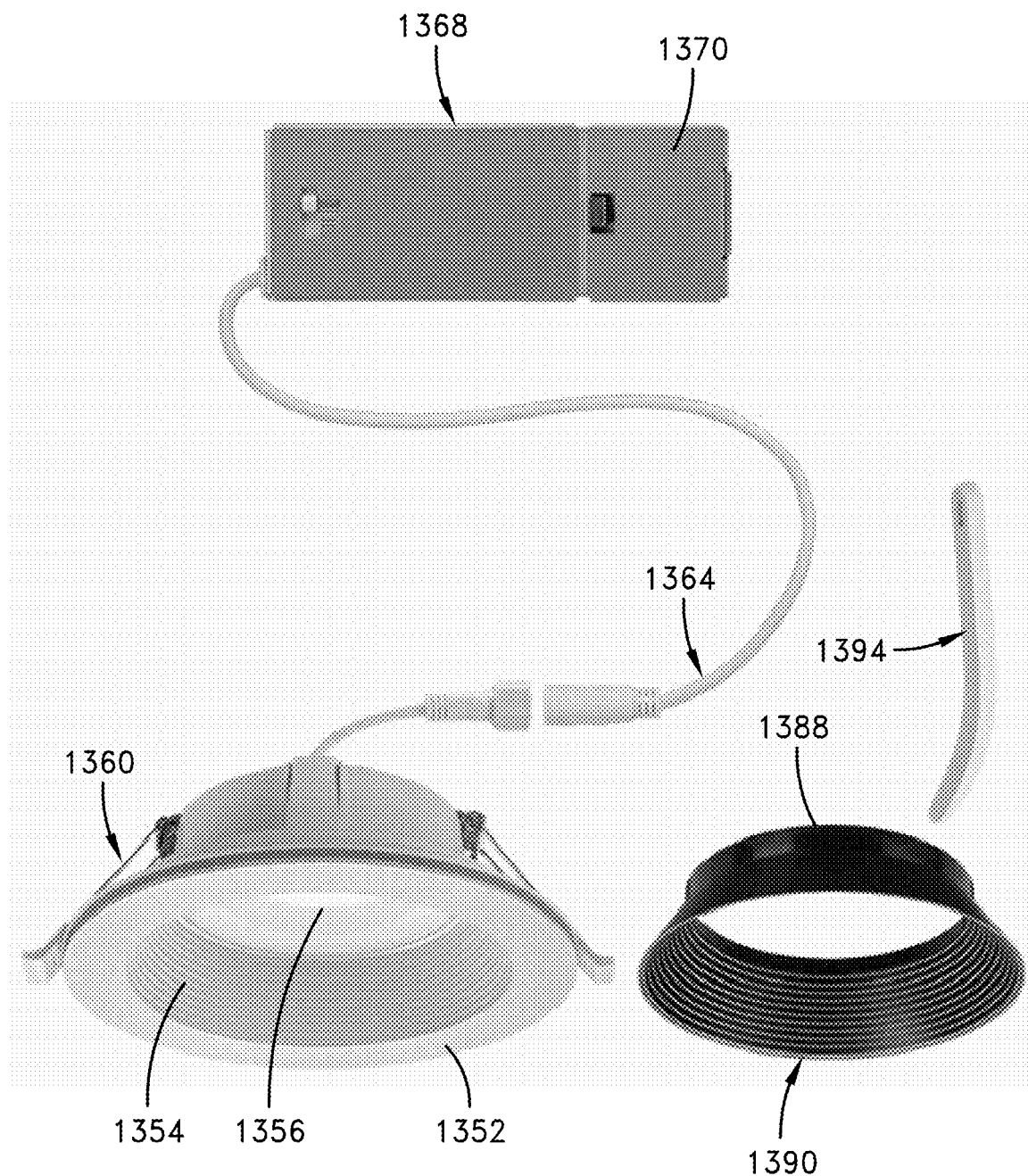
Figure 87:
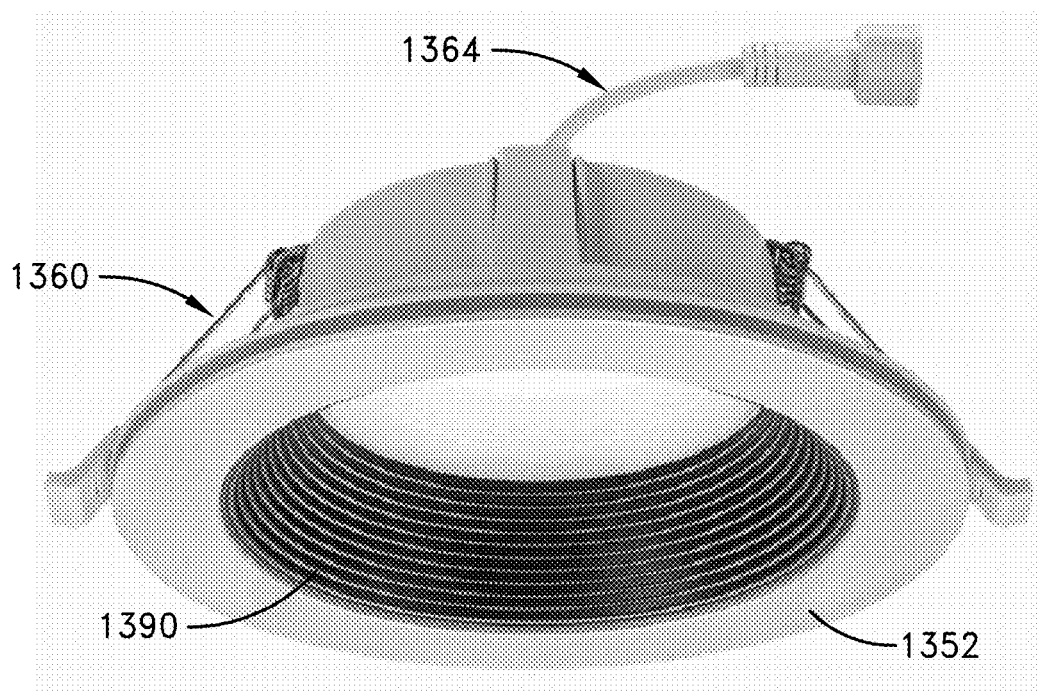
FIG. 87 is a perspective view of a canless downlight with nightlight having a black baffle.
Figure 88:
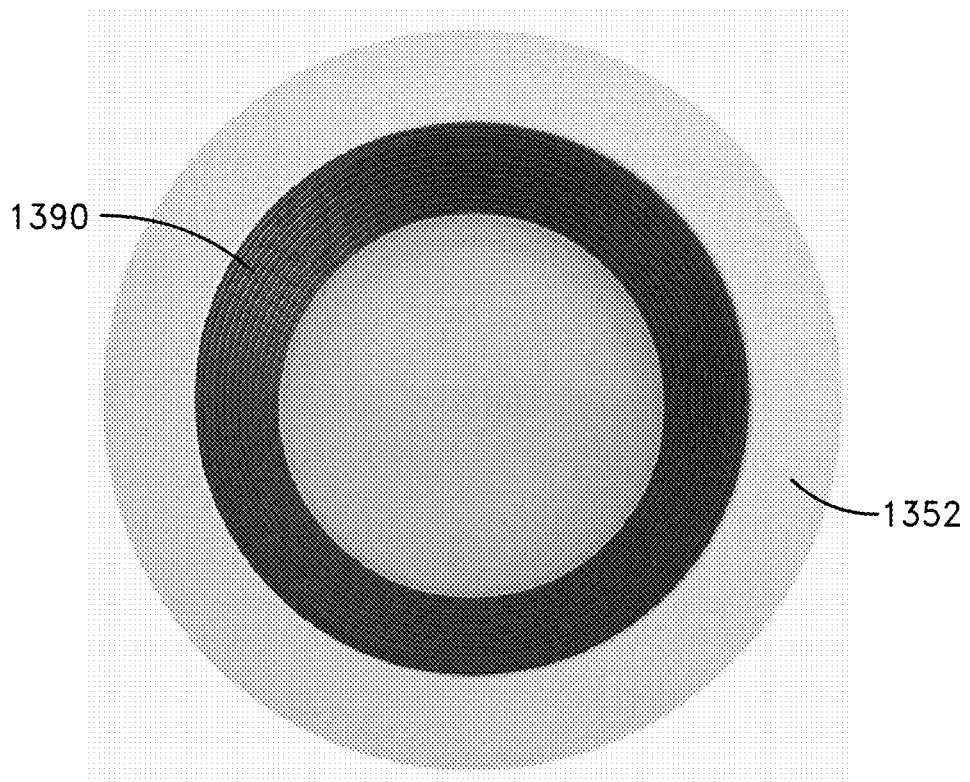
FIG. 88 is a front view of the canless downlight with nightlight shown in FIG. 87.
Figure 89:
FIG. 89 is a perspective view of the baffle incorporated in FIGS. 87-88.

A canless downlight with nightlight correlated color temperature (CCT) switch assembly 1368 is shown in FIGS. 84, 85 and 86. Canless downlight with nightlight 1350 incorporates variable correlated color temperature ("CCT"), wherein the CCT can be changed by the movement of a simple switch. Referring to FIG. 84, a CCT assembly 1368 is shown. CCT assembly 1368 includes a container 1370 for containing, among other things, the circuitry for changing the CCT and a switch for controlling the circuitry to make the desired change in the CCT. Accordingly, a switch assembly 1372 includes a finger-operated slide switch 1374 which is movable in a slot 1377 between various CCT values, shown on a CCT value chart 1376 having values printed thereon in accordance with various colors, indicative of the respective values on them. Thus, CCT 2700K could be on a red designation 1380, 3000K could be on an orange designation 1382, 3500K could be on a yellow valuation 1384, and 5000K could be on a blue designation 1386. Many other values could be use, such as 4000K. Canless downlight 1350 is attached to CCT switch assembly 1368 by means of power cord 1364 as shown in FIG. 85, which can be electrically coupled to an appropriate terminal of a power supply.

Figure 90:
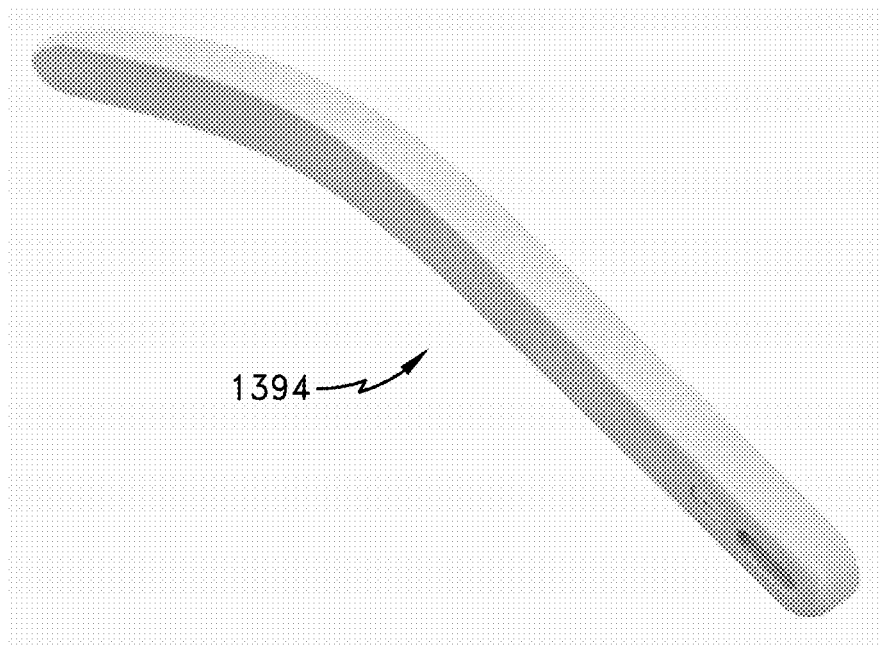
FIG. 90 is a perspective view of a crowbar for removing a baffle shown in each of FIGS. 81-83 and 85-88.

The fixtures shown so far include outwardly flared baffle 1354, which as shown as having a white color. A deep flared stepped baffle 1390 is shown in each of FIGS. 86-89, Baffle 1390 is composed of a cylindrical base portion 1388 from which extends an outwardly flared portion 1392. Baffle 1390 is deeper than baffle 1354 and can concentrate the illumination emitted by canless downlight with nightlight 1350. Baffles 1354 and 1390 can be interchanged by virtue of a crowbar 1394 shown in FIG. 90 which can be inserted in the transition between cylindrical base portion 1388 and flared portion 1392 of baffle 1390.

Just as the CCT can be varied for the main light LED lighting arrangement described above, the same provision can be employed for the respective nightlights incorporated in the present invention. The CCT of the respective nightlight can be varied using the same basic electrical circuitry as used for varying the CCT of the respective LED main lights with downlight a described above. It can be used for varying the CCT nightlights and accent lights as discussed herein.

The LED ceiling/wall-light-with-LED-nightlight 1100 provided herein can be used in conjunction with numerous light fixtures for residence homes and apartments, hotel rooms, hallways of many sorts, stairways, small or large spaces and the like. Some specific types of lighting fixtures are downlights, wall sconces; undercabinet lighting such as undercabinet lighting fixtures employed in kitchens, bathrooms, workshops, cabinets used on boats, trailers, aircraft, etc.; outdoor lighting including verandas, gardens, camping areas, porches, garages and the like. Flushmounts including the LED ceiling/wall lights with nightlight as discussed herein, and LED light fixtures that can be mounted using such mounting methods as J-boxes, recessed cans, and other types of LED light fixtures, such as boxless LED recessed lighting and other LED light fixtures including those operated by wall switches that are of inner switches which can be used in a nightlight mode.

There are other lighting devices with primary or main sources of illumination which can be combined with secondary sources of illumination such as nightlights (accent lights), secondary lights directed in a specific direction such as along a ceiling, a wall, a surface going a direction other than vertically or horizontally such as a tilted ceiling or curved surface such as in the passenger area of a passenger airplane.

The invention has been described in detail with a particular discussion directed to the preferred embodiment, but modifications and variations may occur to those skilled in the art from the preceding description and from the appended claims.

The invention claimed is:

1. An LED light fixture for being mounted to a ceiling, said LED light fixture having a rearward portion proximal a ceiling and a forward portion proximal a floor when said LED light fixture is mounted to the ceiling, said LED light fixture comprising:
   a base located on a vertical central axis and being upwardly located when said base is mounted to the ceiling;
   a downlight assembly comprising:
   a main light assembly for emitting main light illumination directed in a downward direction when said base is mounted to the ceiling, said main light assembly being operatively connected to said base and including: at least one LED for emitting main light illumination directed in a downward direction, and
   a nightlight assembly for emitting nightlight illumination, said nightlight assembly comprising: a nightlight LED supporting band; an LED nightlight support assembly including an array of nightlight LEDs positioned along said nightlight LED supporting band, said nightlight support assembly emitting nightlight illumination in a direction predominantly separate from the downward direction, said nightlight illumination being subdued nightlight illumination as compared to the main light illumination;
   an outer annular portion for supporting said LED nightlight support assembly on an upper surface of the exterior of said outer annular portion for emitting nightlight illumination in a direction predominantly separate from the downward direction; and
   a nightlight transmitting cover between said night light assembly and the upper surface of the exterior of said outer annular portion with a downlight for transmitting illumination from said nightlight LED supporting band to the exterior of said LED light fixture.

2. An LED light fixture according to claim 1 wherein said ceiling LED light fixture with a downlight comprises electric circuitry for providing electrical power to said array of nightlight LEDs, said electric circuitry including a switching assembly for selectively enabling electrical power to be transmitted to said array of LED nightlights to turn said array of nightlight LEDs on and off.

3. An LED light fixture according to claim 2 and further comprising:
   nightlight illumination directing structure for directing the nightlight illumination provided by said array of nightlight LEDs in at least one particular set of directions.

4. An LED light fixture according to claim 3 wherein said nightlight illumination directing structure restricts said nightlight illumination in a set of directions relative to said ceiling.

5. An LED light fixture according to claim 4 wherein said nightlight assembly further comprises: a nightlight LED mounting structure disposed adjacent a ceiling when said ceiling LED light fixture is mounted to the ceiling; and said array of nightlight LEDs being mounted on said nightlight LED mounting structure for directing nightlight LED illumination in directions substantially parallel to the ceiling in response to sufficient electrical power being transmitted to said array of nightlight LEDs.

6. An LED light fixture according to claim 4 wherein said LED light fixture with a downlight comprises:
   a nightlight LED mounting structure disposed adjacent a ceiling when said LED light fixture with a downlight is mounted to the ceiling; and
   said array of nightlight LEDs being mounted on said nightlight mounting structure for directing LED nightlight, said direction being relative to the ceiling and being substantially parallel to the ceiling.

7. An LED light fixture according to claim 5 wherein said nightlight LED mounting structure has a predetermined configuration and is composed of an exterior mounting location, and wherein said array of nightlight LEDs is mounted on said exterior mounting location to project nightlight illumination along a ceiling to which said ceiling LED light fixture is mounted.

8. An LED light fixture according to claim 7 and further comprising a nightlight light transmitter for modifying the LED light emitted by said array of nightlight LEDs and transmitting said nightlight illumination through said nightlight light transmitter.

9. An LED light fixture according to claim 7 and further comprising:
   a main light printed circuit board disposed forwardly of said exterior mounting location;
   main light LEDs mounted on said main light printed circuit board, wherein said main light LEDs are activated in response to the receipt of sufficient electrical power by said main light printed circuit board; and
   a diffuser located forwardly of said main light printed circuit board for diffusing light emitted by said main light LEDs.

10. An LED light fixture according to claim 6 wherein: said main light assembly comprises a main light printed circuit board, and said at least one LED for emitting main light illumination in a downward direction comprises an array of main light LEDs mounted on said main light printed circuit board for providing main light illumination in response to receiving electricity from a source of electricity, the main light illumination having variable correlated color temperature according to variable electrical characteristics of said electricity received by said main light LEDs; and wherein said LED light fixture further comprises: main light electric circuitry for supplying electricity from a source of electricity to said array of main light LEDs; and digitally operated electricity correlated color temperature switching apparatus for varying the control of the electricity transmitted to said main light LEDs to vary the correlated color temperature of the main light transmitted by said main light LEDs.

11. An LED light fixture according to claim 1 wherein said nightlight assembly is located separately from said main light assembly.

12. An LED light fixture according to claim 11 wherein at least one of said main light assembly and said nightlight assembly includes a variable correlated color temperature, and a switching assembly for varying said correlated color temperature of at least one of said main light assembly and said nightlight assembly.

13. An LED light fixture according to claim 11 wherein:
said at least one LED comprises an array of main light LEDs for providing main light illumination, said array of main light LEDs being disposed at a forward part of said LED light fixture; and
wherein said LED light fixture with a downlight further comprises:
a heat sink for absorbing heat generated by said array of main light LEDs;
a nightlight printed circuit board disposed rearwardly of said heat sink; and
an array of nightlight LEDs mounted on said nightlight printed circuit board for emitting nightlight illumination;
said array of nightlight LEDs emitting nightlight illumination in a direction different from the downward direction that said main light LEDs emit main light illumination.

14. An LED light fixture with a downlight for being mounted to a ceiling according to claim 1 wherein said array of nightlight LEDs includes a portion facing the exterior of said LED light fixture and further including a lamp shade on the exterior side of said portion of said nightlight LEDs facing the exterior of said LED light fixture.

15. A downlight-with-nightlight assembly comprising:
a housing including:
a truncated conical structure comprising a relatively narrow closed rearward end and a relatively wide forward open end, said relatively wide forward open end including an annular section proximal the truncated conical structure;
a main light assembly located rearwardly of said wide forward open end for generating main light from a position proximal the relatively narrow closed rearward end of said housing, the generated main light emanating through said relatively wide forward open end of said truncated conical structure in the downward direction; and
a nightlight assembly located on the upper exterior surface of the annular section, said nightlight assembly including a nightlight LED supporting band, an LED support assembly including an array of nightlight LEDs positioned along said nightlight LED supporting band, a nightlight transmitting cover located between said nightlight LED supporting band and the upper exterior surface of the annular section, said nightlight assembly emitting nightlight illumination transmitted through said nightlight transmitting cover in a direction predominantly separate from the downward direction.

16. A downlight-with-nightlight-assembly according to claim 15 wherein said downlight-with-nightlight-assembly comprises:
a body portion including:
a mounting section for being mounted in a support; and
wherein said main light assembly comprises an LED downlight main light section for emitting LED main light illumination, said LED downlight main light section being connected to said body portion; and
wherein said body portion further includes:
an LED nightlight holding section fixed with respect to said body portion; and
an LED nightlight illumination section operatively connected to said LED nightlight holding section.

17. A downlight-with-nightlight-assembly according to claim 16, wherein said downlight-with-nightlight-assembly further includes an LED downlight central section and said LED downlight central section includes a downlight peripheral portion, and wherein relatively wide open end of said truncated conical structure includes a periphery proximal to the exterior of downlight-with-nightlight-assembly, and wherein said periphery is located at said peripheral portion of said LED downlight central section; wherein said LED downlight main light section is disposed in said LED downlight central section for emitting main light from said LED downlight central section; and wherein said LED nightlight illumination section is disposed in a selected one of being proximate to and being located in said LED downlight peripheral portion.

18. A downlight-with-nightlight-assembly according to claim 17 wherein said LED downlight central section comprises a generally circular cross section.

19. A downlight-with-nightlight-assembly according to claim 18 wherein said LED downlight peripheral section is generally cylindrical in configuration and is generally concentric with said LED downlight central section.

20. A downlight-with-nightlight-assembly according to claim 19 wherein said LED downlight-with-nightlight-assembly is mountable to a ceiling; and wherein said LED downlight main light central section emits main light illumination in at least one main light direction; and wherein said LED nightlight illumination section emits nightlight illumination.

21. A downlight-with-nightlight assembly according to claim 15 wherein said main light assembly does not generate main light illumination that interferes with said nightlight illumination.

22. A downlight-with-nightlight assembly according to claim 21 and further comprising a nightlight mounting structure for being mounted to a first wall; and
wherein the main light assembly effects the generation of main light illumination in a direction opposite to the first wall.

23. A downlight-with-nightlight assembly according to claim 22 wherein the first wall is a ceiling, and the direction opposite to the first wall is a floor surface opposing the ceiling, and wherein said main light assembly directs light to the floor surface.

24. A downlight-with-nightlight assembly according to claim 15 wherein said nightlight assembly comprises at least one LED at said periphery proximal to the exterior of said downlight-with-nightlight assembly.

25. A downlight-with-nightlight assembly according to claim 24 and further including a lamp shade on a portion of said at least one LED facing the exterior of said downlight-with-nightlight assembly.

26. An electrically powered downlight and nightlight assembly for receiving electrical power from a power supply assembly, said electrically powered downlight and nightlight assembly comprising:
a main light assembly including:
a main light printed circuit board for receiving electric power from the power supply assembly and transmitting electric power;
at least one main light LED operatively connected to said main light printed circuit board for receiving electrical power transmitted from said main light printed circuit board and emitting main light illumination; and at least one main light director for receiving and directing the received main light illumination from said at least one main light LED in the downward direction; and a nightlight assembly for emitting nightlight illumination, said nightlight illumination having subdued illumination as compared to said main light illumination, said nightlight assembly comprising:

a nightlight LED supporting band; and an LED support assembly including an array of nightlight LEDs positioned along said LED supporting band;

an annular portion for supporting said LED support assembly on the exterior upper surface of the annular portion, said nightlight assembly emitting nightlight illumination in one or more directions predominantly separate from the downward direction; and a nightlight transmitting cover located between said LED support assembly and the exterior upper surface of the annular portion for transmitting illumination from said nightlight LED supporting band in a direction predominantly separate from the downward direction.

27. A ceiling/wall LED light fixture for being mounted on a selected one of a ceiling and a wall, said ceiling/wall LED light fixture comprising:

a base proximal a selected one of a ceiling and a wall when said ceiling/wall LED light fixture is mounted on a selected one of a ceiling and a wall, said base having a rearward portion, said base including:

an outer peripheral annular section proximal the exterior of said base and including an exterior upper surface;

a main light assembly located forwardly with respect to the rearward portion of said base when said ceiling/wall light fixture is mounted on a selected one of a ceiling and a wall, said main light assembly providing main light illumination in a main light downward direction; and a nightlight assembly emitting nightlight illumination and comprising:

a nightlight LED supporting band;

an LED support assembly including an array of nightlight LEDs positioned along said LED supporting band, said LED support assembly emitting nightlight illumination in a direction predominantly separate from the main light direction;

said nightlight illumination being subdued nightlight illumination as compared to the main light downward illumination;

said nightlight assembly being disposed on the exterior upper surface of the outer peripheral annular section; and a light transmitting cover located between said nightlight LED supporting band and the exterior upper surface of the outer peripheral annular section, with said LED support assembly transmitting nightlight illumination from the exterior of the upper surface of the outer peripheral annular section.

28. A ceiling/wall main light fixture according to claim 27 wherein main light assembly comprises: a base structure, said base structure having a rearward portion proximate a selected one of a ceiling and a wall when said ceiling/wall main light fixture is mounted to a selected one of a ceiling and a wall, and wherein said base structure has a forward portion distal the selected one of a ceiling and a wall when said LED ceiling/wall main light with a nightlight is mounted to a selected one of a ceiling and a wall; a nightlight LED band located at a selected one of being located adjacent the rearward side of said base structure and adjacent said forward portion; an array of nightlight LEDs attached to said nightlight LED band; a main light printed circuit board located forwardly of said base structure; an array of main light LEDs mounted on said main light printed circuit board; and a diffuser located forward of said main light printed circuit board, said diffuser being operatively attached to said base structure and enclosing said main light printed circuit board for transmitting main light LED light emissions from said array of main light LEDs.

29. An LED ceiling/wall light with a nightlight according to claim 28 and further including an optical lens forward of and adjacent to said main light printed circuit board for directing main light LED light emissions through said diffuser.

* * * * *